(12) United States Patent
Tabata et al.

(10) Patent No.: US 7,186,203 B2
(45) Date of Patent: Mar. 6, 2007

(54) PLANETARY GEAR TYPE MULTISTAGE TRANSMISSION FOR VEHICLE

(75) Inventors: Atsushi Tabata, Okazaki (JP); Akira Hoshino, Nishikamo-gun (JP); Terufumi Miyazaki, Toyota (JP); Atsushi Honda, Seto (JP); Akiharu Abe, Toyota (JP); Hirofumi Ota, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 147 days.

(21) Appl. No.: 10/893,922

(22) Filed: Jul. 20, 2004

(65) Prior Publication Data

US 2005/0020398 A1 Jan. 27, 2005

(30) Foreign Application Priority Data

| Jul. 22, 2003 | (JP) | ............................. 2003-277778 |
| Jul. 24, 2003 | (JP) | ............................. 2003-279310 |
| Jul. 28, 2003 | (JP) | ............................. 2003-281318 |

(51) Int. Cl.
*F16H 3/44* (2006.01)

(52) U.S. Cl. .................... 475/286; 475/207; 475/214; 475/215; 475/218; 475/219; 475/271; 475/329; 475/330

(58) Field of Classification Search .............. 475/207, 475/209, 214, 215, 218, 219, 271, 286, 329, 475/330
See application file for complete search history.

(56) References Cited

U.S. PATENT DOCUMENTS

| 4,614,133 | A | * | 9/1986 | Nerstad et al. ............. 475/218 |
| 4,976,670 | A | * | 12/1990 | Klemen ...................... 475/278 |
| 5,039,305 | A | * | 8/1991 | Pierce .......................... 475/71 |
| 5,593,359 | A | * | 1/1997 | Justice et al. ............... 475/280 |
| 6,080,074 | A | * | 6/2000 | Ulbrich et al. ................ 475/76 |

(Continued)

FOREIGN PATENT DOCUMENTS

DE 10115983 A1 10/2002

(Continued)

*Primary Examiner*—David D. Le
(74) *Attorney, Agent, or Firm*—Oblon, Spivak, McClelland, Maier & Neustadt, P.C.

(57) ABSTRACT

The transmission 10 is constructed so that, in the first transmission portion 36, the rotation of the input shaft 16 is outputted to the second transmission portion 38 via the first intermediate output path M1 and the second intermediate output path M2 accelerated and rotated with respect to the first intermediate output path M1, and, in the second transmission portion 38, the first rotary element RE1 (S2 and S3) is selectively connected to the first driven gear CG1B via the first clutch C1 and is selectively connected to the second driven gear CG2B via the third clutch C3, the second rotary element RE2 (CA1 and CA2) are selectively connected to the first driven gear CG1B via the second clutch C2 and are selectively connected to the transmission case 12 operating as a non-rotating member via the first brake B1, the third rotary element RE3 (R1, R2 and CA3) is connected to the output gear 28 operating as an output rotating member, the fourth rotary element RE4 (S1) is selectively connected to the transmission case 12 via the second brake B2, and the fifth rotary element RE5 (R3) is selectively connected to the second driven gear CG2B via the fourth clutch C4. A forward multistage transmission can be obtained by engagement operations of the friction engagement devices.

11 Claims, 81 Drawing Sheets

U.S. PATENT DOCUMENTS

| | | | |
|---|---|---|---|
| 6,471,615 B1 * | 10/2002 | Naraki et al. | 475/262 |
| 6,634,980 B1 | 10/2003 | Ziemer | |
| 2004/0166984 A1 * | 8/2004 | Inoue | 475/207 |

FOREIGN PATENT DOCUMENTS

| JP | 8-105496 | 4/1996 |
|---|---|---|
| JP | 2956173 | 7/1999 |
| JP | 2000-199549 | 7/2000 |
| JP | 2000-266138 | 9/2000 |
| JP | 2001-82555 | 3/2001 |
| JP | 2001-182785 | 7/2001 |
| JP | 2002-206601 | 7/2002 |
| JP | 2002-227940 | 8/2002 |
| JP | 2002-295609 | 10/2002 |
| JP | 2002-323098 | 11/2002 |

* cited by examiner

| | C1 | C2 | C3 | C4 | B1 | B2 | Transmission ratio | Step |
|---|---|---|---|---|---|---|---|---|
| 1st | ○ | | | | | ○ | 3.518 | |
| 2nd | ○ | | | | ○ | | 2.508 | 1.402 |
| 3rd | ○ | ○ | | | | | 1.802 | 1.392 |
| 4th-1 | ○ | | | ○ | | | 1.295 | 1.391 |
| 5th | | | ○ | ○ | | | 1.000 | 1.295 |
| 6th | | ○ | | ○ | | | 0.834 | 1.200 |
| 7th | | | | ○ | ○ | | 0.690 | 1.208 |
| 8th | | | ○ | | ○ | | 0.588 | 1.173 |
| R | | ○ | | | | ○ | 2.574 | Total 5.980 |

|      | C1 | C2 | C3 | C4 | B1 | B2 | Transmission ratio | Step |
|------|----|----|----|----|----|----|--------|-------|
| 1st  | ○  |    |    |    |    | ○  | 3.518  |       |
|      |    |    |    |    |    |    |        | 1.402 |
| 2nd  | ○  |    |    |    | ○  |    | 2.508  |       |
|      |    |    |    |    |    |    |        | 1.392 |
| 3rd  | ○  | ○  |    |    |    |    | 1.802  |       |
|      |    |    |    |    |    |    |        | 1.448 |
| 4th-2| ○  |    |    | ○  |    |    | 1.244  |       |
|      |    |    |    |    |    |    |        | 1.244 |
| 5th  |    |    | ○  | ○  |    |    | 1.000  |       |
|      |    |    |    |    |    |    |        | 1.200 |
| 6th  |    | ○  |    | ○  |    |    | 0.834  |       |
|      |    |    |    |    |    |    |        | 1.208 |
| 7th  |    |    |    | ○  | ○  |    | 0.690  |       |
|      |    |    |    |    |    |    |        | 1.173 |
| 8th  |    |    | ○  |    | ○  |    | 0.588  |       |
|      |    |    |    |    |    |    |        | Total |
| R    |    | ○  |    |    |    | ○  | 2.574  | 5.980 |

| | C1 | C2 | C3 | C4 | B1 | B2 | Transmission ratio | Step |
|---|---|---|---|---|---|---|---|---|
| 1st | ○ | | | | | ○ | 3.518 | |
| 2nd | ○ | | | | ○ | | 2.508 | 1.402 |
| 3rd | ○ | ○ | | | | | 1.802 | 1.392 |
| 4th-1 | ○ | | | ○ | | | 1.295 | 1.391 |
| 5th | | | ○ | ○ | | | 1.000 | 1.295 |
| 6th | | ○ | | ○ | | | 0.834 | 1.200 |
| 7th | | | | ○ | ○ | | 0.690 | 1.208 |
| 8th | | | ○ | | ○ | | 0.588 | 1.173 |
| R | | ○ | | | | ○ | 2.574 | Total 5.980 |

| | C1 | C2 | C3 | C4 | B1 | B2 | Transmission ratio | Step |
|---|---|---|---|---|---|---|---|---|
| 1st | ○ | | | | | ○ | 3.518 | |
| 2nd | ○ | | | | ○ | | 2.508 | 1.402 |
| 3rd | ○ | ○ | | | | | 1.802 | 1.392 |
| 4th-2 | ○ | | | ○ | | | 1.244 | 1.448 |
| 5th | | | ○ | ○ | | | 1.000 | 1.244 |
| 6th | | ○ | | ○ | | | 0.834 | 1.200 |
| 7th | | | ○ | ○ | | | 0.690 | 1.208 |
| 8th | | | ○ | | ○ | | 0.588 | 1.173 |
| R | | ○ | | | | ○ | 2.574 | Total 5.980 |

| | C1 | C2 | C3 | C4 | B1 | B2 | Transmission ratio | Step |
|---|---|---|---|---|---|---|---|---|
| 1st | ○ | | | | | ○ | 3.518 | |
| 2nd | ○ | | | | ○ | | 2.508 | 1.402 |
| 3rd | ○ | ○ | | | | | 1.802 | 1.392 |
| 4th-1 | ○ | | | ○ | | | 1.295 | 1.391 |
| 5th | | | ○ | ○ | | | 1.000 | 1.295 |
| 6th | | ○ | | ○ | | | 0.834 | 1.200 |
| 7th | | | | ○ | ○ | | 0.690 | 1.208 |
| 8th | | | ○ | | ○ | | 0.588 | 1.173 |
| R | | ○ | | | | ○ | 2.574 | Total 5.980 |

| | C1 | C2 | C3 | C4 | B1 | B2 | Transmission ratio | Step |
|---|---|---|---|---|---|---|---|---|
| 1st | ○ | | | | | ○ | 3.518 | |
| 2nd | ○ | | | | ○ | | 2.508 | 1.402 |
| 3rd | ○ | ○ | | | | | 1.802 | 1.392 |
| 4th-2 | ○ | | | ○ | | | 1.244 | 1.448 |
| 5th | | | ○ | ○ | | | 1.000 | 1.244 |
| 6th | | ○ | | ○ | | | 0.834 | 1.200 |
| 7th | | | ○ | ○ | | | 0.690 | 1.208 |
| 8th | | | ○ | | ○ | | 0.588 | 1.173 |
| R | | ○ | | | | ○ | 2.574 | Total 5.980 |

| | C1 | C2 | C3 | C4 | B1 | B2 | Transmission ratio | Step |
|---|---|---|---|---|---|---|---|---|
| 1st | ○ | | | | | ○ | 3.550 | |
| 2nd | ○ | | | | ○ | | 2.456 | 1.445 |
| 3rd | ○ | ○ | | | | | 1.818 | 1.351 |
| 4th-1 | ○ | | ○ | | | | 1.349 | 1.348 |
| 5th | | | ○ | ○ | | | 1.000 | 1.349 |
| 6th | | ○ | | ○ | | | 0.792 | 1.263 |
| 7th | | | | ○ | ○ | | 0.632 | 1.254 |
| 8th | | | ○ | | ○ | | 0.526 | 1.200 |
| R | | ○ | | | | ○ | 2.597 | Total 6.745 |

|       | C1 | C2 | C3 | C4 | B1 | B2 | Transmission ratio | Step |
|-------|----|----|----|----|----|----|----|----|
| 1st   | ○  |    |    |    |    | ○  | 3.550 |       |
|       |    |    |    |    |    |    |       | 1.445 |
| 2nd   | ○  |    |    |    | ○  |    | 2.456 |       |
|       |    |    |    |    |    |    |       | 1.351 |
| 3rd   | ○  | ○  |    |    |    |    | 1.818 |       |
|       |    |    |    |    |    |    |       | 1.398 |
| 4th-2 | ○  |    |    | ○  |    |    | 1.300 |       |
|       |    |    |    |    |    |    |       | 1.300 |
| 5th   |    |    | ○  | ○  |    |    | 1.000 |       |
|       |    |    |    |    |    |    |       | 1.263 |
| 6th   |    | ○  |    | ○  |    |    | 0.792 |       |
|       |    |    |    |    |    |    |       | 1.254 |
| 7th   |    |    |    | ○  | ○  |    | 0.632 |       |
|       |    |    |    |    |    |    |       | 1.200 |
| 8th   |    |    | ○  |    | ○  |    | 0.526 |       |
|       |    |    |    |    |    |    |       | Total |
| R     |    | ○  |    |    |    | ○  | 2.597 | 6.745 |

|  | C1 | C2 | C3 | C4 | B1 | B2 | Transmission ratio | Step |
|---|---|---|---|---|---|---|---|---|
| 1st | ○ |  |  |  |  | ○ | 3.550 | |
| 2nd | ○ |  |  |  | ○ |  | 2.456 | 1.445 |
| 3rd | ○ | ○ |  |  |  |  | 1.818 | 1.351 |
| 4th-1 | ○ |  |  | ○ |  |  | 1.349 | 1.348 |
| 5th |  |  | ○ | ○ |  |  | 1.000 | 1.349 |
| 6th |  | ○ |  | ○ |  |  | 0.792 | 1.263 |
| 7th |  |  | ○ |  | ○ |  | 0.632 | 1.254 |
| 8th |  |  | ○ |  |  | ○ | 0.526 | 1.200 |
| R |  | ○ |  |  |  | ○ | 2.597 | Total 6.745 |

| | C1 | C2 | C3 | C4 | B1 | B2 | Transmission ratio | Step |
|---|---|---|---|---|---|---|---|---|
| 1st | ○ | | | | | ○ | 3.550 | |
| | | | | | | | | 1.445 |
| 2nd | ○ | | | | ○ | | 2.456 | |
| | | | | | | | | 1.351 |
| 3rd | ○ | ○ | | | | | 1.818 | |
| | | | | | | | | 1.398 |
| 4th-2 | ○ | | | ○ | | | 1.300 | |
| | | | | | | | | 1.300 |
| 5th | | | ○ | ○ | | | 1.000 | |
| | | | | | | | | 1.263 |
| 6th | | ○ | | ○ | | | 0.792 | |
| | | | | | | | | 1.254 |
| 7th | | | | ○ | ○ | | 0.632 | |
| | | | | | | | | 1.200 |
| 8th | | | ○ | | ○ | | 0.526 | |
| R | | ○ | | | | ○ | 2.597 | Total 6.745 |

|       | C1 | C2 | C3 | C4 | B1 | B2 | Transmission ratio | Step  |
|-------|----|----|----|----|----|----|--------------------|-------|
| 1st   | ○  |    |    |    |    | ○  | 3.550              |       |
| 2nd   | ○  |    |    |    | ○  |    | 2.456              | 1.445 |
| 3rd   | ○  | ○  |    |    |    |    | 1.818              | 1.351 |
| 4th-1 | ○  |    |    | ○  |    |    | 1.349              | 1.348 |
| 5th   |    |    | ○  | ○  |    |    | 1.000              | 1.349 |
| 6th   |    | ○  |    | ○  |    |    | 0.792              | 1.263 |
| 7th   |    |    |    | ○  | ○  |    | 0.632              | 1.254 |
| 8th   |    |    | ○  |    | ○  |    | 0.526              | 1.200 |
| R     |    | ○  |    |    |    | ○  | 2.597              | Total 6.745 |

|  | C1 | C2 | C3 | C4 | B1 | B2 | Transmission ratio | Step |
|---|---|---|---|---|---|---|---|---|
| 1st | ○ |  |  |  |  | ○ | 3.550 | |
| 2nd | ○ |  |  |  | ○ |  | 2.456 | 1.445 |
| 3rd | ○ | ○ |  |  |  |  | 1.818 | 1.351 |
| 4th-2 | ○ |  |  | ○ |  |  | 1.300 | 1.398 |
| 5th |  |  | ○ | ○ |  |  | 1.000 | 1.300 |
| 6th |  | ○ |  | ○ |  |  | 0.792 | 1.263 |
| 7th |  |  |  | ○ | ○ |  | 0.632 | 1.254 |
| 8th |  |  | ○ |  | ○ |  | 0.526 | 1.200 |
| R |  | ○ |  |  |  | ○ | 2.597 | Total 6.745 |

| | C1 | C2 | C3 | C4 | B1 | B2 | Transmission ratio | Step |
|---|---|---|---|---|---|---|---|---|
| 1st | ○ | | | | | ○ | 3.550 | |
| 2nd | ○ | | | | ○ | | 2.456 | 1.445 |
| 3rd | ○ | ○ | | | | | 1.818 | 1.351 |
| 4th-1 | ○ | | ○ | | | | 1.349 | 1.348 |
| 5th | | | ○ | ○ | | | 1.000 | 1.349 |
| 6th | | ○ | | ○ | | | 0.792 | 1.263 |
| 7th | | | | ○ | ○ | | 0.632 | 1.254 |
| 8th | | | ○ | | | ○ | 0.526 | 1.200 |
| R | | ○ | | | | ○ | 2.597 | Total 6.745 |

| | C1 | C2 | C3 | C4 | B1 | B2 | Transmission ratio | Step |
|---|---|---|---|---|---|---|---|---|
| 1st | ○ | | | | | ○ | 3.550 | |
| 2nd | ○ | | | | ○ | | 2.456 | 1.445 |
| 3rd | ○ | ○ | | | | | 1.818 | 1.351 |
| 4th-2 | ○ | | | ○ | | | 1.300 | 1.398 |
| 5th | | | ○ | ○ | | | 1.000 | 1.300 |
| 6th | | ○ | | ○ | | | 0.792 | 1.263 |
| 7th | | | | ○ | ○ | | 0.632 | 1.254 |
| 8th | | | ○ | | | ○ | 0.526 | 1.200 |
| R | | ○ | | | | ○ | 2.597 | Total 6.745 |

| | C1 | C2 | C3 | C4 | B1 | B2 | Transmission ratio | Step |
|---|---|---|---|---|---|---|---|---|
| 1st | ○ | | | | | ○ | 3.550 | |
| 2nd | ○ | | | | ○ | | 2.456 | 1.445 |
| 3rd | ○ | ○ | | | | | 1.818 | 1.351 |
| 4th-1 | ○ | | | ○ | | | 1.349 | 1.348 |
| 5th | | | ○ | ○ | | | 1.000 | 1.349 |
| 6th | | ○ | | ○ | | | 0.792 | 1.263 |
| 7th | | | | ○ | ○ | | 0.632 | 1.254 |
| 8th | | | ○ | | ○ | | 0.526 | 1.200 |
| R | | ○ | | | | ○ | 2.597 | Total 6.745 |

|  | C1 | C2 | C3 | C4 | B1 | B2 | Transmission ratio | Step |
|---|---|---|---|---|---|---|---|---|
| 1st | ○ |  |  |  |  | ○ | 3.550 |  |
| 2nd | ○ |  |  |  | ○ |  | 2.456 | 1.445 |
| 3rd | ○ | ○ |  |  |  |  | 1.818 | 1.351 |
| 4th-2 | ○ |  |  | ○ |  |  | 1.300 | 1.398 |
| 5th |  |  | ○ | ○ |  |  | 1.000 | 1.300 |
| 6th |  | ○ |  | ○ |  |  | 0.792 | 1.263 |
| 7th |  |  |  | ○ | ○ |  | 0.632 | 1.254 |
| 8th |  |  | ○ |  | ○ |  | 0.526 | 1.200 |
| R |  | ○ |  |  |  | ○ | 2.597 | Total 6.745 |

|  | C1 | C2 | C3 | C4 | B1 | B2 | B3 | Transmission ratio | Step |
|---|---|---|---|---|---|---|---|---|---|
| 1st | ○ |  |  |  |  |  | ○ | 4.169 |  |
| 2nd | ○ |  |  |  |  | ○ |  | 3.067 | 1.359 |
| 3rd | ○ |  |  |  | ○ |  |  | 2.271 | 1.351 |
| 4th | ○ | ○ |  |  |  |  |  | 1.745 | 1.301 |
| 5th | ○ |  | ○ |  |  |  |  | 1.321 | 1.321 |
| 6th |  |  | ○ | ○ |  |  |  | 1.000 | 1.321 |
| 7th |  | ○ | ○ |  |  |  |  | 0.780 | 1.282 |
| 8th |  |  | ○ |  | ○ |  |  | 0.602 | 1.295 |
| R1 |  | ○ |  |  |  | ○ |  | 2.644 | Total 6.921 |

| | C1 | C2 | C3 | C4 | B1 | B2 | B3 | Transmission ratio | Step |
|---|---|---|---|---|---|---|---|---|---|
| 1st | ○ | | | | | | ○ | 4.169 | |
| 2nd | ○ | | | | | ○ | | 3.067 | 1.359 |
| 3rd | ○ | | | ○ | | | | 2.271 | 1.351 |
| 4th | ○ | ○ | | | | | | 1.745 | 1.301 |
| 5th | ○ | | ○ | | | | | 1.321 | 1.321 |
| 6th | | | ○ | ○ | | | | 1.000 | 1.321 |
| 7th | | ○ | ○ | | | | | 0.780 | 1.282 |
| 8th | | | ○ | | ○ | | | 0.602 | 1.295 |
| R1 | | ○ | | | | ○ | | 2.644 | Total 6.921 |

| | C1 | C2 | C3 | C4 | B1 | B2 | B3 | Transmission ratio | Step |
|---|---|---|---|---|---|---|---|---|---|
| 1st | ○ | | | | | | ○ | 4.169 | |
| 2nd | ○ | | | | | ○ | | 3.067 | 1.359 |
| 3rd | ○ | | | ○ | | | | 2.271 | 1.351 |
| 4th | ○ | ○ | | | | | | 1.745 | 1.301 |
| 5th | ○ | | ○ | | | | | 1.321 | 1.321 |
| 6th | | | ○ | ○ | | | | 1.000 | 1.321 |
| 7th | | ○ | ○ | | | | | 0.780 | 1.282 |
| 8th | | | ○ | | ○ | | | 0.602 | 1.295 |
| R1 | | ○ | | | | ○ | | 2.644 | Total 6.921 |

|  | C1 | C2 | C3 | C4 | B1 | B2 | B3 | Transmission ratio | Step |
|---|---|---|---|---|---|---|---|---|---|
| 1st | ○ |  |  |  |  |  | ○ | 4.169 |  |
| 2nd | ○ |  |  |  |  | ○ |  | 3.067 | 1.359 |
| 3rd | ○ |  |  | ○ |  |  |  | 2.271 | 1.351 |
| 4th | ○ | ○ |  |  |  |  |  | 1.745 | 1.301 |
| 5th | ○ |  | ○ |  |  |  |  | 1.321 | 1.321 |
| 6th |  |  | ○ | ○ |  |  |  | 1.000 | 1.321 |
| 7th |  | ○ | ○ |  |  |  |  | 0.780 | 1.282 |
| 8th |  |  | ○ |  | ○ |  |  | 0.602 | 1.295 |
| R1 |  | ○ |  |  |  | ○ |  | 2.644 | Total 6.921 |

|      | C1 | C2 | C3 | C4 | B1 | B2 | B3 | Transmission ratio | Step |
|------|----|----|----|----|----|----|----|--------------------|------|
| 1st  | ○  |    |    |    |    |    | ○  | 4.169              |      |
| 2nd  | ○  |    |    |    |    | ○  |    | 3.067              | 1.359 |
| 3rd  | ○  |    |    | ○  |    |    |    | 2.271              | 1.351 |
| 4th  | ○  | ○  |    |    |    |    |    | 1.745              | 1.301 |
| 5th  | ○  |    | ○  |    |    |    |    | 1.321              | 1.321 |
| 6th  |    |    | ○  | ○  |    |    |    | 1.000              | 1.321 |
| 7th  |    | ○  | ○  |    |    |    |    | 0.780              | 1.282 |
| 8th  |    |    | ○  |    | ○  |    |    | 0.602              | 1.295 |
| R1   |    | ○  |    |    |    | ○  |    | 2.644              | Total 6.921 |

| | C1 | C2 | C3 | C4 | B1 | B2 | B3 | Transmission ratio | Step |
|---|---|---|---|---|---|---|---|---|---|
| 1st | ○ | | | | | | ○ | 4.169 | |
| 2nd | ○ | | | | | ○ | | 3.067 | 1.359 |
| 3rd | ○ | | | | ○ | | | 2.271 | 1.351 |
| 4th | ○ | ○ | | | | | | 1.745 | 1.301 |
| 5th | ○ | | ○ | | | | | 1.321 | 1.321 |
| 6th | | | ○ | ○ | | | | 1.000 | 1.321 |
| 7th | | ○ | | ○ | | | | 0.780 | 1.282 |
| 8th | | | ○ | | ○ | | | 0.602 | 1.295 |
| R1 | | ○ | | | | | ○ | 2.644 | Total 6.921 |
| R2 | | | | ○ | | | ○ | 3.611 | |

|  | C1 | C2 | C3 | C4 | B1 | B2 | Transmission ratio | Step |
|---|---|---|---|---|---|---|---|---|
| 1st | ○ |  |  |  |  | ○ | 3.700 |  |
| 2nd |  |  | ○ |  |  | ○ | 2.330 | 1.588 |
| 3rd |  | ○ |  |  |  | ○ | 1.700 | 1.370 |
| 4th |  | ○ | ○ |  |  |  | 1.259 | 1.350 |
| 5th | ○ | ○ |  |  |  |  | 1.000 | 1.259 |
| 6th |  | ○ |  | ○ |  |  | 0.842 | 1.187 |
| 7th | ○ |  |  | ○ |  |  | 0.726 | 1.161 |
| 8th |  |  | ○ | ○ |  |  | 0.630 | 1.152 |
| R | ○ |  |  |  | ○ |  | 2.857 | Total 5.876 |

| | C1 | C2 | C3 | C4 | B1 | B2 | Transmission ratio | Step |
|---|---|---|---|---|---|---|---|---|
| 1st | ○ | | | | | ○ | 3.700 | |
| 2nd | | | ○ | | | ○ | 2.330 | 1.588 |
| 3rd | | ○ | | | | ○ | 1.700 | 1.370 |
| 4th | | ○ | ○ | | | | 1.259 | 1.350 |
| 5th | ○ | ○ | | | | | 1.000 | 1.259 |
| 6th | | ○ | | ○ | | | 0.842 | 1.187 |
| 7th | ○ | | | ○ | | | 0.726 | 1.161 |
| 8th | | | ○ | ○ | | | 0.630 | 1.152 |
| R | ○ | | | | | ○ | 2.857 | Total 5.876 |

| | C1 | C2 | C3 | C4 | B1 | B2 | Transmission ratio | Step |
|---|---|---|---|---|---|---|---|---|
| 1st | ○ | | | | | ○ | 3.700 | 1.588 |
| 2nd | | | ○ | | | ○ | 2.330 | 1.370 |
| 3rd | | ○ | | | | ○ | 1.700 | 1.350 |
| 4th | | ○ | ○ | | | | 1.259 | 1.259 |
| 5th | ○ | ○ | | | | | 1.000 | 1.187 |
| 6th | | ○ | | ○ | | | 0.842 | 1.161 |
| 7th | ○ | | | ○ | | | 0.726 | 1.152 |
| 8th | | | ○ | ○ | | | 0.630 | Total 5.876 |
| R | ○ | | | | ○ | | 2.857 | |

| | C1 | C2 | C3 | C4 | B1 | B2 | Transmission ratio | Step |
|---|---|---|---|---|---|---|---|---|
| 1st | ○ | | | | | ○ | 3.700 | |
| 2nd | | | ○ | | | ○ | 2.330 | 1.588 |
| 3rd | | ○ | | | | ○ | 1.700 | 1.370 |
| 4th | | ○ | ○ | | | | 1.259 | 1.350 |
| 5th | ○ | ○ | | | | | 1.000 | 1.259 |
| 6th | | ○ | | ○ | | | 0.842 | 1.187 |
| 7th | ○ | | | ○ | | | 0.726 | 1.161 |
| 8th | | | ○ | ○ | | | 0.630 | 1.152 |
| R | ○ | | | | ○ | | 2.857 | Total 5.876 |

| | C1 | C2 | C3 | C4 | B1 | B2 | Transmission ratio | Step |
|---|---|---|---|---|---|---|---|---|
| 1st | ○ | | | | | ○ | 3.700 | |
| 2nd | | | ○ | | | ○ | 2.330 | 1.588 |
| 3rd | | ○ | | | | ○ | 1.700 | 1.370 |
| 4th | | ○ | ○ | | | | 1.259 | 1.350 |
| 5th | ○ | ○ | | | | | 1.000 | 1.259 |
| 6th | | ○ | | ○ | | | 0.842 | 1.187 |
| 7th | ○ | | | ○ | | | 0.726 | 1.161 |
| 8th | | | ○ | ○ | | | 0.630 | 1.152 |
| R | ○ | | | | | ○ | 2.857 | Total 5.876 |

| | C1 | C2 | C3 | C4 | B1 | B2 | Transmission ratio | Step |
|---|---|---|---|---|---|---|---|---|
| 1st | ○ | | | | | ○ | 3.700 | |
| 2nd | | | ○ | | | ○ | 2.330 | 1.588 |
| 3rd | | ○ | | | | ○ | 1.700 | 1.370 |
| 4th | | ○ | ○ | | | | 1.259 | 1.350 |
| 5th | ○ | ○ | | | | | 1.000 | 1.259 |
| 6th | | ○ | | ○ | | | 0.842 | 1.187 |
| 7th | ○ | | | ○ | | | 0.726 | 1.161 |
| 8th | | | ○ | ○ | | | 0.630 | 1.152 |
| R | ○ | | | | ○ | | 2.857 | Total 5.876 |

| | C1 | C2 | C3 | C4 | C5 | B1 | Transmission ratio | Step |
|---|---|---|---|---|---|---|---|---|
| 1st | ○ | | | | | ○ | 4.050 | |
| 2nd | | ○ | | | | ○ | 3.000 | 1.350 |
| 3rd | | | | ○ | | ○ | 2.341 | 1.281 |
| 4th | | | ○ | | | ○ | 1.800 | 1.301 |
| 5th | | | ○ | ○ | | | 1.350 | 1.333 |
| 6th | ○ | (○) | ○ | | | | 1.000 | 1.350 |
| 7th | | | ○ | | ○ | | 0.755 | 1.324 |
| 8th | | | | ○ | ○ | | 0.578 | 1.306 |
| R | | ○ | | ○ | | | 2.562 | Total 7.006 |

| | C1 | C2 | C3 | C4 | C5 | B1 | Transmission ratio | Step |
|---|---|---|---|---|---|---|---|---|
| 1st | ○ | | | | | ○ | 4.050 | |
| 2nd | | ○ | | | | ○ | 3.000 | 1.350 |
| 3rd | | | | ○ | | ○ | 2.341 | 1.281 |
| 4th | | | ○ | | | ○ | 1.800 | 1.301 |
| 5th | | | ○ | ○ | | | 1.350 | 1.333 |
| 6th | ○ | (○) | ○ | | | | 1.000 | 1.350 |
| 7th | | | ○ | | ○ | | 0.755 | 1.324 |
| 8th | | | | ○ | ○ | | 0.578 | 1.306 |
| R | | ○ | | ○ | | | 2.562 | Total 7.006 |

|  | C1 | C2 | C3 | C4 | C5 | B1 | Transmission ratio | Step |
|---|---|---|---|---|---|---|---|---|
| 1st | ○ |  |  |  |  | ○ | 4.050 |  |
| 2nd |  | ○ |  |  |  | ○ | 3.000 | 1.350 |
| 3rd |  |  |  | ○ |  | ○ | 2.341 | 1.281 |
| 4th |  |  | ○ |  |  | ○ | 1.800 | 1.301 |
| 5th |  |  | ○ | ○ |  |  | 1.350 | 1.333 |
| 6th | ○ | (○) | ○ |  |  |  | 1.000 | 1.350 |
| 7th |  |  | ○ |  | ○ |  | 0.755 | 1.324 |
| 8th |  |  |  | ○ | ○ |  | 0.578 | 1.306 |
| R |  | ○ |  | ○ |  |  | 2.562 | Total 7.006 |

|  | C1 | C2 | C3 | C4 | C5 | B1 | Transmission ratio | Step |
|---|---|---|---|---|---|---|---|---|
| 1st | ○ |  |  |  |  | ○ | 4.050 |  |
|  |  |  |  |  |  |  |  | 1.350 |
| 2nd |  | ○ |  |  |  | ○ | 3.000 |  |
|  |  |  |  |  |  |  |  | 1.281 |
| 3rd |  |  |  | ○ |  | ○ | 2.341 |  |
|  |  |  |  |  |  |  |  | 1.301 |
| 4th |  |  | ○ |  |  | ○ | 1.800 |  |
|  |  |  |  |  |  |  |  | 1.333 |
| 5th |  |  | ○ | ○ |  |  | 1.350 |  |
|  |  |  |  |  |  |  |  | 1.350 |
| 6th | ○ | (○) | ○ |  |  |  | 1.000 |  |
|  |  |  |  |  |  |  |  | 1.324 |
| 7th |  |  | ○ |  | ○ |  | 0.755 |  |
|  |  |  |  |  |  |  |  | 1.306 |
| 8th |  |  |  | ○ | ○ |  | 0.578 |  |
| R |  | ○ |  | ○ |  |  | 2.562 | Total 7.006 |

|  | C1 | C2 | C3 | C4 | C5 | B1 | B2 | Transmission ratio | Step |
|---|---|---|---|---|---|---|---|---|---|
| 1st | ○ |  |  |  |  | ○ |  | 4.050 | |
| 2nd |  | ○ |  |  |  | ○ |  | 3.000 | 1.350 |
| 3rd |  |  |  | ○ |  | ○ |  | 2.341 | 1.281 |
| 4th |  |  | ○ |  |  | ○ |  | 1.800 | 1.301 |
| 5th |  |  | ○ | ○ |  |  |  | 1.350 | 1.333 |
| 6th | ○ | (○) | ○ |  |  |  |  | 1.000 | 1.350 |
| 7th |  |  | ○ |  | ○ |  |  | 0.755 | 1.324 |
| 8th |  |  |  | ○ | ○ |  |  | 0.578 | 1.306 |
| R |  |  |  | ○ |  |  | ○ | 2.813 | Total 7.006 |

| | C1 | C2 | C3 | C4 | B1 | B2 | B3 | Transmission ratio | Step |
|---|---|---|---|---|---|---|---|---|---|
| 1st | | ○ | | | | | ○ | 4.817 | |
| 2nd | | ○ | | | | ○ | | 3.653 | 1.319 |
| 3rd | | ○ | | ○ | | | | 2.791 | 1.309 |
| 4th | ○ | ○ | | | | | | 2.000 | 1.395 |
| 5th | | ○ | ○ | | | | | 1.558 | 1.283 |
| 6th | | ○ | | ○ | | | | 1.262 | 1.235 |
| 7th | | | ○ | ○ | | | | 1.000 | 1.262 |
| 8th | ○ | | | ○ | | | | 0.837 | 1.195 |
| 9th | | | ○ | ○ | | | | 0.719 | 1.163 |
| R1 | ○ | | | | | | ○ | 5.127 | Total 1-8th 5.756 |
| R2 | ○ | | | | | ○ | | 2.182 | 1-9th 6.700 |

|  | C1 | C2 | C3 | C4 | B1 | B2 | B3 | Transmission ratio | Step |
|---|---|---|---|---|---|---|---|---|---|
| 1st |  | ○ |  |  |  |  | ○ | 4.817 |  |
| 2nd |  | ○ |  |  |  | ○ |  | 3.653 | 1.319 |
| 3rd |  | ○ |  |  | ○ |  |  | 2.791 | 1.309 |
| 4th | ○ | ○ |  |  |  |  |  | 2.000 | 1.395 |
| 5th |  | ○ | ○ |  |  |  |  | 1.558 | 1.283 |
| 6th |  | ○ |  | ○ |  |  |  | 1.262 | 1.235 |
| 7th |  |  | ○ | ○ |  |  |  | 1.000 | 1.262 |
| 8th | ○ |  |  | ○ |  |  |  | 0.837 | 1.195 |
| 9th |  |  | ○ | ○ |  |  |  | 0.719 | 1.163 |
| R1 | ○ |  |  |  |  |  | ○ | 5.127 | Total |
| R2 | ○ |  |  |  |  | ○ |  | 2.182 | 1-8th 5.756 / 1-9th 6.700 |

| | C1 | C2 | C3 | C4 | B1 | B2 | Transmission ratio | Step |
|---|---|---|---|---|---|---|---|---|
| 1st | ○ | | | | | ○ | 3.700 | |
| 2nd | | | ○ | | | ○ | 2.330 | 1.588 |
| 3rd | | ○ | | | | ○ | 1.700 | 1.370 |
| 4th | | ○ | ○ | | | | 1.259 | 1.350 |
| 5th | ○ | ○ | | | | | 1.000 | 1.259 |
| 6th | | ○ | | ○ | | | 0.842 | 1.187 |
| 7th | ○ | | | ○ | | | 0.726 | 1.161 |
| 8th | | | ○ | ○ | | | 0.630 | 1.152 |
| R | ○ | | | | ○ | | 2.857 | Total 5.876 |

|      | C1 | C2 | C3 | C4 | B1 | B2 | Transmission ratio | Step |
|------|----|----|----|----|----|----|---------------------|------|
| 1st  | ○  |    |    |    |    | ○  | 3.550               |      |
| 2nd  | ○  |    |    |    | ○  |    | 2.456               | 1.445 |
| 3rd  | ○  | ○  |    |    |    |    | 1.818               | 1.351 |
| 4th-1| ○  |    |    | ○  |    |    | 1.349               | 1.348 |
| 5th  |    |    | ○  | ○  |    |    | 1.000               | 1.349 |
| 6th  |    | ○  |    | ○  |    |    | 0.792               | 1.263 |
| 7th  |    |    || ○  | ○  |    | 0.632               | 1.254 |
| 8th  |    |    | ○  |    | ○  |    | 0.526               | 1.200 |
| R    |    | ○  |    |    |    | ○  | 2.597               | Total 6.745 |

|       | C1 | C2 | C3 | C4 | B1 | B2 | Transmission ratio | Step |
|-------|----|----|----|----|----|----|--------------------|------|
| 1st   | ○  |    |    |    |    | ○  | 3.550              |      |
|       |    |    |    |    |    |    |                    | 1.445 |
| 2nd   | ○  |    |    |    | ○  |    | 2.456              |      |
|       |    |    |    |    |    |    |                    | 1.351 |
| 3rd   | ○  | ○  |    |    |    |    | 1.818              |      |
|       |    |    |    |    |    |    |                    | 1.398 |
| 4th-2 | ○  |    |    | ○  |    |    | 1.300              |      |
|       |    |    |    |    |    |    |                    | 1.300 |
| 5th   |    |    | ○  | ○  |    |    | 1.000              |      |
|       |    |    |    |    |    |    |                    | 1.263 |
| 6th   |    | ○  |    | ○  |    |    | 0.792              |      |
|       |    |    |    |    |    |    |                    | 1.254 |
| 7th   |    |    |    | ○  | ○  |    | 0.632              |      |
|       |    |    |    |    |    |    |                    | 1.200 |
| 8th   |    |    | ○  |    | ○  |    | 0.526              |      |
|       |    |    |    |    |    |    |                    | Total |
| R     |    | ○  |    |    |    | ○  | 2.597              | 6.745 |

|        | C1 | C2 | C3 | C4 | B1 | B2 | Transmission ratio | Step |
|--------|----|----|----|----|----|----|--------------------|------|
| 1st    | ○  |    |    |    |    | ○  | 3.550              |      |
|        |    |    |    |    |    |    |                    | 1.445 |
| 2nd    | ○  |    |    |    | ○  |    | 2.456              |      |
|        |    |    |    |    |    |    |                    | 1.351 |
| 3rd    | ○  | ○  |    |    |    |    | 1.818              |      |
|        |    |    |    |    |    |    |                    | 1.348 |
| 4th-1  | ○  |    | ○  |    |    |    | 1.349              |      |
|        |    |    |    |    |    |    |                    | 1.349 |
| 5th    |    |    | ○  | ○  |    |    | 1.000              |      |
|        |    |    |    |    |    |    |                    | 1.263 |
| 6th    |    | ○  |    | ○  |    |    | 0.792              |      |
|        |    |    |    |    |    |    |                    | 1.254 |
| 7th    |    |    |    | ○  | ○  |    | 0.632              |      |
|        |    |    |    |    |    |    |                    | 1.200 |
| 8th    |    |    | ○  |    | ○  |    | 0.526              |      |
|        |    |    |    |    |    |    |                    | Total |
| R      |    | ○  |    |    |    | ○  | 2.597              | 6.745 |

| | C1 | C2 | C3 | C4 | B1 | B2 | Transmission ratio | Step |
|---|---|---|---|---|---|---|---|---|
| 1st | ○ | | | | | ○ | 3.550 | |
| 2nd | ○ | | | | ○ | | 2.456 | 1.445 |
| 3rd | ○ | ○ | | | | | 1.818 | 1.351 |
| 4th-2 | ○ | | | ○ | | | 1.300 | 1.398 |
| 5th | | | ○ | ○ | | | 1.000 | 1.300 |
| 6th | | ○ | | ○ | | | 0.792 | 1.263 |
| 7th | | | | ○ | ○ | | 0.632 | 1.254 |
| 8th | | | ○ | | | ○ | 0.526 | 1.200 |
| R | | ○ | | | | ○ | 2.597 | Total 6.745 |

|      | C1 | C2 | C3 | C4 | B1 | B2 | B3 | Transmission ratio | Step |
|------|----|----|----|----|----|----|----|--------------------|------|
| 1st  |    | O  |    |    |    |    | O  | 4.817              |      |
| 2nd  |    | O  |    |    |    | O  |    | 3.653              | 1.319 |
| 3rd  |    | O  |    | O  |    |    |    | 2.791              | 1.309 |
| 4th  | O  | O  |    |    |    |    |    | 2.000              | 1.395 |
| 5th  |    | O  | O  |    |    |    |    | 1.558              | 1.283 |
| 6th  |    | O  |    | O  |    |    |    | 1.262              | 1.235 |
| 7th  |    |    | O  | O  |    |    |    | 1.000              | 1.262 |
| 8th  | O  |    |    | O  |    |    |    | 0.837              | 1.195 |
| 9th  |    |    |    | O  | O  |    |    | 0.719              | 1.163 |
| R1   | O  |    |    |    |    |    | O  | 5.127              | Total 1-8th 5.756 |
| R2   | O  |    |    |    |    | O  |    | 2.182              | 1-9th 6.700 |

|  | C1 | C2 | C3 | C4 | B1 | B2 | B3 | Transmission ratio | Step |
|---|---|---|---|---|---|---|---|---|---|
| 1st | ○ |  |  |  |  |  | ○ | 4.169 | |
| 2nd | ○ |  |  |  |  | ○ |  | 3.067 | 1.359 |
| 3rd | ○ |  |  | ○ |  |  |  | 2.271 | 1.351 |
| 4th | ○ | ○ |  |  |  |  |  | 1.745 | 1.301 |
| 5th | ○ |  | ○ |  |  |  |  | 1.321 | 1.321 |
| 6th |  |  | ○ | ○ |  |  |  | 1.000 | 1.321 |
| 7th |  | ○ | ○ |  |  |  |  | 0.780 | 1.282 |
| 8th |  |  | ○ |  | ○ |  |  | 0.602 | 1.295 |
| R1 |  | ○ |  |  |  | ○ |  | 2.644 | Total 6.921 |
| R2 |  |  |  | ○ |  |  | ○ | 3.611 | |

| | C1 | C2 | C3 | C4 | B1 | B2 | B3 | Transmission ratio | Step |
|---|---|---|---|---|---|---|---|---|---|
| 1st | ○ | | | | | | ○ | 4.169 | |
| 2nd | ○ | | | | | ○ | | 3.067 | 1.359 |
| 3rd | ○ | | | ○ | | | | 2.271 | 1.351 |
| 4th | ○ | ○ | | | | | | 1.745 | 1.301 |
| 5th | ○ | | ○ | | | | | 1.321 | 1.321 |
| 6th | | | ○ | ○ | | | | 1.000 | 1.321 |
| 7th | | ○ | ○ | | | | | 0.780 | 1.282 |
| 8th | | | ○ | | ○ | | | 0.602 | 1.295 |
| R1 | | ○ | | | | ○ | | 2.644 | Total 6.921 |

|  | C1 | C2 | C3 | C4 | B1 | B2 | B3 | Transmission ratio | Step |
|---|---|---|---|---|---|---|---|---|---|
| 1st | ○ |  |  |  |  |  | ○ | 4.169 | |
| 2nd | ○ |  |  |  |  | ○ |  | 3.067 | 1.359 |
| 3rd | ○ |  |  |  | ○ |  |  | 2.271 | 1.351 |
| 4th | ○ | ○ |  |  |  |  |  | 1.745 | 1.301 |
| 5th | ○ |  |  | ○ |  |  |  | 1.321 | 1.321 |
| 6th |  |  | ○ | ○ |  |  |  | 1.000 | 1.321 |
| 7th |  |  | ○ | ○ |  |  |  | 0.780 | 1.282 |
| 8th |  |  | ○ |  | ○ |  |  | 0.602 | 1.295 |
| R1 |  | ○ |  |  |  | ○ |  | 2.644 | Total 6.921 |

|     | C1 | C2 | C3 | C4 | B1 | B2 | B3 | Transmission ratio | Step |
|-----|----|----|----|----|----|----|----|---------------------|------|
| 1st | ○  |    |    |    |    |    | ○  | 4.169 |       |
| 2nd | ○  |    |    |    |    | ○  |    | 3.067 | 1.359 |
| 3rd | ○  |    |    |    | ○  |    |    | 2.271 | 1.351 |
| 4th | ○  | ○  |    |    |    |    |    | 1.745 | 1.301 |
| 5th | ○  |    | ○  |    |    |    |    | 1.321 | 1.321 |
| 6th |    |    | ○  | ○  |    |    |    | 1.000 | 1.321 |
| 7th |    | ○  | ○  |    |    |    |    | 0.780 | 1.282 |
| 8th |    |    | ○  |    | ○  |    |    | 0.602 | 1.295 |
| R1  |    | ○  |    |    |    |    | ○  | 2.644 | Total 6.921 |

PLANETARY GEAR TYPE MULTISTAGE TRANSMISSION FOR VEHICLE

This application is based on Japanese Patent Application Nos. 2003-279310, 2003-277778, and 2003-281318 filed Jul. 24, 2003, Jul. 22, 2003, and Jul. 28, 2003, respectively, the contents of which are incorporated hereinto by reference.

BACKGROUND OF THE INVENTION

1. Field of the Invention

The present invention relates to a planetary gear type multistage transmission for vehicles, which is installed between a prime mover and driving wheels in a vehicle such as an automobile, etc.

2. Discussion of Related Art

In a vehicle, a planetary gear type multistage transmission has been widely utilized, which employs a plurality of planetary gear sets for selecting a plurality of transmission ratios or transmission stages determined in advance and engagement elements for connecting elements composing the plurality of planetary gear sets, such as clutches and brakes. For example, in an automatic transmission described in Patent Document 1, a forward multistage transmission of 12 stages has been achieved by using four sets of planetary gear sets. In an automatic transmission described in Patent Document 2 and 3, a forward multistage transmission of 6 stages has been achieved by using three sets of planetary gear sets. In an automatic transmission described in Patent Document 4, a forward multistage transmission of 7 stages has been achieved by using three sets of planetary gear sets. In an automatic transmission described in Patent Document 5, a forward multistage transmission of 10 stages has been achieved by using three sets of planetary gear sets. In an automatic transmission described in Patent Document 6, a forward multistage transmission of 7, 9 or 10 stages has been achieved by using three or four sets of planetary gear sets. In an automatic transmission described in Patent Document 7, a forward multistage transmission of 7 or 8 stages has been achieved by using four sets of planetary gear sets. In an automatic transmission described in Patent Document 8, a forward multistage transmission of 5 or 6 stages has been achieved by using two sets of planetary gear sets.

[Patent Document 1] JP-A 2002-206601
[Patent Document 2] JP-A H8-105496
[Patent Document 3] JP-A 2000-199549
[Patent Document 4] JP-A 2000-266138
[Patent Document 5] JP-A 2001-82555
[Patent Document 6] JP-A 2002-227940
[Patent Document 7] JP-A 2002-295609
[Patent Document 8] JP 2956173

However, it is desired that such a planetary gear type multistage transmission is not only simplified and small-sized with further multiple transmission stages secured and a wider transmission ratio width intended, but also the transmission ratio steps to be shifted are made into an equal ratio or made as close to an equal ratio as possible. There is a problem in that, in the automatic transmission disclosed in Patent Document 1 described above, the transmission ratio step is not made multiple in a convenient-to-use setting. For example, as shown in FIG. 5 of Patent Document 1, the transmission ratio steps in the sixth transmission stage and the seventh transmission stage are small to be 1.050, and arrangement of the transmission ratios is diversified to be large or small. In addition, although it is considered that the number of planetary gears is increased with respect to these problems, the entire length of the transmission is accordingly made longer, whereby its mountability thereof in a vehicle is worsened, and there is a possibility that engagement elements for connecting elements composing the planetary gear sets are increased in number. In particular, in the case of a so-called lateral installation in which the axial direction of an automatic transmission that is preferably used in an FF (front engine and front drive) vehicle and an RR (rear engine and rear drive) vehicle is determined in parallel to the axle, the limitation with respect to the entire length of the automatic transmission, which is regulated by the vehicle width, is severe in comparison to a case of a longitudinal installation, wherein there is a possibility that the installation becomes difficult.

SUMMARY OF THE INVENTION

The present invention has been developed on the basis of the above-described situations, and it is an object of the invention to provide a small-sized planetary gear type multistage transmission for vehicles capable of securing large transmission ratio widths, providing forward multistage shifting with adequate transmission ratio steps, which can be preferably applied to the lateral installation in front-engine front-drive (FF) type vehicles and rear-engine rear-drive (RR) type vehicles.

The above object may be achieved according to a 1st aspect of the invention, which provides a planetary gear type multistage transmission for vehicles, (a) which is composed so that the transmission is provided with a first transmission portion and a second transmission portion, transmits rotations of an input rotating member, which is positioned at the driving-force source side and is rotatable around a first axial center, to the second transmission portion on a second axial center parallel to the first axial center via the first transmission portion, and outputs the same from an output rotating member rotating around the second axial center;

(b) wherein the first transmission portion transmits rotations of the input rotating member to the second transmission portion via a first intermediate output path and a second intermediate output path;

(c) the second transmission portion is provided with three planetary gear sets of a first planetary gear set, a second planetary gear set and a third planetary gear set, which are disposed one after another to be concentric with the second axial center, wherein five rotary elements are composed of sun gears, carriers and ring gears of the three planetary gear sets partially connected to each other, at least four rotary elements of the five rotary elements are selectively connected to any one of a first driven member composing the first intermediate output path at the second axial center side, a second driven member composing the second intermediate output path at the second axial center side and a non-rotating member via clutches or brakes;

(d) wherein seven forward speed transmission stages are established by selectively engaging clutches and brakes with each other and disengaging the clutches and brakes from each other.

According to the 2nd aspect of the invention, in the planetary gear type multistage transmission for vehicles defined in the 1st aspect of the invention, (a) the first intermediate output path and the second intermediate output path are disposed in parallel to each other; and (b) the first planetary gear set, the second planetary gear set and the third planetary gear set are disposed one after another to be concentric with the second axial center at the driving-force source side from the first intermediate output path and the second intermediate output path.

According to the 3rd aspect of the invention, in the planetary gear type multistage transmission for vehicles defined in the 1st aspect of the invention, (a) a rotational speed of the rotary motion transmitted by the second intermediate output path is lower than a rotational speed of the rotary motion transmitted by the first intermediate output path;

(b) a first rotary element of the five rotary elements is selectively connected to the second driven member via a second clutch and is selectively connected to the non-rotating member via a first brake;

(c) a second rotary element of the five rotary elements is selectively connected to the first driven member via a third clutch and is selectively connected to the non-rotating member via a second brake;

(d) a third rotary element of the five rotary elements is selectively connected to the first driven member via a fourth clutch;

(e) a fourth rotary element of the five rotary elements is connected to the output rotating member;

(f) and a fifth rotary element of the five rotary elements is selectively connected to the second driven member via a first clutch.

According to the 4th aspect of the invention, in the planetary gear type multistage transmission for vehicles defined in the 3rd aspect of the invention, (a) the first planetary gear set is a single-pinion type planetary gear set provided with a first sun gear, a first carrier and a first ring gear, and having a first planetary gear rotatably supported by means of the first carrier; the second planetary gear set is a double-pinion type planetary gear set provided with a second sun gear, a second carrier and a second ring gear and having a pair of second planetary gears rotatably supported by means of the second carrier, which are engageable with each other; the third planetary gear set is a single-pinion type planetary gear set provided with a third sun gear, a third carrier and a third ring gear, and having a third planetary gear rotatably supported by means of the third carrier;

(b) the first rotary element includes the first sun gear and the second sun gear; the second rotary element includes the third ring gear; the third rotary element includes the second ring gear and the third carrier; the fourth rotary element includes the first carrier, the second carrier and the third sun gear; and the fifth rotating element includes the first ring gear.

According to the 5th aspect of the invention, in the planetary gear type multistage transmission for vehicles defined in the 3rd aspect of the invention, (a) the first planetary gear set is a double-pinion type planetary gear set provided with a first sun gear, a first carrier and a first ring gear and having a pair of first planetary gears rotatably supported by means of the first carrier, which are engageable with each other; the second planetary gear set is a single-pinion type planetary gear set provided with a second sun gear, a second carrier and a second ring gear and having a second planetary gear rotatably supported by means of the second carrier; a third planetary gear set is a single-pinion type planetary gear set provided with a third sun gear, a third carrier and a third ring gear and having a third planetary gear rotatably supported by means of the third carrier;

(b) the first rotary element includes the first sun gear and the second sun gear; the second rotary element includes the first ring gear and the third ring gear; the third rotary element includes the third carrier; the fourth rotary element includes the second carrier and the third sun gear; and the fifth rotary element includes the first carrier and the second ring gear.

According to the 6th aspect of the invention, in the planetary gear type multistage transmission for vehicles defined in the 1st aspect of the invention, (a) a rotational speed of the rotary motion transmitted by the second intermediate output path is lower than a rotational speed of the rotary motion transmitted by the first intermediate output path; and.

(b) the second transmission portion includes a single-pinion type first planetary gear set provided with a first sun gear, a first carrier and a first ring gear having a first planetary gear rotatably supported by means of the first carrier; a double-pinion type second planetary gear set provided with a second sun gear, a second carrier and a second ring gear and having a pair of second planetary gears which are rotatably supported by means of the second carrier and are engageable with each other; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the first sun gear and the second sun gear are selectively connected to the second driven member via a second clutch and is selectively connected to a non-rotating member via a first brake; the third ring gear is selectively connected to the first driven member via a third clutch and is selectively connected to the non-rotating member via a second brake; the second ring gear and the third carrier are selectively connected to the first driven member via a fourth clutch; the first carrier, the second carrier and the third carrier are connected to the output rotating member; and the first ring gear is selectively connected to the second driven member via a first clutch; and (c) wherein at least seven forward speed transmission stages are established by selectively changing engagement and disengagement of the clutches and brakes.

According to the 7th aspect of the invention, in the planetary gear type multistage transmission for vehicles defined in the 1st aspect of the invention, (a) a rotational speed of the rotary motion transmitted by the second intermediate output path is lower than a rotational speed of the rotary motion transmitted by the first intermediate output path;

(b) the second transmission portion includes a double-pinion type first planetary gear set provided with a first sun gear, a first carrier and a first ring gear having a pair of first planetary gears rotatably supported by means of the first carrier, which are engageable with each other; a single-pinion type second planetary gear set provided with a second sun gear, a second carrier and a second ring gear and having a second planetary gear rotatably supported by means of the second carrier; and a single-pinion type third planetary gear set provided with a third sun gear, a third carrier and a third ring gear, and having a third planetary gear rotatably supported by means of the third carrier; the three planetary gear sets being disposed one after another to be concentric with the second axial center; wherein the first sun gear and the second sun gear are selectively connected to the second driven member via a second clutch and are selectively connected to a non-rotating member via a first brake; the first ring gear and the third ring gear are selectively connected to the first driven member via a third clutch and are selectively connected to the non-rotating member via a second brake; the third carrier is selectively connected to the first driven member via a fourth clutch; the second carrier and the third carrier are connected to the output rotating member; the first carrier and the second ring gear are selectively connected to the second driven member via a first clutch; and (c) wherein at least seven forward speed transmission stages are established by selectively changing engagement and disengagement of the clutches and brakes.

According to the 8h aspect of the invention, in the planetary gear type multistage transmission for vehicles defined in the 4th aspect of the invention, the first carrier and the second carrier, and the first sun gear and the second sun gear are, respectively, composed of a common member, and the first planetary gear is concurrently used as any one of the pair of the second planetary gears which are engageable with each other.

According to the 9th aspect of the invention, in the planetary gear type multistage transmission for vehicles defined in the 3rd aspect of the invention, the first transmission stage of the maximum transmission ratio is established by engaging the first clutch and the second brake with each other; a second transmission stage having a smaller transmission ratio than that of the first transmission stage is established by engaging the first clutch and the first brake with each other; a third transmission stage having a smaller transmission ratio than that of the second transmission stage is established by engaging the first clutch and the second clutch with each other; a fourth transmission stage having a smaller transmission ratio than that of the third transmission stage is established by engaging the first clutch and the third clutch with each other and engaging the first clutch and the fourth clutch with each other; a fifth transmission stage having a smaller transmission ratio than that of the fourth transmission stage is established by engaging the third clutch and the fourth clutch with each other; a sixth transmission stage having a smaller transmission ratio than that of the fifth transmission stage is established by engaging the second clutch and the fourth clutch with each other; a seventh transmission stage having a smaller transmission ratio than that of the sixth transmission stage is established by engaging the fourth clutch and the first brake with each other; and an eighth transmission stage having a smaller transmission ratio than that of the seventh transmission stage is established by engaging the third clutch and the first brake with each other.

According to the 10th aspect of the invention, in the planetary gear type multistage transmission for vehicles defined in the 3rd aspect of the invention, a reverse transmission stage is established by engaging the second clutch and the second brake with each other.

According to the 11th aspect of the invention, in the planetary gear type multistage transmission for vehicles defined in the 1st aspect of the invention, (a) a rotational speed of the rotary motion transmitted by the second intermediate output path is lower than a rotational speed of the rotary motion transmitted by the first intermediate output path;

(b) a first rotary element of the five rotary elements is selectively connected to the second driven member via a second clutch, and is selectively connected to a non-rotating member via a first brake;

(c) a second rotary element of the five rotary elements is selectively connected to the first driven member via a third clutch;

(d) a third rotary element of the five rotary elements is selectively connected to the first driven member via a fourth clutch and is selectively connected to the non-rotating member via a second brake;

(e) a fourth rotary element of the five rotary elements is connected to the output rotating member;

(f) and a fifth rotary element of the five rotary elements is selectively connected to the second driven member via a first clutch.

According to the 12th aspect of the invention, in the planetary gear type multistage transmission for vehicles defined in the 11th aspect of the invention, (a) the first planetary gear set is a double-pinion type planetary gear set provided with a first sun gear, a first carrier and a first ring gear and having a pair of first planetary gears which are rotatably supported by means of the first carrier and are engaged with each other; the second planetary gear set is a single-pinion type planetary gear set provided with a second sun gear, a second carrier and a second ring gear and having a second planetary gear rotatably supported by means of the second carrier; and the third planetary gear set is a single-pinion type planetary gear set provided with a third sun gear, a third carrier, and a third ring gear and having a third planetary gear rotatably supported by means of the third carrier;

(b) wherein the first rotary element includes the first sun gear and the third sun gear; the second rotary element includes the second ring gear; the third rotary element includes the first ring gear, the second carrier and the third carrier; the fourth rotary element includes the second sun gear and the third ring gear; and the fifth rotary element includes the first carrier.

According to the 13th aspect of the invention, in the planetary gear type multistage transmission for vehicles defined in the 11th aspect of the invention, (a) the first planetary gear set is a single-pinion type planetary gear set provided with a first sun gear, a first carrier and a first ring gear and having a first planetary gear rotatably supported by means of the first carrier; the second planetary gear set is a double-pinion type planetary gear set provided with a second sun gear, a second carrier and a second ring gear and having a pair of second planetary gears which are rotatably supported by means of the second carrier and are engageable with each other; and the third planetary gear set is a single-pinion type planetary gear set provided with a third sun gear, a third carrier, and a third ring gear and having a third planetary gear rotatably supported by means of the third carrier;

(b) wherein the first rotary element includes the first sun gear and the second sun gear; the second rotary element includes the third ring gear; the third rotary element includes the second ring gear and the third carrier; the fourth rotary element includes the first carrier, the second carrier and the third sun gear; and the fifth rotary element includes the first ring gear.

According to the 14th aspect of the invention, in the planetary gear type multistage transmission for vehicles defined in the 11th aspect of the invention, (a) the first planetary gear set is a single-pinion type planetary gear set provided with a first sun gear, a first carrier and a first ring gear and having a first planetary gear rotatably supported by means of the first carrier; the second planetary gear set is a single-pinion type planetary gear set provided with a second sun gear, a second carrier and a second ring gear and having a second planetary gear rotatably supported by means of the second carrier; and the third planetary gear set is a single-pinion type planetary gear set provided with a third sun gear, a third carrier, and a third ring gear and having a third planetary gear rotatably supported by means of the third carrier;

(b) wherein the first rotary element includes the second sun gear and the third sun gear; the second rotary element includes the first ring gear; the third rotary element includes the first carrier and the second carrier; the fourth rotary element includes the first sun gear, the second ring gear and the third carrier; and the fifth rotary element includes the third ring gear.

According to the 15th aspect of the invention, in the planetary gear type multistage transmission for vehicles defined in the 11th aspect of the invention, (a) the first planetary gear set is a single-pinion type planetary gear set provided with a first sun gear, a first carrier and a first ring gear and having a first planetary gear rotatably supported by means of the first carrier; the second planetary gear set is a double-pinion type planetary gear set provided with a second sun gear, a second carrier and a second ring gear and having a second planetary gear which are rotatably supported by means of the second carrier and engageable with each other; and the third planetary gear set is a single-pinion type planetary gear set provided with a third sun gear, a third carrier, and a third ring gear and having a third planetary gear rotatably supported by means of the third carrier;

(b) wherein the first rotary element includes the third sun gear; the second rotary element includes the first ring gear; the third rotary element includes the first carrier and the second sun gear; the fourth rotary element includes the first sun gear, the second ring gear and the third carrier; and the fifth rotary element includes the second carrier and the third ring gear.

According to the 16th aspect of the invention, in the planetary gear type multistage transmission for vehicles defined in the 1st aspect of the invention, (a) a rotational speed of the rotary motion transmitted by the second intermediate output path is lower than a rotational speed of the rotary motion transmitted by the first intermediate output path;

(b) the second transmission portion includes a double-pinion type first planetary gear set provided with a first sun gear, a first carrier and a first ring gear having a pair of first planetary gears which are rotatably supported by means of the first carrier and engageable with each other; a single-pinion type second planetary gear set provided with a second sun gear, a second carrier and a second ring gear and having a second planetary gear rotatably supported by means of the second carrier; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the first sun gear and the third sun gear are selectively connected to the second driven member via a second clutch and are selectively connected to the non-rotating member via a first brake; the second ring gear is selectively connected to the first driven member via a third clutch; the first ring gear, the second carrier and the third carrier are selectively connected to the first driven member via a fourth clutch and are selectively connected to the non-rotating member via a second brake; the second sun gear and the third ring gear are connected to the output rotating member, and the first carrier is selectively connected to the second driven member via a first clutch; and (c) wherein at least seven forward speed transmission stages are established by selectively changing engagement and disengagement of the clutches and brakes.

According to the 17th aspect of the invention, in the planetary gear type multistage transmission for vehicles defined in the 1st aspect of the invention, (a) wherein a rotational speed of the rotary motion transmitted by the second intermediate output path is lower than a rotational speed of the rotary motion transmitted by the first intermediate output path;

(b) the second transmission portion includes a single-pinion type first planetary gear set provided with a first sun gear, a first carrier and a first ring gear having a first planetary gear rotatably supported by means of the first carrier; a double-pinion type second planetary gear set provided with a second sun gear, a second carrier and a second ring gear and having a pair of second planetary gears which are rotatably supported by means of the second carrier and engageable with each other; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the first sun gear and the second sun gear are selectively connected to the second driven member via a second clutch and are selectively connected to the non-rotating member via a first brake; the third ring gear is selectively connected to the first driven member via a third clutch; the second ring gear and the third carrier are selectively connected to the first driven member via a fourth clutch, and are selectively connected to the non-rotating member via a second brake; the first carrier, the second carrier and the third sun gear are connected to the output rotating member; and the first ring gear is selectively connected to the second driven member via the first clutch; and (c) wherein at least seven forward speed transmission stages are established by selectively changing engagement and disengagement of the clutches and brakes.

According to the 18th aspect of the invention, in the planetary gear type multistage transmission for vehicles defined in the 1st aspect of the invention, (a) a rotational speed of the rotary motion transmitted by the second intermediate output path is lower than a rotational speed of the rotary motion transmitted by the first intermediate output path;

(b) the second transmission portion includes a single-pinion type first planetary gear set provided with a first sun gear, a first carrier and a first ring gear having a first planetary gear rotatably supported by means of the first carrier; a single-pinion type second planetary gear set provided with a second sun gear, a second carrier and a second ring gear and having a second planetary gear rotatably supported by means of the second carrier; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the second sun gear and the third sun gear are selectively connected to the second driven member via a second clutch and are selectively connected to the non-rotating member via a first brake; the first ring gear is selectively connected to the first driven member via a third clutch; the first carrier and the second carrier are selectively connected to the first driven member via a fourth clutch, and are selectively connected to the non-rotating member via a second brake; the first sun gear, the second ring gear and the third carrier are connected to the output rotating member;

and the third ring gear is selectively connected to the second driven member via the first clutch; and (c) wherein at least seven forward speed transmission stages are established by selectively changing engagement and disengagement of the clutches and brakes.

According to the 19th aspect of the invention, in the planetary gear type multistage transmission for vehicles defined in the 1st aspect of the invention, (a) a rotational speed of the rotary motion transmitted by the second intermediate output path is lower than a rotational speed of the rotary motion transmitted by the first intermediate output path;

(b) the second transmission portion includes a single-pinion type first planetary gear set provided with a first sun gear, a first carrier and a first ring gear having a first planetary gear rotatably supported by means of the first carrier; a double-pinion type second planetary gear set provided with a second sun gear, a second carrier and a second ring gear and having a pair of second planetary gears which are rotatably supported by means of the second carrier and are engageable with each other; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the third sun gear is selectively connected to the second driven member via a second clutch and is selectively connected to the non-rotating member via a first brake; the first ring gear is selectively connected to the first driven member via a third clutch; the first carrier and the second sun gear are selectively connected to the first driven member via a fourth clutch, and are selectively connected to the non-rotating member via a second brake; the first sun gear, the second ring gear and the third carrier are connected to the output rotating member; and the second carrier and the third ring gear are selectively connected to the second driven member via the first clutch; and (c) wherein at least seven forward speed transmission stages are established by selectively changing engagement and disengagement of the clutches and brakes.

According to the 20th aspect of the invention, in the planetary gear type multistage transmission for vehicles defined in the 13st aspect of the invention, the first carrier and the second carrier, and the first sun gear and the second sun gear are, respectively, composed of a common member, and the first planetary gear is concurrently used as any one of the pair of the second planetary gears which are engageable with each other.

According to the 21st aspect of the invention, in the planetary gear type multistage transmission for vehicles defined in the 11th aspect of the invention, a first transmission stage of the maximum transmission ratio is established by engaging the first clutch and the second brake with each other; a second transmission stage having a smaller transmission ratio than that of the first transmission stage is established by engaging the first clutch and the first brake with each other; a third transmission stage having a smaller transmission ratio than that of the second transmission stage is established by engaging the first clutch and the second clutch with each other; a fourth transmission stage having a smaller transmission ratio than that of the third transmission stage is established by engaging the first clutch and the third clutch with each other and engaging the first clutch and the fourth clutch with each other; a fifth transmission stage having a smaller transmission ratio than that of the fourth transmission stage is established by engaging the third clutch and the fourth clutch with each other; a sixth transmission stage having a smaller transmission ratio than that of the fifth transmission stage is established by engaging the second clutch and the fourth clutch with each other; a seventh transmission stage having a smaller transmission ratio than that of the sixth transmission stage is established by engaging the fourth clutch and the first brake with each other; and an eighth transmission stage having a smaller transmission ratio than that of the seventh transmission stage is established by engaging the third clutch and the first brake with each other.

According to the 22nd aspect of the invention, in the planetary gear type multistage transmission for vehicles defined in the 11th aspect of the invention, a reverse transmission stage is established by engaging the second clutch and the second brake with each other.

According to the 23rd aspect of the invention, in the planetary gear type multistage transmission for vehicles defined in the 1st aspect of the invention, (a) a rotational speed of the rotary motion transmitted by the second intermediate output path is lower than a rotational speed of the rotary motion transmitted by the first intermediate output path;

(b) a first rotary element of the five rotary elements is selectively connected to the second driven member via a second clutch, and is selectively connected to a non-rotating member via a first brake;

(c) a second rotary element of the five rotary elements is selectively connected to the first driven member via a third clutch;

(d) a third rotary element of the five rotary elements is selectively connected to non-rotating member via a third brake;

(e) a fourth rotary element of the five rotary elements is connected to the output rotating member;

(f) a fifth rotary element of the five rotary elements is selectively connected to the second driven member via a first clutch, and further, via the fourth clutch, the third rotary element is selectively connected to the first driven member, or the third rotary element is selectively connected to the fifth rotary element, or the fifth rotary element is selectively connected to the first driven member, or the first rotary element is selectively connected to the first driven member.

According to the 24th aspect of the invention, in the planetary gear type multistage transmission for vehicles defined in the 23rd aspect of the invention, (a) the first planetary gear set is a single-pinion type planetary gear set provided with a first sun gear, a first carrier and a first ring gear, and having a first planetary gear rotatably supported by means of the first carrier; the second planetary gear set is a double-pinion type planetary gear set provided with a second sun gear, a second carrier and a second ring gear and having a pair of second planetary gears rotatably supported by means of the second carrier, which are engageable with each other; the third planetary gear set is a single-pinion type planetary gear set provided with a third sun gear, a third carrier and a third ring gear, and having a third planetary gear rotatably supported by means of the third carrier;

(b) the first rotary element includes the third sun gear; the second rotary element includes the first ring gear; the third rotary element includes the first carrier and the second carrier; the fourth rotary element includes the second ring gear and the third carrier; and the fifth rotating element includes the first sun gear, the second sun gear and the third ring gear.

According to the 25th aspect of the invention, in the planetary gear type multistage transmission for vehicles defined in the 23rd aspect of the invention, (a) the first planetary gear set is a double-pinion type planetary gear set provided with a first sun gear, a first carrier and a first ring gear and having a pair of first planetary gears rotatably supported by means of the first carrier, which are engageable with each other; the second planetary gear set is a single-pinion type planetary gear set provided with a second sun gear, a second carrier and a second ring gear and having a second planetary gear rotatably supported by means of the second carrier; a third planetary gear set is a single-pinion type planetary gear set provided with a third sun gear, a third carrier and a third ring gear and having a third planetary gear rotatably supported by means of the third carrier;

(b) the first rotary element includes the second sun gear and the third sun gear; the second rotary element includes the first carrier and the second carrier; the third rotary element includes the first ring gear and the second ring gear; the fourth rotary element includes the first sun gear and the third carrier; and the fifth rotary element includes the third ring gear.

According to the 26th aspect of the invention, in the planetary gear type multistage transmission for vehicles defined in the 23rd aspect of the invention, (a) the first planetary gear set is a single-pinion type planetary gear set provided with a first sun gear, a first carrier and a first ring gear, and having a first planetary gear rotatably supported by means of the first carrier; the second planetary gear set is a double-pinion type planetary gear set provided with a second sun gear, a second carrier and a second ring gear and having a pair of second planetary gears rotatably supported by means of the second carrier, which are engageable with each other; the third planetary gear set is a single-pinion type planetary gear set provided with a third sun gear, a third carrier and a third ring gear, and having a third planetary gear rotatably supported by means of the third carrier;

(b) the first rotary element includes the first sun gear and the third sun gear; the second rotary element includes the first carrier and the second carrier; the third rotary element includes the first ring gear and the second ring gear; the fourth rotary element includes the second sun gear and the third carrier; and the fifth rotary element includes the third ring gear.

According to the 27th aspect of the invention, in the planetary gear type multistage transmission for vehicles defined in the 1st aspect of the invention, (a) a rotational speed of the rotary motion transmitted by the second intermediate output path is lower than a rotational speed of the rotary motion transmitted by the first intermediate output path; and (b) the second transmission portion includes a single-pinion type first planetary gear set provided with a first sun gear, a first carrier and a first ring gear having a first planetary gear rotatably supported by means of the first carrier; a double-pinion type second planetary gear set provided with a second sun gear, a second carrier and a second ring gear and having a pair of second planetary gears which are rotatably supported by means of the second carrier and are engageable with each other; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the third sun gear is selectively connected to the second driven member via a second clutch and is selectively connected to a non-rotating member via a first brake; the first ring gear is selectively connected to the first driven member via a third clutch, and is selectively connected to the non-rotating member via a second brake; the first carrier and the second carrier are selectively connected to the first driven member via a fourth clutch and is selectively connected to the non-rotating member via a third brake; the second ring gear and the third carrier are connected to the output rotating member; and the first sun gear, the second sun gear and the third ring gear are selectively connected to the second driven member via a first clutch;

(c) wherein at least seven forward speed transmission stages are established by selectively changing engagement and disengagement of the clutches and brakes.

According to the 28th aspect of the invention, in the planetary gear type multistage transmission for vehicles defined in the 1st aspect of the invention, (a) a rotational speed of the rotary motion transmitted by the second intermediate output path is lower than a rotational speed of the rotary motion transmitted by the first intermediate output path; and (b) the second transmission portion includes a single-pinion type first planetary gear set provided with a first sun gear, a first carrier and a first ring gear having a first planetary gear rotatably supported by means of the first carrier; a double-pinion type second planetary gear set provided with a second sun gear, a second carrier and a second ring gear and having a pair of second planetary gears which are rotatably supported by means of the second carrier and are engageable with each other; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the third sun gear is selectively connected to the second driven member via a second clutch and is selectively connected to a non-rotating member via a first brake; the first ring gear is selectively connected to the first driven member via a third clutch and is connected to the non-rotating member via a second brake; the first carrier and the second carrier are selectively connected to the non-rotating member via a third brake; the second ring gear and the third carrier are connected to the output rotating member; the first sun gear, the second sun gear and the third ring gear are selectively connected to the first driven member via a fourth clutch and are selectively connected to the second driven member via a first clutch; and (c) wherein at least seven forward speed transmission stages are established by selectively changing engagement and disengagement of the clutches and brakes.

According to the 29th aspect of the invention, in the planetary gear type multistage transmission for vehicles defined in the 1st aspect of the invention, (a) a rotational speed of the rotary motion transmitted by the second intermediate output path is lower than a rotational speed of the rotary motion transmitted by the first intermediate output path;

(b) the second transmission portion includes a single-pinion type first planetary gear set provided with a first sun gear, a first carrier and a first ring gear having a first planetary gear rotatably supported by means of the first carrier; a double-pinion type second planetary gear set provided with a second sun gear, a second carrier and a second ring gear and having a pair of second planetary gears which are rotatably supported by means of the second carrier and are engageable with each other; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the third sun gear is selectively connected to the second driven member via a second clutch and is selectively connected to a non-rotating member via a first brake; the first ring gear is selectively connected to the first driven member via a third clutch and is selectively connected to the non-rotating member via a second brake; the first carrier and the second carrier are selectively connected to the non-rotating member via a third brake; the second ring gear and the third carrier are connected to the output rotating member; the first sun gear, the second sun gear and the third ring gear are selectively connected to the second driven member via a first clutch; and the first carrier and the second carrier are selectively connected to the first sun gear, the second sun gear and the third ring gear via a fourth clutch; and (c) wherein at least seven forward speed transmission stages are established by selectively changing engagement and disengagement of the clutches and brakes.

According to the 30th aspect of the invention, in the planetary gear type multistage transmission for vehicles defined in the 1st aspect of the invention, (a) a rotational speed of the rotary motion transmitted by the second intermediate output path is lower than a rotational speed of the rotary motion transmitted by the first intermediate output path; and (b) the second transmission portion includes a double-pinion type first planetary gear set provided with a first sun gear, a first carrier and a first ring gear having a pair of first planetary gears which are rotatably supported by means of the first carrier and are engageable with each other; a single-pinion type second planetary gear set provided with a second sun gear, a second carrier and a second ring gear and having a second planetary gear rotatably supported by means of the second carrier; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the second sun gear and the third sun gear are selectively connected to the second driven member via a second clutch and are selectively connected to a non-rotating member via a first brake; the first carrier and the second carrier are selectively connected to the first driven member via a third clutch and are selectively connected to the non-rotating member via a second brake; the first ring gear and the second ring gear are selectively connected to the first driven member via a fourth clutch and are selectively connected to the non-rotating member via a third brake; the first sun gear and the third carrier are connected to the output rotating member; and the third ring gear is selectively connected to the second driven member via a first clutch; and (c) wherein at least seven forward speed transmission stages are established by selectively changing engagement and disengagement of the clutches and brakes.

According to the 31st aspect of the invention, in the planetary gear type multistage transmission for vehicles defined in the 1st aspect of the invention, (a) a rotational speed of the rotary motion transmitted by the second intermediate output path is lower than a rotational speed of the rotary motion transmitted by the first intermediate output path; and (b) the second transmission portion includes a single-pinion type first planetary gear set provided with a first sun gear, a first carrier and a first ring gear having a first planetary gear rotatably supported by means of the first carrier; a double-pinion type second planetary gear set provided with a second sun gear, a second carrier and a second ring gear and having a pair of second planetary gears which are rotatably supported by means of the second carrier and are engageable with each other; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the first sun gear and the third sun gear are selectively connected to the second driven member via a second clutch, are selectively connected to the first driven member via a fourth clutch and are further connected to the non-rotating member via a first brake; the first carrier and the second carrier are selectively connected to the first driven member via a third clutch, and are selectively connected to the non-rotating member via a second brake; the first ring gear and the second ring gear are selectively connected to the non-rotating member via a third brake; the second sun gear and the third carrier are connected to the output rotating member; the third ring gear is selectively connected to the second driven member via a first clutch; and (c) wherein at least seven forward speed transmission stages are established by selectively changing engagement and disengagement of the clutches and brakes.

According to the 32nd aspect of the invention, in the planetary gear type multistage transmission for vehicles defined in the 24th aspect of the invention, the first carrier and the second carrier, and the first sun gear and the second sun gear are, respectively, composed of a common member, and the first planetary gear is concurrently used as any one of the pair of the second planetary gears which are engageable with each other.

According to the 33rd aspect of the invention, in the planetary gear type multistage transmission for vehicles defined in the 23rd aspect of the invention, a first transmission stage of the maximum transmission ratio is established by engaging the first clutch and the third brake with each other; a second transmission stage having a smaller transmission ratio than that of the first transmission stage is established by engaging the first clutch and the second brake with each other; a third transmission stage having a smaller transmission ratio than that of the second transmission stage is established by engaging the first clutch and the first brake with each other; a fourth transmission stage having a smaller transmission ratio than that of the third transmission stage is established by engaging the first clutch and the second clutch with each other; a fifth transmission stage having a smaller transmission ratio than that of the fourth transmission stage is established by engaging the first clutch and the third clutch with each other; a sixth transmission stage having a smaller transmission ratio than that of the fifth transmission stage is established by engaging the third clutch and the fourth clutch with each other; a seventh transmission stage having a smaller transmission ratio than that of the sixth transmission stage is established by engaging the second clutch and the third clutch with each other; and an eighth transmission stage having a smaller transmission ratio than that of the seventh transmission stage is established by engaging the third clutch and the first brake with each other.

According to the 34th aspect of the invention, in the planetary gear type multistage transmission for vehicles defined in the 23rd aspect of the invention, a reverse transmission stage is established by engaging the second clutch and the second brake with each other or a first reverse transmission stage is established by engaging the second clutch and the second brake with each other, and a second reverse transmission stage having a larger transmission ratio than that of the first reverse transmission stage is established by the fourth clutch and the third brake.

According to the 35th aspect of the invention, in the planetary gear type multistage transmission for vehicles defined in the 1st aspect of the invention, (a) a rotational speed of the rotary motion transmitted by the second intermediate output path is higher than a rotational speed of the rotary motion transmitted by the first intermediate output path;

(b) a first rotary element of the five rotary elements is selectively connected to the first driven member via a first clutch and is selectively connected to the second driven member via a third clutch;

(c) a second rotary element of the five rotary elements is selectively connected to the first driven member via a second clutch and is selectively connected to the non-rotating member via a first brake;

(d) a third rotary element of the five rotary elements is connected to the output rotating member;

(e) a fourth rotary element of the five rotary elements is selectively connected to the non-rotating member via a second brake;

(f) a fifth rotary element of the five rotary elements is selectively connected to the second driven member via a fourth clutch.

According to the 36th aspect of the invention, in the planetary gear type multistage transmission for vehicles defined in the 35th aspect of the invention, (a) the first planetary gear set is a double-pinion type planetary gear set provided with a first sun gear, a first carrier and a first ring gear and having a pair of first planetary gears which are rotatably supported by means of the first carrier and are engaged with each other; the second planetary gear set is a single-pinion type planetary gear set provided with a second sun gear, a second carrier and a second ring gear and having a second planetary gear rotatably supported by means of the second carrier; and the third planetary gear set is a single-pinion type planetary gear set provided with a third sun gear, a third carrier, and a third ring gear and having a third planetary gear rotatably supported by means of the third carrier;

(b) wherein the first rotary element includes the second sun gear; the second rotary element includes the first carrier, the second carrier and the third ring gear; the third rotary element includes the first ring gear, the second ring gear and the third carrier; the fourth rotary element includes the first sun gear; and the fifth rotary element includes the third sun gear.

According to the 37th aspect of the invention, in the planetary gear type multistage transmission for vehicles defined in the 35th aspect of the invention, (a) the first planetary gear set is a single-pinion type planetary gear set provided with a first sun gear, a first carrier and a first ring gear, and having a first planetary gear rotatably supported by means of the first carrier; the second planetary gear set is a double-pinion type planetary gear set provided with a second sun gear, a second carrier and a second ring gear and having a pair of second planetary gears which are rotatably supported by means of the second carrier and are engageable with each other; the third planetary gear set is a single-pinion type planetary gear set provided with a third sun gear, a third carrier and a third ring gear, and having a third planetary gear rotatably supported by means of the third carrier;

(b) the first rotary element includes the third sun gear; the second rotary element includes the first sun gear, the second carrier and the third carrier; the third rotary element includes the second ring gear and the third ring gear; the fourth rotary element includes the first carrier; and the fifth rotating element includes the first ring gear and the second sun gear.

According to the 38th aspect of the invention, in the planetary gear type multistage transmission for vehicles defined in the 35th aspect of the invention, (a) the first planetary gear set is a single-pinion type planetary gear set provided with a first sun gear, a first carrier and a first ring gear, and having a first planetary gear rotatably supported by means of the first carrier; the second planetary gear set is a double-pinion type planetary gear set provided with a second sun gear, a second carrier and a second ring gear and having a pair of second planetary gears which are rotatably supported by means of the second carrier and are engageable with each other; the third planetary gear set is a single-pinion type planetary gear set provided with a third sun gear, a third carrier and a third ring gear, and having a third planetary gear rotatably supported by means of the third carrier;

(b) the first rotary element includes the third sun gear; the second rotary element includes the second carrier and the third carrier; the third rotary element includes the first sun gear, the second ring gear and the third ring gear; the fourth rotary element includes the first carrier; and the fifth rotating element includes the first ring gear and the second sun gear.

According to the 39th aspect of the invention, in the planetary gear type multistage transmission for vehicles defined in the 35th aspect of the invention, (a) the first planetary gear set is a single-pinion type planetary gear set provided with a first sun gear, a first carrier and a first ring gear and having a first planetary gear rotatably supported by means of the first carrier; the second planetary gear set is a single-pinion type planetary gear set provided with a second sun gear, a second carrier and a second ring gear and having a second planetary gear rotatably supported by means of the second carrier; and the third planetary gear set is a single-pinion type planetary gear set provided with a third sun gear, a third carrier, and a third ring gear and having a third planetary gear rotatably supported by means of the third carrier;

(b) wherein the first rotary element includes the second sun gear and the third sun gear; the second rotary element includes the third carrier; the third rotary element includes the first sun gear, the second carrier and the third ring gear; the fourth rotary element includes the first carrier and the second ring gear; and the fifth rotary element includes the first ring gear.

According to the 40th aspect of the invention, in the planetary gear type multistage transmission for vehicles defined in the 35th aspect of the invention, (a) the first planetary gear set is a double-pinion type planetary gear set provided with a first sun gear, a first carrier and a first ring gear and having a pair of first planetary gears which are rotatably supported by means of the first carrier and are engaged with each other; the second planetary gear set is a single-pinion type planetary gear set provided with a second sun gear, a second carrier and a second ring gear and having a second planetary gear rotatably supported by means of the second carrier; and the third planetary gear set is a single-pinion type planetary gear set provided with a third sun gear, a third carrier, and a third ring gear and having a third planetary gear rotatably supported by means of the third carrier;

(b) wherein the first rotary element includes the first sun gear; the second rotary element includes the first ring gear and the second sun gear; the third rotary element includes the third sun gear; the fourth rotary element includes the first carrier, the second carrier and the third carrier; and the fifth rotary element includes the second ring gear and the third ring gear.

According to the 41st aspect of the invention, in the planetary gear type multistage transmission for vehicles defined in the 35th aspect of the invention, (a) the first planetary gear set is a double-pinion type planetary gear set provided with a first sun gear, a first carrier and a first ring gear and having a pair of first planetary gears which are rotatably supported by means of the first carrier and are engaged with each other; the second planetary gear set is a single-pinion type planetary gear set provided with a second sun gear, a second carrier and a second ring gear and having a second planetary gear rotatably supported by means of the second carrier; and the third planetary gear set is a single-pinion type planetary gear set provided with a third sun gear, a third carrier, and a third ring gear and having a third planetary gear rotatably supported by means of the third carrier;

(b) wherein the first rotary element includes the second sun gear and the third sun gear; the second rotary element includes the first carrier and the second carrier; the third rotary element includes the first ring gear, the second ring gear and the third carrier; the fourth rotary element includes the first sun gear; and the fifth rotary element includes the third ring gear.

According to the 42nd aspect of the invention, in the planetary gear type multistage transmission for vehicles defined in the 1st aspect of the invention, (a) a rotational speed of the rotary motion transmitted by the second intermediate output path is higher than a rotational speed of the rotary motion transmitted by the first intermediate output path; and (b) the second transmission portion includes a double-pinion type first planetary gear set provided with a first sun gear, a first carrier and a first ring gear having a pair of first planetary gears which are rotatably supported by means of the first carrier and are engageable with each other; a single-pinion type second planetary gear set provided with a second sun gear, a second carrier and a second ring gear and having a second planetary gear rotatably supported by means of the second carrier; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the second sun gear is selectively connected to the first driven member via a first clutch and is selectively connected to the second driven member via a third clutch; the first carrier, the second carrier and the third ring gear are selectively connected to the first driven member, and are selectively connected to the non-rotating member via a first brake; the first ring gear, the second ring gear and the third carrier are connected to the output rotating member; the first sun gear is selectively connected to the non-rotating member via the second brake; and the third sun gear is selectively connected to the second driven member via a fourth clutch; and (c) wherein seven forward speed transmission stages are established by selectively engaging clutches and brakes with each other and disengaging the clutches and brakes from each other.

According to the 43rd aspect of the invention, in the planetary gear type multistage transmission for vehicles defined in the 1st aspect of the invention, (a) a rotational speed of the rotary motion transmitted by the second intermediate output path is higher than a rotational speed of the rotary motion transmitted by the first intermediate output path; and (b) the second transmission portion includes a single-pinion type first planetary gear set provided with a first sun gear, a first carrier and a first ring gear having a first planetary gear rotatably supported by means of the first carrier; a double-pinion type second planetary gear set provided with a second sun gear, a second carrier and a second ring gear and having a pair of second planetary gears which are rotatably supported by means of the second carrier and are engageable with each other; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the third sun gear is selectively connected to the first driven member via a first clutch and is selectively connected to the second driven member via a third clutch; the first sun gear, the second carrier and the third carrier are selectively connected to the non-rotating member via a first brake; the second ring gear and the third ring gear are connected to the output rotating member; the first carrier is selectively connected to the non-rotating member via a second brake; the first ring gear and the second sun gear are selectively connected to the second driven member via a fourth clutch; and (c) wherein seven forward speed transmission stages are established by selectively engaging clutches and brakes with each other and disengaging the clutches and brakes from each other.

According to the 44th aspect of the invention, in the planetary gear type multistage transmission for vehicles defined in the 1st aspect of the invention, (a) a rotational speed of the rotary motion transmitted by the second intermediate output path is higher than a rotational speed of the rotary motion transmitted by the first intermediate output path; and (b) the second transmission portion includes a single-pinion type first planetary gear set provided with a first sun gear, a first carrier and a first ring gear having a first planetary gear rotatably supported by means of the first carrier; a double-pinion type second planetary gear set provided with a second sun gear, a second carrier and a second ring gear and having a pair of second planetary gears which are rotatably supported by means of the second carrier and are engageable with each other; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the third sun gear is selectively connected to the first driven member via a first clutch and is selectively connected to the second driven member via a third clutch; the second carrier and the third carrier are selectively connected to the first driven member, and is selectively connected to the non-rotating member via a first brake; the first sun gear, the second ring gear and the third ring gear are connected to the output rotating member; the first carrier is selectively connected to the non-rotating member via the second brake; the first ring gear and the second sun gear are selectively connected to the second driven member via a fourth clutch; and (c) wherein seven forward speed transmission stages are established by selectively engaging clutches and brakes with each other and disengaging the clutches and brakes from each other.

According to the 45th aspect of the invention, in the planetary gear type multistage transmission for vehicles defined in the 1st aspect of the invention, (a) a rotational speed of the rotary motion transmitted by the second intermediate output path is higher than a rotational speed of the rotary motion transmitted by the first intermediate output path; and (b) the second transmission portion includes a single-pinion type first planetary gear set provided with a first sun gear, a first carrier and a first ring gear having a first planetary gear rotatably supported by means of the first carrier; a single-pinion type second planetary gear set provided with a second sun gear, a second carrier and a second ring gear and having a second planetary gear rotatably supported by means of the second carrier; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the second sun gear and the third sun gear are selectively connected to the first driven member via a first clutch, and are selectively connected to the second driven member via a third clutch; the third carrier is selectively connected to the first driven member via a second clutch, and is selectively connected to the non-rotating member via a first brake; the first sun gear, the second carrier and the third ring gear are connected to the output rotating member; the first carrier and the second ring gear are selectively connected to the non-rotating member via a second brake; and the first ring gear is selectively connected to the second driven member via a fourth clutch; and (c) wherein seven forward speed transmission stages are established by selectively engaging clutches and brakes with each other and disengaging the clutches and brakes from each other.

According to the 46th aspect of the invention, in the planetary gear type multistage transmission for vehicles defined in the 1st aspect of the invention, (a) a rotational speed of the rotary motion transmitted by the second intermediate output path is higher than a rotational speed of the rotary motion transmitted by the first intermediate output path; and (b) the second transmission portion includes a double-pinion type first planetary gear set provided with a first sun gear, a first carrier and a first ring gear having a pair of first planetary gears which are rotatably supported by means of the first carrier and are engageable with each other; a single-pinion type second planetary gear set provided with a second sun gear, a second carrier and a second ring gear and having a second planetary gear rotatably supported by means of the second carrier; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the first sun gear is selectively connected to the first driven member via a first clutch, and is selectively connected to the second driven member via a third clutch; the first ring gear and the second sun gear are selectively connected to the first driven member via a second clutch, and are selectively connected to the non-rotating member via a first brake; the third sun gear is connected to the output rotating member; the first carrier, the second carrier and the third carrier are selectively connected to the non-rotating member via a second brake; the second ring gear and the third ring gear are selectively connected to the second driven member via a fourth clutch; and (c) wherein seven forward speed transmission stages are established by selectively engaging clutches and brakes with each other and disengaging the clutches and brakes from each other.

According to the 47th aspect of the invention, in the planetary gear type multistage transmission for vehicles defined in the 1st aspect of the invention, (a) a rotational speed of the rotary motion transmitted by the second intermediate output path is higher than a rotational speed of the rotary motion transmitted by the first intermediate output path; and (b) the second transmission portion includes a double-pinion type first planetary gear set provided with a first sun gear, a first carrier and a first ring gear having a pair of first planetary gears which are rotatably supported by means of the first carrier and are engageable with each other; a single-pinion type second planetary gear set provided with a second sun gear, a second carrier and a second ring gear and having a second planetary gear rotatably supported by means of the second carrier; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the second sun gear and the third sun gear are selectively connected to the first driven member via a first clutch, and are selectively connected to the second driven member via a third clutch; the first carrier and the second carrier are selectively connected to the first driven member via a second clutch, and are selectively connected to the non-rotating member via a first brake; the first ring gear, the second ring gear and the third carrier are connected to the output rotating member; the first sun gear is selectively connected to the non-rotating member via a second brake; and the third ring gear is selectively connected to the second driven member via a fourth clutch; and (c) wherein seven forward speed transmission stages are established by selectively engaging clutches and brakes with each other and disengaging the clutches and brakes from each other.

According to the 48th aspect of the invention, in the planetary gear type multistage transmission for vehicles defined in the 37th aspect of the invention, the second carrier and the third carrier, and the second ring gear and the third ring gear are, respectively, composed of a common member, and the third planetary gear is concurrently used as any one of the pair of the second planetary gears which are engageable with each other.

According to the 49th aspect of the invention, in the planetary gear type multistage transmission for vehicles defined in the 35th aspect of the invention, a first transmission stage of the maximum transmission ratio is established by engaging the first clutch and the second brake with each other; a second transmission stage having a smaller transmission ratio than that of the first transmission stage is established by engaging the third clutch and the second brake with each other; a third transmission stage having a smaller transmission ratio than that of the second transmission stage is established by engaging the second clutch and the second brake with each other; a fourth transmission stage having a smaller transmission ratio than that of the third transmission stage is established by engaging the second clutch and the third clutch with each other; a fifth transmission stage having a smaller transmission ratio than that of the fourth transmission stage is established by engaging the first clutch and the second clutch with each other; a sixth transmission stage having a smaller transmission ratio than that of the fifth transmission stage is established by engaging the second clutch and the fourth clutch with each other; a seventh transmission stage having a smaller transmission ratio than that of the sixth transmission stage is established by engaging the first clutch and the fourth clutch with each other; and an eighth transmission stage having a smaller transmission ratio than that of the seventh transmission stage is established by engaging the third clutch and the fourth clutch with each other.

According to the 50th aspect of the invention, in the planetary gear type multistage transmission for vehicles defined in the 35th aspect of the invention, a reverse transmission stage is established by engaging the first clutch and the first brake with each other.

According to the 51th aspect of the invention, in the planetary gear type multistage transmission for vehicles defined in the 1st aspect of the invention, (a) a rotational speed of the rotary motion transmitted by the second intermediate output path is higher than a rotational speed of the rotary motion transmitted by the first intermediate output path;

(b) a first rotary element of the five rotary elements is selectively connected to the first driven member via a first clutch and is selectively connected to the second driven member via a fourth clutch;

(c) a second rotary element of the five rotary elements is selectively connected to the first driven member via a second clutch;

(d) a third rotary element of the five rotary elements is selectively connected to the first driven member via a third clutch or is selectively connected to the first driven member via a third clutch and is selectively connected to the non-rotating member via a second brake;

(e) a fourth rotary element of the five rotary elements is connected to the output rotating member;

(f) a fifth rotary element of the five rotary elements is selectively connected to the second driven member via a fifth clutch, and is selectively connected to the non-rotating member via a first brake.

According to the 52nd aspect of the invention, in the planetary gear type multistage transmission for vehicles defined in the 51st aspect of the invention, (a) the first planetary gear set is a single-pinion type planetary gear set provided with a first sun gear, a first carrier and a first ring gear and having a first planetary gear rotatably supported by means of the first carrier; the second planetary gear set is a single-pinion type planetary gear set provided with a second sun gear, a second carrier and a second ring gear and having a second planetary gear rotatably supported by means of the second carrier; and the third planetary gear set is a single-pinion type planetary gear set provided with a third sun gear, a third carrier, and a third ring gear and having a third planetary gear rotatably supported by means of the third carrier;

(b) wherein the first rotary element includes the first sun gear and the second sun gear; the second rotary element includes the third sun gear; the third rotary element includes the second carrier; the fourth rotary element includes the first carrier, the second ring gear and the third carrier; and the fifth rotary element includes the first ring gear and the third ring gear.

According to the 53rd aspect of the invention, in the planetary gear type multistage transmission for vehicles defined in the 51st aspect of the invention, (a) the first planetary gear set is a single-pinion type planetary gear set provided with a first sun gear, a first carrier and a first ring gear, and having a first planetary gear rotatably supported by means of the first carrier; the second planetary gear set is a double-pinion type planetary gear set provided with a second sun gear, a second carrier and a second ring gear and having a pair of second planetary gears which are rotatably supported by means of the second carrier and are engageable with each other; the third planetary gear set is a single-pinion type planetary gear set provided with a third sun gear, a third carrier and a third ring gear, and having a third planetary gear rotatably supported by means of the third carrier;

(b) the first rotary element includes the first sun gear; the second rotary element includes the second sun gear and the third sun gear; the third rotary element includes the first carrier and the second ring gear; the fourth rotary element includes the first ring gear, the second carrier and the third carrier; and the fifth rotating element includes the third ring gear.

According to the 54th aspect of the invention, in the planetary gear type multistage transmission for vehicles defined in the 51st aspect of the invention, (a) the first planetary gear set is a double-pinion type planetary gear set provided with a first sun gear, a first carrier and a first ring gear and having a pair of first planetary gears which are rotatably supported by means of the first carrier and are engaged with each other; the second planetary gear set is a single-pinion type planetary gear set provided with a second sun gear, a second carrier and a second ring gear and having a second planetary gear rotatably supported by means of the second carrier; and the third planetary gear set is a single-pinion type planetary gear set provided with a third sun gear, a third carrier, and a third ring gear and having a third planetary gear rotatably supported by means of the third carrier;

(b) wherein the first rotary element includes the second sun gear; the second rotary element includes the third sun gear; the third rotary element includes the first carrier and the second carrier; the fourth rotary element includes the first ring gear, the second ring gear and the third carrier; and the fifth rotary element includes the first sun gear and the third ring gear.

According to the 55th aspect of the invention, in the planetary gear type multistage transmission for vehicles defined in the 51st aspect of the invention, (a) the first planetary gear set is a single-pinion type planetary gear set provided with a first sun gear, a first carrier and a first ring gear and having a first planetary gear rotatably supported by means of the first carrier; the second planetary gear set is a single-pinion type planetary gear set provided with a second sun gear, a second carrier and a second ring gear and having a second planetary gear rotatably supported by means of the second carrier; and the third planetary gear set is a double-pinion type planetary gear set provided with a third sun gear, a third carrier, and a third ring gear and having a pair of third planetary gears which are rotatably supported by means of the third carrier and are engageable with each other;

(b) wherein the first rotary element includes the first sun gear; the second rotary element includes the second sun gear and the third sun gear; the third rotary element includes the third ring gear; the fourth rotary element includes the first carrier, the second carrier and the third carrier; and the fifth rotary element includes the first ring gear and the second ring gear.

According to the 56th aspect of the invention, in the planetary gear type multistage transmission for vehicles defined in the 51st aspect of the invention, (a) the first planetary gear set is a single-pinion type planetary gear set provided with a first sun gear, a first carrier and a first ring gear, and having a first planetary gear rotatably supported by means of the first carrier; the second planetary gear set is a double-pinion type planetary gear set provided with a second sun gear, a second carrier and a second ring gear and having a pair of second planetary gears which are rotatably supported by means of the second carrier and are engageable with each other; the third planetary gear set is a single-pinion type planetary gear set provided with a third sun gear, a third carrier and a third ring gear, and having a third planetary gear rotatably supported by means of the third carrier;

(b) the first rotary element includes the first ring gear; the rotary element includes the first carrier, the second carrier and the third carrier; the third rotary element includes the second ring gear; the fourth rotary element includes the third carrier; and the fifth rotary element includes the first sun gear, the second sun gear and the third ring gear.

According to the 57th aspect of the invention, in the planetary gear type multistage transmission for vehicles defined in the 1st aspect of the invention, (a) a rotational speed of the rotary motion transmitted by the second intermediate output path is higher than a rotational speed of the rotary motion transmitted by the first intermediate output path;

(b) the second transmission portion includes a single-pinion type first planetary gear set provided with a first sun gear, a first carrier and a first ring gear having a first planetary gear rotatably supported by means of the first carrier; a single-pinion type second planetary gear set provided with a second sun gear, a second carrier and a second ring gear and having a second planetary gear rotatably supported by means of the second carrier; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the first sun gear and the second sun gear are selectively connected to the first driven member via a first clutch, and are selectively connected to the first driven member via a second clutch; the second carrier is selectively connected to the first driven member via a third clutch; the first carrier, the second ring gear and the third carrier are connected to the output rotating member; the first ring gear and the third ring gear are selectively connected to the second driven member via a fifth clutch and are selectively connected to the non-rotating member via a first brake; and (c) wherein seven forward speed transmission stages are established by selectively engaging clutches and brakes with each other and disengaging the clutches and brakes from each other.

According to the 58th aspect of the invention, in the planetary gear type multistage transmission for vehicles defined in the 1st aspect of the invention, (a) a rotational speed of the rotary motion transmitted by the second intermediate output path is higher than a rotational speed of the rotary motion transmitted by the first intermediate output path;

(b) the second transmission portion includes a single-pinion type first planetary gear set provided with a first sun gear, a first carrier and a first ring gear having a first planetary gear rotatably supported by means of the first carrier; a double-pinion type second planetary gear set provided with a second sun gear, a second carrier and a second ring gear and having a pair of second planetary gears which are rotatably supported by means of the second carrier and are engageable with each other; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the first sun gear is selectively connected to the first driven member via a first clutch, and is selectively connected to the second driven member via a fourth clutch; the second sun gear and the third sun gear are selectively connected to the first driven member via a second clutch; the first carrier and the second ring gear are selectively connected to the first driven member via a third clutch; the first ring gear, the second carrier and the third carrier are connected to the output rotating member; and the third ring gear is selectively connected to the second driven member via a fifth clutch and is selectively connected to the non-rotating member via a first brake; and (c) wherein seven forward speed transmission stages are established by selectively engaging clutches and brakes with each other and disengaging the clutches and brakes from each other.

According to the 59th aspect of the invention, in the planetary gear type multistage transmission for vehicles defined in the 1st aspect of the invention, (a) a rotational speed of the rotary motion transmitted by the second intermediate output path is higher than a rotational speed of the rotary motion transmitted by the first intermediate output path;

(b) the second transmission portion includes a double-pinion type first planetary gear set provided with a first sun gear, a first carrier and a first ring gear having a pair of first planetary gears which are rotatably supported by means of the first carrier and are engageable with each other; a single-pinion type second planetary gear set provided with a second sun gear, a second carrier and a second ring gear and having a second planetary gear rotatably supported by means of the second carrier; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the second sun gear is selectively connected to the first driven member via a first clutch, and is selectively connected to the second driven member via a fourth clutch; the third sun gear is selectively connected to the first driven member via a second clutch; the first carrier and the second carrier are selectively connected to the first driven member via a third clutch; the first ring gear, the second ring gear and the third carrier are connected to the output rotating member; and the first sun gear and the third ring gear are selectively connected to the second driven member via a fifth clutch and are selectively connected to the non-rotating member via a first brake; and (c) wherein seven forward speed transmission stages are established by selectively engaging clutches and brakes with each other and disengaging the clutches and brakes from each other.

According to the 60th aspect of the invention, in the planetary gear type multistage transmission for vehicles defined in the 1st aspect of the invention, (a) a rotational speed of the rotary motion transmitted by the second intermediate output path is higher than a rotational speed of the rotary motion transmitted by the first intermediate output path; and (b) the second transmission portion includes a single-pinion type first planetary gear set provided with a first sun gear, a first carrier and a first ring gear having a first planetary gear rotatably supported by means of the first carrier; a single-pinion type second planetary gear set provided with a second sun gear, a second carrier and a second ring gear and having a second planetary gear rotatably supported by means of the second carrier; and a double-pinion type third planetary gear set provided with a third sun gear, a third carrier and a third ring gear and having a pair of third planetary gears which are rotatably supported by means of the third carrier and engageable with each other; the three planetary gear sets being disposed one after another to be concentric with the second axial center; wherein the first sun gear is selectively connected to the first driven member via a first clutch, and is selectively connected to the second driven member via a fourth clutch; the second sun gear and the third sun gear are selectively connected to the first driven member via a second clutch; the third ring gear is selectively connected to the first driven member via a third clutch; the first carrier, the second carrier, and the third carrier are connected to the output rotating member, the first ring gear and the second ring gear are selectively connected to the second driven member via a fifth clutch and are selectively connected to the non-rotating member via a first brake; and (c) wherein seven forward speed transmission stages are established by selectively engaging clutches and brakes with each other and disengaging the clutches and brakes from each other.

According to the 61st aspect of the invention, in the planetary gear type multistage transmission for vehicles defined in the 1st aspect of the invention, (a) a rotational speed of the rotary motion transmitted by the second intermediate output path is higher than a rotational speed of the rotary motion transmitted by the first intermediate output path; and (b) the second transmission portion includes a single-pinion type first planetary gear set provided with a first sun gear, a first carrier and a first ring gear having a first planetary gear rotatably supported by means of the first carrier; a double-pinion type second planetary gear set provided with a second sun gear, a second carrier and a second ring gear and having a pair of second planetary gears which are rotatably supported by means of the second carrier and are engageable with each other; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the first ring gear is selectively connected to the first driven member via a first clutch and is selectively connected to the second driven member via a fourth clutch; the first carrier, the second carrier and the third sun gear are selectively connected to the first driven member via a second clutch; the second ring gear is selectively connected to the first driven member via a third clutch and is selectively connected to the non-rotating member via a second brake; the third carrier is connected to the output rotating member; the first sun gear, the second sun gear and the third ring gear are selectively connected to the second driven member via a fifth clutch and are selectively connected to the non-rotating member via a first brake; and (c) wherein seven forward speed transmission stages are established by selectively engaging clutches and brakes with each other and disengaging the clutches and brakes from each other.

According to the 62nd aspect of the invention, in the planetary gear type multistage transmission for vehicles defined in the 53rd aspect of the invention, the second carrier and the third carrier, and the second sun gear and the third sun gear are, respectively, composed of a common member, and the third planetary gear is concurrently used as any one of the pair of the second planetary gears which are engageable with each other.

According to the 63rd aspect of the invention, in the planetary gear type multistage transmission for vehicles defined in the 54th aspect of the invention, the first carrier and the second carrier, and the first ring gear and the second ring gear are, respectively, composed of a common member, and the second planetary gear is concurrently used as any one of the pair of the first planetary gears which are engageable with each other.

According to the 64th aspect of the invention, in the planetary gear type multistage transmission for vehicles defined in the 56th aspect of the invention, the first carrier and the second carrier, and the first sun gear and the second sun gear are, respectively, composed of a common member, and the first planetary gear is concurrently used as any one of the pair of the second planetary gears which are engageable with each other.

According to the 65th aspect of the invention, in the planetary gear type multistage transmission for vehicles defined in the 51st aspect of the invention, a first transmission stage of the maximum transmission ratio is established by engaging the first clutch and the first brake with each other; a second transmission stage having a smaller transmission ratio than that of the first transmission stage is established by engaging the second clutch and the first brake with each other; a third transmission stage having a smaller transmission ratio than that of the second transmission stage is established by engaging the fourth clutch and the first brake with each other; a fourth transmission stage having a smaller transmission ratio than that of the third transmission stage is established by engaging the third clutch and the first brake with each other; a fifth transmission stage having a smaller transmission ratio than that of the fourth transmission stage is established by engaging the third clutch and the fourth clutch with each other; a sixth transmission stage having a smaller transmission ratio than that of the fifth transmission stage is established by engaging the first clutch and the third clutch with each other; a seventh transmission stage having a smaller transmission ratio than that of the sixth transmission stage is established by engaging the third clutch and the fifth clutch with each other; and an eighth transmission stage having a smaller transmission ratio than that of the seventh transmission stage is established by engaging the fourth clutch and the fifth clutch with each other.

According to the 66th aspect of the invention, in the planetary gear type multistage transmission for vehicles defined in the 51st aspect of the invention, a reverse transmission stage is established by engaging the second clutch and the fourth clutch with each other, or a reverse transmission stage is established by engaging the fourth clutch and the second brake with each other.

According to the 67th aspect of the invention, in the planetary gear type multistage transmission for vehicles defined in the 1st aspect of the invention, (a) a rotational speed of the rotary motion transmitted by the second intermediate output path is lower than a rotational speed of the rotary motion transmitted by the first intermediate output path;

(b) a first rotary element of the five rotary elements is selectively connected to the second driven member via a first clutch, is selectively connected to the first driven member via a third clutch, and is selectively connected to the non-rotating member via a first brake;

(c) a second rotary element of the five rotary elements is selectively connected to the non-rotating member via a second brake;

(d) a third rotary element of the five rotary elements is selectively connected to the first driven member via a fourth clutch and is selectively connected to the non-rotating member via a third brake;

(e) a fourth rotary element of the five rotary elements is connected to the output rotating member;

(f) a fifth rotary element of the five rotary elements is selectively connected to the second driven member via a second clutch.

According to the 68th aspect of the invention, in the planetary gear type multistage transmission for vehicles defined in the 67th aspect of the invention, (a) the first planetary gear set is a double-pinion type planetary gear set provided with a first sun gear, a first carrier and a first ring gear and having a pair of first planetary gears which are rotatably supported by means of the first carrier and are engaged with each other; the second planetary gear set is a single-pinion type planetary gear set provided with a second sun gear, a second carrier and a second ring gear and having a second planetary gear rotatably supported by means of the second carrier; and the third planetary gear set is a single-pinion type planetary gear set provided with a third sun gear, a third carrier, and a third ring gear and having a third planetary gear rotatably supported by means of the third carrier;

(b) wherein the first rotary element includes the second sun gear and the third sun gear; the second rotary element includes the first carrier and the second carrier; the third rotary element includes the second ring gear and the third carrier; the fourth rotary element includes the first ring gear and the third ring gear; and the fifth rotary element includes the first sun gear.

According to the 69th aspect of the invention, in the planetary gear type multistage transmission for vehicles defined in the 1st aspect of the invention, (a) wherein a rotational speed of the rotary motion transmitted by the second intermediate output path is lower than a rotational speed of the rotary motion transmitted by the first intermediate output path;

(b) the second transmission portion includes a double-pinion type first planetary gear set provided with a first sun gear, a first carrier and a first ring gear having a pair of first planetary gears which are rotatably supported by means of the first carrier and are engageable with each other; a single-pinion type second planetary gear set provided with a second sun gear, a second carrier and a second ring gear and having a second planetary gear rotatably supported by means of the second carrier; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the second sun gear and the third sun gear are selectively connected to the second driven member via a first clutch, are selectively connected to the first driven member via a third clutch, and are selectively connected to the non-rotating member via a first brake; the first carrier and the second carrier are selectively connected to the non-rotating member via a second brake; the second ring gear and the third carrier are selectively connected to the first driven member via a fourth clutch, and are selectively connected to the non-rotating member via a third brake; the first ring gear and the third ring gear are connected to the output rotating member; and the first sun gear is selectively connected to the second driven member via a second clutch; and (c) wherein at least seven forward speed transmission stages are established by selectively changing engagement and disengagement of the clutches and brakes.

According to the 70th aspect of the invention, in the planetary gear type multistage transmission for vehicles defined in the 67th aspect of the invention, a first transmission stage of the maximum transmission ratio is established by engaging the second clutch and the third brake with each other; a second transmission stage having a smaller transmission ratio than that of the first transmission stage is established by engaging the second clutch and the second brake with each other; a third transmission stage having a smaller transmission ratio than that of the second transmission stage is established by engaging the second clutch and the first brake with each other; a fourth transmission stage having a smaller transmission ratio than that of the third transmission stage is established by engaging the first clutch and the second clutch with each other; a fifth transmission stage having a smaller transmission ratio than that of the fourth transmission stage is established by engaging the second clutch and the third clutch with each other; a sixth transmission stage having a smaller transmission ratio than that of the fifth transmission stage is established by engaging the second clutch and the fourth clutch with each other; a seventh transmission stage having a smaller transmission ratio than that of the sixth transmission stage is established by engaging the third clutch and the fourth clutch with each other; and an eighth transmission stage having a smaller transmission ratio than that of the seventh transmission stage is established by engaging the fourth clutch and the first brake with each other.

According to the 71st aspect of the invention, in the planetary gear type multistage transmission for vehicles defined in the 67th aspect of the invention, a first reverse transmission stage is established by engaging the first clutch and the third brake with each other, and a second reverse transmission stage having a smaller transmission ratio than that of the first reverse transmission stage is established by engaging the first clutch and the second brake with each other.

According to the 72nd aspect of the invention, in the planetary gear type multistage transmission for vehicles defined in the 1st aspect of the invention, the first transmission portion transmits rotations of the input rotating member to the second transmission portion at rotations differing from each other via the first intermediate output path and the second intermediate output path.

According to the 73rd aspect of the invention, in the planetary gear type multistage transmission for vehicles defined in the 1st aspect of the invention, the power transmission member is a counter-gear pair composed of a drive gear disposed on the first axial center and a driven gear disposed on the second axial center and engaged with the drive gear.

According to the 74th aspect of the invention, in the planetary gear type multistage transmission for vehicles defined in the 1st aspect of the invention, output of the driving-force source is inputted into the input rotating member via a hydraulic power transmission.

According to the 75th aspect of the invention, in the planetary gear type multistage transmission for vehicles defined in the 1st aspect of the invention, (a) wherein the first intermediate output path and the second intermediate output path are disposed in parallel to each other;

(b) the first planetary gear set, the second planetary gear set, and the thied planetary gear set are disposed one after another to be concentric with the second axial center at the side opposite to the driving-force source side from the first intermediate output path and the second intermediate output path.

According to the 76th aspect of the invention, in the planetary gear type multistage transmission for vehicles defined in the 1st aspect of the invention, (a) wherein the first intermediate output path and the second intermediate output path are disposed in parallel to each other;

(b) the first planetary gear set, the second planetary gear set, and the thied planetary gear set are disposed one after another to be concentric with the second axial center so as to be placed between the first intermediate output path and the second intermediate output path.

According to the 77th aspect of the invention, in the planetary gear type multistage transmission for vehicles defined in the 11th aspect of the invention, (a) the first planetary gear set is a single-pinion type planetary gear set provided with a first sun gear, a first carrier and a first ring gear and having a first planetary gear rotatably supported by means of the first carrier; the second planetary gear set is a double-pinion type planetary gear set provided with a second sun gear, a second carrier and a second ring gear and having a pair of second planetary gears which are rotatably supported by means of the second carrier and are engageable with each other; and the third planetary gear set is a single-pinion type planetary gear set provided with a third sun gear, a third carrier, and a third ring gear and having a third planetary gear rotatably supported by means of the third carrier;

(b) the first rotary element includes the third sun gear; the second rotary element includes the first ring gear and the second sun gear; the third rotary element includes the first carrier; the fourth rotary element includes the first sun gear, the second ring gear and the third carrier; and the fifth rotary element includes the second carrier and the third ring gear.

According to the 78th aspect of the invention, in the planetary gear type multistage transmission for vehicles defined in the 11th aspect of the invention, (a) the first planetary gear set is a double-pinion type planetary gear set provided with a first sun gear, a first carrier and a first ring gear and having a pair of first planetary gears which are rotatably supported by means of the first carrier and are engaged with each other; the second planetary gear set is a single-pinion type planetary gear set provided with a second sun gear, a second carrier and a second ring gear and having a second planetary gear rotatably supported by means of the second carrier; and the third planetary gear set is a single-pinion type planetary gear set provided with a third sun gear, a third carrier, and a third ring gear and having a third planetary gear rotatably supported by means of the third carrier; and (b) the first rotary element includes the third sun gear; the second rotary element includes the first carrier and the second ring gear; the third rotary element includes the second carrier; the fourth rotary element includes the first ring gear, the second sun gear and the third carrier; and the fifth rotary element includes the first sun gear and the third ring gear.

According to the 79th aspect of the invention, in the planetary gear type multistage transmission for vehicles defined in the 67th aspect of the invention, (a) the first planetary gear set is a single-pinion type planetary gear set provided with a first sun gear, a first carrier and a first ring gear and having a first planetary gear rotatably supported by means of the first carrier; the second planetary gear set is a single-pinion type planetary gear set provided with a second sun gear, a second carrier and a second ring gear and having a second planetary gear rotatably supported by means of the second carrier; and the third planetary gear set is a single-pinion type planetary gear set provided with a third sun gear, a third carrier, and a third ring gear and having a third planetary gear rotatably supported by means of the third carrier;

(b) the first rotary element includes the first sun gear; the second rotary element includes the second ring gear; the third rotary element includes the second carrier and the third ring gear; the fourth rotary element includes the first carrier, the second sun gear and the third carrier; and the fifth rotary element includes the first ring gear and the third sun gear.

According to the 80th aspect of the invention, in the planetary gear type multistage transmission for vehicles defined in the 23rd aspect of the invention, (a) the first planetary gear set is a single-pinion type planetary gear set provided with a first sun gear, a first carrier and a first ring gear, and having a first planetary gear rotatably supported by means of the first carrier; the second planetary gear set is a double-pinion type planetary gear set provided with a second sun gear, a second carrier and a second ring gear and having a pair of second planetary gears which are rotatably supported by means of the second carrier and are engageable with each other; the third planetary gear set is a single-pinion type planetary gear set provided with a third sun gear, a third carrier and a third ring gear, and having a third planetary gear rotatably supported by means of the third carrier; and (b) the first rotary element includes the first sun gear, the second sun gear and the third sun gear; the second rotary element includes the first carrier and the second ring gear; the third rotary element includes the first ring gear; the fourth rotary element includes the second carrier and the third carrier; and the fifth rotating element includes the third ring gear.

According to the 81st aspect of the invention, in the planetary gear type multistage transmission for vehicles defined in the 23rd aspect of the invention, (a) the first planetary gear set is a single-pinion type planetary gear set provided with a first sun gear, a first carrier and a first ring gear, and having a first planetary gear rotatably supported by means of the first carrier; the second planetary gear set is a double-pinion type planetary gear set provided with a second sun gear, a second carrier and a second ring gear and having a pair of second planetary gears which are rotatably supported by means of the second carrier and are engageable with each other; the third planetary gear set is a single-pinion type planetary gear set provided with a third sun gear, a third carrier and a third ring gear, and having a third planetary gear rotatably supported by means of the third carrier; and (b) the first rotary element includes the first sun gear and the third sun gear; the second rotary element includes the first carrier and the second sun gear; the third rotary element includes the first ring gear and the second ring gear; the fourth rotary element includes the second carrier and the third carrier; and the fifth rotating element includes the third ring gear.

According to the 82nd aspect of the invention, in the planetary gear type multistage transmission for vehicles defined in the 23rd aspect of the invention, (a) the first planetary gear set is a single-pinion type planetary gear set provided with a first sun gear, a first carrier and a first ring gear and having a first planetary gear rotatably supported by means of the first carrier; the second planetary gear set is a single-pinion type planetary gear set provided with a second sun gear, a second carrier and a second ring gear and having a second planetary gear rotatably supported by means of the second carrier; and the third planetary gear set is a double-pinion type planetary gear set provided with a third sun gear, a third carrier, and a third ring gear and having a pair of third planetary gears which are rotatably supported by means of the third carrier and are engageable with each other;

(b) the first rotary element includes the first sun gear; the second rotary element includes the first carrier and the second ring gear; the third rotary element includes the first ring gear, the second carrier and the third carrier; the fourth rotary element includes the third ring gear; and the fifth rotary element includes the second sun gear and the third sun gear.

According to the 83rd aspect of the invention, in the planetary gear type multistage transmission for vehicles defined in the 23rd aspect of the invention, (a) the first planetary gear set is a single-pinion type planetary gear set provided with a first sun gear, a first carrier and a first ring gear and having a first planetary gear rotatably supported by means of the first carrier; the second planetary gear set is a single-pinion type planetary gear set provided with a second sun gear, a second carrier and a second ring gear and having a second planetary gear rotatably supported by means of the second carrier; and the third planetary gear set is a double-pinion type planetary gear set provided with a third sun gear, a third carrier, and a third ring gear and having a pair of third planetary gears which are rotatably supported by means of the third carrier and are engageable with each other;

(b) the first rotary element includes the second sun gear; the second rotary element includes the first ring gear, the second carrier and the third carrier; the third rotary element includes the first carrier, the second ring gear and the third ring gear; the fourth rotary element includes the third sun gear; and the fifth rotary element includes the first sun gear.

A planetary gear type multistage transmission for vehicles according to the 1st aspect through the 74th aspect of the invention is provided with the first transmission portion for transmitting rotations of an input rotating member rotatable around the first axial center to the second transmission portion on the second axial center parallel to the first axial center via the first intermediate output path composed of two sets of power transmission members and the second intermediate output path and a plurality of planetary gear sets disposed one after another to be concentric with the second axial center composing the second transmission portion, for example, three sets of planetary gear sets of the first planetary gear set, the second planetary gear set and the third planetary gear set, whereby a planetary gear type multistage transmission for vehicles capable of carrying out forward multiple gear stages, for example, seven or more forward speed gear stages can be brought about, which enables large transmission ratio widths and has adequate transmission ratio steps. Also, since only three planetary gear sets are used therein, the entire length, that is, the axial dimension thereof can be shortened in comparison with the case where four planetary gear sets, in which the first transmission portion is composed of a planetary gear set, are disposed on one axis. Therefore, the planetary gear type multistage transmission for vehicles can be preferably utilized for lateral installation in FF vehicles and RR vehicles.

With the 8th aspect, the 21st aspect, 33rd aspect, the 49th aspect, and the 65th aspect of the invention, a small-sized planetary gear type multistage transmission for vehicles capable of securing eight forward speed transmission stages with large transmission ratio widths and adequate transmission ratio steps can be brought about by the first transmission portion and three sets of planetary gear sets of the first planetary gear set, the second planetary gear set and the third planetary gear set.

With the 70th aspect of the invention, a small-sized planetary gear type multistage transmission for vehicles capable of securing nine forward speed transmission stages with large transmission ratio widths and adequate transmission ratio steps can be brought about by the first transmission portion and three sets of planetary gear sets of the first planetary gear set, the second planetary gear set and the third planetary gear set. Also, by selecting a transmission stage capable of securing a desired transmission ratio among the first transmission stage through the ninth transmission stage, a multistage transmission of seven forward speed transmission stages or eight forward speed transmission stages can be brought about. For example, if the first transmission stage through the seventh transmission stage or the second transmission stage through the eighth transmission stage are used, a multistage transmission of seven forward speed transmission stages can be obtained, and if the first transmission stage through the eighth transmission stage or the second transmission stage through the ninth transmission stage are used, a multistage transmission of eight forward speed transmission stages can be obtained.

With the 8th aspect, the 20th aspect, the 32nd aspect, the 48th aspect, the 62nd aspect, the 63ed aspect, and the 64th aspect of the invention, the number of components can be further decreased, and the axial length can be also shortened.

With the 10th aspect, the 22nd aspect, the 34th aspect, the 50th aspect, the 66th aspect, and the 71st aspect of the invention, seven or more forward transmission gear stages and one reverse transmission gear stage can be obtained. In addition, with the 47th aspect and the 84th aspect of the invention, it is possible to select two reverse transmission gear stages. For example, where a further greater drive force is required, for example, if, in the case of reverse on an uphill road, a reverse transmission stage having a larger transmission ratio is used, and in the case of reverse on a flat road, a reverse transmission stage having a smaller transmission ratio is used, such an effect can be brought about, by which fuel consumption can be saved.

In addition, with the 73rd aspect of the invention, valve bodies of hydraulic control circuits of an oil pump and a hydraulic type friction engagement device can be disposed in an empty spacing above the first axial center between the first transmission portion and a torque converter while keeping compact the axial length of a planetary gear type multistage transmission for vehicles, wherein oil paths of the planetary gear type multistage transmission for vehicles can be easily connected to each other. Further, if a mechanical type oil pump that is driven and rotated by a drive power source is disposed in the vicinity of the drive power source, operation of the mechanical type oil pump becomes advantageous (efficient).

Also, with the 73th aspect of the invention, since a counter gear pair is employed, power (rotations) can be precisely transmitted from the input rotating member to the second transmission portion, and an adequate rotation speed can be obtained by only setting the gear ratio.

In addition, with the 74th aspect of the invention, an automatic transmission can be compactly designed.

A planetary gear type multistage transmission for vehicles according to the 75th aspect of the invention is provided with the first transmission portion for transmitting rotations of (1) an input rotating member, which is positioned at the driving-force source side and is driven and rotated around a first axial center by the driving-force source, to the second transmission portion on the second axial center parallel to the first axial center via the first intermediate output path composed of two sets of power transmission members disposed in parallel to each other and the second intermediate output path and (2) a plurality of planetary gear sets disposed one after another to be concentric with the second axial center at the side opposite to the driving-force source side from the two sets of power transmission members, composing the second transmission portion, for example, three sets of planetary gear sets of the first planetary gear set, the second planetary gear set and the third planetary gear set, whereby a planetary gear type multistage transmission for vehicles capable of carrying out forward multiple gear stages can be brought about, which enables large transmission ratio widths and has adequate transmission ratio steps. Also, since only three planetary gear sets are used therein, the entire length, that is, the axial dimension thereof can be shortened in comparison with the case where four planetary gear sets, in which the first transmission portion is composed of a planetary gear set, are disposed on one axis. Therefore, the planetary gear type multistage transmission for vehicles can be preferably utilized for lateral installation in FF vehicles and RR vehicles.

A planetary gear type multistage transmission for vehicles according to the 76th aspect through the 83rd aspect of the invention is provided with the first transmission portion for transmitting rotations of the input rotating member to the second transmission portion on the second axial center parallel to the first axial center via the first intermediate output path composed of two sets of power transmission members disposed in parallel to each other and the second intermediate output path and a plurality of planetary gear sets, for example, three planetary gear sets of the first planetary gear set, the second planetary gear set and the third planetary gear set, which are disposed one after another to be concentric with the second axial center so as to be placed between the above-described two sets of power transmission members, wherein it is possible to obtain a planetary gear type multistage transmission for vehicles capable of securing large transmission ratio widths and adequate transmission ratio steps. Also, since only three or less planetary gear sets are used on one axial center, the entire length, that is, the axial dimension thereof can be shortened in comparison with the case where four planetary gear sets, in which the first transmission portion is composed of a planetary gear set, are disposed on one axis. Therefore, the planetary gear type multistage transmission for vehicles can be preferably utilized for lateral installation in FF vehicles and RR vehicles. Further, since a plurality of planetary gear sets are centralized and disposed between the two sets of power transmission members, comparatively short members used to mutually connect between the planetary gear sets are sufficient, wherein it is possible to prevent the arrangement of the members from becoming complicated (multilayered).

BRIEF DESCRIPTION OF THE DRAWINGS

The above and other objects, features, advantages and technical and industrial significances of the present invention will be better understood by reading the following detailed description of preferred embodiment of the invention, when considered in connection with the accompanying drawings, in which:

FIG. 119 is a chart showing the relationship between transmission gear stages of the planetary gear type multistage transmission for vehicles according to the embodiment shown in FIG. 118 and operations of hydraulic type friction engagement devices, which are required to establish the transmission gear stages, corresponding to FIG. 116;

FIG. 120 is a collinear chart describing operations of the planetary gear type multistage transmission for vehicles according to the embodiment shown in FIG. 118, corresponding to FIG. 117;

FIG. 121 is a view showing main points for describing a construction of a planetary gear type multistage transmission for vehicles according to still another embodiment of the present invention, corresponding to FIG. 119;

FIG. 122 is a chart showing the relationship between transmission gear stages of the planetary gear type multistage transmission for vehicles according to the embodiment shown in FIG. 121 and operations of hydraulic type friction engagement devices, which are required to establish the transmission gear stages, corresponding to FIG. 119;

FIG. 123 is a collinear chart describing operations of the planetary gear type multistage transmission for vehicles according to the embodiment shown in FIG. 121, corresponding to FIG. 120;

FIG. 124 is a view showing main points for describing a construction of a planetary gear type multistage transmission for vehicles according to still another embodiment of the present invention, corresponding to FIG. 118;

FIG. 125 is a chart showing the relationship between transmission gear stages of the planetary gear type multistage transmission for vehicles according to the embodiment shown in FIG. 124 and operations of hydraulic type friction engagement devices, which are required to establish the transmission gear stages, corresponding to FIG. 119;

FIG. 126 is a collinear chart describing operations of the planetary gear type multistage transmission for vehicles according to the embodiment shown in FIG. 124, corresponding to FIG. 120;

DETAILED DESCRIPTION OF THE PREFERRED EMBODIMENTS

Hereinafter, a detailed description is given of embodiments of the invention with reference to the accompanying drawings.

Figure 1:
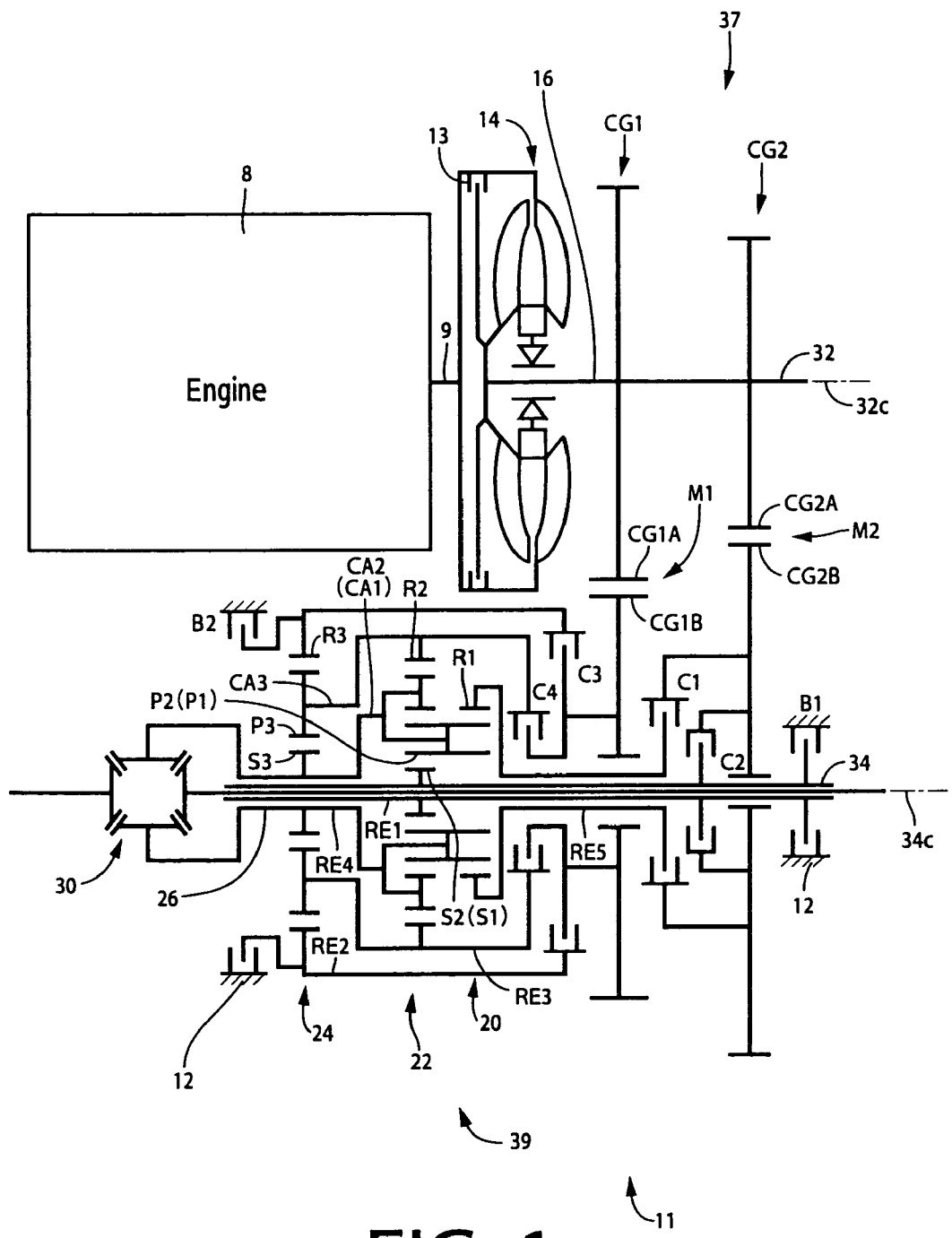
FIG. 1 is a view showing main points for describing a construction of a planetary gear type multistage transmission for vehicles according to an embodiment of the present invention.

FIG. 1 is a view showing main points for describing a construction of another planetary gear type multistage transmission (hereinafter called a "transmission") 11 for vehicle, which is preferably employed as an automatic transmission for a vehicle. In FIG. 1, the transmission 11 is provided, in a transmission case 12 attached to the vehicle body, with the first transmission portion 37, which is mainly composed of the first axis 32 and the second axis 34 rotatably fixed in the transmission case 12 and disposed therein in parallel to each other and two sets of counter gear pairs being the first counter gear pair CG1 and the second counter gear pair CG2 operating as two sets of power transmission members, and the second transmission portion 39 which is mainly composed of the first planetary gear set 20, the second planetary gear set 22 and the third planetary gear set 24, wherein a torque converter 14 with a lockup clutch 13, an input shaft 16 connected to the torque converter 14, a drive gear CG1A being one of the above-described first counter gear pair CG1 fixed on the first axis 32 connected to the input shaft 16 and a drive gear CG2A being one of the above-described second counter gear pair CG2, all of which operate as a hydraulic power transmission, are disposed on the first axial center 32c, which is the rotation center of the above-described first axis 32, one after another to be concentric therewith from a drive power source, for example, an engine 8 side, and a driven gear CG1B being the other of the above-described first counter gear pair CG1 rotatably provided around the second axis 34, a driven gear CG2B being the other of the above-described second counter gear pair CG2, the first planetary gear set 20, the second planetary gear set 22, the third planetary gear set 24 and an output shaft 26 are disposed on the second axial center 34c, which is the rotation center of the above-described second axis 34, to be concentric therewith. The transmission 11 is preferably used as an automatic transmission for an FF or an RR, which is installed particularly in a lateral direction in a vehicle, and is provided between the engine 8 and drive wheels (not illustrated). The transmission 11 transmits an output of the engine 8 to the driving wheels. In the present embodiment, the above-described input shaft 16 and output shaft 26 correspond to the input rotating member and output rotating member, respectively, and the above-described transmission case 12 corresponds to the non-rotating member. In addition, the input shaft 16 is substantially identical to the first axis 32 connected to the input shaft 16, wherein it can be that that rotations of the first axis 32 are rotations of the input shaft 16 being the input rotating member. Further, the above-described torque converter 14 is operatively connected to the crankshaft 9 of the engine 8 and outputs power of the engine 8 to the input shaft 16. That is, the input shaft 16 connected to a turbine shaft being the output side rotating member of the torque converter 14 is driven and rotated around the first axial center 32c by the engine 8, wherein the turbine shaft of the torque converter 14 corresponds to the input rotating member. Further, the above-described output shaft 26 drives and rotates left and right drive wheels via, for example, a differential gear set 30, etc.

Here, by reference to FIG. 1, a detailed description is given of the layout of respective devices that compose the transmission 11. The first transmission portion 37 is disposed so that the first counter gear pair CG1 and the second counter gear pair CG2 are juxtaposed so as to be as close to each other as possible and so that it is made farther from the engine 8 side on the first axial center 32c and the second axial center 34c than the first planetary gear set 20, the second planetary gear set 22 and the third planetary gear set 24. That is, the torque converter 14, the input shaft 16 which is remarkably shorter than the second axis 34, and the second transmission portion 39 are disposed on the first axial center 32c at the engine 8 side from the first transmission portion 37 or the second axial center 34c, and the first counter gear pair CG1 that composes the first transmission portion 37 is disposed at the engine side from the second counter gear pair CG2. In addition, in the second transmission portion 39, the first planetary gear set 20, the second planetary gear set 22, the third planetary gear set 24 and the output shaft 26 are disposed on the second axial center 34c one after another at the engine side from the first transmission portion 37. Further, respective engagement devices such as a clutch C1 through a clutch C4 are disposed between the second transmission portion 39 and the first counter gear pair CG1 or the second counter gear pair CG2, whereby the dimension of the transmission 11 in its axial direction can be shortened in comparison with the case where four planetary gear sets are employed on one axial center, and the transmission 11 becomes advantageous in the lateral installation in a FF or RR vehicle. Also, since, in the present embodiment, the clutches C1 through C4 and brakes B1 and B2 are concentrated at the axial end of the second axial center 34c or outside the transmission case 12, arrangement of a hydraulic path can be facilitated. In particular, connection between the clutches C1 through C4 and the first transmission portion 37 can be made easy.

As in the counter gears of a parallel axis type transmission that has been widely known, the first counter gear pair CG1 and the second counter gear pair CG2 that compose the above-described first transmission portion 37 is provided with the first drive gear CG1A and the second drive gear CG2A on the first axis 32 and the first driven gear CG1B and the second driven gear CG2B on the second axial center 34c, and is composed of gear pairs in which the first drive gear CG1A is always engaged with the first driven gear CG1B and the second drive gear CG2A is also always engaged with the second driven gear CG2B. These two sets of counter gear pairs function as two sets of power transmission members for transmitting rotations of the input rotating member, which are inputted to the first axis, to the second transmission portion 39 on the second axial center 34c, wherein the first intermediate output path M1 being a drive-driven path is composed of the first counter gear pair CG1, and the second intermediate output path M2 also being a drive-driven path is composed of the second counter gear pair CG2. The first transmission portion 37 transmits two types of rotations differing from each other to the second transmission portion 39 via the first intermediate output path M1 and the second intermediate output path M2, which are two output paths. The first drive gear CG1A and the second drive gear CG2A are, respectively, the first drive member that composes the first intermediate output path M1 at the first axis 32 side and the second drive member that composes the second intermediate output path M2 at the first axis 32 side while the first driven gear CG1B and the second driven gear CG2B are, respectively, the first driven member that composes the first intermediate output path M1 at the second axial center 34c side and the second driven member that composes the second intermediate output path M2 at the second axial center 34c side. For example, where it is assumed that the speed reduction ratio (=rotation speed of the drive gear CG1A/rotation speed of the driven gear CG1B) of the first counter gear pair CG1 is [1.000] or so and the speed reduction ratio (=rotation speed of the drive gear CG2A/rotation speed of the driven gear CG2B) of the second counter gear pair CG2 is [1.802] or so, the first transmission portion 37 transmits (outputs) rotations of the input shaft 16, that is, rotations of the first axis 32, to the second transmission portion 39 via the first intermediate output path M1 and the second intermediate output path M2 that is decelerated and rotated with respect to the first intermediate output path M1. In the present embodiment, although it is assumed that the speed reduction ratio of the first counter gear pair CG1 is [1.000] or so and the first intermediate output path M1 is set to the rotation speed of the input shaft 16, the first intermediate output path M1 is not necessarily set to the rotation speed of the input shaft 16.

The first planetary gear set 20 and the third planetary gear set 24 that compose the above-described second transmission portion 39 are, respectively, composed of a single-pinion type planetary gear set, and the second planetary gear set 22 is composed of a double-pinion type planetary gear set. The first planetary gear set 20 is provided with the first sun gear S1, the first planetary gear P1, the first carrier CA1 that supports the first planetary gear P1 so as to cause the same to rotate and to revolve it, and the first ring gear R1 engaged with the first sun gear S1 via the first planetary gear P1, and has a prescribed gear ratio $\rho 1$ of, for example, [0.392] or so. The second planetary gear set 22 is provided with the second sun gear S2, a plurality of pairs of the second planetary gears P2 engaged with each other, the second carrier CA2 that supports the second planetary gears P2 so as to cause the same to rotate and to revolve it, and the second ring gear R2 engaged with the second sun gear S2 via the second planetary gears P2, and has a prescribed gear ratio $\rho 2$ of, for example, [0.310] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio $\rho 3$ of, for example, [0.329] or so. The above-described three sets of planetary gear sets are partially connected to the second axis 34. There may be a case where the second axis 34 is not necessarily a continuous one axis but may be divided into a plurality on the basis of a connected state with the three sets of planetary gear sets. Where it is assumed that the number of teeth of the first sun gear S1 is ZS1, that of the first ring gear R1 is ZR1, that of the second sun gear S2 is ZS2, that of the second ring gear R2 is ZR2, that of the third sun gear S3 is ZS3, and that of the third ring gear R3 is ZR3, the above-described gear ratio $\rho 1$ is ZS1/ZR1, the gear ratio $\rho 2$ is ZS2/ZR2, and the gear ratio $\rho 3$ is ZS2/ZR2.

Also, the above-described first planetary gear set 20 and the second planetary gear set 22 have the first carrier CA1 and the second carrier CA2 composed of a common component, and have the first sun gear S1 and the second sun gear S2 composed of a common component, wherein the first planetary gear P1 is made into a planetary gear train that is concurrently used as any one of the pair of the second planetary gears P2 engaged with each other. Also, those composed of a common component may be composed of components differing from each other.

In the above-described second transmission portion 39, the first sun gear S1 and the second sun gear S2 are connected to become integral with each other and are selectively connected to the second driven gear CG2B via the second clutch C2, and simultaneously are selectively connected to the transmission case 12 operating as the non-rotating member via the first brake B1. Also, the third ring gear R3 is selectively connected to the first driven gear CG1B via the third clutch C3 and is selectively connected to the transmission case 12 via the second brake B2. The second ring gear R2 and the third carrier CA3 are connected to become integral with each other and are selectively connected to the first driven gear CG1B via the fourth clutch C4. The first carrier CA1, the second carrier CA2 and the third sun gear S3 are connected to become integral with each other and are connected to the output shaft 26 operating as the output rotating member. The first ring gear R1 is selectively connected to the second driven gear CG2B via the first clutch C1.

The above-described first clutch C1, the second clutch C2, the third clutch C3, the fourth clutch C4, the first brake B1 and the second brake B2 are Hydraulic type friction engagement devices that have been frequently used in a prior art automatic transmission for vehicle, which are composed of a wet type multi-plate configuration in which a plurality of friction plates overlapping each other are pressed by means of a hydraulic actuator or a band brake in which one end of one or two bands wound on the outer circumference of a rotating drum is tightened by means of a hydraulic actuator.

Members at both sides between which the same intervenes are selectively connected to each other.

Figures 2, 3:
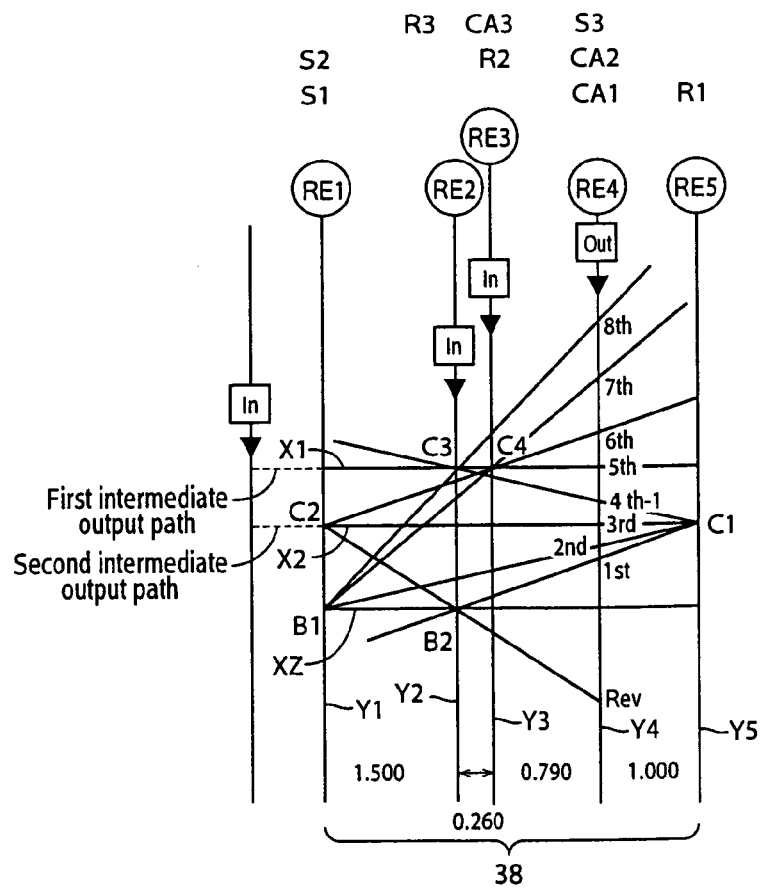
FIG. 2 is a chart showing the relationship between transmission gear stages of the planetary gear type multistage transmission for vehicles according to one embodiment shown in FIG. 1 and operations of hydraulic type friction engagement devices, which are required to establish the transmission gear stages.
FIG. 3 is a collinear chart describing operations of the planetary gear type multistage transmission for vehicles according to the embodiment shown in FIG. 1.

In the transmission 11 composed as described above, for example, as shown in the engagement operation chart of FIG. 2, since any two elements, which are selected from the first clutch C1, the second clutch C2, the third clutch C3, the fourth clutch C4, the first brake B1 and the second brake B2, are simultaneously engaged and operated with each other, any one of the first speed gear stage (the first transmission stage) through the eighth speed gear stage (the eighth transmission stage) or a reverse gear stage (reverse transmission stage) is selectively established, wherein a transmission ratio γ(=input shaft rotation speed $N_{IN}$/output gear rotation speed $N_{OUT}$) changing roughly at an equal ratio can be obtained per gear stage.

That is, as shown in FIG. 2, since, by engagement of the first clutch C1 with the second brake B2, the first ring gear R1 is connected to the second driven gear CG2B, and the third ring gear R3 is connected to the transmission case 12, the first speed gear stage whose transmission ratio γ1 is the maximum value, for example, [3.518] is established. Also, since, by engagement of the first clutch C1 with the first brake B1, the first ring gear R1 is connected to the second driven gear CG2B, and the first sun gear S1 and the second sun gear S2 are, respectively, connected to the transmission case 12, the second speed gear stage whose transmission ratio γ2 is a smaller value than that of the first speed gear stage, for example, [2.508] is established. In addition, since, by engagement of the first clutch C1 with the second clutch C2, the first ring gear R1 is connected to the second driven gear CG2B, and the first sun gear S1 and the second sun gear S2 are, respectively, connected to the second driven gear CG2B, the third speed gear stage whose transmission ratio γ3 is a smaller value than that of the second speed gear stage, for example, [1.802] is established. Also, since, by engagement of the first clutch C1 with the third clutch C3, the first ring gear R1 is connected to the second driven gear CG2B, and the third ring gear R3 is connected to the first driven gear CG1B, the fourth speed gear stage whose transmission ratio γ4 is a smaller value than that of the third speed gear stage, for example, [1.295] is established. Further, since, by engagement of the third clutch C3 with the fourth clutch C4, the third ring gear R3 is connected to the first driven gear CG1B, and the second ring gear R2 and the third carrier CA3 are, respectively, connected to the first driven gear CG1B, the fifth speed gear stage whose transmission ratio γ5 is a smaller value than that of the fourth speed gear stage, for example, [1.000] is established. Also, since, by engagement of the second clutch C2 with the fourth clutch C4, the first sun gear S1 and the second sun gear S2 are, respectively, connected to the second driven gear CG2B, and the second ring gear R2 and the third carrier CA3 are, respectively, connected to the first driven gear CG1B, the sixth speed gear stage whose transmission ratio γ6 is a smaller value than that of the fifth speed gear stage, for example, [834] is established. Also, since, by engagement of the fourth clutch C4 with the first brake B1, the second ring gear R2 and the third carrier CA3 are, respectively, connected to the first driven gear CG1B, and the first sun gear S1 and the second sun gear S2 are, respectively, connected to the transmission case 12, the seventh speed gear stage whose transmission ratio γ7 is a smaller value than that of the sixth speed gear stage, for example, [0.690] is established. Also, since, by engagement of the third clutch C3 with the first brake B1, the third ring gear R3 is connected to the first driven gear CG1B, and the first sun gear S1, the second sun gear S2 and the transmission case 12 are connected to each other, the eighth speed gear stage whose transmission ratio γ8 is a smaller value than that of the seventh speed gear stage, for example, [0.588] is established.

Since, by engagement of the second clutch C2 with the second brake B2, the first sun gear S1 and the second sun gear S2 are, respectively, connected to the second driven gear CG2B, and the third ring gear R3 is connected to the transmission case 12, a reverse gear stage whose transmission ratio γR is a value between the first speed gear stage and the second speed gear stage, for example, [2.574], is established. The speed reduction ratio of the above-described first counter gear pair CG1, speed reduction ratio of the second counter gear pair CG2, gear ratio ρ1 of the first planetary gear set 20, gear ratio ρ2 of the second planetary gear set 22, and gear ratio ρ3 of the third planetary gear set 24 are set so that the above-described transmission ratios can be obtained.

In the above-described transmission 11, the ratio (=γ1/γ2) of the transmission ratio γ1 of the first speed gear stage to the transmission ratio γ2 of the second speed gear stage is set to [1.402], the ratio (=γ2/γ3) of the transmission ratio γ2 of the second speed gear stage to the transmission ratio γ3 of the third speed gear stage is set to [1.392], the ratio (=γ3/γ4) of the transmission ratio γ3 of the third speed gear stage to the transmission ratio γ4 of the fourth speed gear stage is set to [1.391], the ratio (=γ4/γ5) of the transmission ratio γ4 of the fourth speed gear stage to the transmission ratio γ5 of the fifth speed gear stage is set to [1.295], the ratio (=γ5/γ6) of the transmission ratio γ5 of the fifth speed gear stage to the transmission ratio γ6 of the sixth speed gear stage is set to [1.200], the ratio (=γ6/γ7) of the transmission ratio γ6 of the sixth speed gear stage to the transmission ratio γ7 of the seventh speed gear stage is set to [1.208], and the ratio (=γ7/γ8) of the transmission ratio γ7 of the seventh speed gear stage to the transmission ratio γ8 of the eighth speed gear stage is set to [1.173], wherein the respective transmission ratios γ are varied roughly at an equal ratio. In addition, in the above-described transmission 11, the transmission ratio width (=γ1/γ8), which is the ratio of the transmission ratio γ1 of the first speed gear stage to the transmission ratio γ8 of the eighth speed gear stage is set to a comparatively large value, that is, [5.980].

FIG. 3 is a collinear chart capable of linearly describing the correlation in rotation speeds of respective rotary elements for which connected states differ from each other per gear stage. The collinear chart of FIG. 3 shows two-dimensional coordinates in which the horizontal direction shows the relationship of gear ratios ρ of the respective planetary gear sets 20, 22 and 24, and the vertical direction shows relative rotation speeds. The lowermost horizontal line XZ of the three horizontal lines shows that the rotation speed is zero, the uppermost horizontal line X1 shows that the rotation speed is [1.0], that is, the rotation speed of the first intermediate output path M1, and the intermediate horizontal line X2 shows a prescribed rotation speed [NX2] decelerated and rotated with respect to the first intermediate output path M1 in response to the speed reduction ratio of the second counter gear pair CG2, that is, the rotation speed of the second intermediate output path M2. In addition, five vertical lines Y1 through Y5 of the second transmission portion 39 represent, in order from the left side, the sun gear S1 and sun gear S2 connected to each other, which correspond to the first rotary element RE1, the ring gear R3 corresponding to the second rotary element RE2, the ring gear R2 and the carrier CA3 connected to each other, which correspond to the third rotary element RE3, the carrier CA1, carrier CA2 and sun gear S3 connected to each other, which correspond to the fourth rotary element RE4, and the ring gear R1 corresponding to the fifth rotary element RE5, respectively, wherein the intervals therebetween are determined in response to the gear ratios ρ1, ρ2, and ρ3 of the planetary gear sets 20, 22 and 24. Where it is assumed that the spacing between the sun gear and carrier is set to an interval corresponding to [1] between the vertical lines in the collinear chart, the spacing between the carrier and ring gear is determined to be an interval corresponding to ρ, and, in the second transmission portion 39 of FIG. 9, the spacing between the vertical line Y4 and the vertical line Y5 is set to the interval corresponding to [1], and the intervals between other vertical lines are accordingly determined on the basis of the above-described relationship. As described above, since the sun gear S1, carrier CA1 and ring gear R1 of the first planetary gear set 20, the sun gear S2, carrier CA2 and ring gear R2 of the second planetary gear set 22, the sun gear S3, carrier CA3 and ring gear R3 of the third planetary gear set 24 are partially connected independently or with each other, five rotary elements, that is, the first rotary element RE1, the second rotary element RE2, the third rotary element RE3, the fourth rotary element RE4 and the fifth rotary element RE5 are composed in order from one (left) end to the other (right) end in the collinear chart as the rotary elements of the second transmission portion 39.

If expressed utilizing the above-described collinear chart, the transmission 11 according to the present embodiment is composed so that, in the transmission portion 37, rotations of the input shaft 16 (that is, rotations of the first axis 32) are outputted to the second transmission portion 38 via the first intermediate output path M1 and the second intermediate output path M2 decelerated and rotated with respect to the first intermediate output path M1. Also, the transmission 11 is composed, in the second transmission portion 39, so that the first rotary element RE1 (composed of S1 and S2) is selectively connected to the second driven gear CG2B via the second clutch C2, and is selectively connected to the transmission case 12 operating as the non-rotating member via the first brake B1, the second rotary element RE2 (composed of R3) is selectively connected to the first driven gear CG1B via the third clutch C3, and is selectively connected to the transmission case 12 via the second brake B2, the third rotary element RE3 (composed of R2 and CA3) is connected to the first driven member CG1B via the fourth clutch C4, the fourth rotary element RE4 (composed of CA1, CA2 and S3) is selectively connected to the output shaft 26 operating as the output rotating member, and the fifth rotary element RE5 (R1) is selectively connected to the second driven gear CG2B via the first clutch C1.

In the above-described collinear chart in FIG. 3, since, in the first speed gear stage, the fifth rotary element RE5 is connected to the second driven gear CG2B by engagement of the clutch C1 and its rotation speed is made into [NX2], and the second rotary element RE2 is connected to the transmission case 12 by engagement of the brake B2 and its rotation speed is made into [0], the rotation speed of the output shaft 26 is shown by the point (1st) at which a straight line connecting the intersection point of the vertical line Y5 and the horizontal line X2 to the intersection point of the vertical line Y2 and the horizontal line XZ crosses the vertical line Y4. Since, in the second speed gear stage, the fifth rotary element RE5 is connected to the second driven gear CG2B by engagement of the clutch C1 and its rotation speed is made into [NX2], and the first rotary element RE1 is connected to the transmission case 12 by engagement of the brake B1 and its rotation speed is made into [0], the rotation speed of the output shaft 26 is shown by the point (2nd) at which a straight line connecting the intersection point of the vertical line Y5 and the horizontal line X2 to the intersection point of the vertical line Y1 and the horizontal line XZ crosses the vertical line Y4. Since, in the third speed gear stage, the fifth rotary element RE5 is connected to the second driven gear CG2B by engagement of the clutch C1 and its rotation speed is made into [NX2], and the first rotary element RE1 is connected to the second driven gear CG2B by engagement of the clutch C2 and its rotation speed is made into [NX2], the rotation speed of the output shaft 26 is shown by the point (3rd) at which a straight line connecting the intersection point of the vertical line Y5 and the horizontal line X2 to the intersection point of the vertical line Y1 and the horizontal line X2 crosses the vertical line Y4. Since, in the fourth speed gear stage, the fifth rotary element RE5 is connected to the second driven gear CG2B by engagement of the clutch C1 and its rotation speed is made into [NX2], and the second rotary element RE2 is connected to the first driven gear CG1B by engagement of the clutch C3 and its rotation speed is made into [1], the rotation speed of the output shaft 26 is shown by the point (4th-1) at which a straight line connecting the intersection point of the vertical line Y5 and the horizontal line X2 to the intersection point of the vertical line Y2 and the horizontal line X1 crosses the vertical line Y4. Since, in the fifth speed gear stage, the second rotary element RE2 is connected to the first driven gear CG1B by engagement of the clutch C3 and its rotation speed is made into [1], and the third rotary element RE3 is connected to the first driven gear CG1B by engagement of the clutch C4 and its rotation speed is made into [1], the rotation speed of the output shaft 26 is shown by the point (5th) at which a straight line connecting the intersection point of the vertical line Y2 and the horizontal line X1 to the intersection point of the vertical line Y3 and the horizontal line X1 crosses the vertical line Y4. Since, in the sixth speed gear stage, the first rotary element RE1 is connected to the second driven gear CG2B by engagement of the clutch C2 and its rotation speed is made into [NX2], and the third rotary element RE3 is connected to the first driven gear CG1B by engagement of the clutch C4 and its rotation speed is made into [1], the rotation speed of the output shaft 26 is shown by the point (6th) at which a straight line connecting the intersection point of the vertical line Y1 and the horizontal line X2 to the intersection point of the vertical line Y3 and the horizontal line X1 crosses the vertical line Y4. Since, in the seventh speed gear stage, the third rotary element RE3 is connected to the first driven gear CG1B by engagement of the clutch C4 and its rotation speed is made into [1], and the first rotary element RE1 is connected to the transmission case 12 by engagement of the brake B1 and its rotation speed is made into [0], the rotation speed of the output shaft 26 is shown by the point (7th) at which a straight line connecting the intersection point of the vertical line Y3 and the horizontal line X1 to the intersection point of the vertical line Y1 and the horizontal line XZ crosses the vertical line Y4. Since, in the eighth speed gear stage, the second rotary element RE2 is connected to the first driven gear CG1B by engagement of the clutch C3, and its rotation speed is made into [1], and the first rotary element RE1 is connected to the transmission case 12 by engagement of the brake B1 and its rotation speed is made into [0], the rotation speed of the output shaft 26 is shown by the point (8th) at which a straight line connecting the intersection point of the vertical line Y2 and the horizontal line X1 to the intersection point of the vertical line Y1 and the horizontal line XZ crosses the vertical line Y4. Since, in the reverse gear stage, the first rotary element RE1 is connected to the second driven gear CG2B by engagement of the clutch C2, and its rotation speed is made into [NX2], and the second rotary element RE2 is connected to the transmission case 12 by engagement of the brake B2, and its rotation speed is made into [0], a negative rotation speed of the output shaft 26 is shown by the point (Rev) at which a straight line connecting the intersection point of the vertical line Y1 and the horizontal line X2 to the intersection point of the vertical line Y2 and the horizontal line XZ crosses the vertical line Y4.

As described above, according to the present embodiment, with the first transmission portion 37 and three sets of planetary gear sets of the first planetary gear set 20, the second planetary gear set 22 and the third planetary gear set 24, a planetary gear type multistage transmission 11 for vehicle capable of securing large transmission ratio widths and adequate transmission ratio steps can be brought about, which enables seven or more forward speed gear stages. That is, respective transmission ratios γ are varied roughly at an equal ratio, excellent speed-increasing characteristics or speed accelerating characteristics can be obtained by changing the gear stages, and the transmission ratio width ($=γ1/γ8$) of the transmission 11 is set to a comparatively large value, for example, [5.980]. Therefore, a small-sized planetary gear type multistage transmission 11 for vehicle, by which, for example, high-speed drive and uphill-road starting performance are compatible with each other, can be obtained. In addition, since only three sets of planetary gear sets are used, it is possible to shorten the entire length, that is, the dimension in the axial direction, in comparison with a case of employing four planetary gear sets, in which the first transmission portion is composed of a planetary gear set, and the transmission 11 can be preferably employed for lateral installation in an FF vehicle and an RR vehicle.

Further, according to the present embodiment, since the first counter gear pair CG1 and the second counter gear pair CG2 are used, power (rotation) can be precisely transmitted from the input shaft 16 to the second transmission portion 39, and an adequate rotation speed can be obtained by only setting the speed reduction ratio (gear ratio) of the counter gear pairs.

In addition, according to the present embodiment, a reverse transmission stage can be established by engaging the second clutch C2 with the second brake B2, wherein seven or more forward transmission gear stages and one reverse transmission gear stage are obtained.

Further, according to the present embodiment, the first planetary gear set 20 and the second planetary gear set 22 have the first carrier CA1, the second carrier CA2, the first sun gear S1 and the second sun gear S2 composed of a common component, which are made into a planetary gear train in which the first planetary gear P1 is concurrently used as any one of a pair of the second planetary gears P2 engaged with each other. Therefore, it is possible to further decrease the number of components of the transmission 11 and the axial length thereof.

In addition, according to the present embodiment, the first planetary gear set 20, the second planetary gear set 22 and the third planetary gear set 24 are disposed in order between the first transmission portion 37 and the output shaft 26 on the second axial center 34c, and the torque converter 14 is disposed at the engine 8 side with respect to the first transmission portion 37 on the first axis 32 so that the output of the engine 8 is inputted into the input shaft 16 of the transmission 11 via the torque converter 14. Therefore, a compact design of an automatic transmission is enabled.

Also, according to the present embodiment, since the first clutch C1, the second clutch C2, the third clutch C3, the fourth clutch C4, the first brake B1 and the second brake B2 are concentrated at the axial end of the second axis 34 or at the transmission case 12 side, that is, outside, arrangement of hydraulic circuits can be facilitated.

Next, a description is given of still another embodiment of the invention. In addition, in the following description, parts which are common to those in the above-described embodiment are given the same reference numbers, and the description thereof is omitted.

Figures 4, 5:
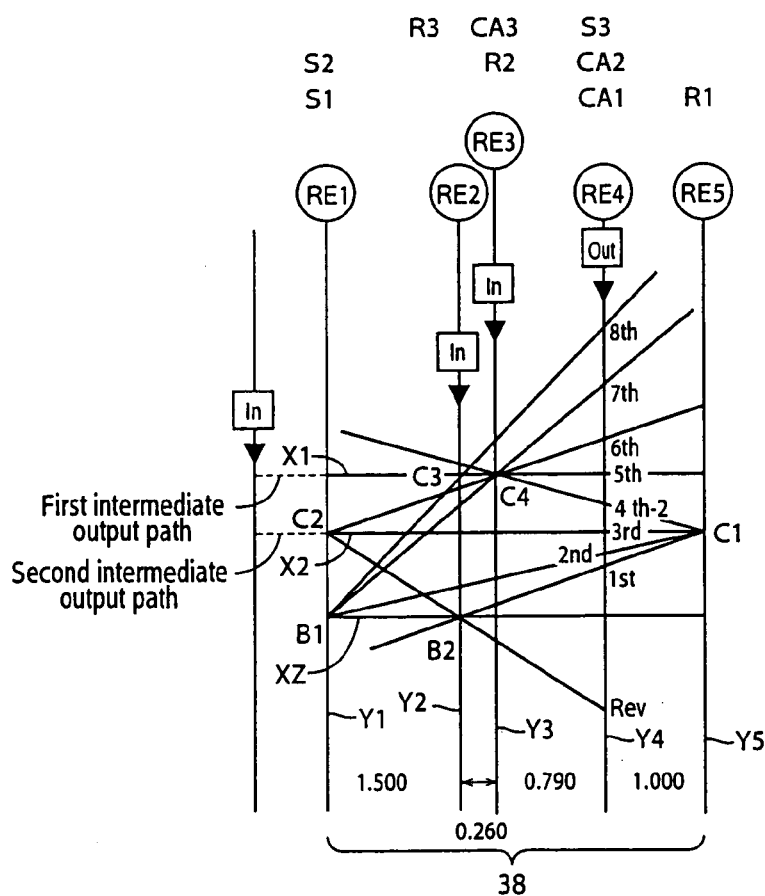
FIG. 4 is a chart showing another embodiment of the relationship between transmission gear stages of the planetary gear type multistage transmission for vehicles according to one embodiment shown in FIG. 1 and operations of hydraulic type friction engagement devices, which are required to establish the transmission gear stages, corresponding to FIG. 2.
FIG. 5 is a collinear chart describing another embodiment of the operations of the planetary gear type multistage transmission for vehicles according to the embodiment shown in FIG. 1, corresponding to FIG. 3.
Figure 99:
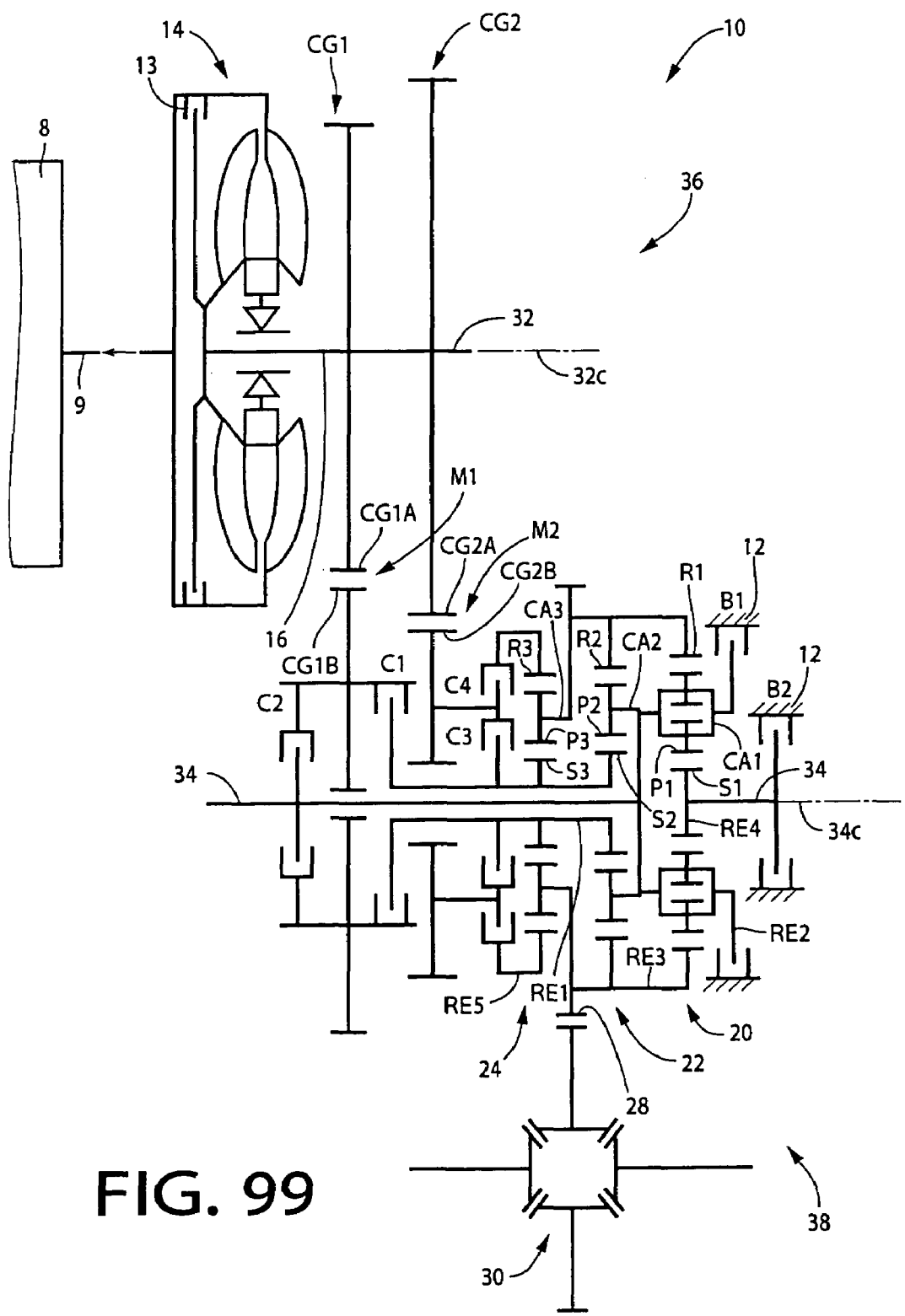
FIG. 99 is a view showing main points for describing a main points construction of a planetary gear type multistage transmission for vehicles according to one embodiment of the present invention.

FIG. 4 shows still another embodiment of engagement operations, shown in FIG. 2, of hydraulic type friction engagement devices of the transmission 11 shown in FIG. 99. FIG. 5 shows another embodiment of the collinear chart, shown in FIG. 3, of the transmission 11. A point in which FIG. 4 differs from FIG. 2 resides in that the operation of the hydraulic type friction engagement device necessary to establish the fourth speed gear stage is changed from engagement of the clutch C1 with the clutch C3 to engagement of the clutch C1 with the clutch C4. As a result, the transmission ratio γ4 is made into [1.244] or so, wherein the ratio ($=γ3/γ4$) of the transmission ratio γ3 of the third speed gear stage to the transmission ratio γ4 of the fourth speed gear stage is made into [1.448], and the ratio ($=γ4/γ5$) of the transmission ratio γ4 of the fourth speed gear stage to the transmission ratio γ5 of the fifth speed gear stage is made into [1.244].

Also, since, in the fourth speed gear stage in FIG. 5, the fifth rotary element RE5 is connected to the second driven gear CG2B by engagement of the clutch C1 and its rotation speed is made into [NX2], and the third rotary element RE3 is connected to the first driven gear CG1B by engagement of the clutch C4 and its rotation speed is made into [1], the rotation speed of the output shaft 26 is shown by the point (4th-2) at which a straight line connecting the intersection point of the vertical line Y5 and the horizontal line X2 to the intersection point of the vertical line Y3 and the horizontal line X1 crosses the vertical line Y4.

Figure 6:
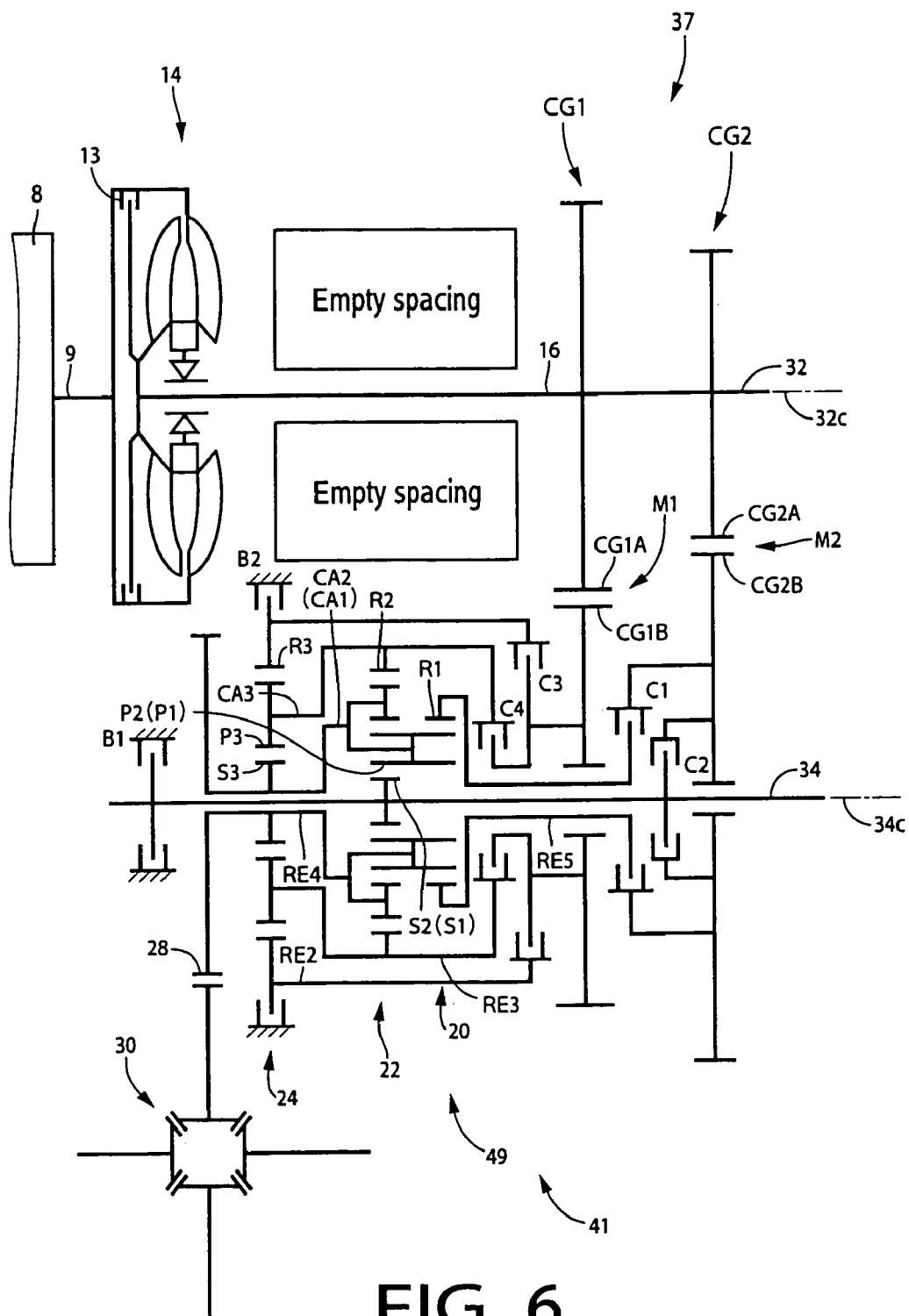
FIG. 6 is a view showing main points for describing a construction of a planetary gear type multistage transmission for vehicles according to still another embodiment of the present invention, corresponding to FIG. 1.
Figures 7, 8:
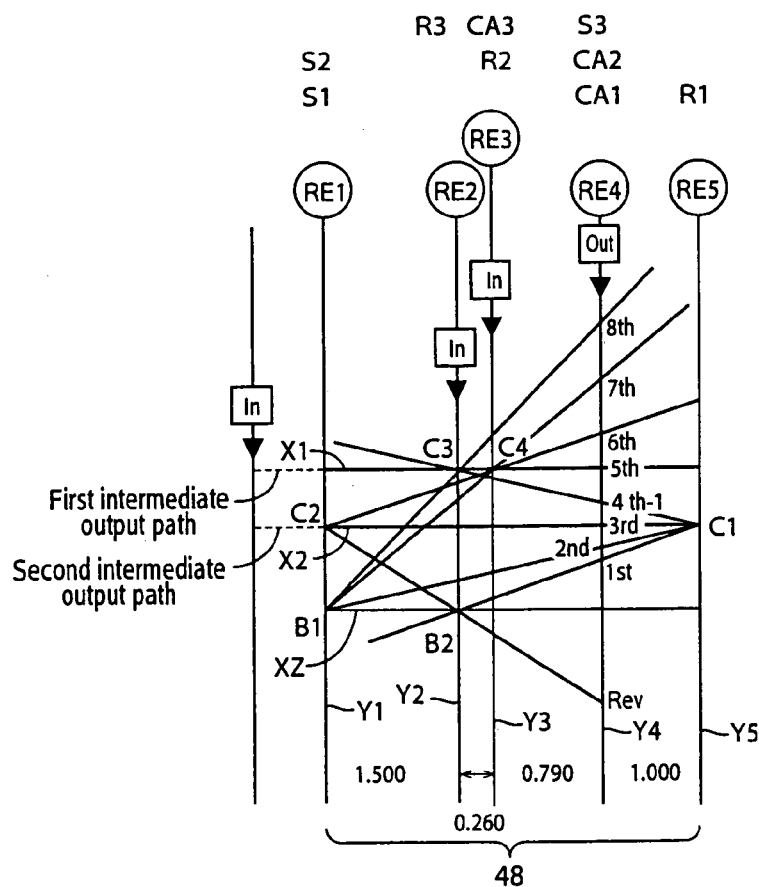
FIG. 7 is a chart showing the relationship between transmission gear stages of the planetary gear type multistage transmission for vehicles according to the embodiment shown in FIG. 6 and operations of hydraulic type friction engagement devices, which are required to establish the transmission gear stages, corresponding to FIG. 2.
FIG. 8 is a collinear chart describing operations of the planetary gear type multistage transmission for vehicles according to the embodiment shown in FIG. 6, corresponding to FIG. 3.

FIG. 6 is a view showing main points for describing a construction of a transmission 41 according to another embodiment of the present invention. FIG. 7 is a chart showing the relationship between the transmission gear stages of the transmission 41 and operations of hydraulic type friction engagement devices necessary to establish the transmission gear stages. FIG. 8 is a collinear chart showing the rotation speeds of rotary elements in the respective gear stages. The present embodiment is the same as the embodiment shown in FIG. 1 through FIG. 3 with respect to the construction and engagement operations except for that the arrangement of the torque converter 14 and the brake B1 differs from that of the embodiment shown in FIG. 1 through FIG. 3 and that the output rotating portion is changed to the output gear 28. Therefore, effects similar to those of the embodiment shown in FIG. 1 through FIG. 3 can be obtained. Hereinafter, a description is given of the arrangement of the torque converter 14 at a different point. Also, FIG. 7 and FIG. 8 are similar to FIG. 2 and FIG. 3. Therefore, the description thereof is omitted.

In the transmission 41 according to the present embodiment, as shown in FIG. 6, the axial length of the input shaft 16 is sufficiently long in comparison with the transmission 11, for example, the axial length obtained by adding the input shaft 16 to the first axis 32 is caused to become the axial length of the second axis 34 or so, and the spacing between the first transmission portion 37 and the torque converter is made wide in comparison with the transmission 11 shown in FIG. 1. Thus, the axial length of the transmission 41 can be kept compact as in the transmission 11, and it becomes possible to dispose valve bodies of hydraulic control circuits of an oil pump and hydraulic type friction engagement devices in an empty spacing above the first axial center 32c between the first transmission portion 37 and the torque converter, wherein connections of oil paths of the transmission 41 can be facilitated. In addition, since a mechanical type oil pump driven and rotated by the engine 8 can be disposed in the vicinity of the engine 8, the operation of the mechanical type oil pump can be advantageous (efficient).

Figures 9, 10:
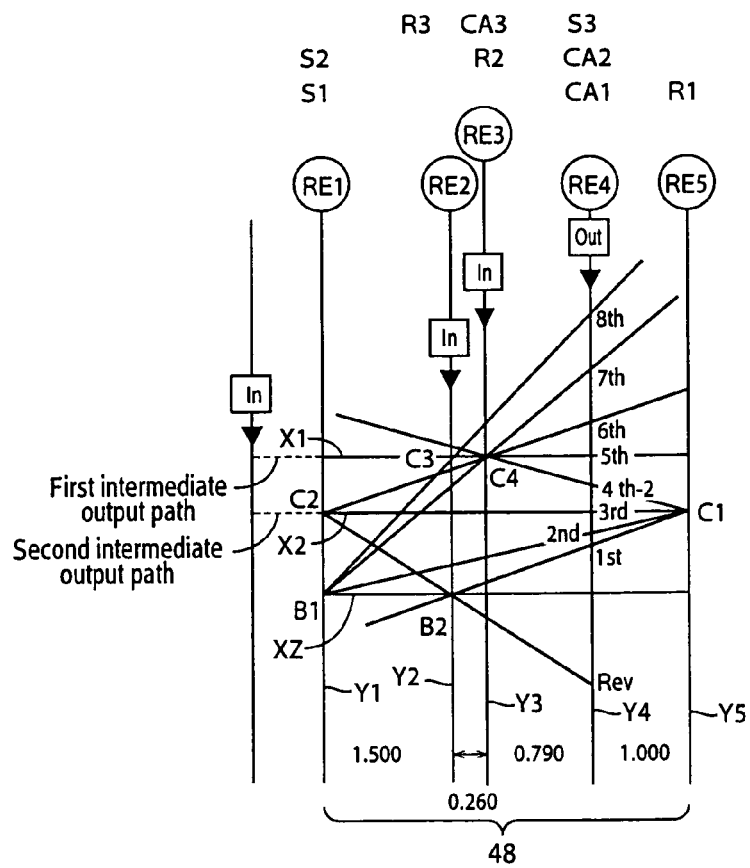
FIG. 9 is a chart showing another embodiment of the relationship between transmission gear stages of the planetary gear type multistage transmission for vehicles according to one embodiment shown in FIG. 6 and operations of hydraulic type friction engagement devices, which are required to establish the transmission gear stages, corresponding to FIG. 4.
FIG. 10 is a collinear chart describing another embodiment of the operations of the planetary gear type multistage transmission for vehicles according to the embodiment shown in FIG. 6, corresponding to FIG. 5.

FIG. 9 shows another embodiment of engagement operations, shown in FIG. 1, of the hydraulic type friction engagement devices of the transmission 41 shown in FIG. 5. FIG. 10 shows another embodiment of the collinear chart, shown in FIG. 8, of the transmission 41. Since differences between FIG. 9 and FIG. 7 are similar to those between FIG. 4 and FIG. 2, and differences between FIG. 10 and FIG. 8 are similar to those between FIG. 5 and FIG. 3, descriptions thereof are omitted.

Figure 11:
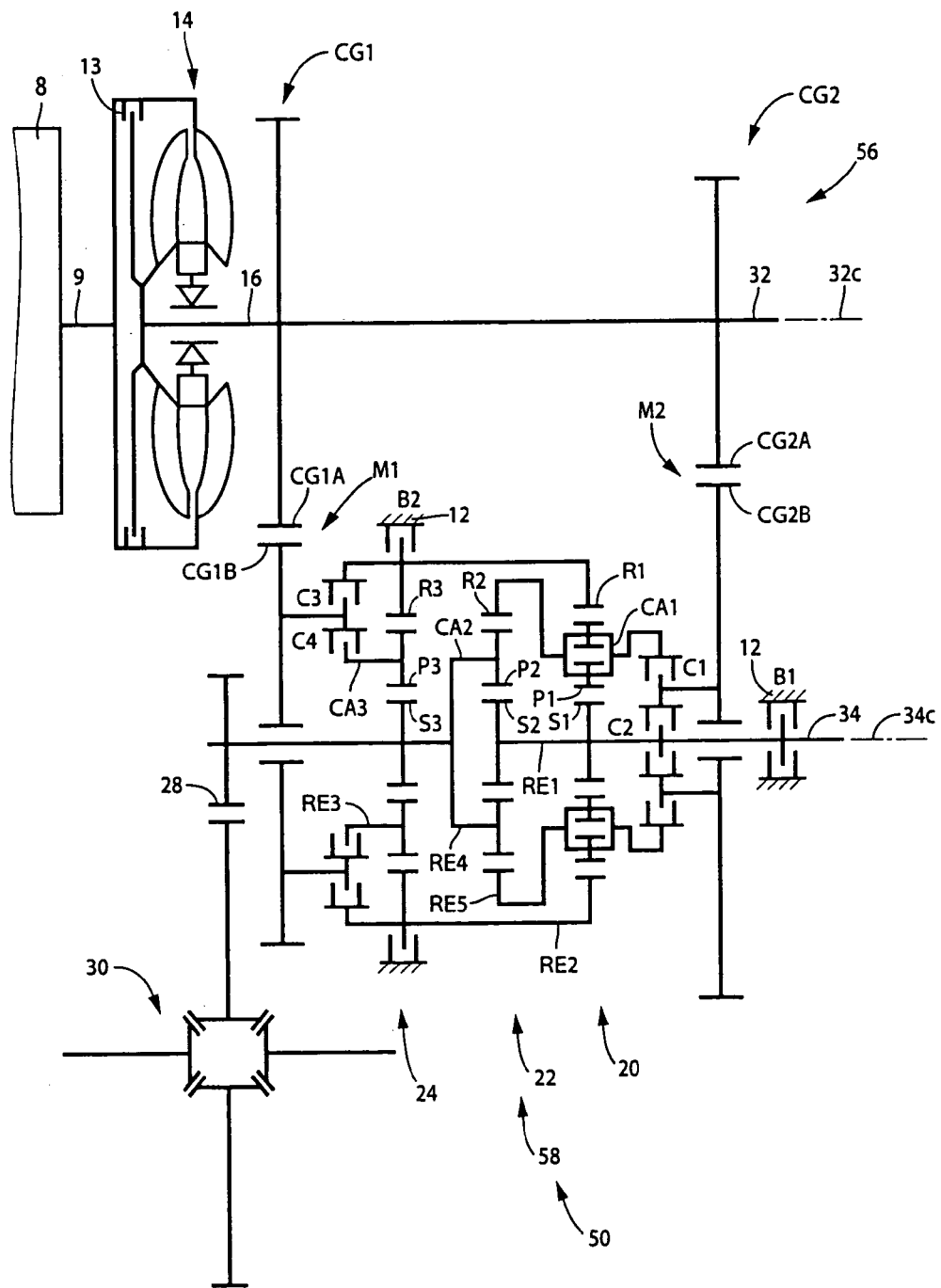
FIG. 11 is a view showing main points for describing a construction of a planetary gear type multistage transmission for vehicles according to still another embodiment of the present invention, corresponding to FIG. 6.
Figures 12, 13:
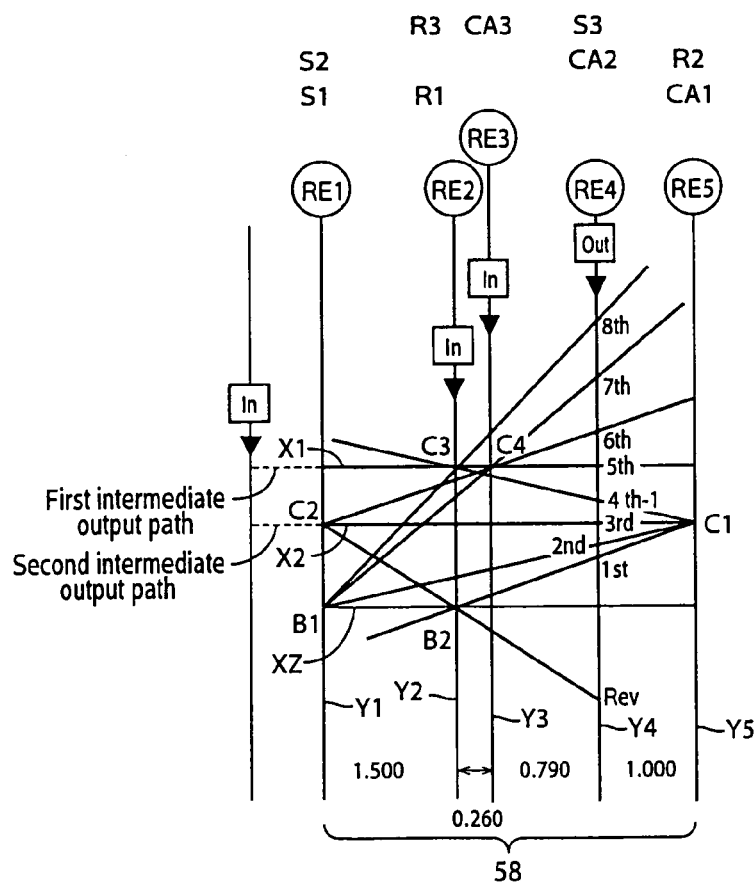
FIG. 12 is a chart showing the relationship between transmission gear stages of the planetary gear type multistage transmission for vehicles according to the embodiment shown in FIG. 11 and operations of hydraulic type friction engagement devices, which are required to establish the transmission gear stages, corresponding to FIG. 7.
FIG. 13 is a collinear chart describing operations of the planetary gear type multistage transmission for vehicles according to the embodiment shown in FIG. 11, corresponding to FIG. 8.

FIG. 11 is a view showing main points for describing a construction of a transmission 50 which is still another embodiment of the present invention. FIG. 12 is a chart showing the relationship between the transmission gear stages of the transmission 50 and operations of the hydraulic friction engagement devices necessary to establish the transmission gear stages. FIG. 13 is a collinear chart showing the rotation speeds of rotary elements in respective gear stages. The present embodiment is the same as the transmission 41 shown in FIG. 6 except for that the construction of respective devices of the second transmission portion 58 and arrangement of the first transmission portion 56, differ from those of the transmission 41 shown in FIG. 6. Therefore, effects similar to those of the embodiment shown in FIG. 6 through FIG. 8 can be obtained. Hereinafter, a description is given of points at which the transmission 50 differs from the transmission 41.

In the transmission 50 according to the present embodiment, as shown in FIG. 11, the first counter gear pair CG1 and the second counter gear pair CG2, which compose the first transmission portion 56, are disposed so that the second transmission portion 58 is placed therebetween. Thereby, the axial length of the transmission 50 can be kept compact as in the transmission 11, and valve bodies of hydraulic control circuits of an oil pump and hydraulic friction engagement devices can be disposed in the empty spacing above the first axial center 32c between the first counter gear pair CG1 and the second counter gear pair CG2, wherein connections of oil paths of the transmission 50 can be facilitated.

The first planetary gear set 20 that composes the second transmission portion 58 of the transmission 50 shown in FIG. 11 described above is composed of a double-pinion type planetary gear set, and the second planetary gear set 22 and the third planetary gear set 24 are, respectively, composed of a single-pinion type planetary gear set. The first planetary gear set 20 is provided with the first sun gear S1, a plurality of pairs of the first planetary gears P1 engaged with each other, the first carrier CA1 that supports the first planetary gears P1 so as to cause the same to rotate and to revolve it, and the first ring gear R1 engaged with the first sun gear S1 via the first planetary gears P1, and has a prescribed gear ratio ρ1 of, for example, or so. The second planetary gear set 22 is provided with the second sun gear S2, the second planetary gear P2, the second carrier CA2 that supports the second planetary gear P2 so as to cause the same to rotate and to revolve it, and the second ring gear R2 engaged with the second sun gear S2 via the second planetary gear P2, and has a prescribed gear ratio ρ2 of, for example, [0.392] or so. The third planetary gear set 24 is provided with the third sun gear S3, the third planetary gear P3 and the third ring gear R3 engaged with the third sun gear S3 via the third planetary gear P3, and has a prescribed gear ratio ρ3 of, for example, [0.329].

In the above-described second transmission portion 58, the first sun gear S1 and the second sun gear S2 are connected to become integral with each other and are selectively connected to the second driven gear CG2B via the second clutch C2, and are selectively connected to the transmission case 12 via the first brake B1. The first ring gear R1 and the third ring gear R3 are connected to become integral with each other, are selectively connected to the first driven gear CG1B via the third clutch C3, and are selectively connected to the transmission case 12 via the second brake B2. The third carrier CA3 is selectively connected to the first driven gear CG1B via the fourth clutch C4. The second carrier CA2 and the third sun gear S3 are connected to become integral with each other and are connected to the output gear 28 operating as the output rotating member. The first carrier CA1 and the second ring gear R2 are connected to become integral with each other and are selectively connected to the second driven gear CG2B via the first clutch C1.

In the transmission 50 constructed as described above, for example, as shown in FIG. 12 which is similar to the engagement operation chart of FIG. 7, since any two elements, which are selected among the first clutch C1, the second clutch C2, the third clutch C3, the fourth clutch C4, the first brake B1 and the second brake B2, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios γ (=input shaft rotation speed $N_{IN}$/output shaft rotation speed $N_{OUT}$) which vary roughly at an equal ratio as in the embodiment shown in FIG. 6 through FIG. 8 can be obtained per gear stage. In addition, the transmission ratio width (=γ1/γ8) which is the ratio of the transmission ratio γ1 of the first speed gear stage to the transmission ratio γ8 of the eighth speed gear stage is made into a comparatively large value. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

FIG. 13 shows a collinear chart in the above-described transmission 50, which corresponds to FIG. 8 of the collinear chart showing the transmission 41. Five vertical lines Y1 through Y5 of the second transmission portion 58 in FIG. 13 represent, in order from the left side, the sun gear S1 and sun gear S2 connected to each other, which correspond to the first rotary element RE1, the ring gear R1 and the ring gear R3 connected to each other, which correspond to the second rotary element RE2, the carrier CA3 corresponding to the third rotary element RE3, the carrier CA2 and sun gear S3 connected to each other, which correspond to the fourth rotary element RE4, and the carrier CA1 and the ring gear R2 connected to each other, which correspond to the fifth rotary element RE5, respectively. Therefore, FIG. 13 differs from FIG. 8 only in the construction of the respective rotary elements on the basis of these rotary elements, wherein the collinear charts thereof are the same. A description of the collinear chart of FIG. 13 is omitted.

Figures 14, 15:
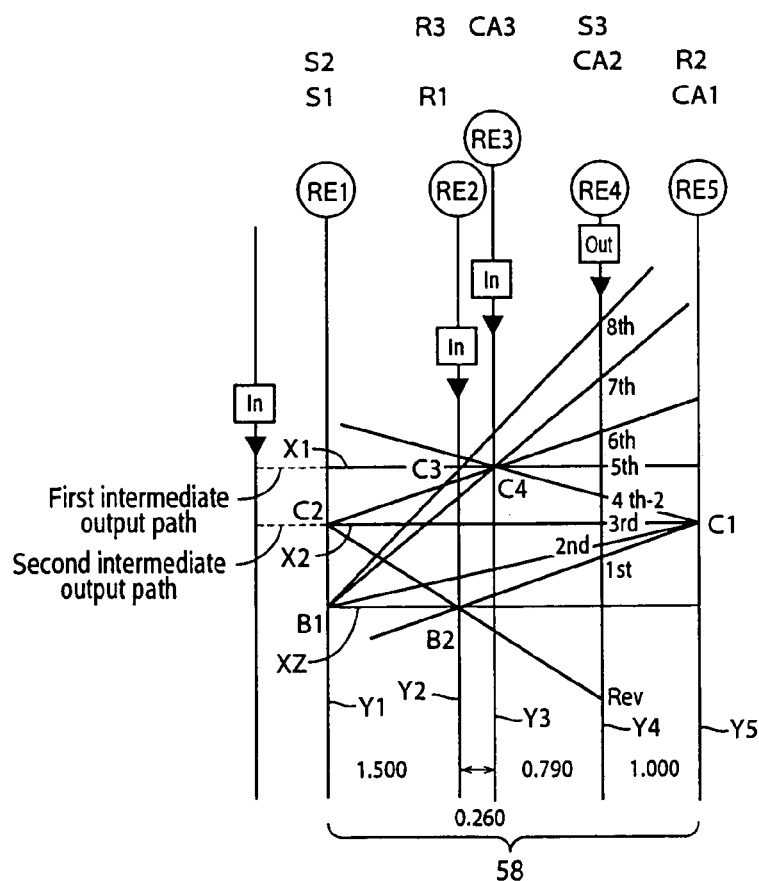
FIG. 14 is a chart showing another embodiment of the relationship between transmission gear stages of the planetary gear type multistage transmission for vehicles according to one embodiment shown in FIG. 11 and operations of hydraulic type friction engagement devices, which are required to establish the transmission gear stages, corresponding to FIG. 9.
FIG. 15 is a collinear chart describing another embodiment of the operations of the planetary gear type multistage transmission for vehicles according to the embodiment shown in FIG. 11, corresponding to FIG. 10.

FIG. 14 shows another embodiment of engagement operations, shown in FIG. 12, of the hydraulic type friction engagement devices of the transmission 50 shown in FIG. 11. FIG. 15 shows another embodiment of the collinear chart, shown in FIG. 13, of the transmission 50. Differences between FIG. 14 and FIG. 12 are similar to those between FIG. 9 and FIG. 7, and differences between FIG. 15 and FIG. 13 are similar to those between FIG. 10 and FIG. 8. Therefore, the descriptions thereof are omitted.

Figure 16:
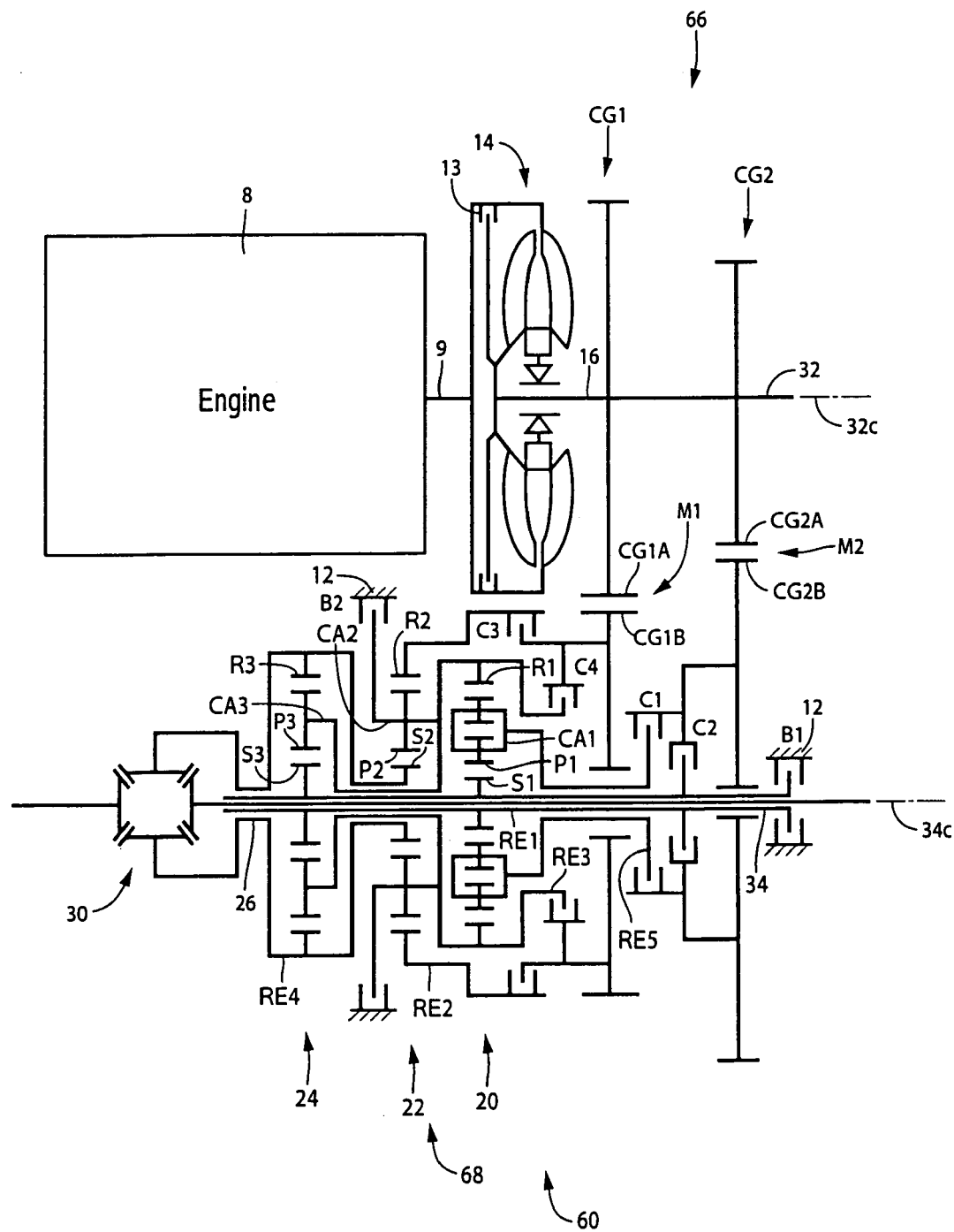
FIG. 16 is a view showing main points for describing a construction of a planetary gear type multistage transmission for vehicles according to still another embodiment of the present invention, corresponding to FIG. 1.
Figures 17, 18:
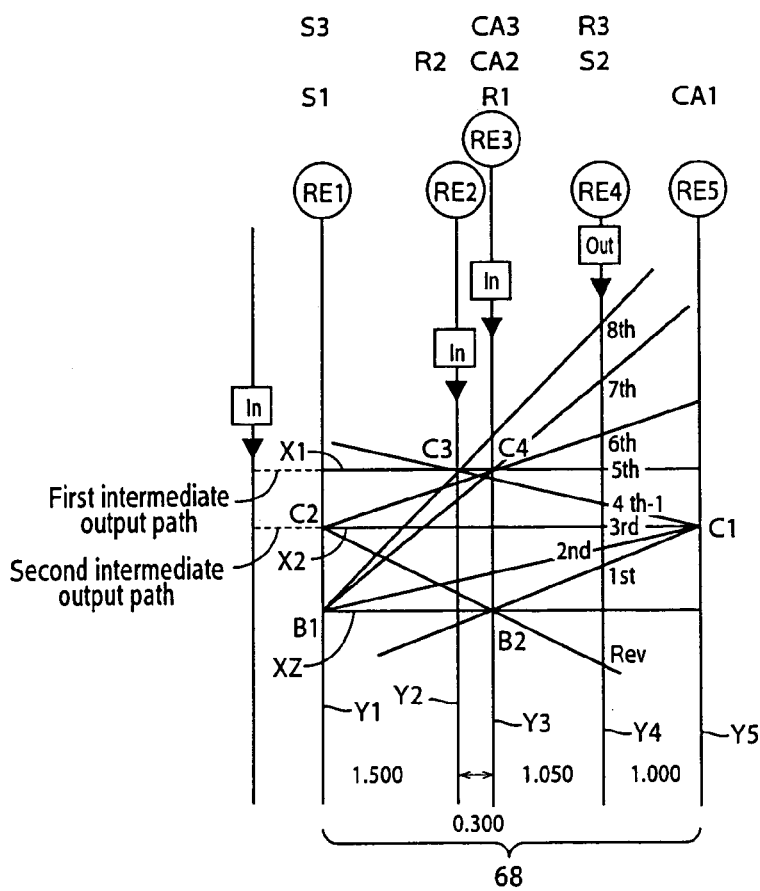
FIG. 17 is a chart showing the relationship between transmission gear stages of the planetary gear type multistage transmission for vehicles according to the embodiment shown in FIG. 16 and operations of hydraulic type friction engagement devices, which are required to establish the transmission gear stages, corresponding to FIG. 2.
FIG. 18 is a collinear chart describing operations of the planetary gear type multistage transmission for vehicles according to the embodiment shown in FIG. 16, corresponding to FIG. 3.

FIG. 16 is a view showing main points for describing a construction of a transmission 60 according to another embodiment of the present invention. FIG. 17 is a chart showing the relationship between the transmission gear stages of the transmission 60 and operations of hydraulic type friction engagement devices necessary to establish the transmission gear stages.

FIG. 18 is a collinear chart showing the rotation speeds of the rotary elements in the respective gear stages. Arrangement of the respective devices that compose the transmission 60 according to the present embodiment is similar to that of the transmission 11 shown in FIG. 1. Therefore, effects similar to those of the embodiment shown in FIG. 1 through FIG. 3 can be obtained. Hereinafter, a description is given of only differences between the transmission 60 and the transmission 11.

In the first counter gear pair CG1 and the second counter gear pair CG2 that compose the first transmission portion 66 of the transmission 60 shown in FIG. 16 above, the speed reduction ratio of the first counter gear pair CG1 is made into, for example, [1.000] or so, and that of the second counter gear pair CG2 is made into, for example, [1.818] or so, and the first transmission portion 66 transmits (outputs) rotations of the input shaft 16, that is, rotations of the first axis 32 to the second transmission portion 68 via the first intermediate output path M1 and the second intermediate output path M2 decelerated and rotated with respect to the first intermediate output path M1.

In the present embodiment, the first planetary gear set 20 that composes the second transmission portion 68 of the transmission 60 shown in FIG. 16 above is composed of a double-pinion type planetary gear set, and the second planetary gear set 22 and the third planetary gear set 24 are composed of a single-pinion type planetary gear set, respectively. The first planetary gear set 20 is provided with the first sun gear S1, a plurality of pairs of the first planetary gears P1 engaged with each other, the first carrier CA1 that supports the first planetary gears P1 to cause the same to rotate and to revolve it, and the ring gear R1 engaged with the first sun gear S1 via the first planetary gears P1, and has a prescribed gear ratio ρ1 of, for example, [0.532] or so. The second planetary gear set 22 is provided with the second sun gear S2, the second planetary gear P2, the second carrier CA2 that supports the second planetary gear P2 so as to cause the same to rotate and to revolve it, and the second ring gear R2 engaged with the second sun gear S2 via the second planetary gear P2, and has a prescribed gear ratio ρ2 of, for example, [0.286] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.583] or so.

In the above-described second transmission portion 68, the first sun gear S1 and the third sun gear S3 are connected to become integral with each other, are selectively connected to the second driven gear CG2B via the second clutch C2, and are selectively connected to the transmission case 12 operating as the non-rotating member via the first brake B1. The second ring gear R2 is selectively connected to the first driven gear CG1B via the third clutch C3. The first ring gear R1, the second carrier CA2 and the third carrier CA3 are connected to become integral with each other, are selectively connected to the first driven gear CG1B via the fourth clutch C4, and are selectively connected to the transmission case 12 via the second brake B2. The second sun gear S2 and the third ring gear R3 are connected to become integral with each other and are connected to the output shaft 26 operating as the output rotating member. And the first carrier CA1 is selectively connected to the second driven gear CG2B via the first clutch C1.

In the transmission 60 constructed as described above, for example, as shown in the engagement operation chart of FIG. 17, since any two elements, which are selected among the first clutch C1, the second clutch C2, the third clutch C3, the fourth clutch C4, the first brake B1 and the second brake B2, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios γ (=input shaft rotation speed $N_{IN}$/output shaft rotation speed $N_{OUT}$) which vary roughly at an equal ratio can be obtained per gear stage.

That is, as shown in FIG. 17, since, by engagement of the first clutch C1 with the second brake B2, the first carrier CA1 is connected to the second driven gear CG2B, and the first ring gear R1, the second carrier CA2 and third carrier CA3 are, respectively, connected to the transmission case 12, the first speed gear stage whose transmission ratio γ1 is the maximum value, for example, [3.550] is established. Also, since, by engagement of the first clutch C1 with the first brake B1, the first carrier CA1 is connected to the second driven gear CG2B, and the first sun gear S1 and the third sun gear S3 are, respectively, connected to the transmission case 12, the second speed gear stage whose transmission ratio γ2 is a smaller value of, for example, [2.456] or so than that of the first speed gear stage is established. In addition, since, by engagement of the first clutch C1 with the second clutch C2, the first carrier CA1 is connected to the second driven gear CG2B, and the first sun gear S1 and third sun gear S3 are, respectively, connected to the second driven gear CG2B, the third speed gear stage whose transmission ratio γ3 is a smaller value of, for example, [1.818] or so than that of the second speed gear stage is established. Further, since, by engagement of the first clutch C1 with the third clutch C3, the first carrier CA1 is connected to the second driven gear CG2B, and the second ring gear R2 is connected to the first driven gear CG1B, the fourth speed gear stage whose transmission ratio γ4 is a smaller value of, for example, [1.349] or so than that of the third speed gear stage is established. Also, since, by engagement of the third clutch C3 with the fourth clutch C4, the second ring gear R2 is connected to the first driven gear CG1B, and the first ring gear R1, the second carrier CA2 and the third carrier CA3 are, respectively, connected to the first driven gear CG1B, the fifth speed gear stage whose transmission ratio γ5 is a smaller value of, for example, [1.000] or so than that of the fourth speed gear stage is established. Further, since, by engagement of the second clutch C2 with the fourth clutch C4, the first sun gear S1 and the third sun gear S3 are, respectively, connected to the second driven gear CG2B, and the first ring gear R1, the second carrier CA2 and the third carrier CA3 are, respectively, connected to the first driven gear CG1B, the sixth speed gear stage whose transmission ratio γ6 is a smaller value of, for example, [0.792] or so than that of the fifth speed gear stage is established. In addition, since, by engagement of the fourth clutch C4 with the first brake B1, the first ring gear R1, the second carrier CA2 and the third carrier CA3 are, respectively, connected to the first driven gear CG1B, and the first sun gear S1 and the third sun gear S3 are, respectively, connected to the transmission case 12, the seventh speed gear stage whose transmission ratio γ7 is a smaller value of, for example, [0.632] than that of the sixth speed gear stage is established. Further, since, by engagement of the third clutch C3 with the first brake B1, the second ring gear R2 is connected to the first driven gear CG1B, and the first sun gear S1 and the third sun gear S3 are, respectively, connected to the transmission case 12, the eighth speed gear stage whose transmission γ8 is a smaller value of, for example, [0.526] than that of the seventh speed gear stage is established.

In addition, since, by engagement of the second clutch C2 with the second brake B2, the first sun gear S1 and the third sun gear S3 are, respectively, connected to the second driven gear CG2B, and the first ring gear R1, the second carrier CA2 and the third carrier CA3 are, respectively, connected to the transmission case 12, a reverse gear stage whose transmission ratio γR is a value, for example, [2.597] between the first speed gear stage and the second speed gear stage is established. The speed reduction ratio of the first counter gear pair CG1, speed reduction ratio of the second counter gear pair CG2, gear ratio ρ1 of the first planetary gear set 20, gear ratio ρ2 of the second planetary gear set 22, and gear ratio ρ3 of the third planetary gear set 24 are established so as to obtain the above-described transmission ratios.

In the above-described transmission 60, the ratio (=γ1/γ2) of the transmission ratio γ1 of the first speed gear stage to the transmission ratio γ2 of the second speed gear stage is made into [1.445], the ratio (=γ2/γ3) of the transmission ratio γ2 of the second speed gear stage to the transmission ratio γ3 of the third speed gear stage is made into [1.351], the ratio (=γ3/γ4) of the transmission ratio γ3 of the third speed gear stage to the transmission ratio γ4 of the fourth speed gear stage is made into [1.348], the ratio (=γ4/γ5) of the transmission ratio γ4 of the fourth speed gear stage to the transmission ratio γ5 of the fifth speed gear stage is made into [1.349], the ratio (=γ5/γ6) of the transmission ratio γ5 of the fifth speed gear stage to the transmission ratio γ6 of the sixth speed gear stage is made into [1.263], the ratio (=γ6/γ7) of the transmission ratio γ6 of the sixth speed gear stage to the transmission ratio γ7 of the seventh speed gear stage is made into [1.254], and the ratio (=γ7/γ8) of the transmission ratio γ7 of the seventh speed gear stage to the transmission ratio γ8 of the eighth speed gear stage is made into [1.200], wherein the respective transmission ratios γ vary roughly at an equal ratio. Also, in the above-described transmission 60, the transmission ratio width (=γ1/γ8) which is the ratio of the transmission ratio γ1 of the first speed gear stage to the transmission ratio γ8 of the eighth speed gear stage is made into a comparatively large value, that is, [6.745].

FIG. 18 is a collinear chart of the above-described transmission 60, corresponding to FIG. 3 which is a collinear chart of the above-described transmission 11. Five vertical lines Y1 through Y5 of the second transmission portion 68 in FIG. 16 represent, in order from the left side, the sun gear S1 and sun gear S3 connected to each other, which correspond to the first rotary element RE1, the ring gear R2 corresponding to the second rotary element RE2, the ring gear R1, the carrier CA2 and carrier CA3 connected to each other, which correspond to the third rotary element RE3, the sun gear S2 and the ring gear R3 connected to each other, which correspond to the fourth rotary element RE4, and the carrier CA1 corresponding to the fifth rotary element RE5, respectively.

If expressed utilizing the above-described collinear chart, the transmission 60 according to the present embodiment is constructed so that, in the first transmission portion 66, rotations of the input shaft 16 (rotations of the first axis 32) are outputted to the second transmission portion 68 via the first intermediate output path M1 and the second intermediate output path M2 decelerated and rotated with respect to the first intermediate output path M1. The transmission 60 is also constructed so that, in the second transmission portion 68, the first rotary element RE1 (S1 and S3) is selectively connected to the second driven gear CG2B via the second clutch C2 and is selectively connected to the transmission case 12 operating as the non-rotating member via the first brake B1, the second rotary element RE2 (R2) is selectively connected to the first driven gear CG1B via the third clutch C3, the third rotary element RE3 (R1, CA2 and CA3) is selectively connected to the first driven gear CG1B via the fourth clutch C4, and is selectively connected to the transmission case 12 via the second brake B2, the fourth rotary element RE4 (S2 and R3) is connected to the output shaft 26 operating as the output rotating member, and the fifth rotary element RE5 (CA1) is selectively connected to the second driven gear CG2B via the first clutch C1.

In the collinear chart of FIG. 18 described above, since, in the first speed gear stage, the fifth rotary element RE5 is connected to the second driven gear CG2B by engagement of the clutch C1 and its rotation speed is made into [NX2], and the third rotary element RE3 is connected to the transmission case 12 by engagement of the brake B2 and its rotation speed is made into [0], the rotation speed of the output shaft 26 is shown by the point (1st) at which a straight line connecting the intersection point of the vertical line Y5 and the horizontal line X2 to the intersection point of the vertical line Y3 and the horizontal line XZ crosses the vertical line Y4. Since, in the second speed gear stage, the fifth rotary element RE5 is connected to the second driven gear CG2B by engagement of the clutch C1 and its rotation speed is made into [NX2], and the first rotary element RE1 is connected to the transmission case 12 by engagement of the brake B1 and its rotation speed is made into [0], the rotation speed of the output shaft 26 is shown by the point (2nd) at which a straight line connecting the intersection point of the vertical line Y5 and the horizontal line X2 to the intersection point of the vertical line Y1 and the horizontal line XZ crosses the vertical line Y4. Since, in the third speed gear stage, the fifth rotary element RE5 is connected to the second driven gear CG2B by engagement of the clutch C1 and its rotation speed is made into [NX2], and the first rotary element RE1 is connected to the second driven gear CG2B by engagement of the clutch C2 and its rotation speed is made into [NX2], the rotation speed of the output shaft 26 is shown by the point (3rd) at which a straight line connecting the intersection point of the vertical line Y5 and the horizontal line X2 to the intersection point of the vertical line Y1 and the horizontal line X2 crosses the vertical line Y4. Since, in the fourth speed gear stage, the fifth rotary element RE5 is connected to the second driven gear CG2B by engagement of the clutch C1 and its rotation speed is made into [NX2], and the second rotary element RE2 is connected to the first driven gear CG1B by engagement of the clutch C3 and its rotation speed is made into [1], the rotation speed of the output shaft 26 is shown by the point (4th-1) at which a straight line connecting the intersection point of the vertical line Y5 and the horizontal line X2 to the intersection point of the vertical line Y2 and the horizontal line X1 crosses the vertical line Y4. Since, in the fifth speed gear stage, the second rotary element RE2 is connected to the first driven gear CG1B by engagement of the clutch C3 and its rotation speed is made into [1], and the third rotary element RE3 is connected to the first driven gear CG1B by engagement of the clutch C4 and its rotation speed is made into [1], the rotation speed of the output shaft 26 is shown by the point (5th) at which a straight line connecting the intersection point of the vertical line Y2 and the horizontal line X1 to the intersection point of the vertical line Y3 and the horizontal line X1 crosses the vertical line Y4. Since, in the sixth speed gear stage, the first rotary element RE1 is connected to the second driven gear CG1B by engagement of the clutch C2 and its rotation speed is made into [NX2], and the third rotary element RE3 is connected to the first driven gear CG1B by engagement of the clutch C4 and its rotation speed is made into [1], the rotation speed of the output shaft 26 is shown by the point (6th) at which a straight line connecting the intersection point of the vertical line Y1 and the horizontal line X2 to the intersection point of the vertical line Y3 and the horizontal line X1 crosses the vertical line Y4. Since, in the seventh speed gear stage, the third rotary element RE3 is connected to the first driven gear CG1B by engagement of the clutch C4 and its rotation speed is made into [1], and the first rotary element RE1 is connected to the transmission case 12 by engagement of the brake B1 and its rotation speed is made into [0], the rotation speed of the output shaft 26 is shown by the point (7th) at which a straight line connecting the intersection point of the vertical line Y3 and the horizontal line X1 to the intersection point of the vertical line Y1 and the horizontal line XZ crosses the vertical line Y4. Since, in the eighth speed gear stage, the second rotary element RE2 is connected to the first driven gear CG1B by engagement of the clutch C3 and its rotation speed is made into [1], and the first rotary element RE1 is connected to the transmission case 12 by engagement of the brake B1 and its rotation speed is made into [0], the rotation speed of the output shaft 26 is shown by the point (8th) at which a straight line connecting the intersection point of the vertical line Y2 and the horizontal line X1 to the intersection point of the vertical line Y1 and the horizontal line XZ crosses the vertical line Y4. Since, in the reverse gear stage, the first rotary element RE1 is connected to the second driven gear CG2B by engagement of the clutch C2 and its rotation speed is made into [NX2], and the third rotary element RE3 is connected to the transmission case 12 by engagement of the brake B2 and its rotation speed is made into [0], a negative rotation speed of the output shaft 26 is shown by the point (Rev) at which a straight line connecting the intersection point of the vertical line Y1 and the horizontal line X2 to the intersection point of the vertical line Y2 and the horizontal line XZ crosses the vertical line Y4.

Figures 19, 20:
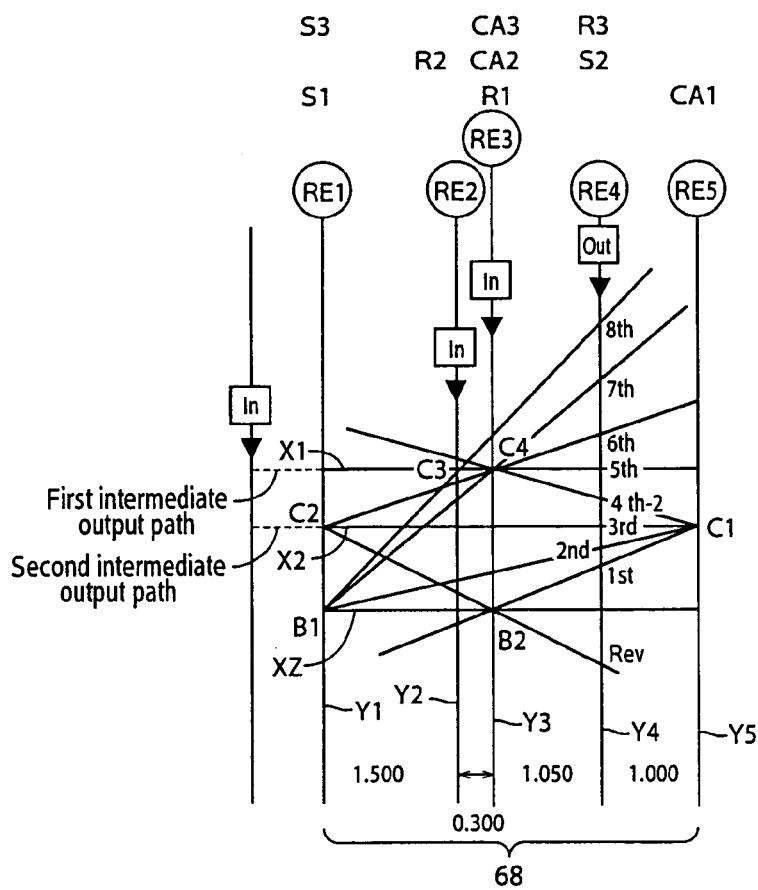
FIG. 19 is a chart showing another embodiment of the relationship between transmission gear stages of the planetary gear type multistage transmission for vehicles according to one embodiment shown in FIG. 16 and operations of hydraulic type friction engagement devices, which are required to establish the transmission gear stages, corresponding to FIG. 17.
FIG. 20 is a collinear chart describing another embodiment of the operations of the planetary gear type multistage transmission for vehicles according to the embodiment shown in FIG. 16, corresponding to FIG. 18.

FIG. 19 shows another embodiment of engagement operations, shown in FIG. 17, of the hydraulic type friction engagement devices of the transmission 60 shown in FIG. 16. FIG. 20 shows another embodiment of the collinear chart, shown in FIG. 18, of the transmission 60. A difference between FIG. 19 and FIG. 17 resides in that the operation of the hydraulic type friction engagement devices necessary to establish the fourth speed gear stage is changed from engagement of the clutch C1 with the clutch C3 to engagement of the clutch C1 with the clutch C4. As a result, the transmission ratio γ4 becomes [1.300] or so, wherein the ratio (=γ3/γ4) of the transmission ratio γ3 of the third speed gear stage to the transmission ratio γ4 of the fourth speed gear stage is made into [1.398], and the ratio (=γ4/γ5) of the transmission ratio γ4 of the fourth speed gear stage to the transmission ratio γ5 of the fifth speed gear stage is made into [1.300].

Also, since, in the fourth speed gear stage in FIG. 20, the fifth rotary element RE5 is connected to the second driven gear CG2B by engagement of the clutch C1 and its rotation speed is made into [NX2], and the third rotary element RE3 is connected to the first driven gear CG1B by engagement of the clutch C4, the rotation speed of the output shaft 26 is shown by the point (4th-2) at which a straight line connecting the intersection point of the vertical line Y5 and the horizontal line X2 to the intersection point of the vertical line Y3 and the horizontal line X1 crosses the vertical line Y4.

Figure 21:
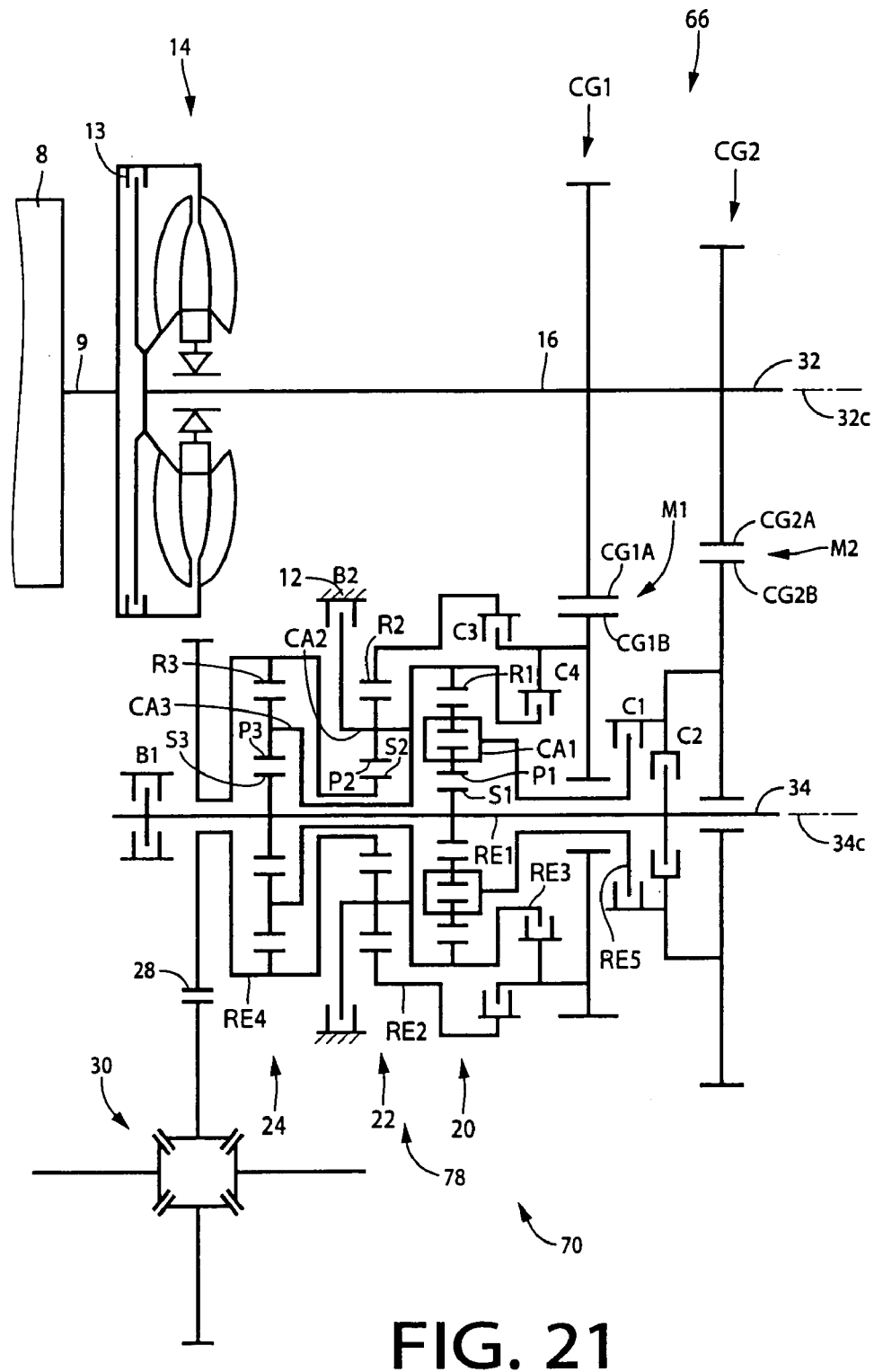
FIG. 21 is a view showing main points for describing a construction of a planetary gear type multistage transmission for vehicles according to still another embodiment of the present invention, corresponding to FIG. 16.
Figures 22, 23:
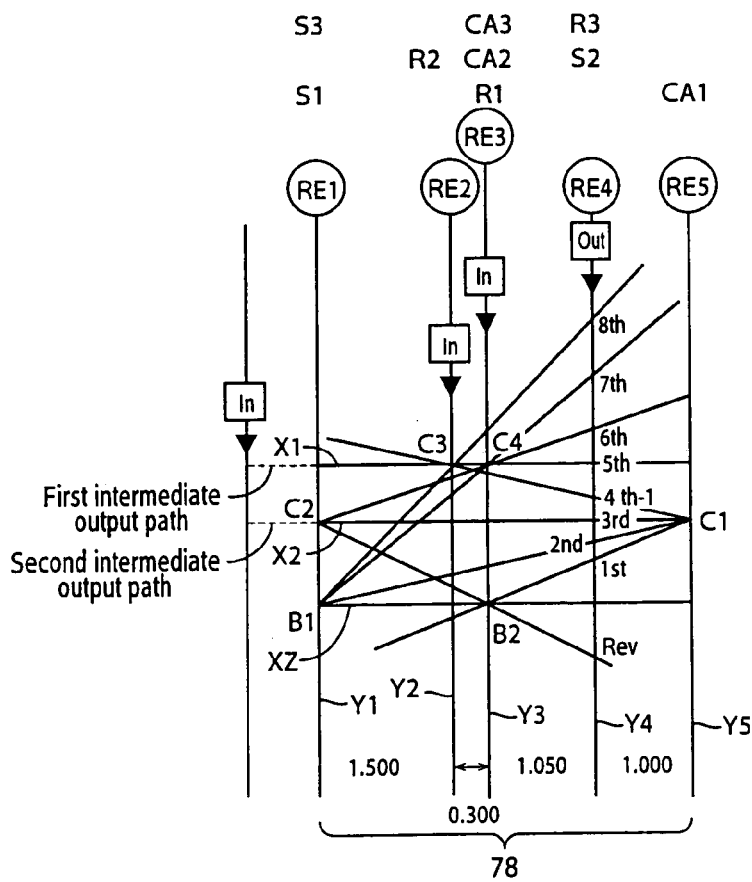
FIG. 22 is a chart showing the relationship between transmission gear stages of the planetary gear type multistage transmission for vehicles according to the embodiment shown in FIG. 21 and operations of hydraulic type friction engagement devices, which are required to establish the transmission gear stages, corresponding to FIG. 17.
FIG. 23 is a collinear chart describing operations of the planetary gear type multistage transmission for vehicles according to the embodiment shown in FIG. 21, corresponding to FIG. 18.

FIG. 21 is a view showing main points for describing a construction of a transmission 70 according to another embodiment of the present invention. FIG. 22 is a chart showing the relationship between the transmission gear stages of the transmission 70 and operations of hydraulic type friction engagement devices necessary to establish the transmission gear stages. FIG. 23 is a collinear chart showing the rotation speeds of the rotary elements in the respective gear stages. The present embodiment differs from the embodiment shown in FIG. 16 through FIG. 18 in arrangement of the torque converter 14 and the brake B1 and the output rotating member being changed to the output gear 28. However, these embodiments are the same in the other construction and engagement operations. Therefore, effects similar to those of the embodiment shown in FIG. 16 through FIG. 18 can be obtained. The arrangement of the torque converter 14 is similar to that of the transmission 41 shown in FIG. 6. In addition, FIG. 22 and FIG. 23 are similar to FIG. 17 and FIG. 18, respectively. Therefore, descriptions thereof are omitted.

Figures 24, 25:
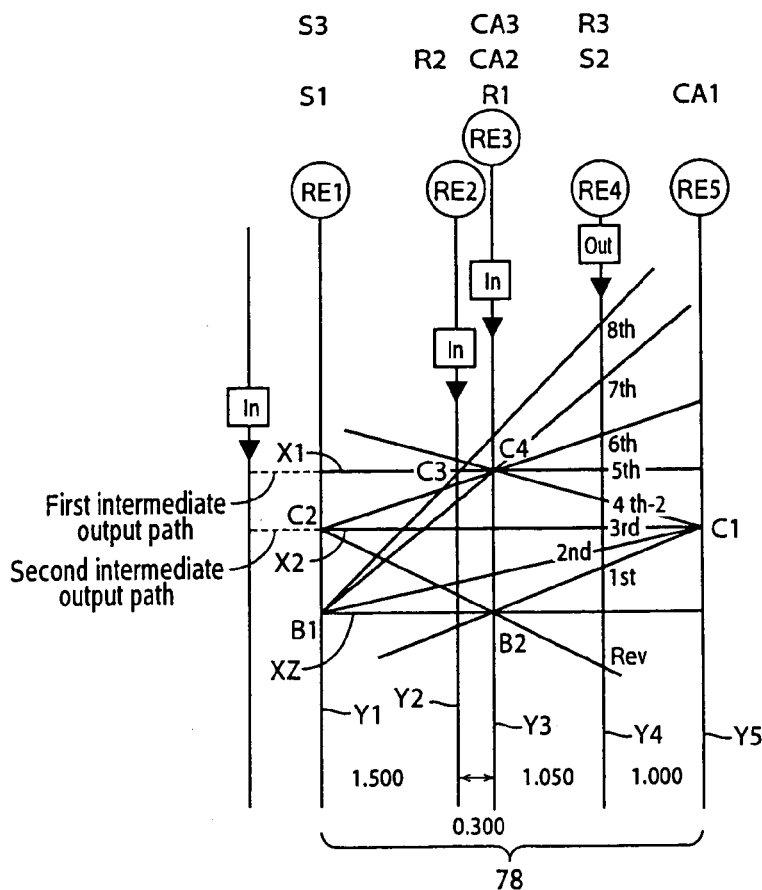
FIG. 24 is a chart showing another embodiment of the relationship between transmission gear stages of the planetary gear type multistage transmission for vehicles according to one embodiment shown in FIG. 21 and operations of hydraulic type friction engagement devices, which are required to establish the transmission gear stages, corresponding to FIG. 19.
FIG. 25 is a collinear chart describing another embodiment of the operations of the planetary gear type multistage transmission for vehicles according to the embodiment shown in FIG. 21, corresponding to FIG. 20.
Figures 27, 28:
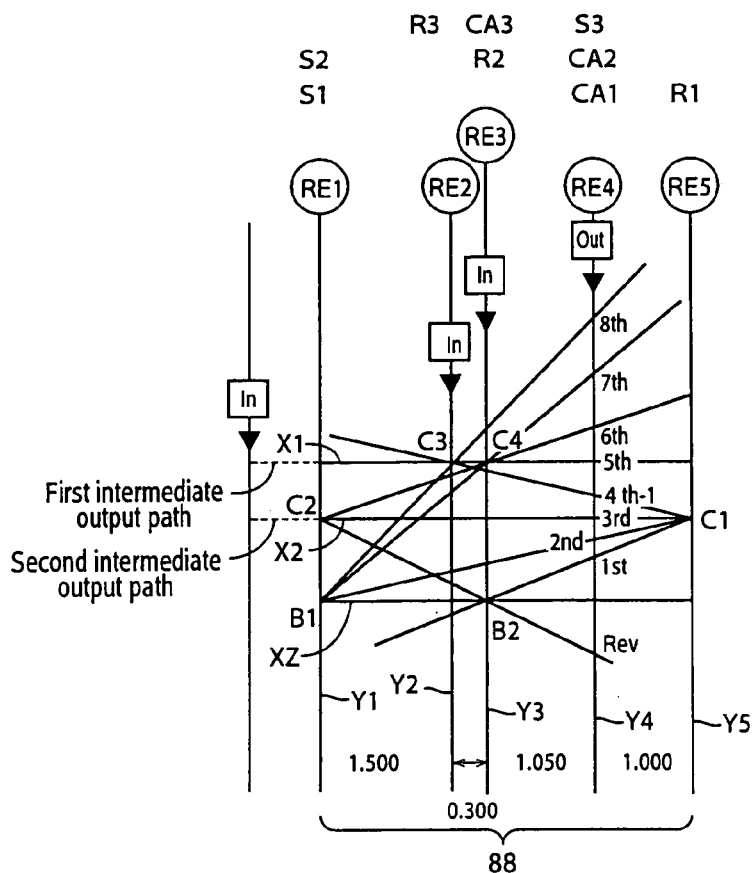
FIG. 27 is a chart showing the relationship between transmission gear stages of the planetary gear type multistage transmission for vehicles according to the embodiment shown in FIG. 26 and operations of hydraulic type friction engagement devices, which are required to establish the transmission gear stages, corresponding to FIG. 22.
FIG. 28 is a collinear chart describing operations of the planetary gear type multistage transmission for vehicles according to the embodiment shown in FIG. 26, corresponding to FIG. 23.
Figures 30, 31:
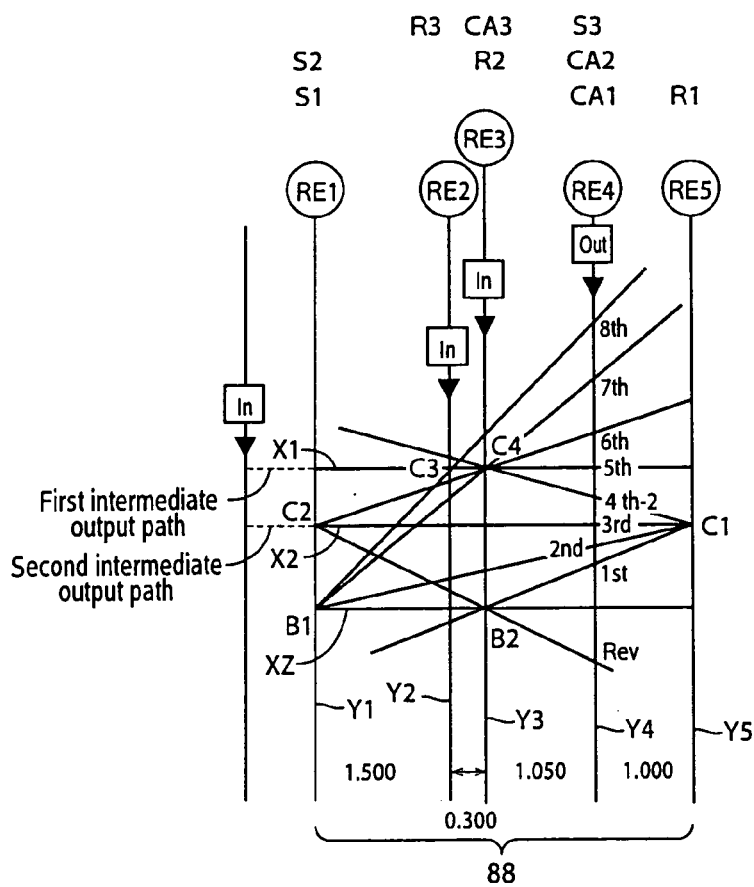
FIG. 30 is a chart showing another embodiment of the relationship between transmission gear stages of the planetary gear type multistage transmission for vehicles according to one embodiment shown in FIG. 29 and operations of hydraulic type friction engagement devices, which are required to establish the transmission gear stages, corresponding to FIG. 24.
FIG. 31 is a collinear chart describing another embodiment of the operations of the planetary gear type multistage transmission for vehicles according to the embodiment shown in FIG. 29, corresponding to FIG. 25.

FIG. 24 shows another embodiment of the engagement operations, shown in FIG. 22, of the hydraulic type friction engagement devices of the transmission 70 shown in FIG. 21, and FIG. 25 shows another embodiment of the collinear chart, shown in FIG. 23, of the transmission 70. Differences between FIG. 30 and FIG. 28 are similar to those between FIG. 19 and FIG. 17, and differences between FIG. 25 and FIG. 23 are similar to those between FIG. 20 and FIG. 18. Therefore, descriptions thereof are also omitted.

Figure 26:
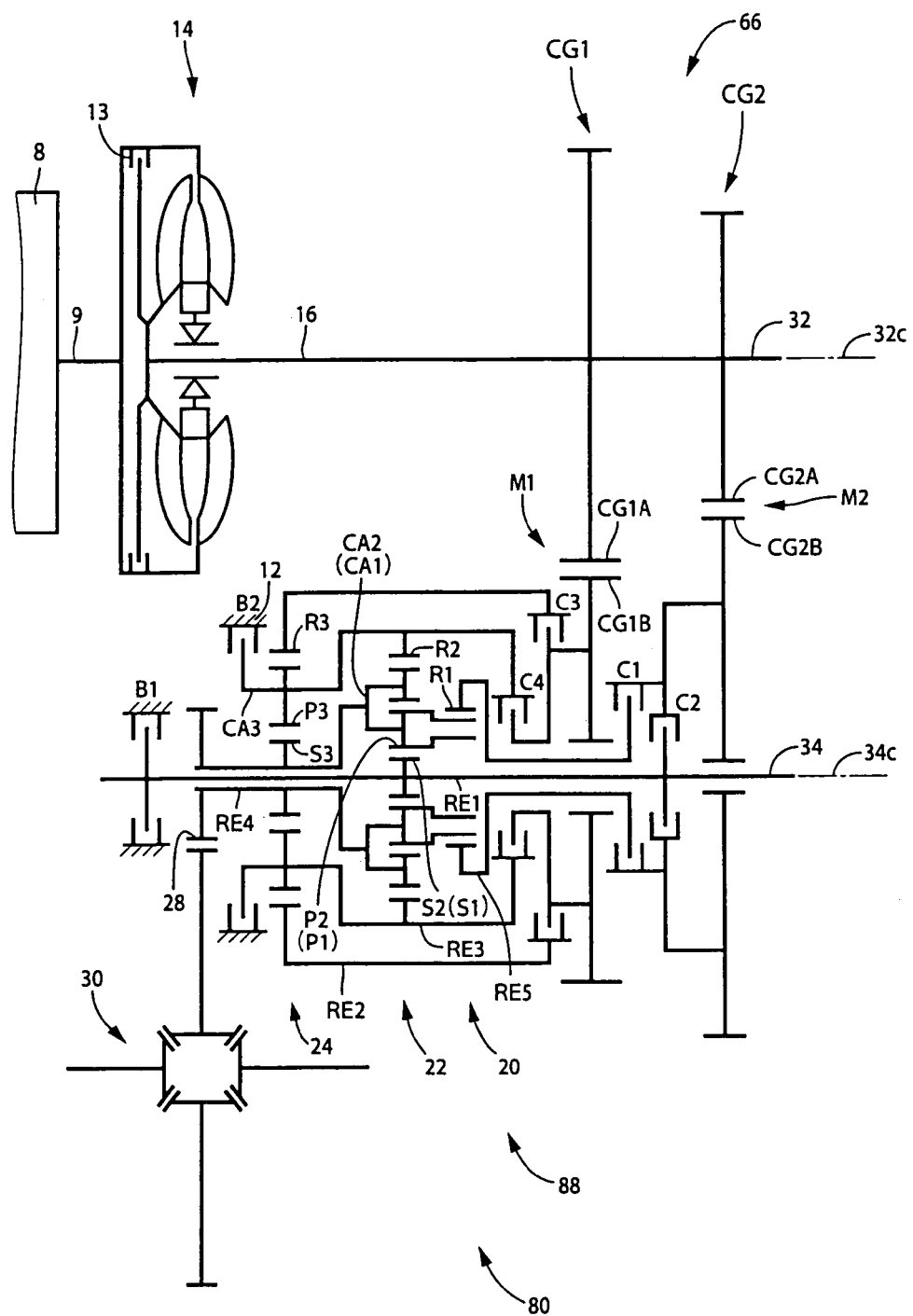
FIG. 26 is a view showing main points for describing a construction of a planetary gear type multistage transmission for vehicles according to still another embodiment of the present invention, corresponding to FIG. 21.

FIG. 26 is a view showing main points for describing a construction of a transmission 80 according to still another embodiment of the present invention. FIG. 27 is a chart showing the relationship between the transmission gear stages of the transmission 80 and operations of hydraulic type friction engagement devices necessary to establish the transmission gear stages. FIG. 28 is a collinear chart showing the rotation speeds of the rotary elements in the respective gear stages. The present embodiment is the same as the transmission 70 shown in FIG. 21 except for that the construction of the respective devices of the second transmission portion 88 differ from that of the transmission 70 shown in FIG. 21. Therefore, effects similar to those of the embodiment shown in FIG. 21 through FIG. 23 can be obtained. Hereinafter, a description is given of differences between the transmission 80 and the transmission 70.

In the present embodiment, the first planetary gear set 20 and the third planetary gear set 24 that compose the second transmission portion 88 of the transmission 80 shown in FIG. 26 described above are composed of a single-pinion type planetary gear set, respectively. The second planetary gear set 22 is composed of a double-pinion type planetary gear set. The first planetary gear set 20 is provided with the first sun gear S1, the first planetary gear P1, the first carrier CA1 that supports the first planetary gear P1 so as to cause the same to rotate and to revolve it, and the first ring gear R1 engaged with the first sun gear S1 via the first planetary gear P1, and has a prescribed gear ratio $\rho 1$ of, for example, [0.351] or so. The second planetary gear set 22 is provided with the second sun gear S2, a plurality of pairs of the second planetary gears P2 engaged with each other, the second carrier CA2 that supports the second planetary gears P2 so as to cause the same to rotate and to revolve it, and the second ring gear R2 engaged with the second sun gear S2 via the second planetary gears P2, and has a prescribed gear ratio $\rho 2$ of, for example, [0.368] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio $\rho 3$ of, for example, [0.286] or so.

In the first planetary gear set 20 and the second planetary gear set 22, the first carrier CA1 and the second carrier CA2 are composed of a common component, and the first sun gear S1 and the second sun gear S2 are also composed of a common component. Further, the first planetary gear P1 is made into a planetary gear train that is concurrently used as any one of a pair of the second planetary gears P2 engaged with each other. In addition, these components that are composed of a common member may be composed of separate components.

In the above-described second transmission portion 88, the first sun gear S1 and the second sun gear S2 are connected to become integral with each other, are selectively connected to the second driven gear CG2B via the second clutch C2, and are selectively connected to the transmission case 12 via the first brake B1. The third ring gear R3 is selectively connected to the first driven gear CG1B via the third clutch C3. The second ring gear R2 and the third carrier CA3 are connected to become integral with each other, are selectively connected to the first driven gear CG1B via the fourth clutch C4, and are selectively connected to the transmission case 12 via the second brake B2. The first carrier CA1, the second carrier CA2 and the third sun gear S3 are connected to become integral with each other and are connected to the output gear 28 operating as the output rotating member, and the first ring gear R1 is selectively connected to the second driven gear CG2B via the first clutch C1.

In the transmission 80 constructed as described above, for example, as shown in FIG. 27 which is similar to the engagement operation chart of FIG. 22, since any two elements, which are selected among the first clutch C1, the second clutch C2, the third clutch C3, the fourth clutch C4, the first brake B1 and the second brake B2, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios $\gamma$ (=input shaft rotation speed $N_{IN}$/output shaft rotation speed $N_{OUT}$) which vary roughly at an equal ratio as in the embodiment shown in FIG. 21 through FIG. 23 can be obtained per gear stage. In addition, the transmission ratio width (=$\gamma 1/\gamma 8$) which is the ratio of the transmission ratio $\gamma 1$ of the first speed gear stage to the transmission ratio $\gamma 8$ of the eighth speed gear stage is made into a comparatively large value.

The speed reduction ratio of the first counter gear pair CG1, the speed reduction ratio of the second counter gear pair CG2, gear ratio $\rho 1$ of the first planetary gear set 20, gear ratio $\rho 2$ of the second planetary gear set 22 and gear ratio $\rho 3$ of the third planetary gear set 24 are established so as to obtain the above-described transmission ratios.

FIG. 28 is a collinear chart of the above-described transmission 80, corresponding to FIG. 23 which is a collinear chart of the above-described transmission 70. Five vertical lines Y1 through Y5 of the second transmission portion 88 in FIG. 28 represent, in order from the left side, the sun gear S1 and sun gear S2 connected to each other, which correspond to the first rotary element RE1, the ring gear R3 corresponding to the second rotary element RE2, the ring gear R2 and the carrier CA3 connected to each other, which correspond to the third rotary element RE3, the carrier CA1, carrier CA2 and the sun gear S3 connected to each other, which correspond to the fourth rotary element RE4, and the ring gear R1 corresponding to the fifth rotary element RE5, respectively. Therefore, on the basis of these rotary elements, FIG. 28 differs from FIG. 23 only in the construction of the respective rotary elements. These drawings are the same in the form of the collinear chart. Accordingly, a description of the collinear chart of FIG. 28 is omitted.

Figure 29:
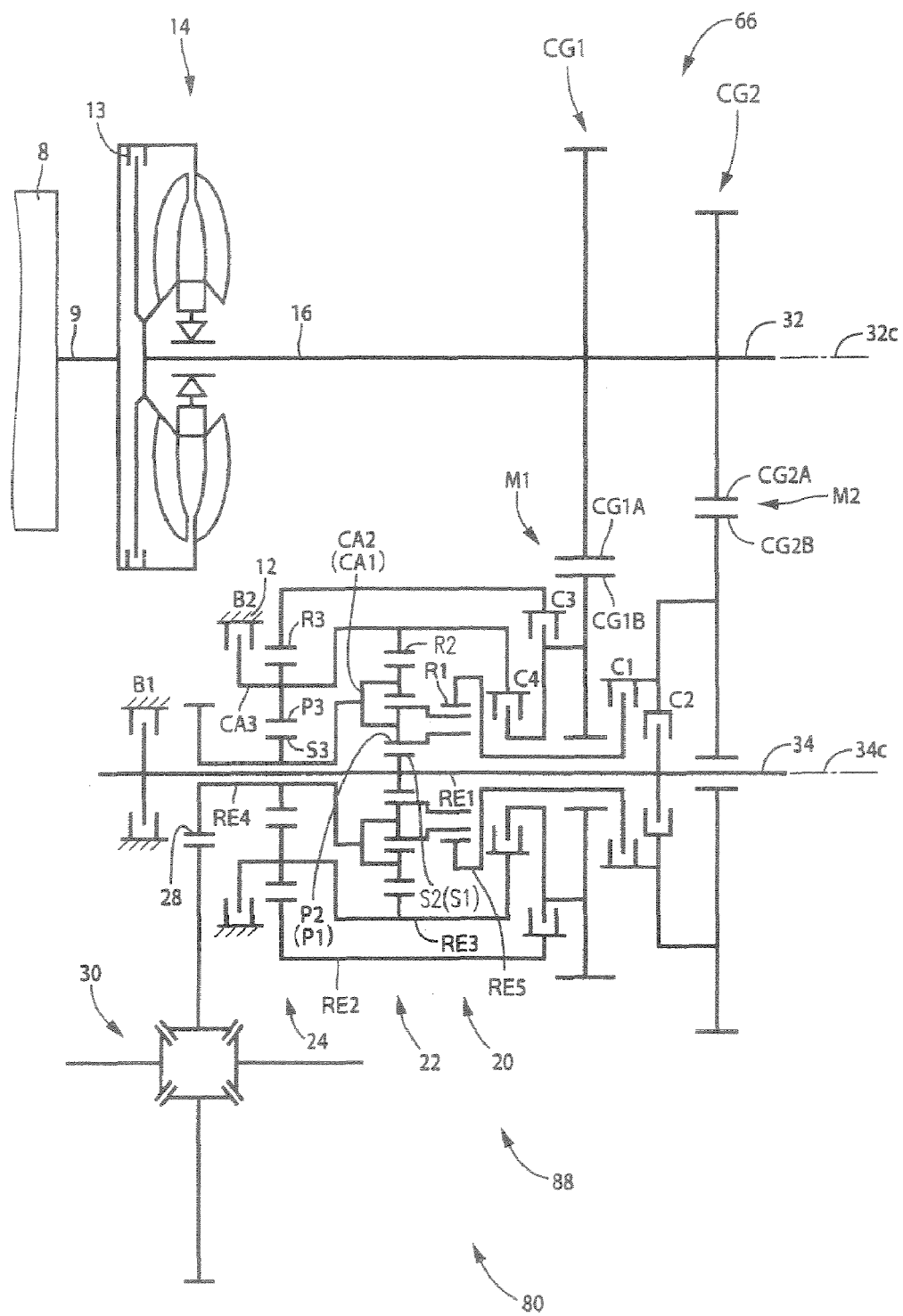
FIG. 29 is a view showing main points for describing a construction of a planetary gear type multistage transmission for vehicles according to still another embodiment of the present invention, corresponding to FIG. 26.

FIG. 29 is a view showing main points for describing a construction of a transmission 80 according to still another embodiment of the present invention, which is similar to FIG. 26. FIG. 30 shows another embodiment of engagement operations, shown in FIG. 27, of the hydraulic type friction engagement devices of the transmission 80. FIG. 31 shows another embodiment of the collinear chart, shown in FIG. 28, of the transmission 80. Since differences between FIG. 30 and FIG. 27 are similar to those between FIG. 24 and FIG. 22, and differences between FIG. 31 and FIG. 28 are similar to those between FIG. 25 and FIG. 23, the description thereof is omitted.

Figure 32:
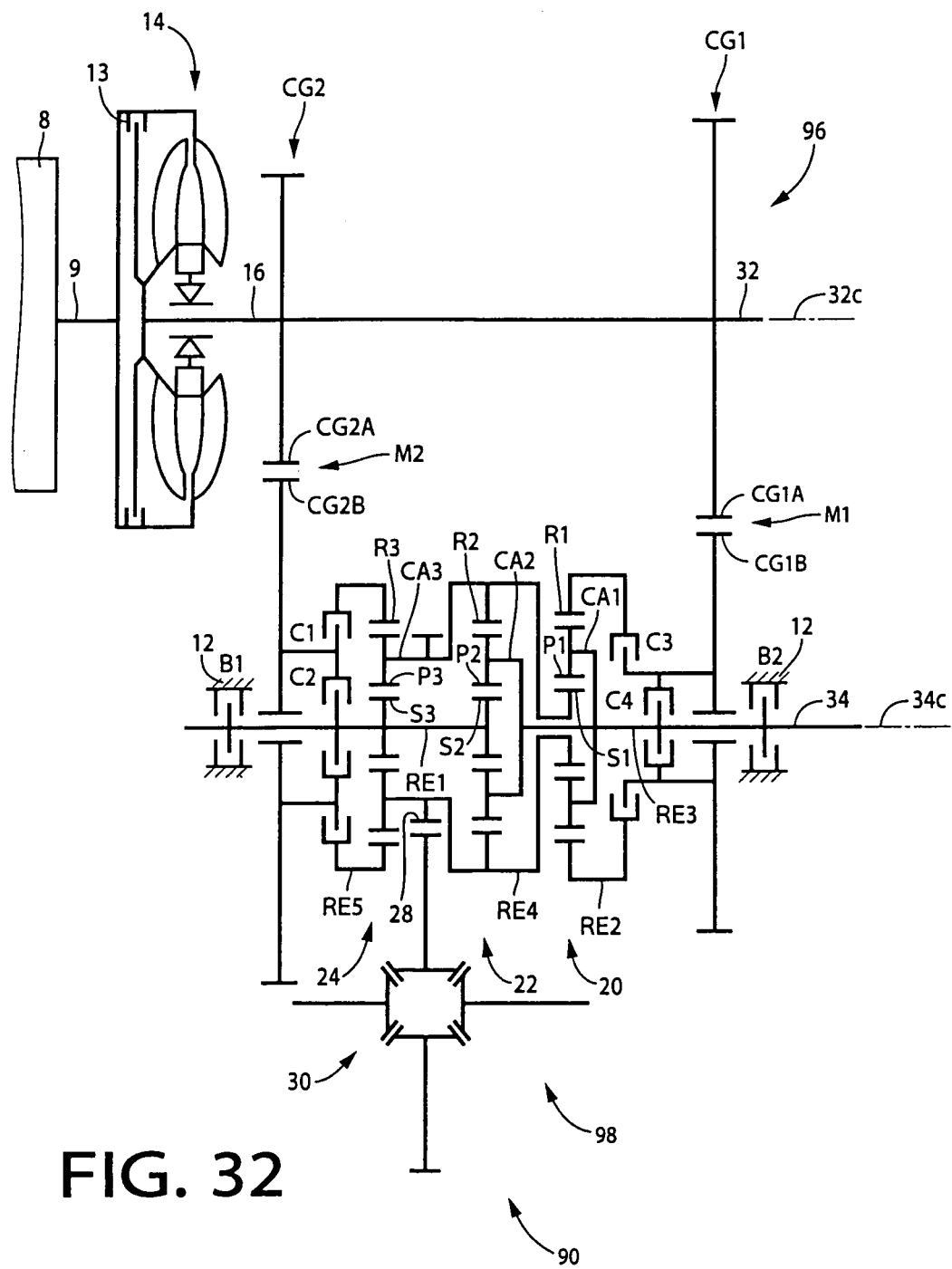
FIG. 32 is a view showing main points for describing a construction of a planetary gear type multistage transmission for vehicles according to still another embodiment of the present invention, corresponding to FIG. 21.
Figures 33, 34:
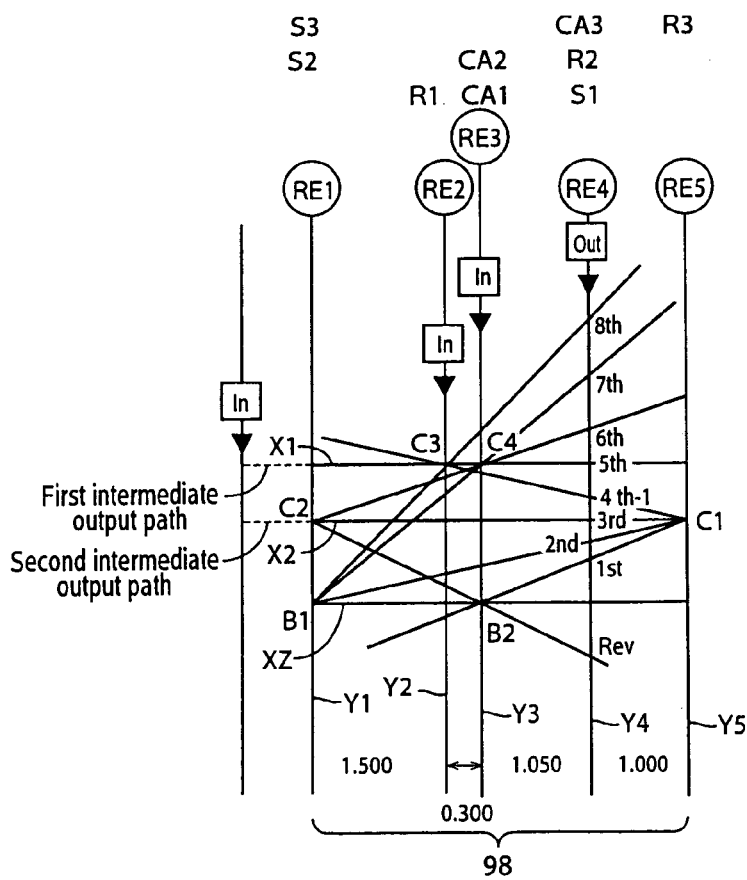
FIG. 33 is a chart showing the relationship between transmission gear stages of the planetary gear type multistage transmission for vehicles according to the embodiment shown in FIG. 32 and operations of hydraulic type friction engagement devices, which are required to establish the transmission gear stages, corresponding to FIG. 22.
FIG. 34 is a collinear chart describing operations of the planetary gear type multistage transmission for vehicles according to the embodiment shown in FIG. 32, corresponding to FIG. 23.

FIG. 32 is a view showing main points for describing a construction of a transmission 90 according to still another embodiment of the present invention. FIG. 33 is a chart showing the relationship between the transmission gear stages of the transmission 90 and operations of hydraulic type friction engagement devices necessary to establish the transmission gear stages. FIG. 34 is a collinear chart showing the rotation speeds of the rotary elements in the respective gear stages. The present embodiment is the same as the transmission 70 shown in FIG. 21, except for that the construction of the respective devices of the second transmission portion 98 and arrangement of the first transmission portion 96, differ from those of the transmission 70 shown in FIG. 21. Therefore, effects similar to those of the embodiment shown in FIG. 21 through FIG. 23 can be obtained. Hereinafter, a description is given of only differences between the transmission 90 and the transmission 70.

In the transmission 90 according to the present embodiment, as shown in FIG. 32, the first counter gear pair CG1 and the second counter gear pair CG2, which compose the first transmission portion 96, are disposed so as for the second transmission portion 98 to be placed therebetween. Thus, the axial length of the transmission 90 can be kept compact as in the transmission 70, and valve bodies of hydraulic control circuits of an oil pump and hydraulic type friction engagement devices can be disposed in the empty spacing above the first axial center 32$c$ between the first counter gear pair CG1 and the second counter gear pair CG2, wherein connection of oil paths of the transmission 90 can be facilitated.

In the present embodiment, the first planetary gear set 20, the second planetary gear set 22 and the third planetary gear set 24, which compose the second transmission portion 98 of the transmission 90 shown in FIG. 32 are composed of a single-pinion type planetary gear set, respectively. The first planetary gear set 20 is provided with the first sun gear S1, the first planetary gear P1, the first carrier CA1 that supports the first planetary gear P1 so as to cause the same to rotate and to revolve it, and the first ring gear R1 engaged with the first sun gear S1 via the first planetary gear P1, and has a prescribed gear ratio ρ1 of, for example, [0.286]. The second planetary gear set 22 is provided with the second sun gear S2, the second planetary gear P2, the second carrier CA2 that supports the second planetary gear P2 so as to cause the same to rotate and to revolve it, and the second ring gear R2 engaged with the second sun gear S2 via the second planetary gear P2, and has a prescribed gear ratio ρ2 of, for example, [0.583] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.351] or so.

In the above-described second transmission portion 98, the second sun gear S2 and the third sun gear S3 are connected to become integral with each other, are selectively connected to the second driven gear CG2B via the second clutch C2, and are selectively connected to the transmission case 12 via the first brake B1. The first ring gear R1 is selectively connected to the first driven gear CG1B via the third clutch C3. The first carrier CA1 and the second carrier CA2 are connected to become integral with each other, are selectively connected to the first driven gear CG1B via the fourth clutch C4, and are selectively connected to the transmission case 12 via the second brake B2. The first sun gear S1, the second ring gear R2 and the third carrier CA3 are connected to become integral with each other and are connected to the output gear 28 operating as the output rotating member. The third ring gear R3 is selectively connected to the second driven gear CG2B via the first clutch C1.

In the transmission 90 constructed as described above, as shown in FIG. 33 which is similar to the engagement operation chart of FIG. 22, since any two elements, which are selected among the first clutch C1, the second clutch C2, the third clutch C3, the fourth clutch C4, the first brake B1 and the second brake B2, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios γ (=input shaft rotation speed $N_{IN}$/output shaft rotation speed $N_{OUT}$) which vary roughly at an equal ratio as in the embodiment shown in FIG. 21 through FIG. 23 can be obtained per gear stage. In addition, the transmission ratio width (=γ1/γ8) which is the ratio of the transmission ratio γ1 of the first speed gear stage to the transmission ratio γ8 of the eighth speed gear stage is made into a comparatively large value. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

FIG. 34 is a collinear chart of the above-described transmission 90, corresponding to FIG. 23 which is a collinear chart of the transmission 70. Five vertical lines Y1 through Y5 of the second transmission portion 98 in FIG. 34 represent, in order from the left side, the sun gear S2 and sun gear S3 connected to each other, which correspond to the first rotary element RE1, the ring gear R1 corresponding to the second rotary element RE2, the carrier CA1 and the carrier CA2 connected to each other, which correspond to the third rotary element RE3, the sun gear S1, ring gear R2 and carrier CA3 connected to each other, which correspond to the fourth rotary element RE4, and the ring gear R3 corresponding to the fifth rotary element RE5, respectively. Therefore, on the basis of these rotary elements, FIG. 34 differs from FIG. 23 only in the construction of the respective rotary elements. These drawings are the same in the form of the collinear chart. Accordingly, a description of the collinear chart of FIG. 34 is omitted.

Figures 35, 36:
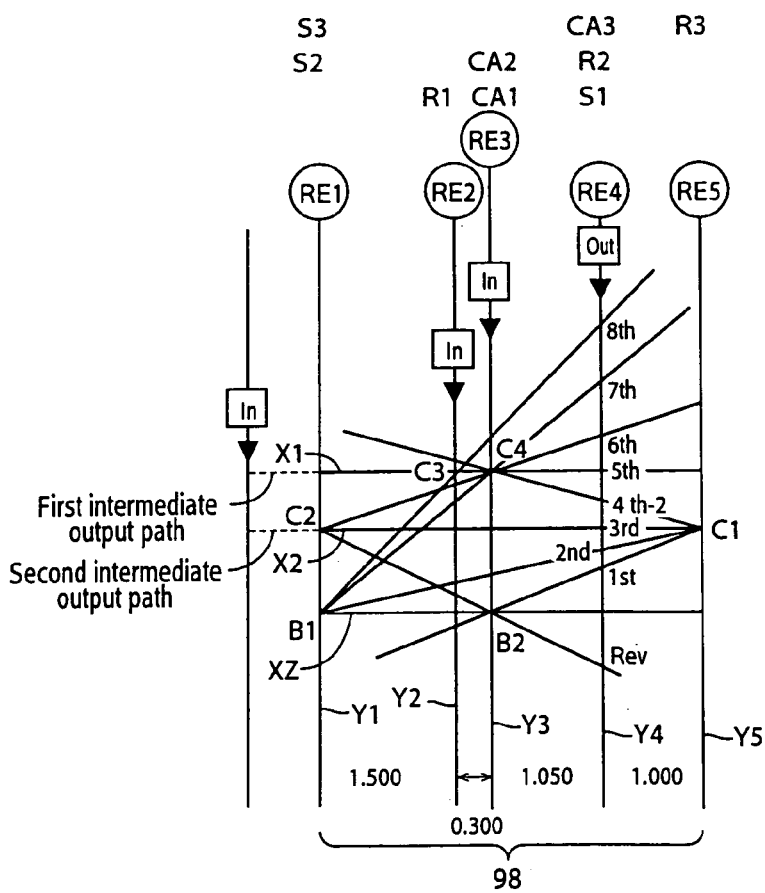
FIG. 35 is a chart showing another embodiment of the relationship between transmission gear stages of the planetary gear type multistage transmission for vehicles according to the embodiment shown in FIG. 32 and operations of hydraulic type friction engagement devices, which are required to establish the transmission gear stages, corresponding to FIG. 24.
FIG. 36 is a collinear chart describing another embodiment of the operations of the planetary gear type multistage transmission for vehicles according to the embodiment shown in FIG. 32, corresponding to FIG. 25.

FIG. 35 shows another embodiment of the engagement operations, shown in FIG. 33, of the hydraulic type friction engagement devices of the transmission 90, and FIG. 36 shows another embodiment of the collinear chart, shown in FIG. 34, of the transmission 90. Differences between FIG. 35 and FIG. 33 are similar to those between FIG. 24 and FIG. 22, and differences between FIG. 36 and FIG. 34 are similar to those between FIG. 25 and FIG. 23. Therefore, descriptions thereof are also omitted.

Figure 37:
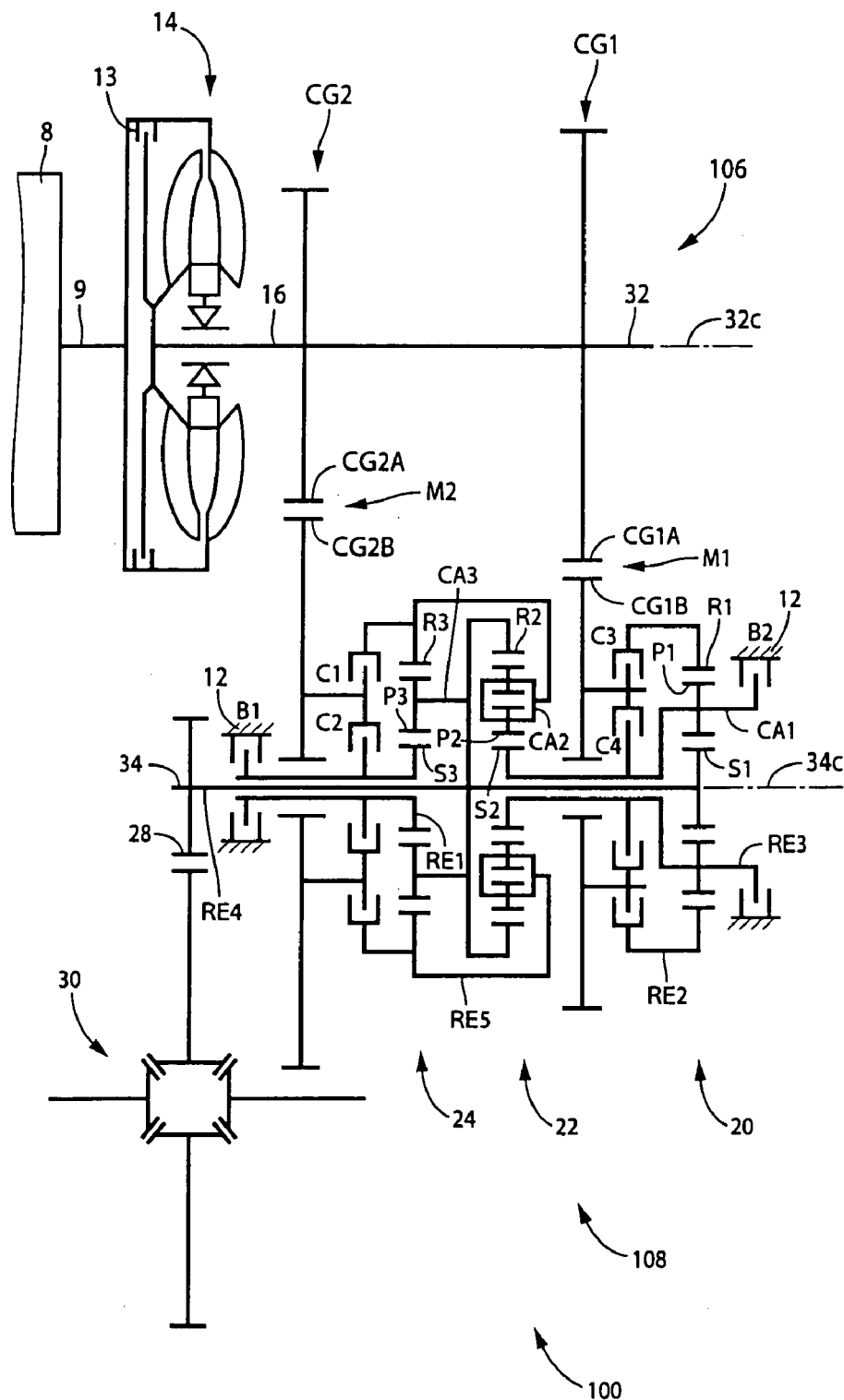
FIG. 37 is a view showing main points for describing a construction of a planetary gear type multistage transmission for vehicles according to still another embodiment of the present invention, corresponding to FIG. 21.
Figures 38, 39:
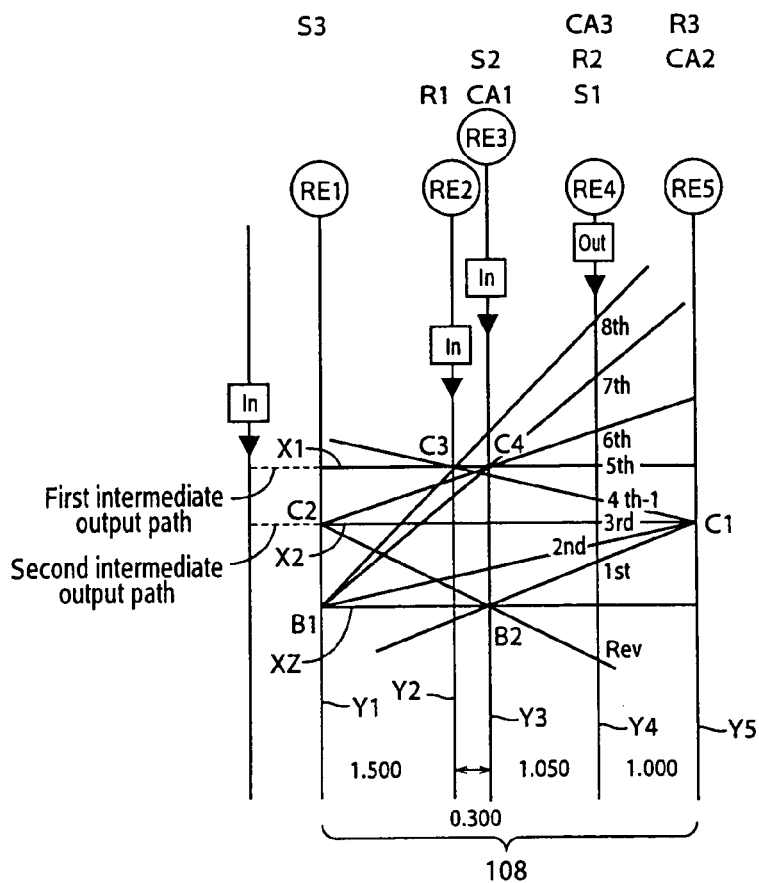
FIG. 38 is a chart showing the relationship between transmission gear stages of the planetary gear type multistage transmission for vehicles according to the embodiment shown in FIG. 37 and operations of hydraulic type friction engagement devices, which are required to establish the transmission gear stages, corresponding to FIG. 22.
FIG. 39 is a collinear chart describing operations of the planetary gear type multistage transmission for vehicles according to the embodiment shown in FIG. 37, corresponding to FIG. 22.

FIG. 37 is a view showing main points for describing a construction of a transmission 100 according to still another embodiment of the present invention. FIG. 38 is a chart showing the relationship between the transmission gear stages of the transmission 100 and operations of hydraulic type friction engagement devices necessary to establish the transmission gear stages. FIG. 39 is a collinear chart showing the rotation speeds of the rotary elements in the respective gear stages. The present embodiment is the same as the transmission 70 shown in FIG. 21 except for that the construction of the respective devices of the second transmission portion 108 and arrangement of the first transmission portion 106, differ from those of the transmission 70 shown in FIG. 21. Therefore, effects similar to those of the embodiment shown in FIG. 21 through FIG. 23 can be obtained. Hereinafter, only a description is given of differences between the transmission 100 and the transmission 70.

In the present embodiment 100, as shown in FIG. 37, the first counter gear pair CG1 and the second counter gear pair CG2 that compose the first transmission portion 106 are disposed so that the second planetary gear set 22 and the third planetary gear set 24, which compose the second transmission portion 108, are placed therebetween. Thus, the axial length of the transmission 100 can be kept compact as in the transmission 70, and valve bodies of hydraulic control circuits of an oil pump and hydraulic type friction engagement devices can be disposed in the empty spacing above the first axial center 32c between the first counter gear pair CG1 and the second counter gear pair CG2, wherein connections of oil paths of the transmission 100 can be facilitated.

In the present embodiment, the first planetary gear set 20 and the third planetary gear set 24, which compose the second transmission portion 108 of the transmission 100 shown in FIG. 37, are composed of a single-pinion type planetary gear set, respectively. The second planetary gear set 22 is composed of a double-pinion type planetary gear set. The first planetary gear set 20 is provided with the first sun gear S1, the first planetary gear P1, the first carrier CA1 that supports the first planetary gear P1 so as to cause the same to rotate and to revolve it, and the first ring gear R1 engaged with the first sun gear S1 via the first planetary gear P1, and has a prescribed gear ratio ρ1 of, for example, [0.286] or so. The second planetary gear set 22 is provided with the second sun gear S2, a plurality of pairs of the second planetary gears P2 engaged with each other, the second carrier CA2 that supports the second planetary gears P2 so as to cause the same to rotate and to revolve it, and the second ring gear R2 engaged with the second sun gear S2 via the second planetary gears P2, and has a prescribed gear ratio ρ2 of, for example, [0.488] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.351] or so.

In the above-described second transmission portion 108, the third sun gear S3 is selectively connected to the second driven gear CG2B via the second clutch C2, and is selectively connected to the transmission case 12 via the first brake B1. The first ring gear R1 is selectively connected to the first driven gear CG1B via the third clutch C3. The first carrier CA1 and the second sun gear S2 are connected to become integral with each other, are selectively connected to the first driven gear CG1B via the fourth clutch C4, and are selectively connected to the transmission case 12 via the second brake B2. The first sun gear S1, the second ring gear R2 and the third carrier CA3 are connected to become integral with each other and are connected to the output gear 28 operating as the output rotating member. The second carrier CA2 and the third ring gear R3 are selectively connected to become integral with each other and are selectively connected to the second driven gear CG2B via the first clutch C1.

In the transmission 100 constructed as described above, as shown in FIG. 38 which is similar to the engagement operation chart of FIG. 22, since any two elements, which are selected among the first clutch C1, the second clutch C2, the third clutch C3, the fourth clutch C4, the first brake B1 and the second brake B2, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios γ (=input shaft rotation speed $N_{IN}$/ output shaft rotation speed $N_{OUT}$) which vary roughly at an equal ratio as in the embodiment shown in FIG. 21 through FIG. 23 can be obtained per gear stage. In addition, the transmission ratio width (=γ1/γ8) which is the ratio of the transmission ratio γ1 of the first speed gear stage to the transmission ratio γ8 of the eighth speed gear stage is made into a comparatively large value. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

FIG. 39 is a collinear chart of the above-described transmission 100, corresponding to FIG. 23 which is a collinear chart of the above-described transmission 70. Five vertical lines Y1 through Y5 of the second transmission portion 108 in FIG. 39 represent, in order from the left side, the sun gear S3 corresponding to the first rotary element RE1, the ring gear R1 corresponding to the second rotary element RE2, the carrier CA1 and sun gear S2 connected to each other, which correspond to the third rotary element RE3, the sun gear S1 and ring gear R2 and carrier CA3 connected to each other, which correspond to the fourth rotary element RE4, and the carrier CA2 and ring gear R3 connected to each other, which correspond to the fifth rotary element RE5, respectively. Therefore, on the basis of these rotary elements, FIG. 39 differs from FIG. 23 only in the construction of the respective rotary elements. These drawings are the same in the form of the collinear chart. Accordingly, a description of the collinear chart of FIG. 39 is omitted.

Figures 40, 41:
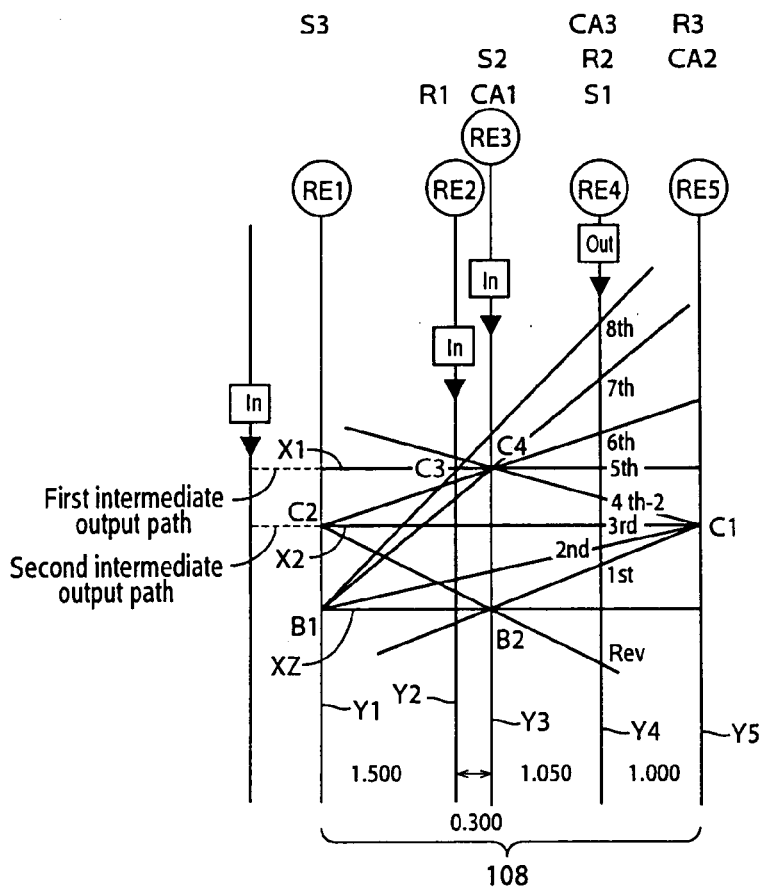
FIG. 40 is a chart showing another embodiment of the relationship between transmission gear stages of the planetary gear type multistage transmission for vehicles according to the embodiment shown in FIG. 37 and operations of hydraulic type friction engagement devices, which are required to establish the transmission gear stages, corresponding to FIG. 24.
FIG. 41 is a collinear chart describing another embodiment of the operations of the planetary gear type multistage transmission for vehicles according to the embodiment shown in FIG. 37, corresponding to FIG. 25.

FIG. 40 shows another embodiment of the engagement operations, shown in FIG. 38, of the hydraulic type friction engagement devices of the transmission 100, and FIG. 39 shows another embodiment of the collinear chart, shown in FIG. 39, of the transmission 100. Differences between FIG. 40 and FIG. 38 are similar to those between FIG. 24 and FIG. 22, and differences between FIG. 41 and FIG. 39 are similar to those between FIG. 25 and FIG. 23. Therefore, descriptions thereof are also omitted.

Figure 42:
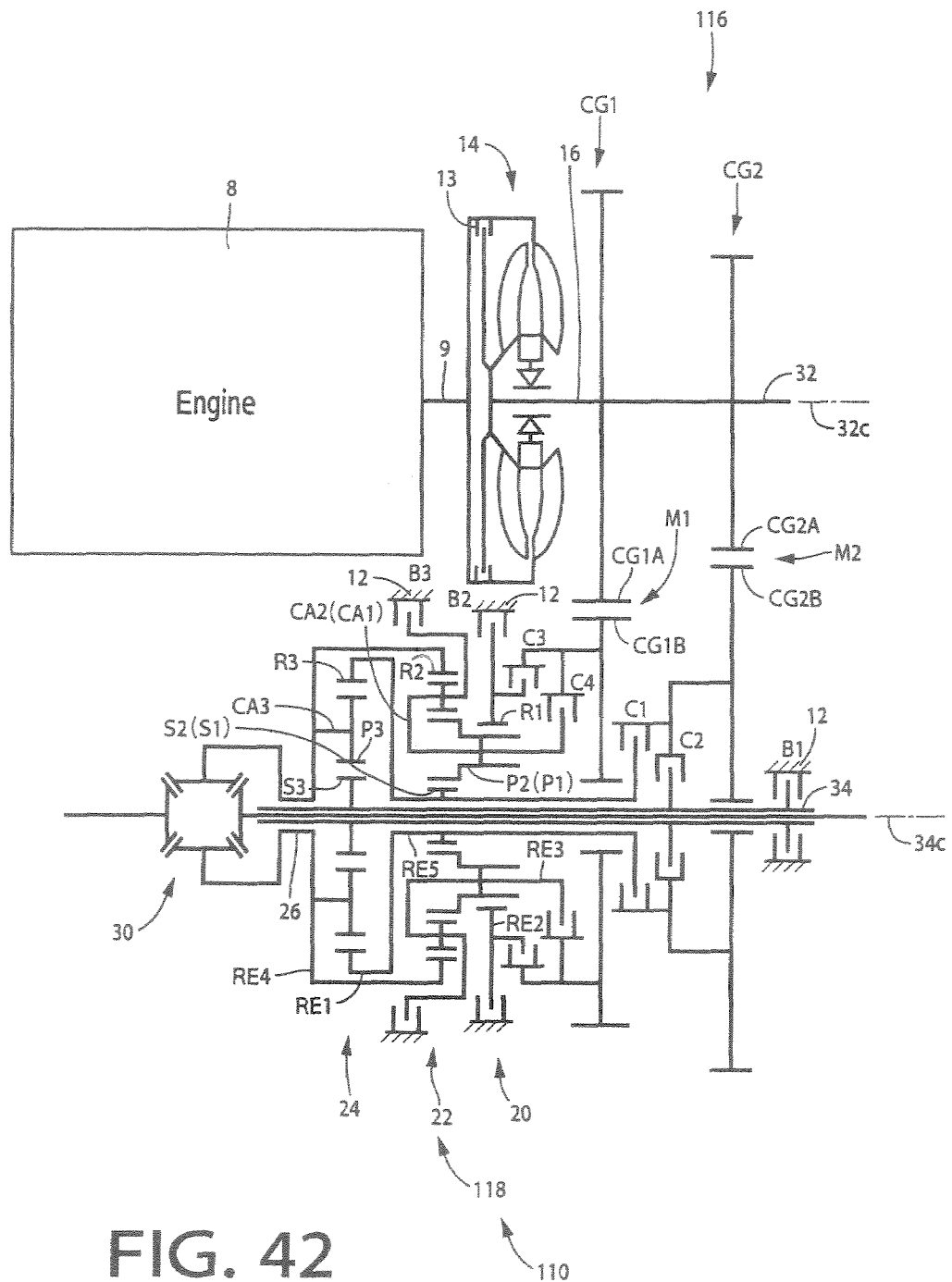
FIG. 42 is a view showing main points for describing a construction of a planetary gear type multistage transmission for vehicles according to still another embodiment of the present invention, corresponding to FIG. 1.
Figures 43, 44:
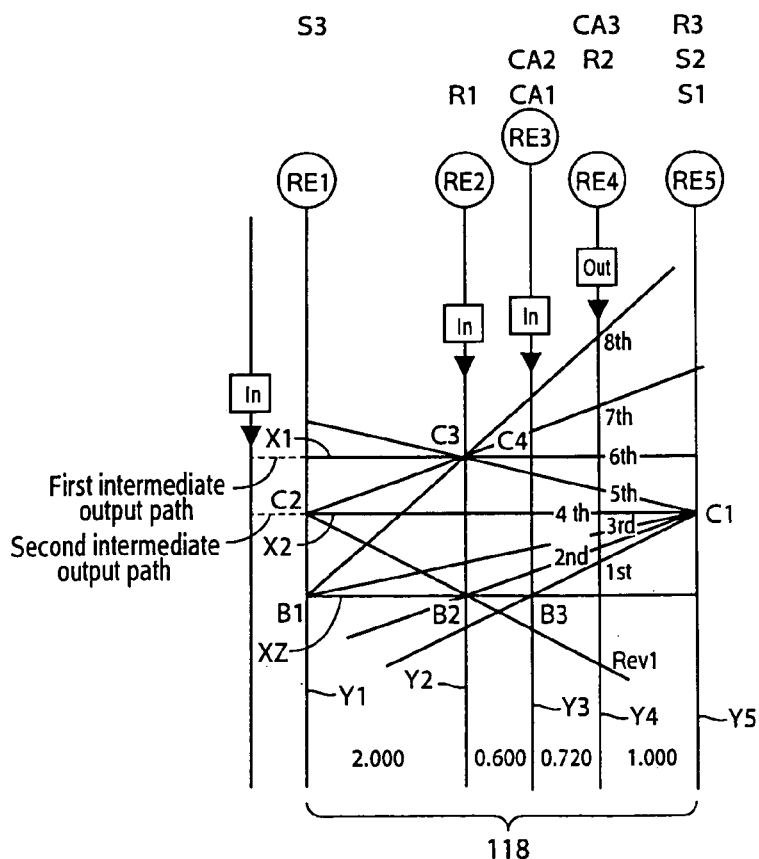
FIG. 43 is a chart showing the relationship between transmission gear stages of the planetary gear type multistage transmission for vehicles according to the embodiment shown in FIG. 42 and operations of hydraulic type friction engagement devices, which are required to establish the transmission gear stages, corresponding to FIG. 2.
FIG. 44 is a collinear chart describing operations of the planetary gear type multistage transmission for vehicles according to the embodiment shown in FIG. 42, corresponding to FIG. 3.

FIG. 42 is a view showing main points for describing a construction of a transmission 110 according to still another embodiment of the present invention. FIG. 43 is a chart showing the relationship between the transmission gear stages of the transmission 110 and operations of hydraulic type friction engagement devices necessary to establish the transmission gear stages. FIG. 44 is a collinear chart showing the rotation speeds of the rotary elements in the respective gear stages. The arrangement of the respective devices composing the transmission 110 of the present embodiment is similar to the transmission 11 shown in FIG. 1. Therefore, effects similar to those of the embodiment shown in FIG. 1 through FIG. 3 can be obtained. Hereinafter, only a description is given of differences between the transmission 110 and the transmission 11.

With respect to the first counter gear pair CG1 and the second counter gear pair CG2, which compose the first transmission portion 116 of the transmission 110 shown in FIG. 42 described above, for example, the speed reduction ratio of the first counter gear pair CG1 is set to [1.000] or so, and that of the second counter gear pair CG2 is set to [1.745] or so. The first transmission portion 116 transmits (outputs) rotations of the input shaft 16, that is, rotations of the first axis 32 via the first intermediate output path M1 and the second intermediate output path M2 decelerated and rotated with respect to the first intermediate output path M2.

In the present embodiment, the first planetary gear set 20 and the third planetary gear set 24, which compose the second transmission portion 118 of the transmission 110 shown in FIG. 42, are composed of a single-pinion type planetary gear set, respectively. The second planetary gear set 22 is composed of a double-pinion type planetary gear set. The first planetary gear set 20 is provided with the first sun gear S1, the first planetary gear P1, the first carrier CA1 that supports the first planetary gear P1 so as to cause the same to rotate and to revolve it, and the first ring gear R1 engaged with the first sun gear S1 via the first planetary gear P1, and has a prescribed gear ratio ρ1 of, for example, [0.349] or so. The second planetary gear set 22 is provided with the second sun gear S2, a plurality of pairs of the second planetary gears P2 engaged with each other, the second carrier CA2 that supports the second planetary gears P2 so as to cause the same to rotate and to revolve it, and the second ring gear R2 engaged with the second sun gear S2 via the second planetary gears P2, and has a prescribed gear ratio ρ2 of, for example, [0.419] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.301].

Also, in the first planetary gear set 20 and the second planetary gear set 22, the first carrier CA1 and the second carrier CA2 are composed of a common component, and the first sun gear S1 and the second sun gear S2 are composed of a common component. In addition, the first planetary gear P1 is made into a planetary gear train that is concurrently used as any one of a pair of the second planetary gears P2 engaged with each other. Also, these components that are composed of a common member may be composed of separate components. Further, the first planetary gear P1 at the first planetary gear set 20 side has a diameter (the number of teeth) differing from that of the first planetary gear P1 at the second planetary gear set 22 side.

In the above-described second transmission portion 118, the third sun gear S3 is selectively connected to the second driven gear CG2B via the second clutch C2, and is selectively connected to the transmission case 12 operating as the non-rotating member via the first brake B1. The first ring gear R1 is selectively connected to the first driven gear CG1B via the third clutch C3 and is selectively connected to the transmission case 12 via the second brake B2. The first carrier CA1 and the second carrier CA2 are connected to become integral with each other, are selectively connected to the first driven gear CG1B via the fourth clutch C4 and are selectively connected to the transmission case 12 via the third brake B3. The second ring gear R2 and the third carrier CA3 are connected to become integral with each other and are connected to the output shaft 26 operating as the output rotating member. The first sun gear S1, the second sun gear S2 and the third ring gear R3 are connected to become integral with each other and are selectively connected to the second driven gear CG2B via the first clutch C1.

In the transmission 110 constructed as described above, for example, as shown in FIG. 43, since any two elements, which are selected among the first clutch C1, the second clutch C2, the third clutch C3, the fourth clutch C4, the first brake B1, the second brake B2 and the third brake B3, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios γ (=input shaft rotation speed $N_{IN}$/output shaft rotation speed $N_{OUT}$) which vary roughly at an equal ratio can be obtained per gear stage.

That is, as shown in FIG. 43, since, by engagement of the first clutch C1 with the third brake B3, the first sun gear S1, the second sun gear S2 and the third ring gear R3 are, respectively, connected to the second driven gear CG2B, and the first carrier CA1 and the second carrier CA2 are, respectively, connected to the transmission case 12, the first speed gear stage whose transmission ratio γ1 is the maximum value, for example, [4.169] is established. Also, since, by engagement of the first clutch C1 with the second brake B2, the first sun gear S1, the second sun gear S2 and the third ring gear R3 are, respectively, connected to the second driven gear CG2B, and the first ring gear R1 is connected to the transmission case 12, the second speed gear stage whose transmission ratio γ2 is a smaller value of, for example, [3.067] or so than the first speed gear stage is established. In addition, since, by engagement of the first clutch C1 with the first brake B1, the first sun gear S1, the second sun gear S2 and the third ring gear R3 are, respectively, connected to the second driven gear CG2B, and the third sun gear S3 is connected to the transmission case 12, the third speed gear stage whose transmission ratio γ3 is a smaller value of, for example, [2.271] or so than the second speed gear stage is established. Further, since, by engagement of the first clutch C1 with the second clutch C2, the first sun gear S1, the second sun gear S2 and the third ring gear R3 are, respectively, connected to the second driven gear CG2B, and the third sun gear S3 is connected to the second driven gear CG2B, the fourth speed gear stage whose transmission ratio γ4 is a smaller value of, for example, [1.745] or so than the third speed gear stage is established. Also, since, by engagement of the first clutch C1 with the third clutch C3, the first sun gear S1, the second sun gear S2 and the third ring gear R3 are, respectively, connected to the second driven gear CG2B, and the first ring gear R1 is connected to the first driven gear CG1B, the fifth speed gear stage whose transmission ratio γ5 is a smaller value of, for example, [1.321] than the fourth speed gear stage is established. Also, since, by engagement of the third clutch C3 with the fourth clutch C4, the first ring gear R1 is connected to the first driven gear CG1B, and the first carrier CA1 and the second carrier CA2 are, respectively, connected to the first driven gear CG1B, the sixth speed gear stage whose transmission ratio γ6 is a smaller value of, for example, [1.000] or so than the fifth speed gear stage is established. In addition, since, by engagement of the second clutch C2 with the third clutch C3, the third sun gear S3 is connected to the second driven gear CG2B, and the first ring gear R1 is connected to the first driven gear CG1B, the seventh speed gear stage whose transmission ratio γ7 is a smaller value of, for example, [0.780] than the sixth speed gear stage is established. Further, since, by engagement of the third clutch C3 with the first brake B1, the first ring gear R1 is connected to the first driven gear CG1B, and the third sun gear S3 is connected to the transmission case 12, the eighth speed gear stage whose transmission ratio γ8 is a smaller value of, for example, [0.602] than the seventh speed gear stage is established.

In addition, since, by engagement of the second clutch C2 with the second brake B2, the third sun gear S3 is connected to the second driven gear CG2B, and the first ring gear R1 is connected to the transmission case 12, a reverse gear stage whose transmission γR is a value between the second speed gear stage and the third speed gear stage, for example, [2.644] or so is established. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

In the above-described transmission 110, the ratio (=γ1/γ2) of the transmission ratio γ1 of the first speed gear stage to the transmission ratio γ2 of the second speed gear stage is made into [1.359], the ratio (=γ2/γ3) of the transmission ratio γ2 of the second speed gear stage to the transmission ratio γ3 of the third speed gear stage is made into [1.351], the ratio (=γ3/γ4) of the transmission ratio γ3 of the third speed gear stage to the transmission ratio γ4 of the fourth speed gear stage is made into [1.301], the ratio (=γ4/γ5) of the transmission ratio γ4 of the fourth speed gear stage to the transmission ratio γ5 of the fifth speed gear stage is made into [1.321], the ratio (=γ5/γ6) of the transmission ratio γ5 of the fifth speed gear stage to the transmission ratio γ6 of the sixth speed gear stage is made into [1.321], the ratio (=γ6/γ7) of the transmission ratio γ6 of the sixth speed gear stage to the transmission ratio γ7 of the seventh speed gear stage is made into [1.282], and the ratio (=γ7/γ8) of the transmission ratio γ7 of the seventh speed gear stage to the transmission ratio γ8 of the eighth speed gear stage is made into [1.295], wherein the respective transmission ratios γ vary roughly at an equal ratio. Also, in the above-described transmission 110, the transmission ratio width (=γ1/γ8) which is the ratio of the transmission ratio γ1 of the first speed gear stage to the transmission ratio γ8 of the eighth speed gear stage is made into a comparatively large value, that is, [6.921].

FIG. 44 is a collinear chart of the above-described transmission 110, corresponding to FIG. 3 which is a collinear chart of the transmission 11. Five vertical lines Y1 through Y5 of the second transmission portion 118 represent, in order from the left side, the sun gear S3 corresponding to the first rotary element RE1, the ring gear R1 corresponding to the second rotary element RE2, the carrier CA1 and carrier CA2 connected to each other, which correspond to the third rotary element RE3, the ring gear R2 and the carrier CA3 connected to each other, which correspond to the fourth rotary element RE4, and the sun gear S1, sun gear S2 and ring gear R3 connected to each other, which correspond to the fifth rotary element RE5, respectively.

If expressed utilizing the above-described collinear chart, the transmission 110 according to the present embodiment is constructed so that, in the first transmission portion 116, rotations of the input shaft 16 (rotations of the first axis 32) are outputted to the second transmission portion 118 via the first intermediate output path M1 and the second intermediate output path M2 decelerated and rotated with respect to the first intermediate output path M1. Also, the transmission 110 is constructed so that, in the second transmission portion 118, the first rotary element RE1 (S3) is selectively connected to the second driven gear CG2B via the second clutch C2 and is selectively connected to the transmission case 12 operating as the non-rotating member via the first brake B1, the second rotary element RE2 (R1) is selectively connected to the first driven gear CG1B via the third clutch C3, and is selectively connected to the transmission case 12 via the second brake B2, the third rotary element RE3 (CA1 and CA2) is selectively connected to the first driven gear CG1B via the fourth clutch C4, and is selectively connected to the transmission case 12 via the third brake B3, the fourth rotary element RE4 (R2 and CA3) is connected to the output shaft 26 operating as the output rotating member, and the fifth rotary element RE5 (S1, S2 and R3) is selectively connected to the second driven gear CG2B via the first clutch C1.

In the collinear chart of FIG. 44 described above, since, in the first speed gear stage, the fifth rotary element RE5 is connected to the second driven gear CG2B by engagement of the clutch C1 and its rotation speed is made into [NX2], and the third rotary element RE3 is connected to the transmission case 12 by engagement of the brake B3 and its rotation speed is made into [0], the rotation speed of the output shaft 26 is shown by the point (1st) at which a straight line connecting the intersection point of the vertical line Y5 and the horizontal line X2 to the intersection point of the vertical line Y3 and the horizontal line XZ crosses the vertical line Y4. Since, in the second speed gear stage, the fifth rotary element RE5 is connected to the second driven gear CG2B by engagement of the clutch C1 and its rotation speed is made into [NX2], and the second rotary element RE2 is connected to the transmission case 12 by engagement of the brake B2 and its rotation speed is made into [0], the rotation speed of the output shaft 26 is shown by the point (2nd) at which a straight line connecting the intersection point of the vertical line Y5 and the horizontal line X2 to the intersection point of the vertical line Y2 and the horizontal line XZ crosses the vertical line Y4. Since, in the third speed gear stage, the fifth rotary element RE5 is connected to the second driven gear CG2B by engagement of the clutch C1 and its rotation speed is made into [NX2], and the first rotary element RE1 is connected to the transmission case 12 by engagement of the brake B1 and its rotation speed is made into [0], the rotation speed of the output shaft 26 is shown by the point (3rd) at which a straight line connecting the intersection point of the vertical line Y5 and the horizontal line X2 to the intersection point of the vertical line Y1 and the horizontal line XZ crosses the vertical line Y4. Since, in the fourth speed gear stage, the fifth rotary element RE5 is connected to the second driven gear CG2B by engagement of the clutch C1 and its rotation speed is made into [NX2], and the first rotary element RE1 is connected to the second driven gear CG2B by engagement of the clutch C2 and its rotation speed is made into [NX2], the rotation speed of the output shaft 26 is shown by the point (4th) at which a straight line connecting the intersection point of the vertical line Y5 and the horizontal line X2 to the intersection point of the vertical line Y1 and the horizontal line X2 crosses the vertical line Y4. Since, in the fifth speed gear stage, the fifth rotary element RE5 is connected to the second driven gear CG2B by engagement of the clutch C1 and its rotation speed is made into [NX2], and the second rotary element RE2 is connected to the first driven gear CG1B by engagement of the clutch C3 and its rotation speed is made into [1], the rotation speed of the output shaft 26 is shown by the point (5th) at which a straight line connecting the intersection point of the vertical line Y5 and the horizontal line X2 to the intersection point of the vertical line Y2 and the horizontal line X1 crosses the vertical line Y4. Since, in the sixth speed gear stage, the second rotary element RE2 is connected to the first driven gear CG1B by engagement of the clutch C3 and its rotation speed is made into [1], and the third rotary element RE3 is connected to the first driven gear CG1B by engagement of the clutch C4 and its rotation speed is made into [1], the rotation speed of the output shaft 26 is shown by the point (6th) at which a straight line connecting the intersection point of the vertical line Y2 and the horizontal line X1 to the intersection point of the vertical line Y3 and the horizontal line X1 crosses the vertical line Y4. Since, in the seventh speed gear stage, the first rotary element RE1 is connected to the second driven gear CG2B by engagement of the clutch C2 and its rotation speed is made into [NX2], and the second rotary element RE2 is connected to the first driven gear CG1B by engagement of the clutch C3 and its rotation speed is made into [1], the rotation speed of the output shaft 26 is shown by the point (7th) at which a straight line connecting the intersection point of the vertical line Y1 and the horizontal line X2 to the intersection point of the vertical line Y2 and the horizontal line X1 crosses the vertical line Y4. Since, in the eighth speed gear stage, the second rotary element RE2 is connected to the first driven gear CG1B by engagement of the clutch C3 and its rotation speed is made into [1], and the first rotary element RE1 is connected to the transmission case 12 by engagement of the brake B1 and its rotation speed is made into [0], the rotation speed of the output shaft 26 is shown by the point (8th) at which a straight line connecting the intersection point of the vertical line Y2 and the horizontal line X1 to the intersection point of the vertical line Y1 and the horizontal line XZ crosses the vertical line Y4. Since, in the reverse gear stage, the first rotary element RE1 is connected to the second driven gear CG2B by engagement of the clutch C2 and its rotation speed is made into [NX2], and the second rotary element RE2 is connected to the transmission case 12 by engagement of the brake B2 and its rotation speed is made into [0], a negative rotation speed of the output shaft 26 is shown by the point (Rev1) at which a straight line connecting the intersection point of the vertical line Y1 and the horizontal line X2 to the intersection point of the vertical line Y2 and the horizontal line XZ crosses the vertical line Y4.

Figure 45:
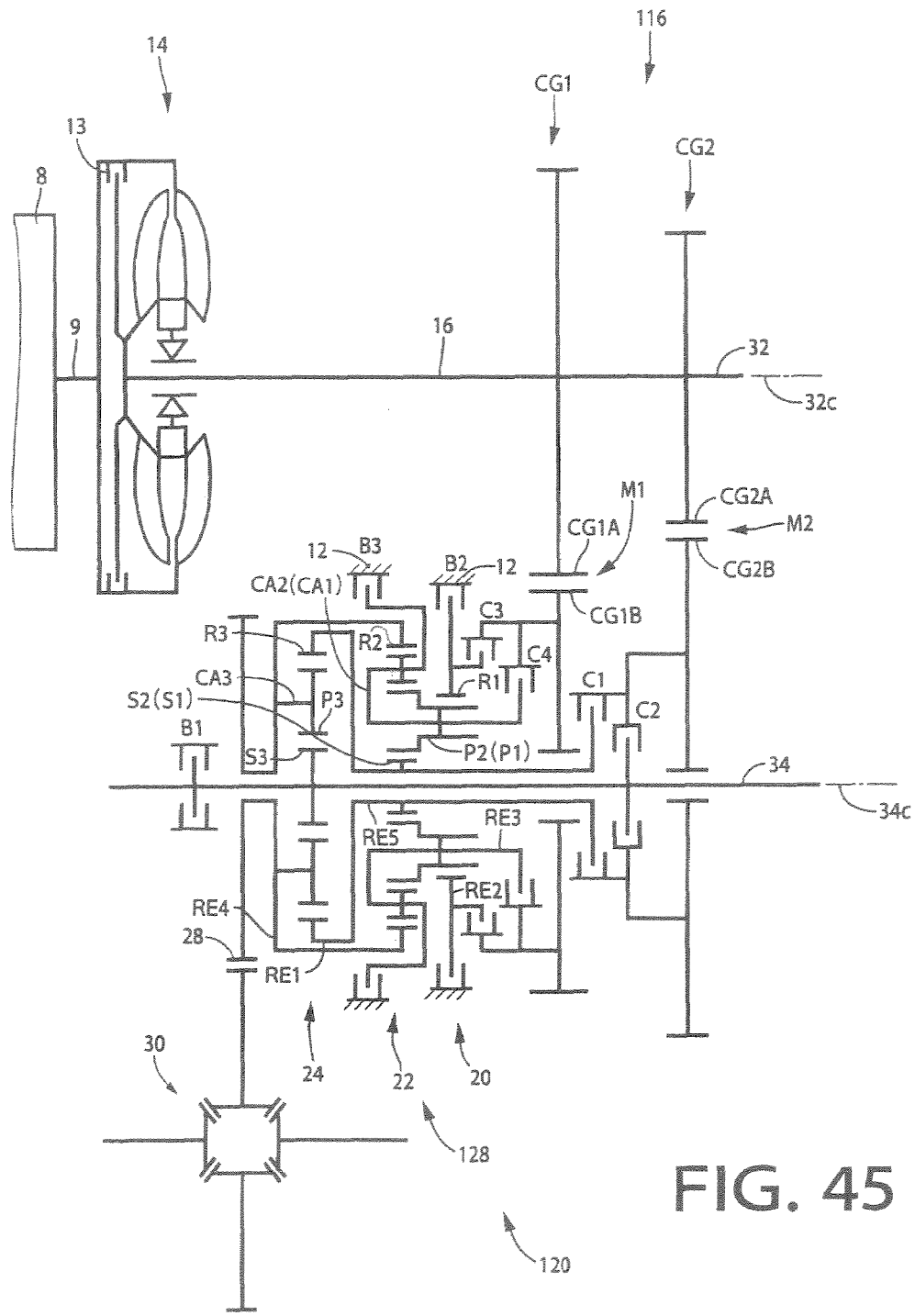
FIG. 45 is a view showing main points for describing a construction of a planetary gear type multistage transmission for vehicles according to still another embodiment of the present invention, corresponding to FIG. 42.
Figures 46, 47:
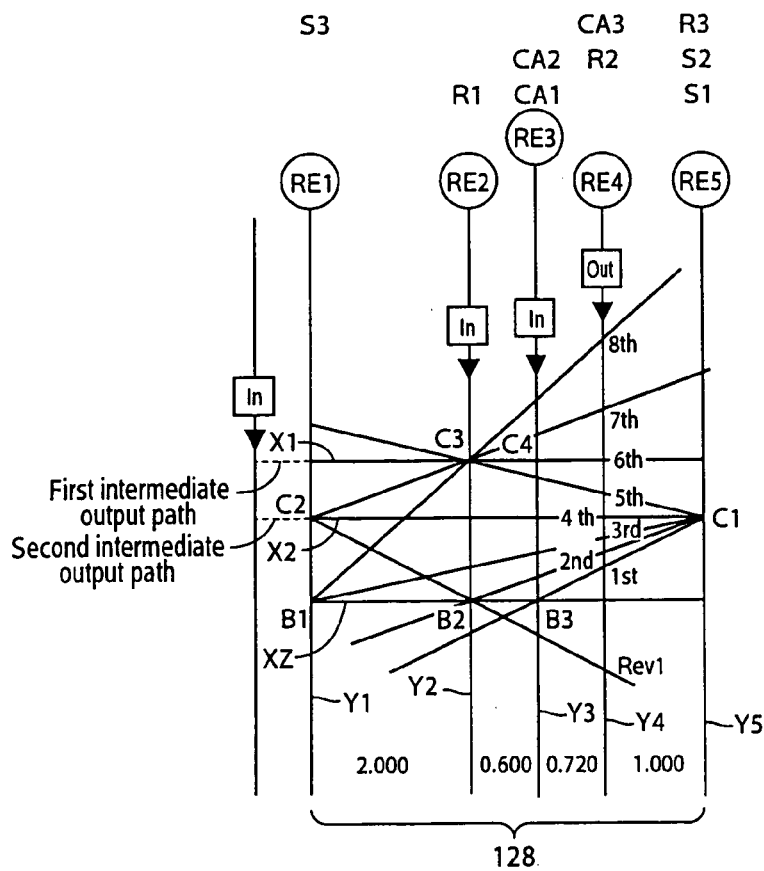
FIG. 46 is a chart showing another embodiment of the relationship between transmission gear stages of the planetary gear type multistage transmission for vehicles according to the embodiment shown in FIG. 45 and operations of hydraulic type friction engagement devices, which are required to establish the transmission gear stages, corresponding to FIG. 43.
FIG. 47 is a collinear chart describing another embodiment of the operations of the planetary gear type multistage transmission for vehicles according to the embodiment shown in FIG. 45, corresponding to FIG. 44.

FIG. 45 is a view showing main points for describing a construction of a transmission 120 according to still another embodiment of the present invention. FIG. 46 is a chart showing the relationship between the transmission gear stages of the transmission 120 and operations of hydraulic type friction engagement devices necessary to establish the transmission gear stages. FIG. 47 is a collinear chart showing the rotation speeds of the rotary elements in the respective gear stages. The present embodiment is the same as the embodiment shown in FIG. 42 through FIG. 44 except for that the arrangement of the torque converter 14 and that the brake B1 and the output rotating member is changed to the output gear 28, differ from those of the embodiment shown in FIG. 42 through FIG. 44. However, these embodiments are the same in the other construction and engagement operations. Therefore, effects similar to those of the embodiment shown in FIG. 42 through FIG. 44 can be obtained. The arrangement of the torque converter 14 is similar to that of the transmission 41 shown in FIG. 6, and FIG. 46 and FIG. 47 are similar to FIG. 43 and FIG. 44, respectively. Accordingly, the description thereof is omitted.

Figure 48:
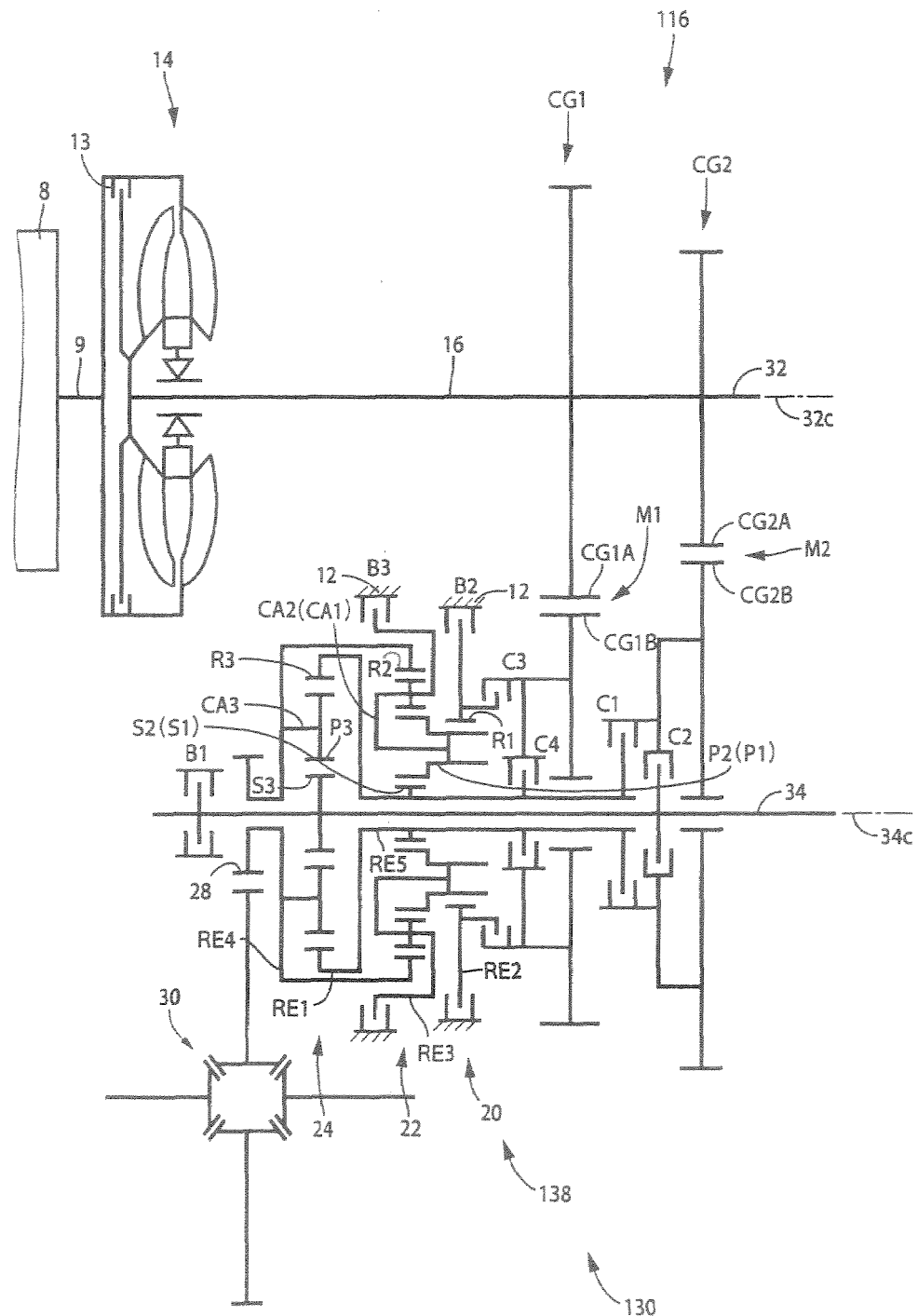
FIG. 48 is a view showing main points for describing a construction of a planetary gear type multistage transmission for vehicles according to still another embodiment of the present invention, corresponding to FIG. 45.
Figures 49, 50:
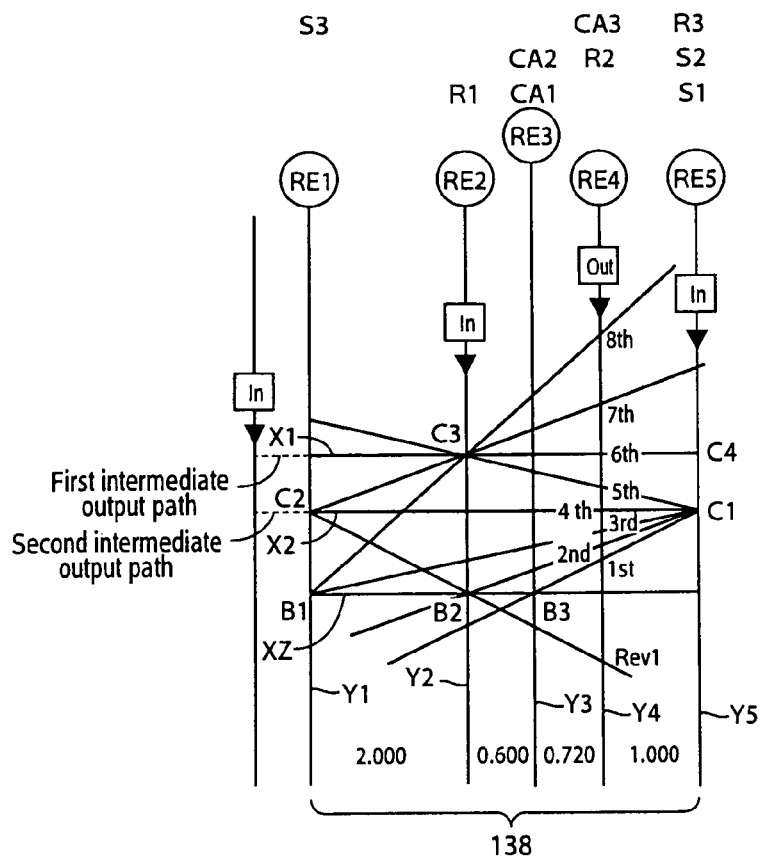
FIG. 49 is a chart showing the relationship between transmission gear stages of the planetary gear type multistage transmission for vehicles according to the embodiment shown in FIG. 48 and operations of hydraulic type friction engagement devices, which are required to establish the transmission gear stages, corresponding to FIG. 46.
FIG. 50 is a collinear chart describing operations of the planetary gear type multistage transmission for vehicles according to the embodiment shown in FIG. 48, corresponding to FIG. 47.

FIG. 48 is a view showing main points for describing a construction of a transmission 130 according to still another embodiment of the present invention. FIG. 49 is a chart showing the relationship between the transmission gear stages of the transmission 130 and operations of hydraulic type friction engagement devices necessary to establish the transmission gear stages. FIG. 50 is a collinear chart showing the rotation speeds of the rotary elements in the respective gear stages. The present embodiment is the same as the transmission 120 shown in FIG. 45, except for that the connections between the clutch C4 and respective devices of the transmission 130 differ from those of the transmission 120 shown in FIG. 45. Therefore, effects similar to those of the embodiment shown in FIG. 45 through FIG. 47 can be obtained. Hereinafter, a description is given of only the different parts between the transmission 130 and the transmission 120.

In the above-described transmission 120, the clutch C4 is disposed so that the first carrier CA1 and the second carrier CA2 connected to each other, which correspond to the third rotary element RE3, are selectively connected to the first driven gear CG1B. However, in the transmission 130 according to the present embodiment, the clutch C4 is disposed so that the first sun gear S1, the second sun gear S2, and the third ring gear R3 connected to each other, which correspond to the fifth rotary element RE5, are selectively connected to the first driven gear CG1B.

That is, in the second transmission portion 138, the third sun gear S3 is selectively connected to the second driven gear CG2B via the second clutch C2, and is selectively connected to the transmission case 12 operating as the non-operating member via the first brake B1. The first ring gear R1 is selectively connected to the first driven gear CG1B via the third clutch C3 and is selectively connected to the transmission case 12 via the second brake B2. The first carrier CA1 and the second carrier CA2 are connected to become integral with each other, and are selectively connected to the transmission case 12 via the third brake B3. The second ring gear R2 and the third carrier CA3 are connected to become integral with each other and are connected to the output gear 28 operating as the output rotating member. The first sun gear S1, the second sun gear S2 and the third ring gear R3 are connected to become integral with each other, are selectively connected to the first driven gear CG1B via the fourth clutch C4, and are selectively connected to the second driven gear CG2B via the first clutch C1.

In the transmission 130 constructed as described above, for example, as shown in FIG. 49 which is similar to the engagement operation chart of FIG. 46, since any two elements, which are selected among the first clutch C1, the second clutch C2, the third clutch C3, the fourth clutch C4, the first brake B1, the second brake B2 and the third brake B3, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios γ (=input shaft rotation speed $N_{IN}$/output shaft rotation speed $N_{OUT}$) which vary roughly at an equal ratio as in the embodiment shown in FIG. 45 through FIG. 47 can be obtained per gear stage. In addition, the transmission ratio width (=γ1/γ8) which is the ratio of the transmission ratio γ1 of the first speed gear stage to the transmission ratio γ8 of the eighth speed gear stage is made into a comparatively large value. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

FIG. 50 shows a collinear chart in the above-described transmission 130, which corresponds to FIG. 47 of the collinear chart showing the above-described transmission 120. As described above, the clutch C4 is disposed so that the fifth rotary element RE5 (sun gear S1, sun gear S2 and ring gear R3) is selectively connected to the first driven gear CG1B. Therefore, since, in the sixth speed gear stage, the second rotary element RE2 is connected to the first driven gear CG1B by engagement of the clutch C3 and its rotation speed is made into [1], and the fifth rotary element RE5 is connected to the first driven gear CG1B by engagement of the clutch C4 and its rotation speed is made into [1], the rotation speed of the output gear 28 is shown by the point (6th) at which a straight line connecting the intersection point of the vertical line Y2 and the horizontal line X1 to the intersection point of the vertical line Y5 and the horizontal line X1 crosses the vertical line Y4. Except for this point, FIG. 50 and FIG. 47 are the same in the form of the collinear chart. Accordingly, a description of parts other than the point in the collinear chart of FIG. 50 is omitted.

Figure 51:
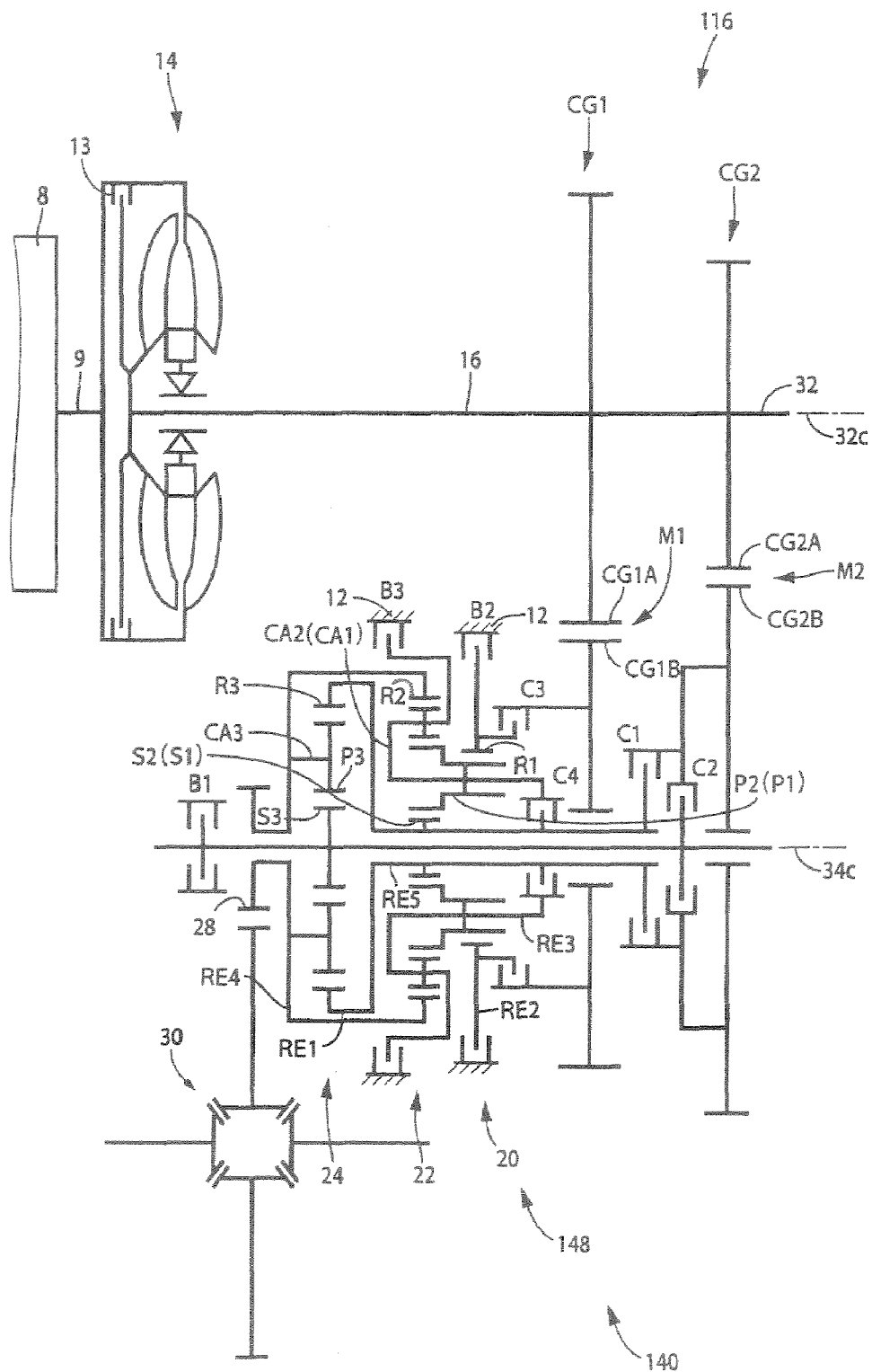
FIG. 51 is a view showing main points for describing a construction of a planetary gear type multistage transmission for vehicles according to still another embodiment of the present invention, corresponding to FIG. 45.
Figures 52, 53:
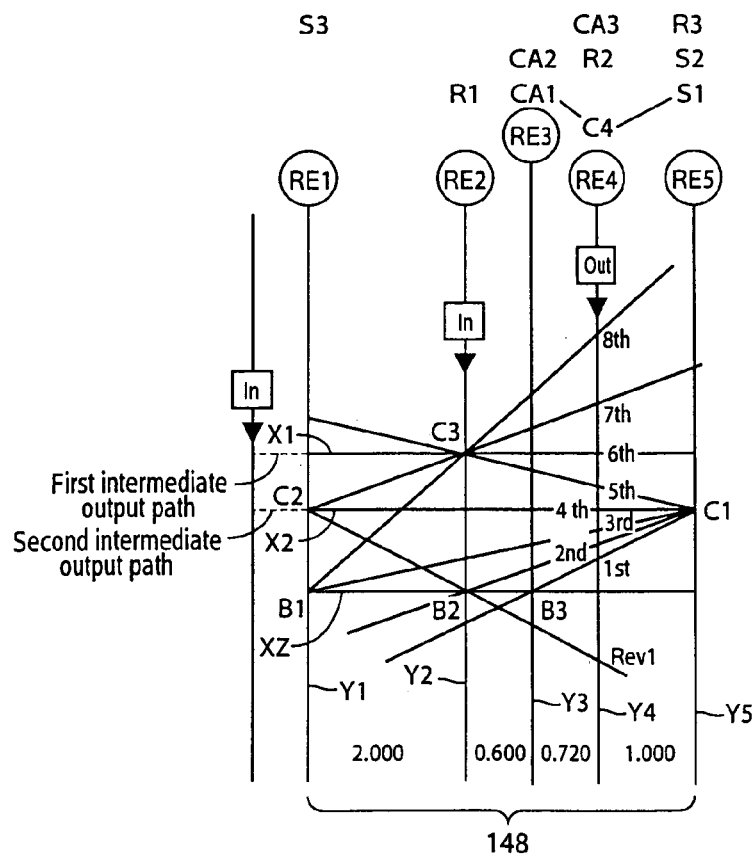
FIG. 52 is a chart showing another embodiment of the relationship between transmission gear stages of the planetary gear type multistage transmission for vehicles according to the embodiment shown in FIG. 51 and operations of hydraulic type friction engagement devices, which are required to establish the transmission gear stages, corresponding to FIG. 46.
FIG. 53 is a collinear chart describing another embodiment of the operations of the planetary gear type multistage transmission for vehicles according to the embodiment shown in FIG. 51, corresponding to FIG. 47.

FIG. 51 is a view showing main points for describing a construction of a transmission 140 according to another embodiment of the present invention. FIG. 52 is a chart showing the relationship between the transmission gear stages of the transmission 140 and operations of hydraulic type friction engagement devices necessary to establish the transmission gear stages. FIG. 53 is a collinear chart showing the rotation speeds of the rotary elements in the respective gear stages. The present embodiment is the same as the transmission 120 shown in FIG. 45 except for that the connections between the clutch C4 and respective devices of the transmission 140 differ from those of the transmission 120 shown in FIG. 45. Therefore, effects similar to those of the embodiment shown in FIG. 45 through FIG. 47 can be obtained. Hereinafter, a description is given of different points between the transmission 140 and the transmission 120.

In the above-described transmission 120, the clutch C4 is disposed so that the first carrier CA1 and the second carrier CA2 connected to each other, which correspond to the third rotary element RE3, are selectively connected to the first driven gear CG1B. However, in the transmission 140 according to the present embodiment, the clutch C4 is disposed so that the first carrier CA1 and the second carrier CA2 connected to each other, which correspond to the third rotary element RE3, are selectively connected to the first sun gear S1, the second sun gear S2, and the third ring gear R3 connected to each other, which correspond to the fifth rotary element RE5.

That is, in the second transmission portion 148, the third sun gear S3 is selectively connected to the second driven gear CG2B via the second clutch C2, and is selectively connected to the transmission case 12 operating as the non-operating member via the first brake B1. The first ring gear R1 is selectively connected to the first driven gear CG1B via the third clutch C3 and is selectively connected to the transmission case 12 via the second brake B2. The first carrier CA1 and the second carrier CA2 are connected to become integral with each other and are selectively connected to the transmission case 12 via the third brake B3. The second ring gear R2 and the third carrier CA3 are connected to become integral with each other and are connected to the output gear 28 operating as the output rotating member. The first sun gear S1, the second sun gear S2 and the third ring gear R3 are connected to become integral with each other, are selectively connected to the second driven gear CG2B via the first clutch C1, and further the first carrier CA1 and the second carrier CA2, which are connected to become integral with each other, are selectively connected, via the fourth clutch C4, to the first sun gear S1, the second sun gear S2, and the third ring gear R3, which are connected to become integral with each other.

In the transmission 140 constructed as described above, for example, as shown in FIG. 52 which is similar to the engagement operation chart of FIG. 46, since any two elements, which are selected among the first clutch C1, the second clutch C2, the third clutch C3, the fourth clutch C4, the first brake B1, the second brake B2 and the third brake B3, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios γ (=input shaft rotation speed $N_{IN}$/output shaft rotation speed $N_{OUT}$) which vary roughly at an equal ratio as in the embodiment shown in FIG. 45 through FIG. 47 can be obtained per gear stage. In addition, the transmission ratio width (=γ1/γ8) which is the ratio of the transmission ratio γ1 of the first speed gear stage to the transmission ratio γ8 of the eighth speed gear stage is made into a comparatively large value. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

FIG. 53 is a collinear chart in the above-described transmission 140, corresponding to FIG. 47 which is a collinear chart of the transmission 120. As described above, the clutch C4 is disposed so that the third rotary element RE3 (Carrier CA1 and carrier CA2) is selectively connected to the fifth rotary element RE5 (sun gear S1, sun gear S2 and ring gear R3). Therefore, since, in the sixth speed gear stage, the second rotary element RE2 is connected to the first driven gear CG1B by engagement of the clutch C3 and its rotation speed is made into [1], the third rotary element RE3 is connected to (coupled to) the fifth rotary element RE5 by engagement of the clutch C4, wherein the first planetary gear set 20, the second planetary gear set 22 and the third planetary gear set 24 are rotated at the rotation speed [1] integrally with each other, and the rotation speed of the output gear 28 is shown by the point (6th) on the vertical line Y4. Except for this point, FIG. 53 and FIG. 47 are identical to each other in the form of the collinear chart. Therefore, a description of parts other than this point concerning the collinear chart is omitted.

Figure 54:
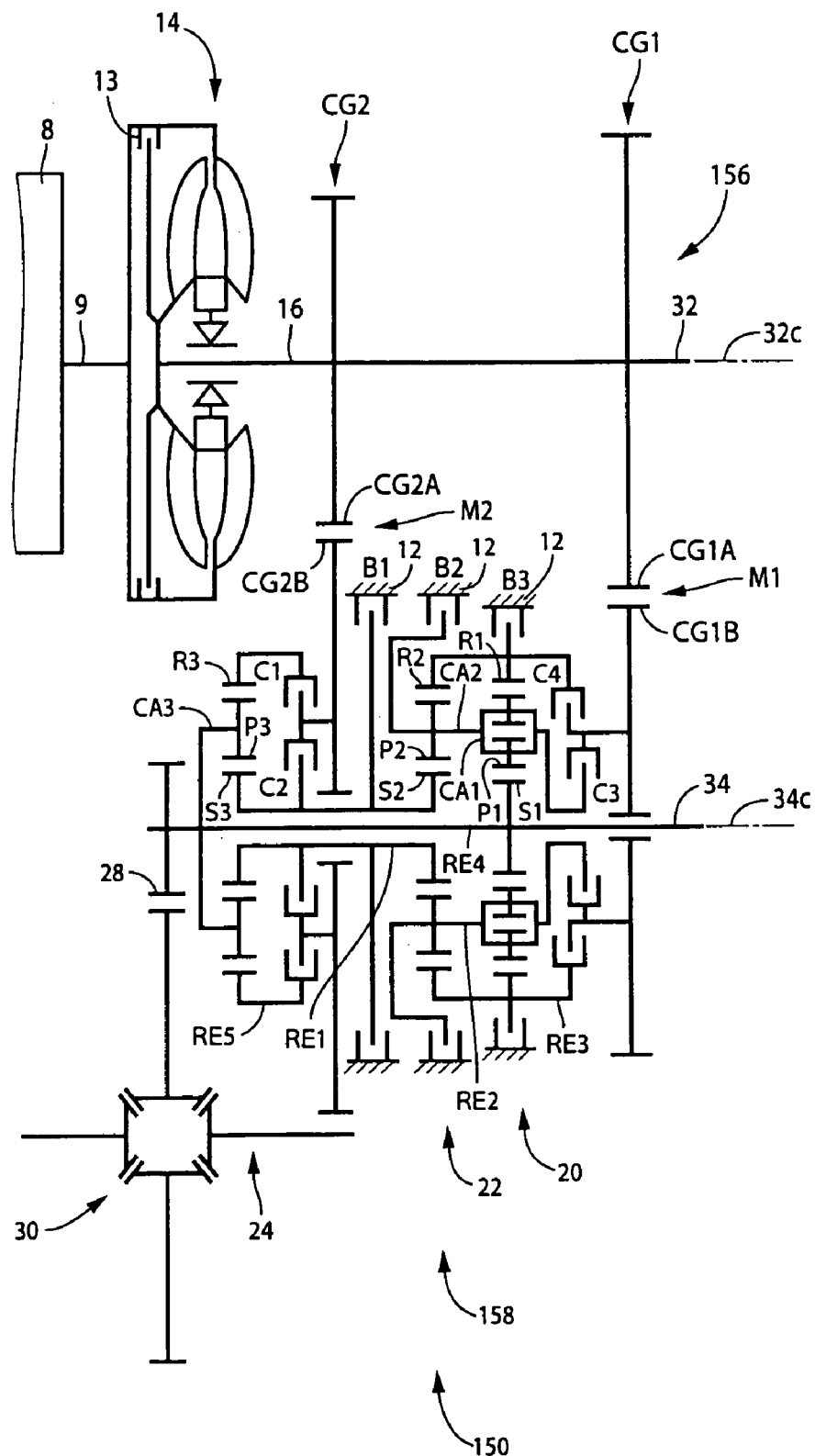
FIG. 54 is a view showing main points for describing a construction of a planetary gear type multistage transmission for vehicles according to still another embodiment of the present invention, corresponding to FIG. 45.
Figures 55, 56:
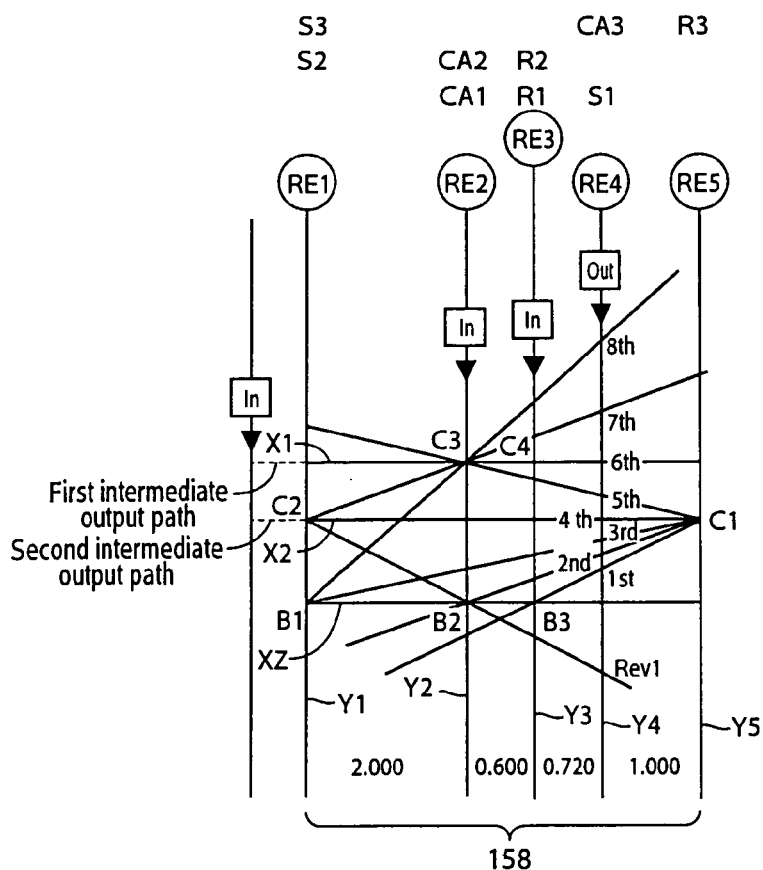
FIG. 55 is a chart showing the relationship between transmission gear stages of the planetary gear type multistage transmission for vehicles according to the embodiment shown in FIG. 54 and operations of hydraulic type friction engagement devices, which are required to establish the transmission gear stages, corresponding to FIG. 46.
FIG. 56 is a collinear chart describing operations of the planetary gear type multistage transmission for vehicles according to the embodiment shown in FIG. 54, corresponding to FIG. 47.

FIG. 54 is a view showing main points for describing a construction of a transmission 150 according to still another embodiment of the present invention. FIG. 55 is a chart showing the relationship between the transmission gear stages of the transmission 150 and operations of hydraulic type friction engagement devices necessary to establish the transmission gear stages. FIG. 56 is a collinear chart showing the rotation speeds of the rotary elements in the respective gear stages. The present embodiment is the same as the transmission 120 shown in FIG. 45, except for that the construction of respective devices of the second transmission portion 158 and the arrangement of the first transmission portion 156, differ from those of the transmission 120 shown in FIG. 45. Therefore, effects similar to those of the embodiment shown in FIG. 45 through FIG. 47 can be obtained. Hereinafter, a description is given of only the different parts between the transmission 150 and the transmission 120.

In the transmission 150 according to the present embodiment, as shown in FIG. 54, the first counter gear pair CG1 and the second counter gear pair CG2, which compose the first transmission 156, are disposed so that the first planetary gear set 20 and the second planetary gear set 22, which compose the second transmission portion 158 is placed therebetween. Thus, the axial length of the transmission 150 can be kept compact as in the transmission 120, and valve bodies of hydraulic control circuits of an oil pump and hydraulic type friction engagement devices can be disposed in the empty spacing above the first axial center 32c between the first counter gear pair CG1 and the second counter gear pair CG2, wherein connections of oil paths of the transmission 150 can be facilitated.

In the present embodiment, the first planetary gear set 20 that composes the second transmission portion 158 of the transmission 150 shown in FIG. 54 described above is composed of a double-pinion type planetary gear set, and the second planetary gear set 22 and the third planetary gear set 24 are composed of a single-pinion type planetary gear set, respectively. The first planetary gear set 20 is provided with the first sun gear S1, a plurality of pairs of the first planetary gears P1 engaged with each other, the first carrier CA1 that supports the first planetary gears P1 so as to cause the same to rotate and to revolve it, and the first ring gear R1 engaged with the first sun gear S1 via the first planetary gears P1, and has a prescribed gear ratio ρ1 of, for example, [0.455] or so. The second planetary gear set 22 is provided with the second sun gear S2, the second planetary gear P2, the second carrier CA2 that supports the second planetary gear P2 so as to cause the same to rotate and to revolve it, and the second ring gear R2 engaged with the second sun gear S2 via the second planetary gear P2 and has a prescribed gear ratio ρ2 of, for example, [0.300] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.301] or so.

Also, in the above-described first planetary gear set 20 and the second planetary gear set 22, the first carrier CA1 and the second carrier CA2 are composed of a common component, and the first ring gear R1 and the second ring gear R2 are also composed of a common component, wherein the second planetary gear P2 may be made into a Ravineaux type planetary gear train which is concurrently used as any one of a pair of the first planetary gears P1 engaged with each other. Also, the above-described second planetary gear set P2 may have different diameters (different numbers of teeth) at the first planetary gear set 20 side and at the second planetary gear set 22 side.

In the above-described second transmission portion 158, the second sun gear S2 and the third sun gear S3 are connected to become integral with each other, are selectively connected to the second driven gear CG2B via the second clutch C2, and are selectively connected to the transmission case 12 operating as the non-rotating member via the first brake B1. The first carrier CA1 and the second carrier CA2 are connected to become integral with each other, are selectively connected to the first driven gear CG1B via the third clutch C3, and are selectively connected to the transmission case 12 via the second brake B2. The first ring gear R1 and the second ring gear R2 are connected to become integral with each other, are selectively connected to the first driven gear CG1B via the fourth clutch C4, and are selectively connected to the transmission case 12 via the third brake B3. The first sun gear S1 and the third carrier CA3 are connected to become integral with each other and are connected to the output gear 28 operating as the output rotating member. The third ring gear R3 is selectively connected to the second driven gear CG2B via the first clutch C1.

In the transmission 150 constructed as described above, for example, as shown in FIG. 55 which is similar to an engagement operation chart of FIG. 46, since any two elements, which are selected among the first clutch C1, the second clutch C2, the third clutch C3, the fourth clutch C4, the first brake B1, the second brake B2 and the third brake B3, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios γ (=input shaft rotation speed $N_{IN}$/output shaft rotation speed $N_{OUT}$) which vary roughly at an equal ratio as in the embodiment shown in FIG. 39 through FIG. 41 can be obtained per gear stage. In addition, the transmission ratio width (=γ1/γ8) which is the ratio of the transmission ratio γ1 of the first speed gear stage to the transmission ratio γ8 of the eighth speed gear stage is made into a comparatively large value. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

FIG. 56 is a collinear chart in the above-described transmission 150, corresponding to FIG. 47 which is a collinear chart of the transmission 120. Five vertical lines Y1 through Y5 of the second transmission portion 158 in FIG. 56 represent, in order from the left side, the sun gear S2 and sun gear S3 connected to each other, which correspond to the first rotary element RE1, the carrier CA1 and carrier CA2 connected to each other, which correspond to the second rotary element RE2, the ring gear R1 and ring gear R2 connected to each other, which correspond to the third rotary element RE3, the sun gear S1 and the carrier CA3 connected to each other, which correspond to the fourth rotary element RE4, and the ring gear R3 corresponding to the fifth rotary element RE5, respectively. Therefore, on the basis of these rotary elements, FIG. 56 differs from FIG. 47 only in the construction of the respective rotary elements. These drawings are the same in the form of the collinear chart. Accordingly, a description of the collinear chart of FIG. 50 is omitted.

Figure 57:
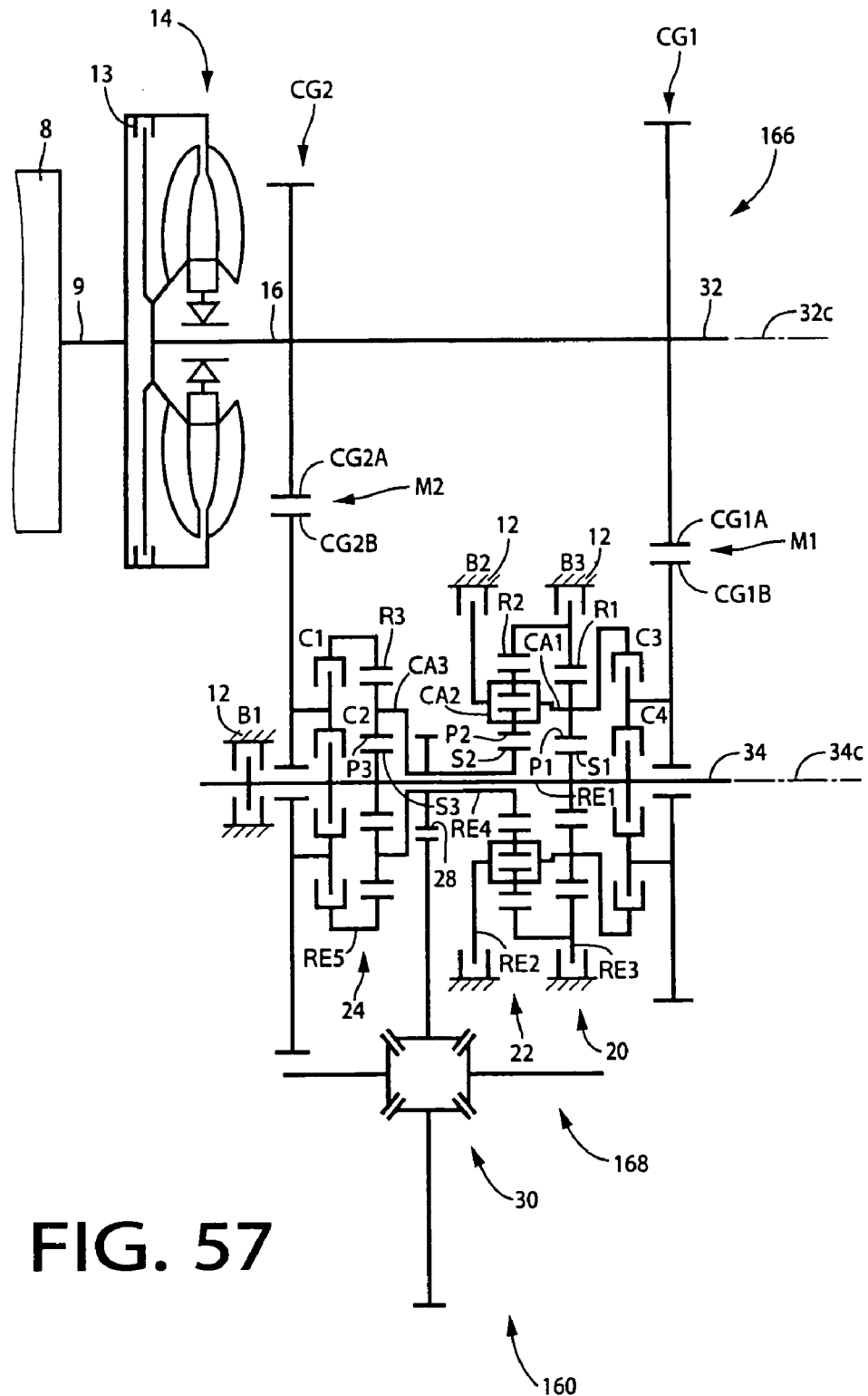
FIG. 57 is a view showing main points for describing a construction of a planetary gear type multistage transmission for vehicles according to still another embodiment of the present invention, corresponding to FIG. 45.
Figures 58, 59:
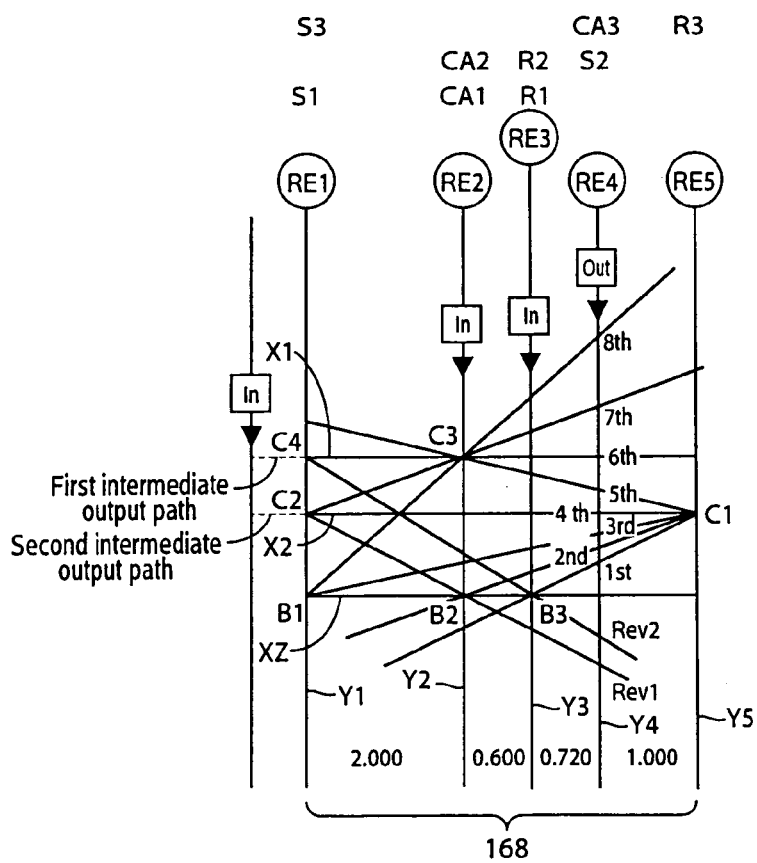
FIG. 58 is a chart showing another embodiment of the relationship between transmission gear stages of the planetary gear type multistage transmission for vehicles according to the embodiment shown in FIG. 57 and operations of hydraulic type friction engagement devices, which are required to establish the transmission gear stages, corresponding to FIG. 46.
FIG. 59 is a collinear chart describing another embodiment of the operations of the planetary gear type multistage transmission for vehicles according to the embodiment shown in FIG. 57, corresponding to FIG. 47.

FIG. 57 is a view showing main points for describing a construction of a transmission 160 according to another embodiment of the present invention. FIG. 58 is a chart showing the relationship between the transmission gear stages of the transmission 160 and operations of hydraulic type friction engagement devices necessary to establish the transmission gear stages. FIG. 59 is a collinear chart showing the rotation speeds of the rotary elements in the respective gear stages. The present embodiment is the same as the transmission 120 shown in FIG. 45 except for that the connections between the clutch C4 and respective devices of the transmission 160, the construction of respective devices of the second transmission portion 168 and arrangement of the first transmission portion 166, differ from those of the transmission 120 shown in FIG. 45. Therefore, effects similar to those of the embodiment shown in FIG. 45 through FIG. 47 can be obtained. Hereinafter, a description is given of different points between the transmission 160 and the transmission 120.

In the transmission 160 according to the present embodiment, as shown in FIG. 57, the first counter gear pair CG1 and the second counter gear pair CG2, which compose the first transmission 166, are disposed so as for the second transmission portion 168 to be placed therebetween. Thus, the axial length of the transmission 160 can be kept compact as in the transmission 120, and valve bodies of hydraulic control circuits of an oil pump and hydraulic type friction engagement devices can be disposed in the empty spacing above the first axial center 32c between the first counter gear pair CG1 and the second counter gear pair CG2, wherein connections of oil paths of the transmission 160 can be facilitated.

In the present embodiment, the first planetary gear set 20 and the third planetary gear set 24 that compose the second transmission portion 168 of the transmission 160 shown in FIG. 57 described above are composed of a single-pinion type planetary gear set, respectively, and the second planetary gear set 22 is composed of a double-pinion type planetary gear set. The first planetary gear set 20 is provided with the first sun gear S1, the first planetary P1, the first carrier CA1 that supports the first planetary P1 so as to cause the same to rotate and to revolve it, and the first ring gear R1 engaged with the first sun gear S1 via the first planetary gear P1, and has a prescribed gear ratio ρ1 of, for example, [0.300] or so. The second planetary gear set 22 is provided with the second sun gear S2, a plurality of pairs of the second planetary gears P2 engaged with each other, the second carrier CA2 that supports the second planetary gears P2 so as to cause the same to rotate and to revolve it, and the second ring gear R2 engaged with the second sun gear S2 via the second planetary gears P2 and has a prescribed gear ratio ρ2 of, for example, [0.455] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.301] or so.

Also, in the above-described first planetary gear set 20 and the second planetary gear set 22, the first carrier CA1 and the second carrier CA2 are composed of a common component, and the first ring gear R1 and the second ring gear R2 are also composed of a common component, wherein the first planetary gear P1 may be made into a Ravineaux type planetary gear train which is concurrently used as any one of a pair of the second planetary gears P2 engaged with each other. Also, the above-described first planetary gear P1 may have different diameters (different numbers of teeth) at the first planetary gear set 20 side and at the second planetary gear set 22 side.

In the above-described second transmission portion 168, the first sun gear S1 and the third sun gear S3 are connected to become integral with each other, are selectively connected to the second driven gear CG2B via the second clutch C2, and are selectively connected to the first driven gear CG1B via the fourth clutch C4 and are selectively connected to the transmission case 12 via the first brake B1. The first carrier CA1 and the second carrier CA2 are connected to become integral with each other, are selectively connected to the first driven gear CG1B via the third clutch C3, and are selectively connected to the transmission case 12 via the second brake B2. The first ring gear R1 and the second ring gear R2 are connected to become integral with each other and are selectively connected to the transmission case 12 via the third brake B3. The second sun gear S2 and the third carrier CA3 are connected to become integral with each other and are connected to the output gear 28 operating as the output rotating member. The third ring gear R3 is selectively connected to the second driven gear CG2B via the first clutch C1.

In the transmission 160 constructed as described above, for example, as shown in FIG. 58 in which the second reverse gear stage is added to the engagement operation chart of FIG. 46, since any two elements, which are selected among the first clutch C1, the second clutch C2, the third clutch C3, the fourth clutch C4, the first brake B1, the second brake B2 and the third brake B3, are simultaneously engaged and operated with each other, any one of the first speed gear stage (the first transmission stage) through the eighth speed gear stage (the eighth transmission stage) or any one of the first reverse gear stage (the first reverse transmission stage) and the second reverse gear stage (the second reverse transmission stage) is selectively established, and transmission ratios γ (=input shaft rotation speed $N_{IN}$/output shaft rotation speed $N_{OUT}$) which vary roughly at an equal ratio as in the embodiment shown in FIG. 45 through FIG. 47 can be obtained per gear stage. In addition, the transmission ratio width (=γ1/γ8) which is the ratio of the transmission ratio γ1 of the first speed gear stage to the transmission ratio γ8 of the eighth speed gear stage is made into a comparatively large value. Here, a description is given of the second reverse gear stage added. Since, by engagement of the second clutch C2 with the second brake B2, the first sun gear S1 and the third sun gear S3 are, respectively, connected to the second driven gear CG2B, and the first carrier CA1 and the second carrier CA2 are, respectively, connected to the transmission case 12, the first reverse gear stage whose transmission ratio γR1 is a value, for example, [2.644] or so, between the second speed gear stage and the third speed gear stage is established. Also, since, by engagement of the fourth clutch C4 with the third brake B3, the first sun gear S1 and the third sun gear S3 are, respectively, connected to the first driven gear CG1B, and the first ring gear R1 and the second ring gear R2 are, respectively, connected to the transmission case 12, the second reverse gear stage whose transmission ratio γR2 is larger than the first reverse transmission stage and is a value, for example, [3.611], between the first speed gear stage and the second speed gear stage is established. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

FIG. 59 is a collinear chart in the above-described transmission 160, corresponding to FIG. 47 which is a collinear chart of the transmission 120. Five vertical lines Y1 through Y5 of the second transmission portion 168 in FIG. 59 represent, in order from the left side, the sun gear S1 and sun gear S3 connected to each other, which correspond to the first rotary element RE1, the carrier CA1 and carrier CA2 connected to each other, which correspond to the second rotary element RE2, the ring gear R1 and ring gear R2 connected to each other, which correspond to the third rotary element RE3, the sun gear S2 and the carrier CA3 connected to each other, which correspond to the fourth rotary element RE4, and the ring gear R3 corresponding to the fifth rotary element RE5, respectively. FIG. 59 mainly differs from FIG. 47 in the connections between the clutch C4 and respective rotary elements, and the second reverse gear stage being shown. The clutch C4 is disposed so that the first rotary element RE1 (sun gear S1 and sun gear S3) is selectively connected to the first driven gear CG1B. Therefore, since, in the sixth speed gear stage, the second rotary element RE2 is connected to the first driven gear by engagement of the clutch C3 and its rotation speed is made into [1], and the first rotary element RE1 is connected to the first driven gear CG1B by engagement of the clutch C4 and its rotation speed is made into [1], the rotation speed of the output gear 28 is shown by the point (6th) at which a straight line connecting the intersection point of the vertical line Y2 and the horizontal line X1 to the intersection point of the vertical line Y1 and the horizontal line X1 crosses the vertical line Y4. In addition, since, in the first reverse gear stage, the first rotary element RE1 is connected to the second driven gear CG2B by engagement of the clutch C2 and its rotation speed is made into [NX2], and the second rotary element RE2 is connected to the transmission case 12 by engagement of the brake B2 and its rotation speed is made into [0], a negative rotation speed of the output gear 28 is shown by the point (Rev1) at which a straight line connecting the intersection point of the vertical line Y1 and the horizontal line X2 to the intersection point of the vertical line Y2 and the horizontal line XZ crosses the vertical line Y4. Since, in the second reverse gear stage, the first rotary element RE1 is connected to the first driven gear CG1B by engagement of the clutch C4 and its rotation speed is made into [1], and the third rotary element. RE3 is connected to the transmission case 12 by engagement of the brake B3 and its rotation speed is made into [0], a negative rotation speed of the output gear 28 is shown by the point (Rev2) at which a straight line connecting the intersection point of the vertical line Y1 and the horizontal line X1 to the intersection point of the vertical line Y3 and the horizontal line XZ crosses the vertical line Y4. Except for this point, FIG. 59 and FIG. 47 are identical to each other in the form of the collinear chart, wherein a description is given of only parts, other than this point, of the collinear chart of FIG. 59.

As described above, according to the present embodiment, in addition to that effects similar to those of the embodiment shown in FIG. 45 through FIG. 47 are brought about, since the first reverse transmission stage is established by engaging the second clutch C2 with the second brake B2, and the second reverse transmission stage whose transmission ratio is larger than that of the first reverse transmission stage is established by engaging the fourth clutch C4 with the third brake B3, seven or more forward transmission gear stages and two reverse transmission gear stages can be obtained. For example, where a greater drive force is required, that is, in the case of reverse on an uphill road, the second reverse transmission stage having a larger transmission ratio is used, and in the case of reverse on a flat road, the first reverse transmission stage having a smaller transmission ratio than that of the second reverse transmission stage is used, such an effect can be brought about, by which fuel consumption can be saved.

Figure 60:
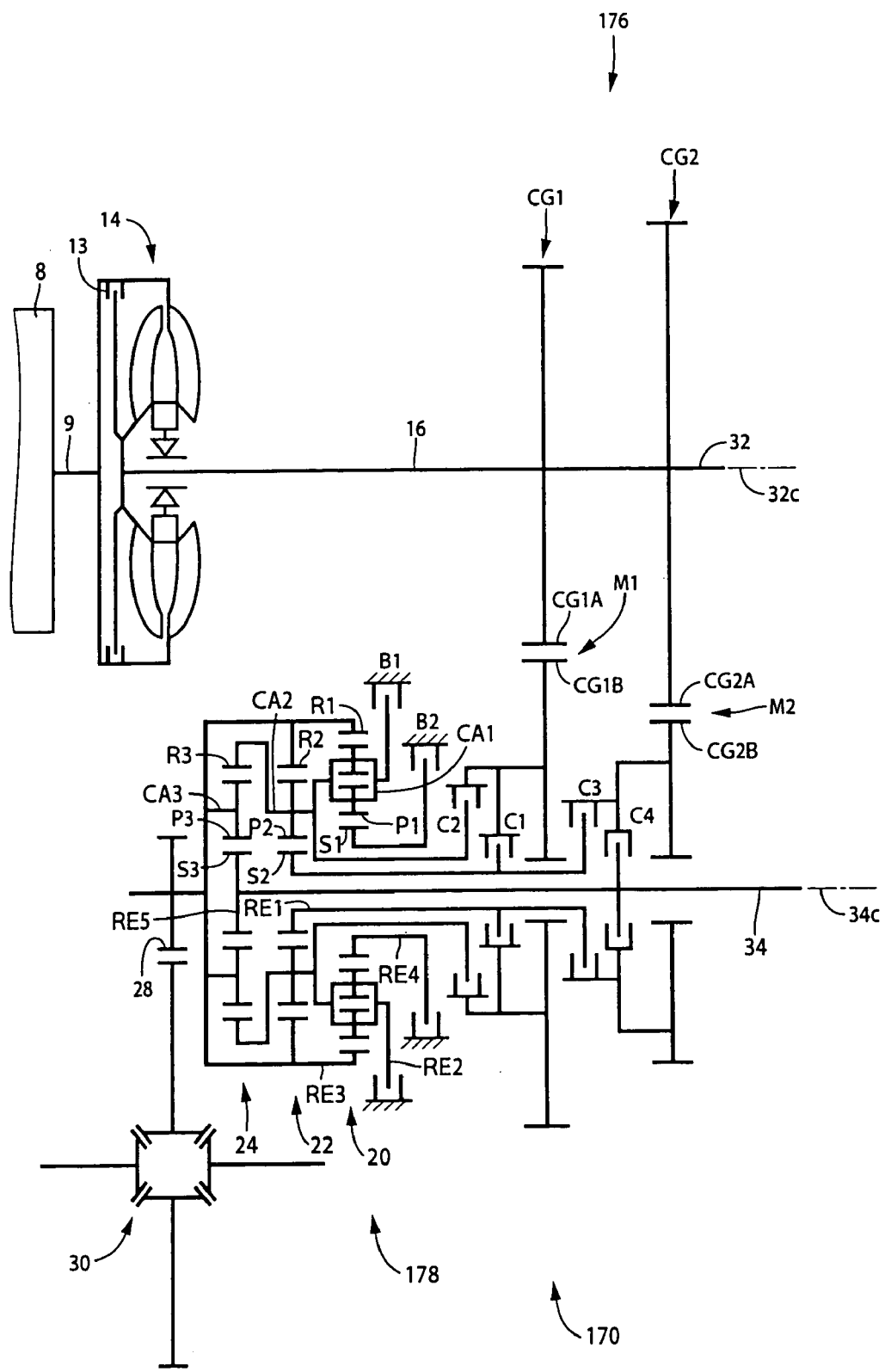
FIG. 60 is a view showing main points for describing a construction of a planetary gear type multistage transmission for vehicles according to still another embodiment of the present invention, corresponding to FIG. 6.
Figures 61, 62:
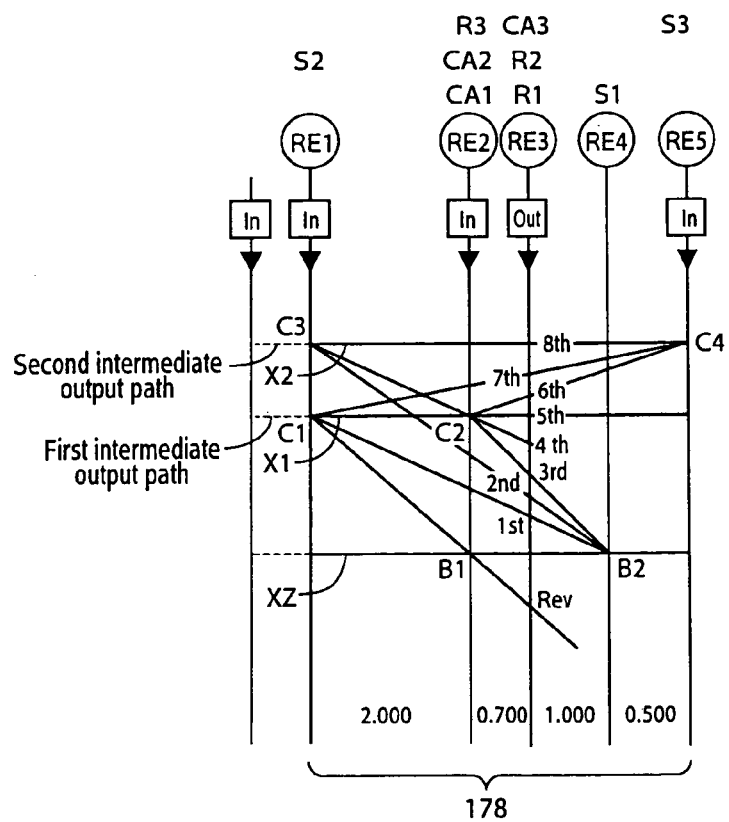
FIG. 61 is a chart showing the relationship between transmission gear stages of the planetary gear type multistage transmission for vehicles according to the embodiment shown in FIG. 60 and operations of hydraulic type friction engagement devices, which are required to establish the transmission gear stages, corresponding to FIG. 7.
FIG. 62 is a collinear chart describing operations of the planetary gear type multistage transmission for vehicles according to the embodiment shown in FIG. 60, corresponding to FIG. 8.

FIG. 60 is a view showing main points for describing a construction of a transmission 170 according to still another embodiment of the present invention. FIG. 61 is a chart showing the relationship between the transmission gear stages of the transmission 170 and operations of hydraulic type friction engagement devices necessary to establish the transmission gear stages. FIG. 62 is a collinear chart showing the rotation speeds of the rotary elements in the respective gear stages. The present embodiment is the same as the transmission 41 shown in FIG. 6, except for that the construction of respective devices of the second transmission portion 178 differs from that of transmission 41 and the matters related to the rotation speeds of the first counter gear pair CG1 and the second counter gear pair CG2, which compose the first transmission portion 176, are opposite to those of the transmission 41. Therefore, effects similar to those of the embodiment shown in FIG. 6 through FIG. 8 can be obtained. Hereinafter, a description is given of only the different parts between the transmission 170 and the transmission 41.

With respect to the first counter gear pair CG1 and the second counter gear pair CG2, which compose the first transmission portion 176 of the transmission 170 shown in FIG. 60 described above, for example, the speed reduction ratio of the first counter gear pair CG1 is set to [1.000] or so, and that of the second counter gear pair CG2 is set to [0.630]. The first transmission portion 176 transmits (outputs) rotations of the input shaft 16, that is, rotations of the first axis 32 to the second transmission portion 178 via the first intermediate output path M1 and the second intermediate output path M2 accelerated and rotated with respect to the first intermediate output path M1.

In the present embodiment, the first planetary gear set 20 that composes the second transmission portion 178 of the transmission 170 shown in FIG. 60 described above is composed of a double-pinion type planetary gear set, and the second planetary gear set 22 and the third planetary gear set 24 are composed of a single-pinion type planetary gear set, respectively. The first planetary gear set 20 is provided with the first sun gear S1, a plurality of pairs of the first planetary gears P1 engaged with each other, the first carrier CA1 that supports the first planetary gears P1 so as to cause the same to rotate and to revolve it, and the first ring gear R1 engaged with the first sun gear S1 via the first planetary gears P1, and has a prescribed gear ratio ρ1 of, for example, [0.412] or so. The second planetary gear set 22 is provided with the second sun gear S2, the second planetary gear P2, the second carrier CA2 that supports the second planetary gear P2 so as to cause the same to rotate and to revolve it, and the second ring gear R2 engaged with the second sun gear S2 via the second planetary gear P2 and has a prescribed gear ratio ρ2 of, for example, [0.350] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.467] or so.

In the above-described second transmission portion 178, the second sun gear S2 is selectively connected to the first driven gear CG1B via the first clutch C1, and is selectively connected to the second driven gear CG2B via the third clutch C3. The first carrier CA1, the second carrier CA2 and the third ring gear R3 are connected to become integral with each other, are selectively connected to the first driven gear CG1B via the second clutch C2, and are selectively connected to the transmission case 12 operating as the non-rotating member via the first brake B1. The first ring gear R1, the second ring gear R2 and the third carrier CA3 are connected to become integral with each other and are connected to the output gear 28 operating as the output rotating member. The first sun gear S1 is selectively connected to the transmission case 12 operating the non-rotating member via the second brake B2. The third sun gear S3 is selectively connected to the second driven gear CG2B via the fourth clutch C4.

In the transmission 170 constructed as described above, for example, as shown in the engagement operation chart of FIG. 61, since any two elements, which are selected among the first clutch C1, the second clutch C2, the third clutch C3, the fourth clutch C4, the first brake B1 and the second brake B2, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios γ (=input shaft rotation speed $N_{IN}$/output shaft rotation speed $N_{OUT}$) which vary roughly at an equal ratio can be obtained per gear stage.

That is, as shown in FIG. 61, since, by engagement of the first clutch C1 with the second brake B2, the second sun gear S2 is connected to the first driven gear CG1B, and the first sun gear S1 is connected to the transmission case 12, the first speed gear stage whose transmission ratio γ1 is the maximum value, for example, [3.700] is established. Also, since, by engagement of the third clutch C3 with the second brake B2, the second sun gear S2 is connected to the second driven gear CG2B, and the first sun gear S1 is connected to the transmission case 12, the second speed gear stage whose transmission ratio γ2 is a smaller value of, for example, [2.330] or so, than the first speed gear stage is established. Since, by engagement of the second clutch C2 with the second brake B2, the first carrier CA1, the second carrier CA2 and the third ring gear R3 are, respectively, connected to the first driven gear CG1B, and the first sun gear S1 is connected to the transmission case 12, the third speed gear stage whose transmission ratio γ3 is a smaller value of, for example, [1.700] or so, than the second speed gear stage is established. Further, since, by engagement of the second clutch C2 with the third clutch C3, the first carrier CA1, the second carrier CA2 and the third ring gear R3 are, respectively, connected to the first driven gear CG1B, and the second sun gear S2 is connected to the second driven gear CG2B, the fourth speed gear stage whose transmission ratio $\gamma 4$ is a smaller value of, for example, [1.259] or so, than the third speed gear stage is established. In addition, since, by engagement of the first clutch C1 with the second clutch C2, the second sun gear S2 is connected to the first driven gear CG1B, and the first carrier CA1, the second carrier CA2 and the third ring gear R3 are, respectively, connected to the first driven gear CG1B, the fifth speed gear stage whose transmission ratio $\gamma 5$ is a smaller value of, for example, [1.000] or so, than the fourth speed gear stage is established. In addition, since, by engagement of the second clutch C2 with the fourth clutch C4, the first carrier CA1, the second carrier CA2 and the third ring gear R3 are, respectively, connected to the first driven gear CG1B, and the third sun gear S3 is connected to the second driven gear CG2B, the sixth speed gear stage whose transmission ratio $\gamma 6$ is a smaller value of, for example, [0.842] or so, than the fifth speed gear stage is established. Also, since, by engagement of the first clutch C1 with the fourth clutch C4, the second sun gear S2 is connected to the first driven gear CG1B, and the third sun gear S3 is connected to the second driven gear CG2B, the seventh speed gear stage whose transmission ratio $\gamma 7$ is a smaller value of, for example, [0.726] or so, than the sixth speed gear stage is established. And, since, by engagement of the third clutch C3 with the fourth clutch C4, the second sun gear S2 is connected to the second driven gear CG2B, and the third sun gear S3 is connected to the second driven gear CG2B, the eighth speed gear stage whose transmission ratio $\gamma 8$ is a smaller value of, for example, [0.630] or so, than the seventh speed gear stage is established.

Also, since, by engagement of the first clutch C1 with the first brake B1, the second sun gear S2 is connected to the first driven gear CG1B, and the first carrier CA1, the second carrier CA2 and the third ring gear R3 are, respectively, connected to the transmission case 12, a reverse gear stage whose transmission ratio $\gamma R$ is a value, for example, [2.857], between the first speed gear stage and the second speed gear stage is established. The speed reduction ratio of the first counter gear pair CG1, the speed reduction ratio of the second counter gear pair CG2, gear ratio $\rho 1$ of the first planetary gear set 20, gear ratio $\rho 2$ of the second planetary gear set 22 and gear ratio $\rho 3$ of the third planetary gear set 24 are established so as to obtain the above-described transmission ratios.

In the above-described transmission 170, the ratio ($=\gamma 1/\gamma 2$) of the transmission ratio $\gamma 1$ of the first speed gear stage to the transmission ratio $\gamma 2$ of the second speed gear stage is made into [1.588], the ratio ($=\gamma 2/\gamma 3$) of the transmission ratio $\gamma 2$ of the second speed gear stage to the transmission ratio $\gamma 3$ of the third speed gear stage is made into [1.370], the ratio ($=\gamma 3/\gamma 4$) of the transmission ratio $\gamma 3$ of the third speed gear stage to the transmission ratio $\gamma 4$ of the fourth speed gear stage is made into [1.350], the ratio ($=\gamma 4/\gamma 5$) of the transmission ratio $\gamma 4$ of the fourth speed gear stage to the transmission ratio $\gamma 5$ of the fifth speed gear stage is made into [1.259], the ratio ($=\gamma 5/\gamma 6$) of the transmission ratio $\gamma 5$ of the fifth speed gear stage to the transmission ratio $\gamma 6$ of the sixth speed gear stage is made into [1.187], the ratio ($=\gamma 6/\gamma 7$) of the transmission ratio $\gamma 6$ of the sixth speed gear stage to the transmission ratio $\gamma 7$ of the seventh speed gear stage is made into [1.161], and the ratio ($=\gamma 7/\gamma 8$) of the transmission ratio $\gamma 7$ of the seventh speed gear stage to the transmission ratio $\gamma 8$ of the eighth speed gear stage is made into [1.152], wherein the respective transmission ratios $\gamma$ vary roughly at an equal ratio. Also, in the above-described transmission 170, the transmission ratio width ($=\gamma 1/\gamma 8$) which is the ratio of the transmission ratio $\gamma 1$ of the first speed gear stage to the transmission ratio $\gamma 8$ of the eighth speed gear stage is made into a comparatively large value, that is, [5.876].

FIG. 62 is a collinear chart of the above-described transmission 170, corresponding to FIG. 8 which is a collinear chart of the above-described transmission 41. The lowermost horizontal line XZ of the three horizontal lines of the collinear chart of FIG. 62 shows that the rotation speed is zero, the horizontal line X1 immediately thereabove shows that the rotation speed is [1.0], that is, the rotation speed of the first intermediate output path M1, and the uppermost horizontal line X2 shows a prescribed rotation speed [NX2] accelerated and rotated with respect to the first intermediate output path M1 in response to the speed reduction ratio of the second counter gear pair CG2, that is, the rotation speed of the second intermediate output path M2. In addition, five vertical lines Y1 through Y5 of the second transmission portion 178 represent, in order from the left side, the sun gear S2 corresponding to the first rotary element RE1, the carrier CA1, carrier CA2 and ring gear R3 connected to each other, which correspond to the second rotary element RE2, the ring gear R1, ring gear R2 and carrier CA3 connected to each other, which correspond to the third rotary element RE3, the sun gear S1 corresponding to the fourth rotary element RE4 and the sun gear S3 corresponding to the fifth rotary element RE5, respectively.

If expressed utilizing the above-described collinear chart, the transmission 170 according to the present embodiment is constructed so that, in the first transmission portion 176, rotations of the input shaft 16 (rotations of the first axis 32) are outputted to the second transmission portion 178 via the first intermediate output path M1 and the second intermediate output path M2 accelerated and rotated with respect to the first intermediate output path M1. Also, the transmission 170 is constructed so that, in the second transmission portion 178, the first rotary element RE1 (S2) is selectively connected to the first driven gear CG1B via the first clutch C1 and is selectively connected to the second driven gear CG2B via the third clutch C3, the second rotary element RE2 (CA1, CA2 and R3) is selectively connected to the first driven gear CG1B via the second clutch C2, and is selectively connected to the transmission case 12 operating as the non-rotating member via the first brake B1, the third rotary element RE3 (R1, R2 and CA3) is connected to the output gear 28 operating as the output rotating member, the fourth rotary element RE4 (S1) is selectively connected to the transmission case 12 operating as the non-rotating member via the second brake B2, and the fifth rotary element RE5 (S3) is selectively connected to the second driven gear CG2B via the fourth clutch C4.

In the collinear chart of FIG. 62 described above, since, in the first speed gear stage, the first rotary element RE1 is connected to the first driven gear CG1B by engagement of the clutch C1 and its rotation speed is made into [1], and the fourth rotary element RE4 is connected to the transmission case 12 by engagement of the brake B2 and its rotation speed is made into [0], the rotation speed of the output gear 28 is shown by the point (1st) at which a straight line connecting the intersection point of the vertical line Y1 and the horizontal line X1 to the intersection point of the vertical line Y4 and the horizontal line XZ crosses the vertical line Y3. Since, in the second speed gear stage, the first rotary element RE1 is connected to the second driven gear CG2B by engagement of the clutch C3 and its rotation speed is made into [NX2], and the fourth rotary element RE4 is connected to the transmission case 12 by engagement of the brake B2 and its rotation speed is made into [0], the rotation speed of the output gear 28 is shown by the point (2nd) at which a straight line connecting the intersection point of the vertical line Y1 and the horizontal line X2 to the intersection point of the vertical line Y4 and the horizontal line XZ crosses the vertical line Y3. Since, in the third speed gear stage, the second rotary element RE2 is connected to the first driven gear CG1B by engagement of the clutch C2 and its rotation speed is made into [1], and the fourth rotary element RE4 is connected to the transmission case 12 by engagement of the brake B2 and its rotation speed is made into [0], the rotation speed of the output gear 28 is shown by the point (3rd) at which a straight line connecting the intersection point of the vertical line Y2 and the horizontal line X1 to the intersection point of the vertical line Y4 and the horizontal line XZ crosses the vertical line Y3. Since, in the fourth speed gear stage, the second rotary element RE2 is connected to the first driven gear CG1B by engagement of the clutch C2 and its rotation speed is made into [1], and the first rotary element RE1 is connected to the second driven gear CG2B by engagement of the clutch C3 and its rotation speed is made into [NX2], the rotation speed of the output gear 28 is shown by the point (4th) at which a straight line connecting the intersection point of the vertical line Y2 and the horizontal line X1 to the intersection point of the vertical line Y1 and the horizontal line X2 crosses the vertical line Y3. Since, in the fifth speed gear stage, the first rotary element RE1 is connected to the first driven gear CG1B by engagement of the clutch C1 and its rotation speed is made into [1], and the second rotary element RE2 is connected to the first driven gear CG1B by engagement of the clutch C2 and its rotation speed is made into [1], the rotation speed of the output gear 28 is shown by the point (5th) at which a straight line connecting the intersection point of the vertical line Y1 and the horizontal line X1 to the intersection point of the vertical line Y2 and the horizontal line X1 crosses the vertical line Y3. Since, in the sixth speed gear stage, the second rotary element RE2 is connected to the first driven gear CG1B by engagement of the clutch C2 and its rotation speed is made into [1], and the fifth rotary element RE5 is connected to the second driven gear CG2B by engagement of the clutch C4 and its rotation speed is made into [NX2], the rotation speed of the output gear 28 is shown by the point (6th) at which a straight line connecting the intersection point of the vertical line Y2 and the horizontal line X1 to the intersection point of the vertical line Y5 and the horizontal line X2 crosses the vertical line Y3. Since, in the seventh speed gear stage, the first rotary element RE1 is connected to the first driven gear CG1B by engagement of the clutch C1 and its rotation speed is made into [1], and the fifth rotary element RE5 is connected to the second driven gear CG2B by engagement of the clutch C4 and its rotation speed is made into [NX2], the rotation speed of the output gear 28 is shown by the point (7th) at which a straight line connecting the intersection point of the vertical line Y1 and the horizontal line X1 to the intersection point of the vertical line Y5 and the horizontal line X2 crosses the vertical line Y3. Since, in the eighth speed gear stage, the first rotary element RE1 is connected to the second driven gear CG2B by engagement of the clutch C3 and its rotation speed is made into [NX2], and the fifth rotary element RE5 is connected to the second driven gear CG2B by engagement of the clutch C4 and its rotation speed is made into [NX2], the rotation speed of the output gear 28 is shown by the point (8th) at which a straight line connecting the intersection point of the vertical line Y1 and the horizontal line X2 to the intersection point of the vertical line Y5 and the horizontal line X2 crosses the vertical line Y3. Since, in the reverse gear stage, the first rotary element RE1 is connected to the first driven gear CG1B by engage-ment of the clutch C1 and its rotation speed is made into [1], and the second rotary element RE2 is connected to the transmission case 12 by engagement of the brake B1 and its rotation speed is made into [0], a negative rotation speed of the output gear 28 is shown by the point (Rev) at which a straight line connecting the intersection point of the vertical line Y1 and the horizontal line X1 to the intersection point of the vertical line Y2 and the horizontal line XZ crosses the vertical line Y3.

Figure 63:
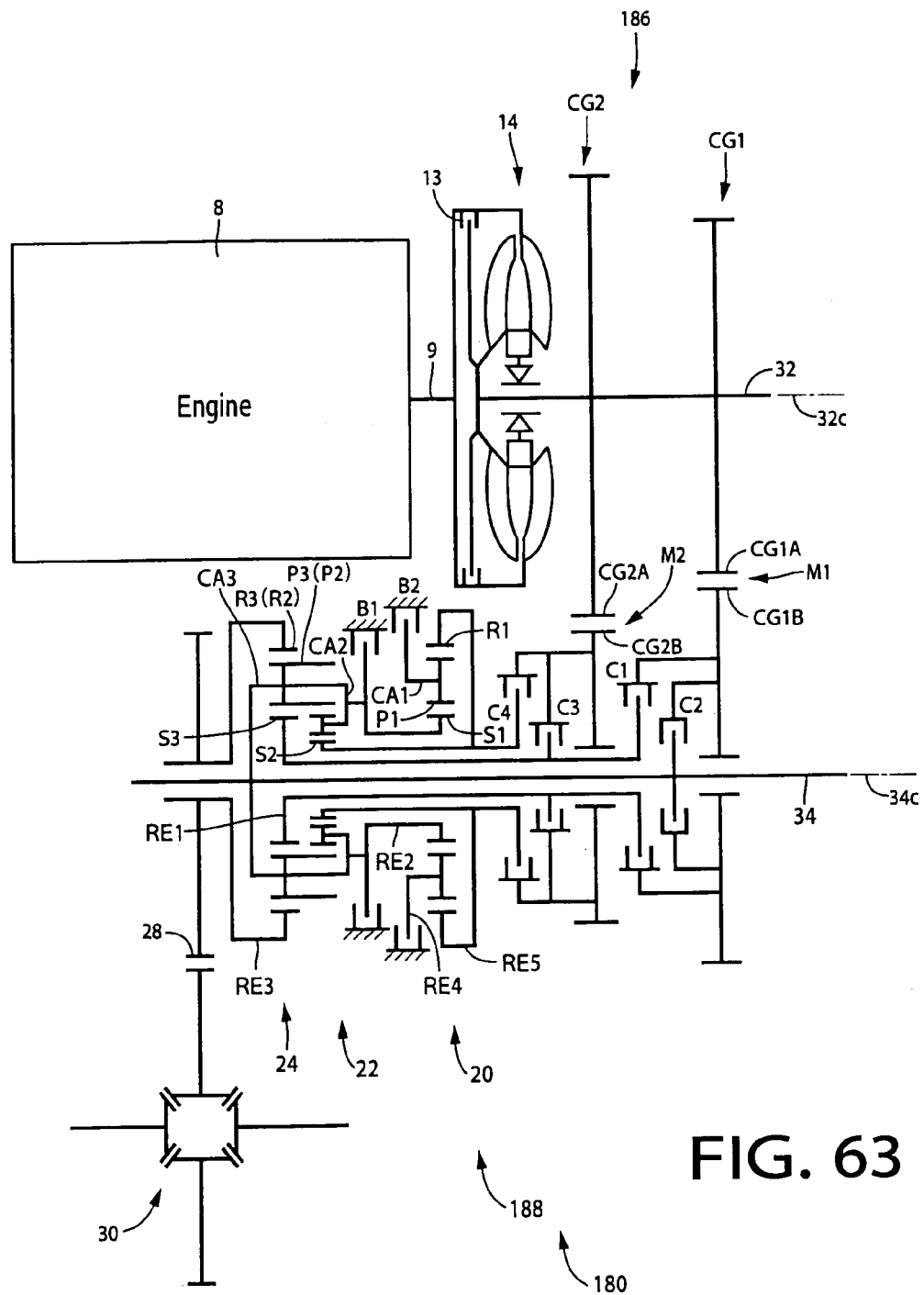
FIG. 63 is a view showing main points for describing a construction of a planetary gear type multistage transmission for vehicles according to still another embodiment of the present invention, corresponding to FIG. 60.
Figures 64, 65:
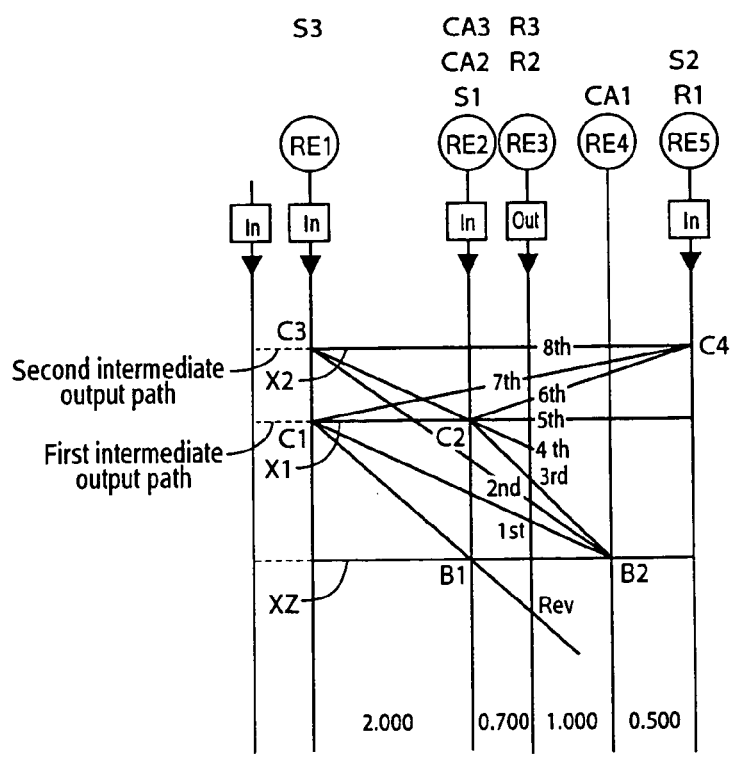
FIG. 64 is a chart showing another embodiment of the relationship between transmission gear stages of the planetary gear type multistage transmission for vehicles according to the embodiment shown in FIG. 63 and operations of hydraulic type friction engagement devices, which are required to establish the transmission gear stages, corresponding to FIG. 61.
FIG. 65 is a collinear chart describing another embodiment of the operations of the planetary gear type multistage transmission for vehicles according to the embodiment shown in FIG. 63, corresponding to FIG. 62.

FIG. 63 is a view showing main points for describing a construction of a transmission 180 according to still another embodiment of the present invention. FIG. 64 is a chart showing the relationship between the transmission gear stages of the transmission 180 and operations of hydraulic type friction engagement devices necessary to establish the transmission gear stages. FIG. 65 is a collinear chart showing the rotation speeds of the rotary elements in the respective gear stages. The present embodiment is the same as the transmission 170 shown in FIG. 54, except for that the construction of respective devices of the second transmission portion 188, arrangement of the torque converter 14 differ from those of the transmission 170 and arrangement between the first counter gear pair CG1 and the second counter gear pair CG2 which compose the first transmission portion 186 are disposed to be opposite to those of the transmission 170. Therefore, effects similar to those of the embodiment shown in FIG. 60 through FIG. 62 can be obtained. Hereinafter, a description is given of only the different parts between the transmission 180 and the transmission 170. Since the arrangement of the torque converter 14 is the same as that of the transmission 11 shown in FIG. 1, the description thereof is omitted.

In the present embodiment, the first planetary gear set 20 and the third planetary gear set 24 that compose the second transmission portion 188 of the transmission 180 shown in FIG. 63 described above are composed of a single-pinion type planetary gear set, respectively. The second planetary gear set 22 is composed of a double-pinion type planetary gear set. The first planetary gear set 20 is provided with the first sun gear S1, the first planetary gear P1, the first carrier CA1 that supports the first planetary gear P1 so as to cause the same to rotate and to revolve it, and the first ring gear R1 engaged with the first sun gear S1 via the first planetary gear P1, and has a prescribed gear ratio ρ1 of, for example, [0.294] or so. The second planetary gear set 22 is provided with the second sun gear S2, a plurality of pairs of the second planetary gears P2 engaged with each other, the second carrier CA2 that supports the second planetary gears P2 so as to cause the same to rotate and to revolve it, and the second ring gear R2 engaged with the second sun gear S2 via the second planetary gears P2, and has a prescribed gear ratio ρ2 of, for example, [0.318] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.350] or so.

Also, the above-described second planetary gear set 22 and the third planetary gear set 24 have the second carrier CA2 and the third carrier CA3 composed of a common component, and have the second ring gear R2 and the third ring gear R3 composed of a common component, wherein the third planetary gear P3 may be made into a Ravineaux type planetary gear train which is concurrently used as any one of a pair of the second planetary gears P2 engaged with each other, and the number of components of the transmission 180 can be further reduced together with a decrease in the axial length thereof. Also, those composed of these common components may be composed of separate components, respectively.

In the above-described second transmission portion 188, the third sun gear S3 is selectively connected to the first driven gear CG1B via the first clutch C1, and is selectively connected to the second driven gear CG2B via the third clutch C3. The first sun gear S1, the second carrier CA2 the third carrier CA3 are connected to become integral with each other, are selectively connected to the first driven gear CG1B via the second clutch C2, and are selectively connected to the transmission case 12 operating as the non-rotating member via the first brake B1. The second ring gear R2 and the third ring gear R3 are connected to become integral with each other and are connected to the output gear 28 operating as the output rotating member. The first carrier CA1 is selectively connected to the transmission case 12 operating as the non-rotating member via the second brake B2. The first ring gear R1 and the second sun gear S2 are connected to become integral with each other and are selectively connected to the second driven gear CG2B via the fourth clutch C4.

In the transmission 180 constructed as described above, for example, as shown in FIG. 64 which is similar to the engagement operation chart of FIG. 61, since any two elements, which are selected among the first clutch C1, the second clutch C2, the third clutch C3, the fourth clutch C4, the first brake B1 and the second brake B2, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios γ (=input shaft rotation speed $N_{IN}$/output shaft rotation speed $N_{OUT}$) which vary roughly at an equal ratio as in the embodiment shown in FIG. 60 through FIG. 62 can be obtained per gear stage. In addition, the transmission ratio width (=γ1/γ8) which is the ratio of the transmission ratio γ1 of the first speed gear stage to the transmission ratio γ8 of the eighth speed gear stage is made into a comparatively large value. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

FIG. 65 is a collinear chart, of the above-described transmission 180, corresponding to FIG. 62 which is a collinear chart of the above-described transmission 170. Five vertical lines Y1 through Y5 of the second transmission portion 188 in FIG. 65 represent, in order from the left side, the sun gear S3 corresponding to the first rotary element RE1, the sun gear S1, carrier CA2 and carrier CA3 connected to each other, which correspond to the second rotary element RE2, the ring gear R2 and ring gear R3 connected to each other, which correspond to the third rotary element RE3, the carrier CA1 corresponding to the fourth rotary element RE4, and the ring gear R1 and the sun gear S2 connected to each other, which correspond to the fifth rotary element RE5, respectively. Therefore, on the basis of these rotary elements, FIG. 65 differs from FIG. 62 only in the construction of the respective rotary elements. These drawings are identical to each other in the form of the collinear chart. Accordingly, a description of the collinear chart of FIG. 65 is omitted.

Figure 66:
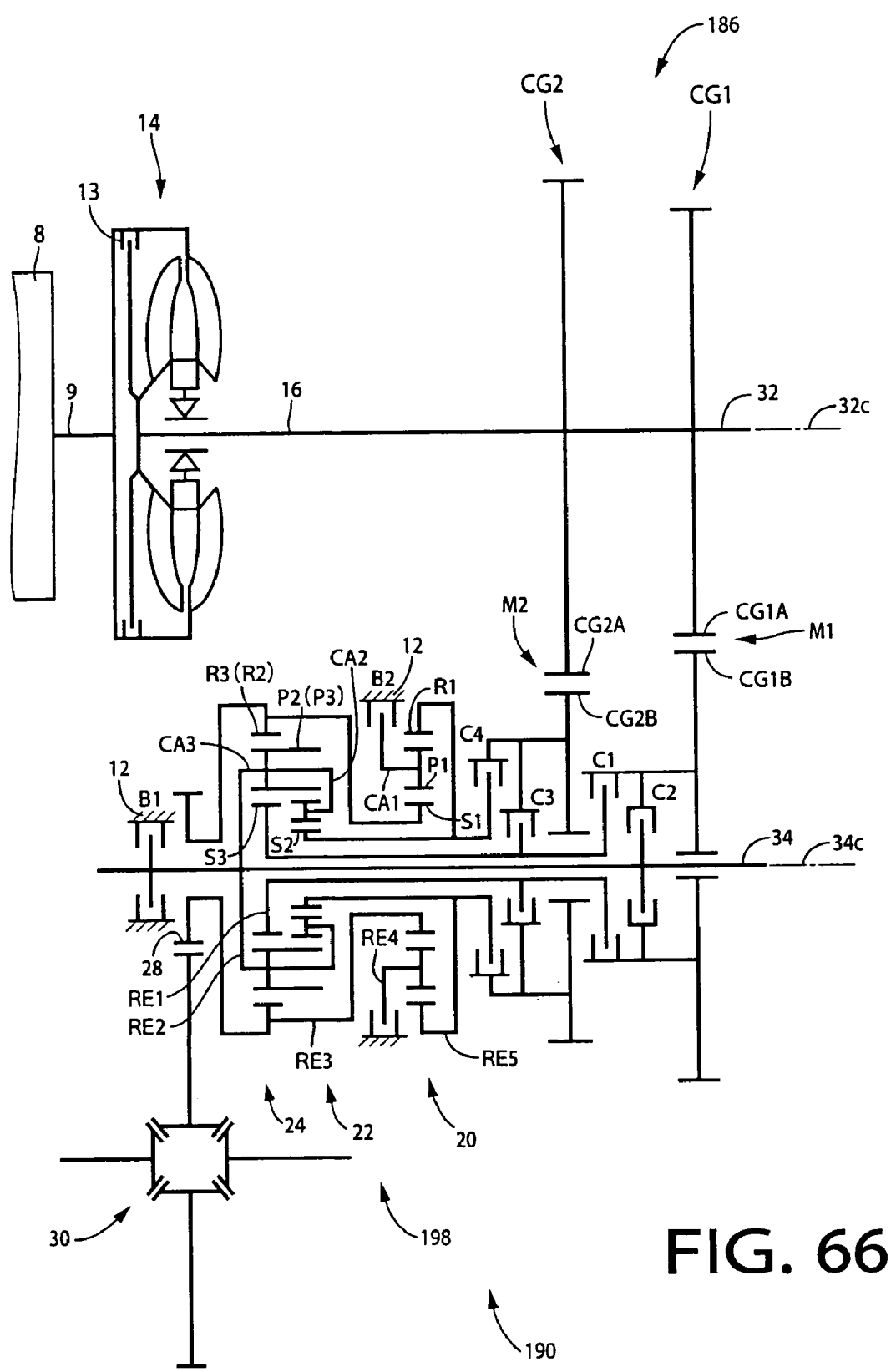
FIG. 66 is a view showing main points for describing a construction of a planetary gear type multistage transmission for vehicles according to still another embodiment of the present invention, corresponding to FIG. 60.
Figures 67, 68:
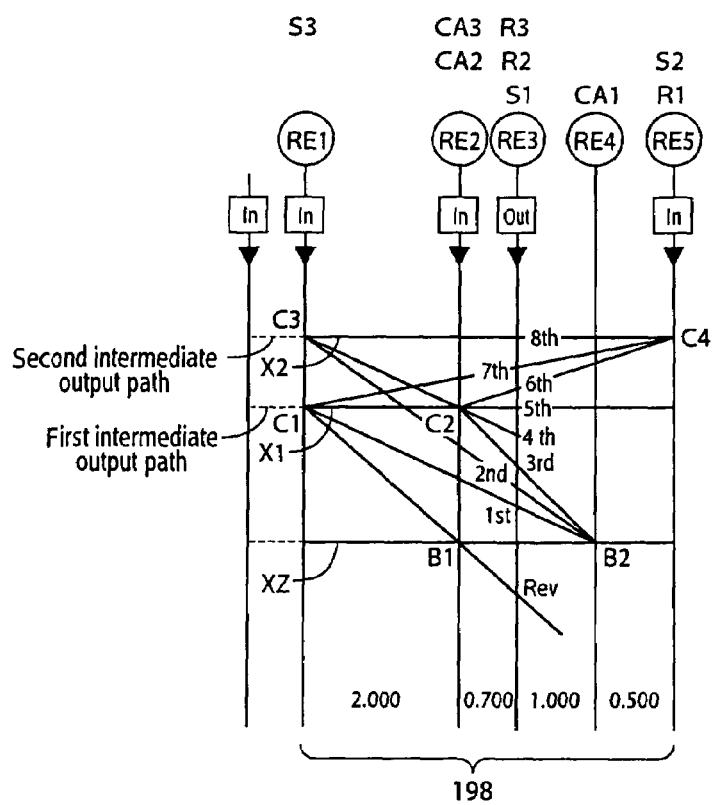
FIG. 67 is a chart showing the relationship between transmission gear stages of the planetary gear type multistage transmission for vehicles according to the embodiment shown in FIG. 66 and operations of hydraulic type friction engagement devices, which are required to establish the transmission gear stages, corresponding to FIG. 61.
FIG. 68 is a collinear chart describing operations of the planetary gear type multistage transmission for vehicles according to the embodiment shown in FIG. 66, corresponding to FIG. 62.

FIG. 66 is a view showing main points for describing a construction of a transmission 190 according to another embodiment of the present invention. FIG. 67 is a chart showing the relationship between the transmission gear stages of the transmission 190 and operations of hydraulic type friction engagement devices necessary to establish the transmission gear stages. FIG. 68 is a collinear chart showing the rotation speeds of the rotary elements in the respective gear stages. The present embodiment is the same as the transmission 170 shown in FIG. 60 except for the construction of respective devices of the second transmission portion 198 differs from that of the transmission 170 and arrangement in which the first counter gear pair CG1 and the second counter gear pair CG2 are disposed is opposite to that of the transmission 170. Therefore, effects similar to those of the embodiment shown in FIG. 60 through FIG. 62 can be obtained. Hereinafter, a description is given of different points between the transmission 190 and the transmission 170.

The first planetary gear set 20 and the third planetary gear set 24 that compose the second transmission portion 198 of the transmission 190 shown in FIG. 66 above are, respectively, composed of a single-pinion type planetary gear set, and the second planetary gear set 22 is composed of a double-pinion type planetary gear set. The first planetary gear set 20 is provided with the first sun gear S1, the first planetary gear P1, the first carrier CA1 that supports the first planetary gear P1 so as to cause the same to rotate and to revolve it, and the first ring gear R1 engaged with the first sun gear S1 via the first planetary gears P1, and has a prescribed gear ratio ρ1 of, for example, [0.500] or so. The second planetary gear set 22 is provided with the second sun gear S2, a plurality of pairs of the second planetary gears P2 engaged with each other, the second carrier CA2 that supports the second planetary gears P2 so as to cause the same to rotate and to revolve it, and the second ring gear R2 engaged with the second sun gear S2 via the second planetary gears P2, and has a prescribed gear ratio ρ2 of, for example, [0.318] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.350] or so.

Also, the above-described second planetary gear set 22 and the third planetary gear set 24 have the second carrier CA2 and the third carrier CA3 composed of a common component, and the second ring gear S2 and the third ring gear S3 are composed of a common component, and have the second ring gear R2 and the third ring gear S3 composed of a common component. In addition, the third planetary gear P3 may be made into a Ravineaux type planetary gear train which is concurrently used as any one of a pair of the second planetary gears P2 engaged with each other, and the number of components of the transmission 190 can be further reduced together with a decrease in the axial length thereof. Also, those composed of these common components may be composed of separate components, respectively.

In the above-described second transmission portion 198, the third sun gear S3 is selectively connected to the first driven gear CG1B via the first clutch C1, and is selectively connected to the second driven gear CG2B via the third clutch C3. The second carrier CA2 and the third carrier CA3 are connected to become integral with each other, are selectively connected to the first driven gear CG1B via the second clutch C2, and are selectively connected to the transmission case 12 operating as the non-rotating member via the first brake B1. The first sun gear S1, the second ring gear R2 and the third ring gear R3 are connected to become integral with each other and are connected to the output gear 28 operating as the output rotating member. The first carrier CA1 is selectively connected to the transmission case 12 operating as the non-rotating member via the second brake B2. The first ring gear R1 and the second sun gear S2 are connected to become integral with each other and are selectively connected to the second driven gear CG2B via the fourth clutch C4.

In the transmission 190 constructed as described above, for example, as shown in FIG. 67 which is similar to the engagement operation chart of FIG. 61, since any two elements, which are selected among the first clutch C1, the second clutch C2, the third clutch C3, the fourth clutch C4, the first brake B1 and the second brake B2, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios $\gamma$ (=input shaft rotation speed $N_{IN}$/output shaft rotation speed $N_{OUT}$) which vary roughly at an equal ratio as in the embodiment shown in FIG. 60 through FIG. 62 can be obtained per gear stage. In addition, the transmission ratio width (=$\gamma 1/\gamma 8$) which is the ratio of the transmission ratio $\gamma 1$ of the first speed gear stage to the transmission ratio $\gamma 8$ of the eighth speed gear stage is made into a comparatively large value. The speed reduction ratio of the first counter gear pair CG1, the speed reduction ratio of the second counter gear pair CG2, gear ratio $\rho 1$ of the first planetary gear set 20, gear ratio $\rho 2$ of the second planetary gear set 22 and gear ratio $\rho 3$ of the third planetary gear set 24 are established so as to obtain the above-described transmission ratios.

FIG. 68 is a collinear chart, of the above-described transmission 190, corresponding to FIG. 62 which is a collinear chart of the above-described transmission 170. Five vertical lines Y1 through Y5 of the second transmission portion 198 in FIG. 68 represent, in order from the left side, the sun gear S3 corresponding to the first rotary element RE1, the carrier CA2 and carrier CA3 connected to each other, which correspond to the second rotary element RE2, the sun gear S1, ring gear R2 and ring gear R3 connected to each other, which correspond to the third rotary element RE3, the carrier CA1 corresponding to the fourth rotary element RE4, and the ring gear R1 and the sun gear S2 connected to each other, which correspond to the fifth rotary element RE5, respectively. Therefore, on the basis of these rotary elements, FIG. 68 differs from FIG. 62 only in the construction of the respective rotary elements. These drawings are identical to each other in the form of the collinear chart. Accordingly, a description of the collinear chart of FIG. 68 is omitted.

Figure 69:
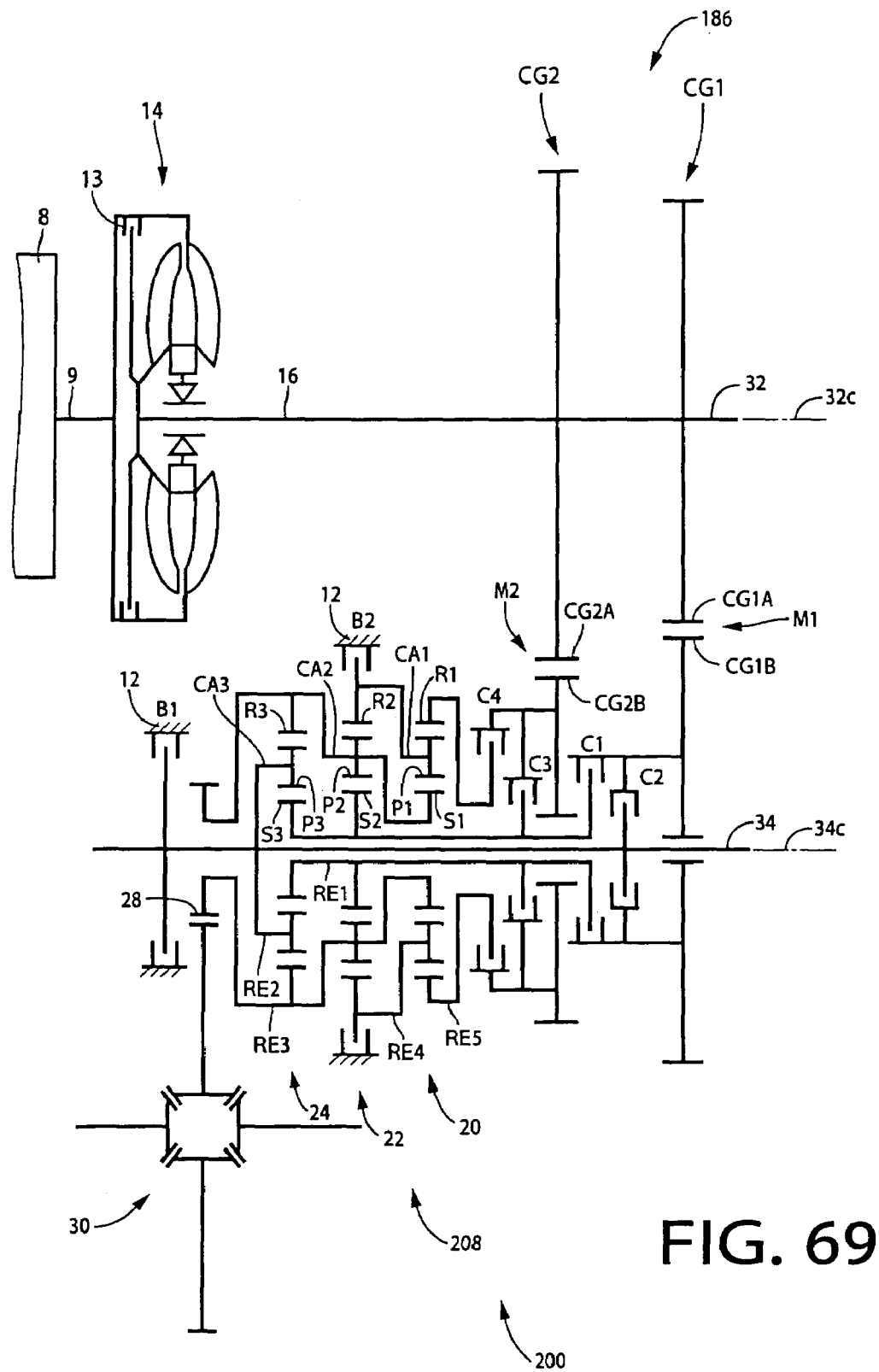
FIG. 69 is a view showing main points for describing a construction of a planetary gear type multistage transmission for vehicles according to still another embodiment of the present invention, corresponding to FIG. 60.
Figures 70, 71:
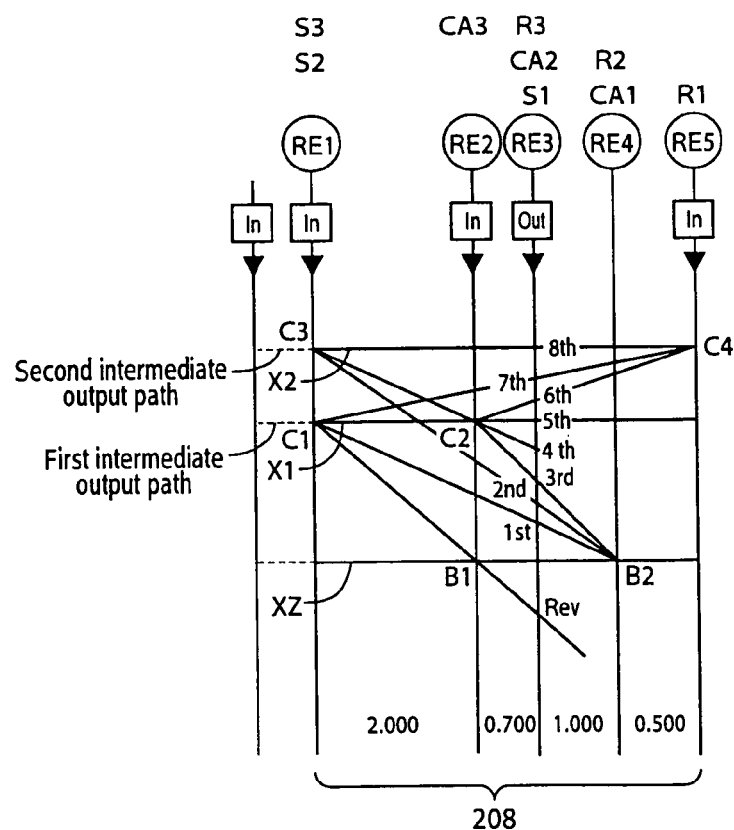
FIG. 70 is a chart showing another embodiment of the relationship between transmission gear stages of the planetary gear type multistage transmission for vehicles according to the embodiment shown in FIG. 69 and operations of hydraulic type friction engagement devices, which are required to establish the transmission gear stages, corresponding to FIG. 61.
FIG. 71 is a collinear chart describing another embodiment of the operations of the planetary gear type multistage transmission for vehicles according to the embodiment shown in FIG. 69, corresponding to FIG. 62.

FIG. 69 is a view showing main points for describing a construction of a transmission 200 according to another embodiment of the present invention. FIG. 70 is a chart showing the relationship between the transmission gear stages of the transmission 200 and operations of hydraulic type friction engagement devices necessary to establish the transmission gear stages. FIG. 71 is a collinear chart showing the rotation speeds of the rotary elements in the respective gear stages. The present embodiment is the same as the transmission 170 shown in FIG. 60 except for that the construction of respective devices of the second transmission portion 208 differs from that of the transmission 170 and arrangement in which the first counter gear pair CG1 and the second counter gear pair CG2 are disposed is opposite to that of the transmission 170. Therefore, effects similar to those of the embodiment shown in FIG. 60 through FIG. 62 can be obtained. Hereinafter, a description is given of different points between the transmission 200 and the transmission 170.

In the present embodiment, the first planetary gear set 20, the second planetary gear set 22 and the third planetary gear set 24, which compose the second transmission portion 208 of the transmission 200 shown in FIG. 69 are composed of a single-pinion type planetary gear set, respectively. The first planetary gear set 20 is provided with the first sun gear S1, the first planetary gear P1, the first carrier CA1 that supports the first planetary gear P1 so as to cause the same to rotate and to revolve it, and the first ring gear R1 engaged with the first sun gear S1 via the first planetary gear P1, and has a prescribed gear ratio $\rho 1$ of, for example, [0.500] or so. The second planetary gear set 22 is provided with the second sun gear S2, the second planetary gear P2, the second carrier CA2 that supports the second planetary gear P2 so as to cause the same to rotate and to revolve it, and the second ring gear R2 engaged with the second sun gear S2 via the second planetary gear P2, and has a prescribed gear ratio $\rho 2$ of, for example, [0.370] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio $\rho 3$ of, for example, [0.350] or so.

In the above-described second transmission portion 208, the second sun gear S2 and the third sun gear S3 are connected to become integral with each other, are selectively connected to the first driven gear CG1B via the first clutch C1, and are selectively connected to the second driven gear CG2B via the third clutch C3. The third carrier CA3 is selectively connected to the first driven gear CG1B via the second clutch C2 and is selectively connected to the transmission case 12 operating as the non-rotating member via the first brake B1. The first sun gear S1, the second carrier CA2 and the third ring gear R3 are connected to become integral with each other and are connected to the output gear 28 operating as the output rotating member. The first carrier CA1 and the second ring gear R2 are connected to become integral with each other and are selectively connected to the transmission case 12 operating as the non-rotating member via the second brake B2. The first ring gear R1 is selectively connected to the second driven gear CG2B via the fourth clutch C4.

In the transmission 200 constructed as described above, for example, as shown in FIG. 70 which is similar to the engagement operation chart of FIG. 61, since any two elements, which are selected among the first clutch C1, the second clutch C2, the third clutch C3, the fourth clutch C4, the first brake B1 and the second brake B2, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios $\gamma$ (=input shaft rotation speed $N_{IN}$/output shaft rotation speed $N_{OUT}$) which vary roughly at an equal ratio as in the embodiment shown in FIG. 60 through FIG. 62 can be obtained per gear stage. In addition, the transmission ratio width (=$\gamma 1/\gamma 8$) which is the ratio of the transmission ratio $\gamma 1$ of the first speed gear stage to the transmission ratio $\gamma 8$ of the eighth speed gear stage is made into a comparatively large value.

The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

FIG. 71 is a collinear chart, of the above-described transmission 200, corresponding to FIG. 68 which is a collinear chart of the above-described transmission 170. Five vertical lines Y1 through Y5 of the second transmission portion 208 in FIG. 71 represent, in order from the left side, the sun gear S2 and sun gear S3 connected to each other, which correspond to the first rotary element RE1, the carrier CA3 corresponding to the second rotary element RE2, the sun gear S1, carrier CA2 and ring gear R3 connected to each other, which correspond to the third rotary element RE3, the carrier CA1 and ring gear R2 connected to each other, which correspond to the fourth rotary element RE4, and the ring gear R1 corresponding to the fifth rotary element RE5, respectively. Therefore, on the basis of these rotary elements, FIG. 71 differs from FIG. 62 only in the construction of the respective rotary elements. These drawings are identical to each other in the form of the collinear chart. Accordingly, a description of the collinear chart of FIG. 71 is omitted.

Figure 72:
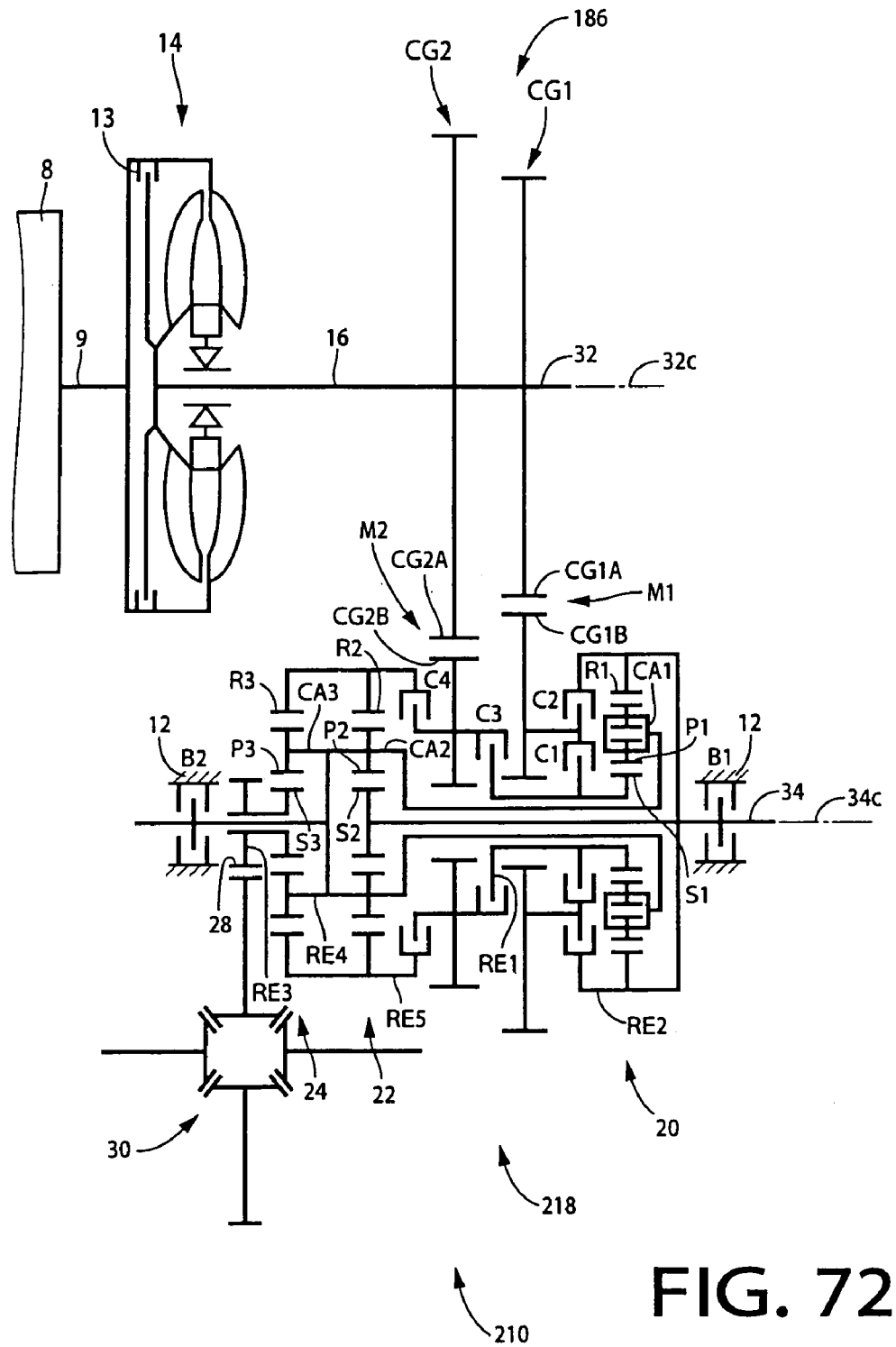
FIG. 72 is a view showing main points for describing a construction of a planetary gear type multistage transmission for vehicles according to still another embodiment of the present invention, corresponding to FIG. 60.
Figures 73, 74:
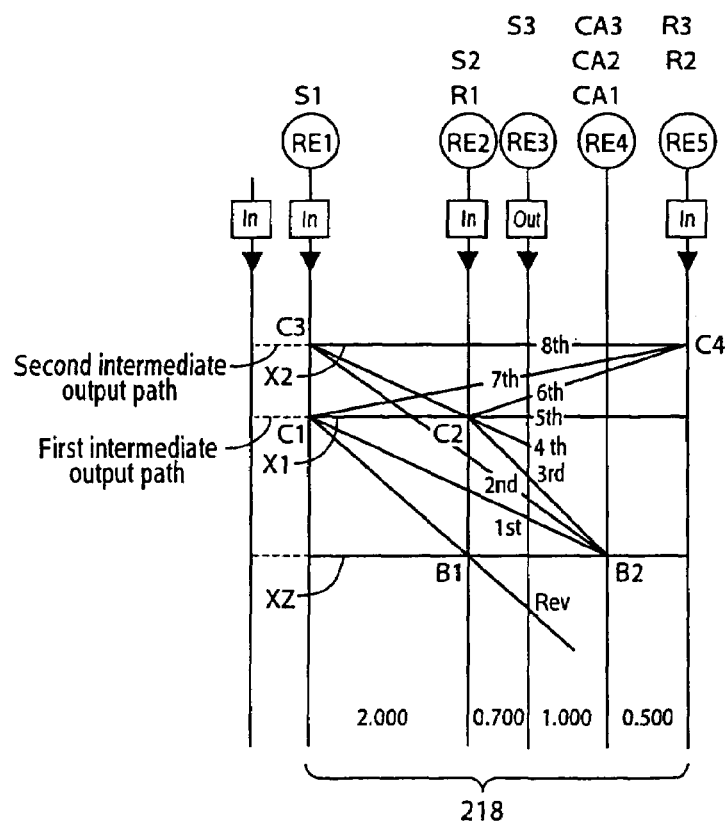
FIG. 73 is a chart showing the relationship between transmission gear stages of the planetary gear type multistage transmission for vehicles according to the embodiment shown in FIG. 72 and operations of hydraulic type friction engagement devices, which are required to establish the transmission gear stages, corresponding to FIG. 61.
FIG. 74 is a collinear chart describing operations of the planetary gear type multistage transmission for vehicles according to the embodiment shown in FIG. 72, corresponding to FIG. 62.

FIG. 72 is a view showing main points for describing a construction of a transmission 210 according to another embodiment of the present invention. FIG. 73 is a chart showing the relationship between the transmission gear stages of the transmission 210 and operations of hydraulic type friction engagement devices necessary to establish the transmission gear stages. FIG. 74 is a collinear chart showing the rotation speeds of the rotary elements in the respective gear stages. The present embodiment is the same as the transmission 170 shown in FIG. 60 except for that the construction of respective devices of the second transmission portion 218 and arrangement between the first counter gear pair CG1 and the second counter gear pair CG2, differ from those of the transmission 170 shown in FIG. 60. Therefore, effects similar to those of the embodiment shown in FIG. 60 through FIG. 62 can be obtained. Hereinafter, a description is given of different points between the transmission 210 and the transmission 170.

In the transmission 210 according to the present embodiment, as shown in FIG. 72, the first counter gear pair CG1 and the second counter gear pair CG2 are disposed so to be placed between the first planetary gear set 20 and the second planetary gear set 22. Thus, the axial length of the transmission 210 can be kept compact as in the transmission 170, and valve bodies of hydraulic control circuits of an oil pump and hydraulic friction engagement devices can be disposed in the empty spacing above the first axial center 32c between the first counter gear pair CG1 and the second counter gear pair CG2.

In the present embodiment, the first planetary gear set 20 that composes the second transmission portion 218 of the transmission 210 shown in FIG. 72 described above is composed of a double-pinion type planetary gear set, and the second planetary gear set 22 and the third planetary gear set 24 are composed of a single-pinion type planetary gear set, respectively. The first planetary gear set 20 is provided with the first sun gear S1, a plurality of pairs of the first planetary gears P1 engaged with each other, the first carrier CA1 that supports the first planetary gears P1 so as to cause the same to rotate and to revolve it, and the first ring gear R1 engaged with the first sun gear S1 via the first planetary gears P1, and has a prescribed gear ratio ρ1 of, for example, [0.459] or so.

The second planetary gear set 22 is provided with the second sun gear S2, the second planetary gear P2, the second carrier CA2 that supports the second planetary gear P2 so as to cause the same to rotate and to revolve it, and the second ring gear R2 engaged with the second sun gear S2 via the second planetary gear P2 and has a prescribed gear ratio ρ2 of, for example, [0.294] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.500] or so.

In the above-described second transmission portion 218, the first sun gear S1 is selectively connected to the first driven gear CG1B via the first clutch C1, and is selectively connected to the second driven gear CG2B via the third clutch C3. The first ring gear R1 and the second sun gear S2 are connected to become integral with each other, are selectively connected to the first driven gear CG1B via the second clutch C2, and are selectively connected to the transmission case 12 operating as the non-rotating member via the first brake B1. The third sun gear S3 is connected to the output gear 28 operating as the output rotating member. The first carrier CA1, the second carrier CA and the third carrier CA3 are connected to become integral with each other, and are selectively connected to the transmission case 12 operating as the above-described non-rotating member. The second ring gear R2 and the third ring gear R3 are connected to become integral with each other and are selectively connected to the second driven gear CG2B via the fourth clutch C4.

In the transmission 210 constructed as described above, for example, as shown in FIG. 73 which is similar to the engagement operation chart of FIG. 61, since any two elements, which are selected among the first clutch C1, the second clutch C2, the third clutch C3, the fourth clutch C4, the first brake B1 and the second brake B2, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios γ (=input shaft rotation speed $N_{IN}$/output shaft rotation speed $N_{OUT}$) which vary roughly at an equal ratio as in the embodiment shown in FIG. 60 through FIG. 62 can be obtained per gear stage. In addition, the transmission ratio width (=γ1/γ8) which is the ratio of the transmission ratio γ1 of the first speed gear stage to the transmission ratio γ8 of the eighth speed gear stage is made into a comparatively large value. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

FIG. 74 is a collinear chart, of the above-described transmission 210, corresponding to FIG. 62 which is a collinear chart of the above-described transmission 170. Five vertical lines Y1 through Y5 of the second transmission portion 218 in FIG. 74 represent, in order from the left side, the sun gear S1 corresponding to the first rotary element RE1, the ring gear R1 and the sun gear S2 connected to each other, which correspond to the second rotary element RE2, the sun gear S3 corresponding to the third rotary element RE3, the carrier CA1, carrier CA2 and carrier CA3 connected to each other, which correspond to the fourth rotary element RE4, and the ring gear R2 and ring gear R3 connected to each other, which correspond to the fifth rotary element RE5, respectively. Therefore, on the basis of these rotary elements, FIG. 74 differs from FIG. 62 only in the construction of the respective rotary elements. These drawings are identical to each other in the form of the collinear chart. Accordingly, a description of the collinear chart of FIG. 74 is omitted.

Figure 75:
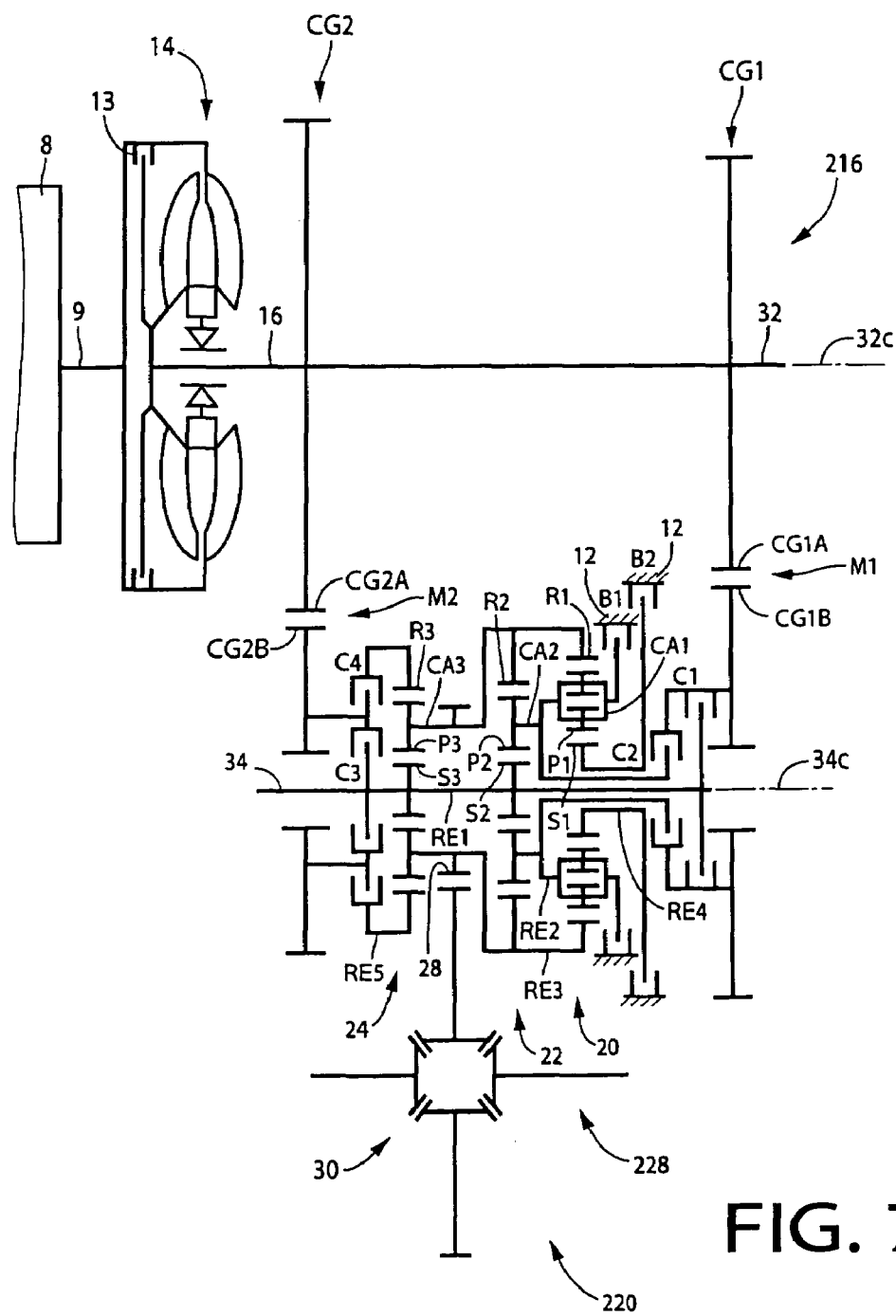
FIG. 75 is a view showing main points for describing a construction of a planetary gear type multistage transmission for vehicles according to still another embodiment of the present invention, corresponding to FIG. 60.
Figures 76, 77:
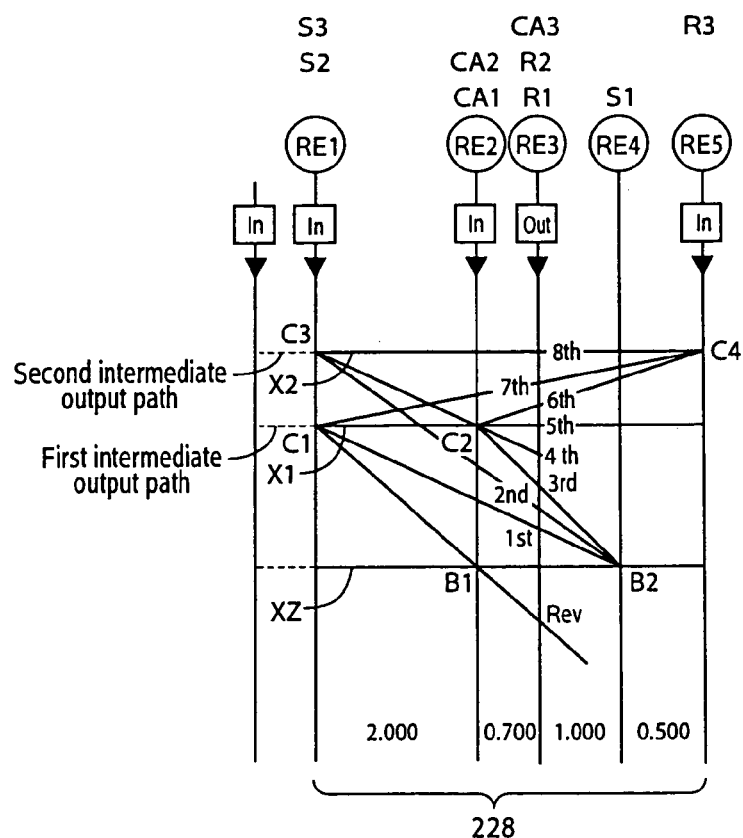
FIG. 76 is a chart showing another embodiment of the relationship between transmission gear stages of the planetary gear type multistage transmission for vehicles according to the embodiment shown in FIG. 75 and operations of hydraulic type friction engagement devices, which are required to establish the transmission gear stages, corresponding to FIG. 61.
FIG. 77 is a collinear chart describing another embodiment of the operations of the planetary gear type multistage transmission for vehicles according to the embodiment shown in FIG. 75, corresponding to FIG. 62.

FIG. 75 is a view showing main points for describing a construction of a transmission 220 according to another embodiment of the present invention. FIG. 76 is a chart showing the relationship between the transmission gear stages of the transmission 220 and operations of hydraulic type friction engagement devices necessary to establish the transmission gear stages. FIG. 77 is a collinear chart showing the rotation speeds of the rotary elements in the respective gear stages. The present embodiment is the same as the transmission 170 shown in FIG. 60 except for that the construction of respective devices of the second transmission portion 228 and arrangement between the first counter gear pair CG1 and the second counter gear pair CG2, differ from those of the transmission 170 shown in FIG. 60. Therefore, effects similar to those of the embodiment shown in FIG. 60 through FIG. 62 can be obtained. Hereinafter, a description is given of different points between the transmission 220 and the transmission 170.

In the transmission 220 according to the present embodiment, as shown in FIG. 75, the first counter gear pair CG1 and the second counter gear pair CG2 are disposed so as for the second transmission portion 228 to be placed therebetween. Thereby, the axial length of the transmission 220 can be kept compact as in the transmission 170, and valve bodies of hydraulic control circuits of an oil pump and hydraulic friction engagement devices can be disposed in the empty spacing above the first axial center 32c between the first counter gear pair CG1 and the second counter gear pair CG2, wherein connections of oil paths of the transmission 220 can be facilitated.

In the present embodiment, the first planetary gear set 20 that composes the second transmission portion 228 of the transmission 220 shown in FIG. 75 described above is composed of a double-pinion type planetary gear set, and the second planetary gear set 22 and the third planetary gear set 24 are, respectively, composed of a single-pinion type planetary gear set. The first planetary gear set 20 is provided with the first sun gear S1, a plurality of pairs of the first planetary gears P1 engaged with each other, the first carrier CA1 that supports the first planetary gears P1 so as to cause the same to rotate and to revolve it, and the first ring gear R1 engaged with the first sun gear S1 via the first planetary gears P1, and has a prescribed gear ratio ρ1 of, for example, [0.412] or so. The second planetary gear set 22 is provided with the second sun gear S2, the second planetary gear P2, the second carrier CA2 that supports the second planetary gear P2 so as to cause the same to rotate and to revolve it, and the second ring gear R2 engaged with the second sun gear S2 via the second planetary gear P2, and has a prescribed gear ratio ρ2 of, for example, [0.350] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.556].

In the above-described second transmission portion 228, the second sun gear S2 and the third sun gear S3 are connected to become integral with each other and are selectively connected to the first driven gear CG1B via the first clutch C1, and are selectively connected to the second driven gear CG2B via the third clutch C3. The first carrier CA1 and the second carrier CA2 are connected to become integral with each other, are selectively connected to the first driven gear CG1B via the second clutch C2, and are selectively connected to the transmission case 12 operating as the non-rotating member via the first brake B1. The first ring gear R1 and the second ring gear R2 are connected to become integral with each other and are connected to the output gear 28 operating as the above-described output operating member. The first sun gear S1 is selectively connected to the transmission case 12 operating as the non-rotating member via the second brake B2, and the third ring gear R3 is selectively connected to the second driven gear CG2B via the fourth clutch C4.

In the transmission 220 constructed as described above, for example, as shown in FIG. 76 which is similar to the engagement operation chart of FIG. 59, since any two elements, which are selected among the first clutch C1, the second clutch C2, the third clutch C3, the fourth clutch C4, the first brake B1 and the second brake B2, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios γ (=input shaft rotation speed $N_{IN}$/output shaft rotation speed $N_{OUT}$) which vary roughly at an equal ratio as in the embodiment shown in FIG. 60 through FIG. 62 can be obtained per gear stage. In addition, the transmission ratio width (=γ1/γ8) which is the ratio of the transmission ratio γ1 of the first speed gear stage to the transmission ratio γ8 of the eighth speed gear stage is made into a comparatively large value. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

FIG. 77 is a collinear chart, of the above-described transmission 220, corresponding to FIG. 62 which is a collinear chart of the above-described transmission 170. Five vertical lines Y1 through Y5 of the second transmission portion 228 in FIG. 77 represent, in order from the left side, the sun gear S2 and sun gear S3 connected to each other, which correspond to the first rotary element RE1, the carrier CA1 and carrier CA2 connected to each other, which correspond to the second rotary element RE2, the ring gear R1, ring gear R2 and carrier CA3 connected to each other, which correspond to the third rotary element RE3, the sun gear S1 corresponding to the fourth rotary element RE4, and the ring gear R3 corresponding to the fifth rotary element RE5, respectively. Therefore, on the basis of these rotary elements, FIG. 77 differs from FIG. 62 only in the construction of the respective rotary elements. These drawings are identical to each other in the form of the collinear chart. Accordingly, a description of the collinear chart of FIG. 77 is omitted.

Figure 78:
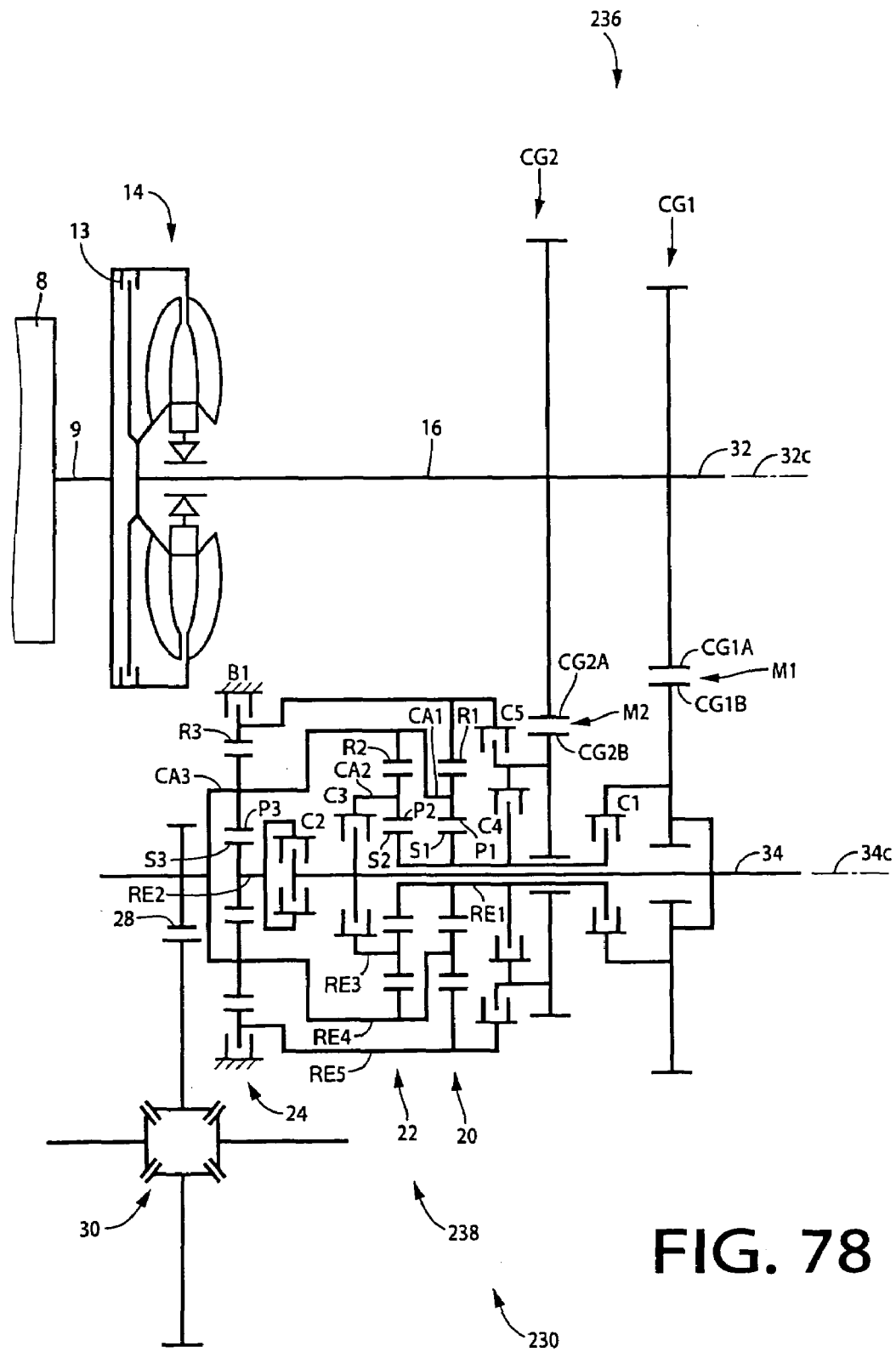
FIG. 78 is a view showing main points for describing a construction of a planetary gear type multistage transmission for vehicles according to still another embodiment of the present invention, corresponding to FIG. 6.
Figures 79, 80:
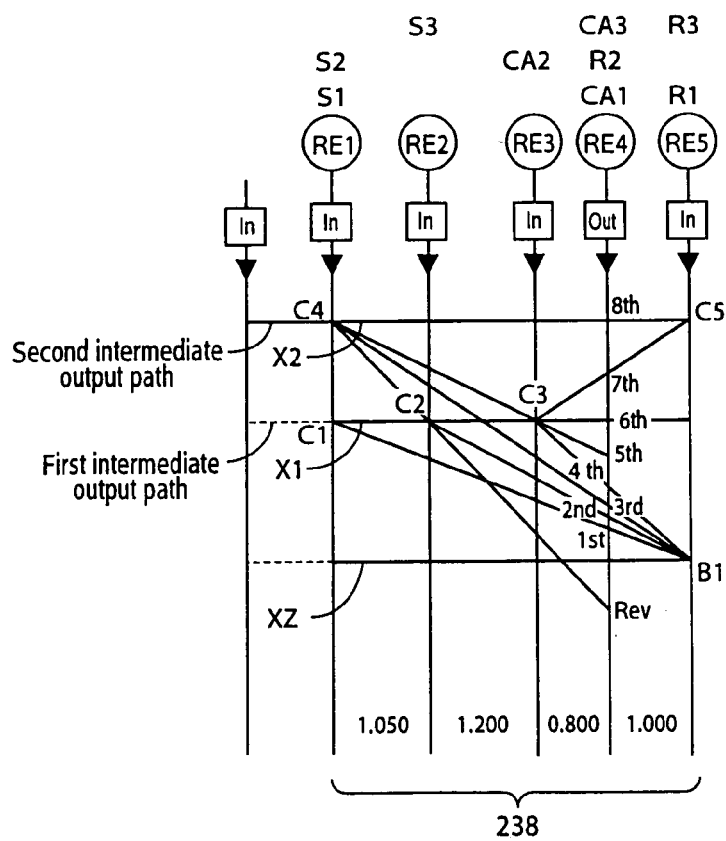
FIG. 79 is a chart showing the relationship between transmission gear stages of the planetary gear type multistage transmission for vehicles according to the embodiment shown in FIG. 78 and operations of hydraulic type friction engagement devices, which are required to establish the transmission gear stages, corresponding to FIG. 7.
FIG. 80 is a collinear chart describing operations of the planetary gear type multistage transmission for vehicles according to the embodiment shown in FIG. 784, corresponding to FIG. 8.

FIG. 78 is a view showing main points for describing a construction of a transmission 230 according to another embodiment of the present invention. FIG. 79 is a chart showing the relationship between the transmission gear stages of the transmission 230 and operations of hydraulic type friction engagement devices necessary to establish the transmission gear stages. FIG. 80 is a collinear chart showing the rotation speeds of the rotary elements in the respective gear stages. The present embodiment is the same as the transmission 41 shown in FIG. 6 except for that the construction of respective devices of the second transmission portion 238 differs from that of the transmission 41 and arrangement between the first counter gear pair CG1 and the second counter gear pair CG2 which compose the first transmission portion 236 are disposed is opposite to that of the transmission 41 with respect to the arrangement of respective devices for composing the transmission 230. Therefore, effects similar to those of the embodiment shown in FIG. 6 through FIG. 8 can be obtained. Hereinafter, a description is given of different points between the transmission 230 and the transmission 41.

In the first counter gear pair CG1 and the second counter gear pair CG2, which compose the first transmission portion 236 of the transmission 230 shown in FIG. 78, the speed reduction ratio of the second counter gear pair CG2 is made smaller than the speed reduction ratio of the first counter gear pair CG1, differing from the first transmission portion 37 of the transmission 41. For example, the speed reduction ratio of the first counter gear pair CG1 is made into [1.000] or so, and the speed reduction ratio of the second counter gear pair CG2 is made into [0.578], and the first transmission portion 236 transmits (outputs) rotations of the input shaft 16, that is, rotations of the first axis 32 to the second transmission portion 238 via the first intermediate output path M1 and the second intermediate output path M2 accelerated and rotated with respect to the first intermediate output path M1.

In the present embodiment, the first planetary gear set 20, the second planetary gear set 22 and the third planetary gear set 24, which compose the second transmission portion 238 of the transmission 230 shown in FIG. 78 above are composed of a single-pinion type planetary gear set, respectively. The first planetary gear set 20 is provided with the first sun gear S1, the first planetary gear P1, the first carrier CA1 that supports the first planetary gear P1 so as to cause the same to rotate and to revolve it, and the first ring gear R1 engaged with the first sun gear S1 via the first planetary gear P1, and has a prescribed gear ratio ρ1 of, for example, [0.328]. The second planetary gear set 22 is provided with the second sun gear S2, the second planetary gear P2, the second carrier CA2 that supports the second planetary gear P2 so as to cause the same to rotate and to revolve it, and the second ring gear R2 engaged with the second sun gear S2 via the second planetary gear P2, and has a prescribed gear ratio ρ2 of, for example, [0.356] or so. The third planetary gear set 24 is provided with the third sun gear S3 the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.500] or so.

In the above-described second transmission portion 238, the first sun gear S1 and the second sun gear S2 are connected to become integral with each other, are selectively connected to the first driven gear CG1B via the first clutch C1, and are selectively connected to the second driven gear CG2B via the fourth clutch C4. The third sun gear S3 is selectively connected to the first driven gear CG1B via the second clutch C2. The second carrier CA2 is selectively connected to the first driven gear CG1B via the third clutch C3. The first carrier CA1, the second ring gear R2 and the third carrier CA3 are connected to become integral with each other and are connected to the output gear 28 operating as the output rotating member. The first ring gear R1 and the third ring gear R3 are connected to become integral with each other, are selectively connected to the second driven gear CG2B via the fifth clutch C5, and are selectively connected to the transmission case 12 operating as the non-rotating member via the first brake B1.

In the transmission 230 constructed as described above, for example, as shown in the engagement operation chart of FIG. 79, since any two elements, which are selected among the first clutch C1, the second clutch C2, the third clutch C3, the fourth clutch C4, the fifth clutch C5, and the first brake B1, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios γ (=input shaft rotation speed $N_{IN}$/output shaft rotation speed $N_{OUT}$) which vary roughly at an equal ratio can be obtained per gear stage.

That is, as shown in FIG. 79, since, by engagement of the first clutch C1 with the first brake B1, the first sun gear S1 and the second sun gear S2 are, respectively, connected to the first driven gear CG1B, and the first ring gear R1 and the third ring gear R3 are, respectively, connected to the transmission case 12, the first speed gear stage whose transmission ratio γ1 is the maximum value, for example, [4.050] is established. Also, since, by engagement of the second clutch C2 with the first brake B1, the third sun gear S3 is connected to the first driven gear CG1B, and the first ring gear R1 and the third ring gear R3 are, respectively, connected to the transmission case 12, the second speed gear stage whose transmission ratio γ2 is a smaller value of, for example, [3.000] or so than the first speed gear stage is established. In addition, since, by engagement of the fourth clutch C4 with the first brake B1, the first sun gear S1 and the second sun gear S2 are, respectively, connected to the second driven gear CG2B, and the first ring gear R1 and the third ring gear R3 are, respectively, connected to the transmission case 12, the third speed gear stage whose transmission ratio γ3 is a smaller value of, for example, [2.341] or so than the second speed gear stage is established. Also, since, by engagement of the third clutch C3 with the first brake B1, the second carrier CA2 is connected to the first driven gear CG1B, and the first ring gear R1 and the third ring gear R3 are, respectively, connected to the transmission case 12, the fourth speed gear stage whose transmission ratio γ4 is a smaller value of, for example, [1.800] or so than the third speed gear stage is established. Further, since, by engagement of the third clutch C3 with the fourth clutch C4, the second carrier CA2 is connected to the first driven gear CG1B, and the first sun gear S1 and the second sun gear S2 are, respectively, connected to the second driven gear CG2B, the fifth speed gear stage whose transmission ratio γ5 is a smaller value of, for example, [1.350] or so than the fourth speed gear stage is established. Also, since, by engagement of the first clutch C1 with the third clutch C3, the first sun gear S1 and the second sun gear S2 are, respectively, connected to the first driven gear CG1B, and the second carrier CA2 is connected to the first driven gear CG1B, the sixth speed gear stage whose transmission ratio γ6 is a smaller value of, for example, [1.000] or so than the fifth speed gear stage is established. Further, since, by engagement of the third clutch C3 with the fifth clutch C5, the second carrier CA2 is connected to the first driven gear CG1B, and the first ring gear R1 and the third ring gear R3 are, respectively, connected to the second driven gear CG2B, the seventh speed gear stage whose transmission ratio γ7 is a smaller value of, for example, [0.755] than the sixth speed gear stage is established. In addition, since, by engagement of the fourth clutch C4 with the fifth clutch C5, the first sun gear S1 and the second sun gear S2 are, respectively, connected to the second driven gear CG2B, and the first ring gear R1 and the third ring gear R3 are, respectively, connected to the second driven gear CG2B, the eighth speed gear stage whose transmission ratio γ8 is a smaller value of, for example, [0.578] than the seventh speed gear stage is established.

Still further, since, by engagement of the second clutch C2 with the fourth clutch C4, the third sun gear S3 is connected to the first driven gear CG1B, and the first sun gear S1 and the second sun gear S2 are, respectively, connected to the second driven gear CG2B, a reverse gear stage whose transmission ratio γR is a value, for example, [2.562], between the second speed gear stage and the third speed gear stage is established. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

In the above-described transmission 230, the ratio (=γ1/γ2) of the transmission ratio γ1 of the first speed gear stage to the transmission ratio γ2 of the second speed gear stage is made into [1.350], the ratio (=γ2/γ3) of the transmission ratio γ2 of the second speed gear stage to the transmission ratio γ3 of the third speed gear stage is made into [1.281], the ratio (=γ3/γ4) of the transmission ratio γ3 of the third speed gear stage to the transmission ratio γ4 of the fourth speed gear stage is made into [1.301], the ratio (=γ4/γ5) of the transmission ratio γ4 of the fourth speed gear stage to the transmission ratio γ5 of the fifth speed gear stage is made into [1.333], the ratio (=γ5/γ6) of the transmission ratio γ5 of the fifth speed gear stage to the transmission ratio γ6 of the sixth speed gear stage is made into [1.350], the ratio (=γ6/γ7) of the transmission ratio γ6 of the sixth speed gear stage to the transmission ratio γ7 of the seventh speed gear stage is made into [1.324], and the ratio (=γ7/γ8) of the transmission ratio γ7 of the seventh speed gear stage to the transmission ratio γ8 of the eighth speed gear stage is made into [1.306], wherein the respective transmission ratios γ vary roughly at an equal ratio. Also, in the above-described transmission 230, the transmission ratio width (=γ1/γ8) which is the ratio of the transmission ratio γ1 of the first speed gear stage to the transmission ratio γ8 of the eighth speed gear stage is made into a comparatively large value, that is, [7.006].

FIG. 80 is a collinear chart of the above-described transmission 230, corresponding to FIG. 8 which is a collinear chart of the above-described transmission 41. The lowermost horizontal line XZ of the three horizontal lines of the collinear chart of FIG. 80 shows that the rotation speed is zero, the horizontal line X1 immediately thereabove shows that the rotation speed is [1.0], that is, the rotation speed of the first intermediate output path M1, and the uppermost horizontal line X2 shows a prescribed rotation speed [NX2] accelerated and rotated with respect to the first intermediate output path M1 in response to the speed reduction ratio of the second counter gear pair CG2, that is, the rotation speed of the second intermediate output path M2. In addition, five vertical lines Y1 through Y5 of the second transmission portion 238 represent, in order from the left side, the sun gear S1 and sun gear S3 connected to each other, which correspond to the first rotary element RE1, the sun gear S3 corresponding to the second rotary element RE2, the carrier CA2 corresponding to the third rotary element RE3, the carrier CA1, ring gear R2 and carrier CA3 connected to each other, which correspond to the fourth rotary element RE4, and the ring gear R1 and ring gear R3 connected to each other, which correspond to the fifth rotary element RE5, respectively.

If expressed utilizing the above-described collinear chart, the transmission 230 according to the present embodiment is constructed so that, in the first transmission portion 236, rotations of the input shaft 16 (rotations of the first axis 32) are outputted to the second transmission portion 238 via the first intermediate output path M1 and the second intermediate output path M2 accelerated and rotated with respect to the first intermediate output path M1. Also, in the second transmission portion 238, the first rotary element RE1 (S1 and S2) is selectively connected to the first driven gear CG1B via the first clutch C1 and is selectively connected to the second driven gear CG2B via the fourth clutch C4, the second rotary element RE2 (S3) is selectively connected to the first driven gear CG1B via the second clutch C2, the third rotary element RE3 (CA2) is connected to the first driven gear CG1B via the third clutch C3, the fourth rotary element RE4 (CA1, R2 and CA3) is connected to the output gear 28 operating as the output rotating member, and the fifth rotary element RE5 (R1 and R3) is selectively connected to the second driven gear CG2B via the fifth clutch C5, and is selectively connected to the transmission case 12 operating as the non-rotating member via the first brake B1.

In the collinear chart of FIG. 80 described above, since, in the first speed gear stage, the first rotary element RE1 is connected to the first driven gear CG1B by engagement of the clutch C1 and its rotation speed is made into [1], and the fifth rotary element RE5 is connected to the transmission case 12 by engagement of the brake B1 and its rotation speed is made into [0], the rotation speed of the output gear 28 is shown by the point (1st) at which a straight line connecting the intersection point of the vertical line Y1 and the horizontal line X1 to the intersection point of the vertical line Y5 and the horizontal line XZ crosses the vertical line Y4. Since, in the second speed gear stage, the second rotary element RE2 is connected to the first driven gear CG1B by engagement of the clutch C2 and its rotation speed is made into [1], and the fifth rotary element RE5 is connected to the transmission case 12 by engagement of the brake B1 and its rotation speed is made into [0], the rotation speed of the output gear 28 is shown by the point (2nd) at which a straight line connecting the intersection point of the vertical line Y2 and the horizontal line X1 to the intersection point of the vertical line Y5 and the horizontal line XZ crosses the vertical line Y4. Since, in the third speed gear stage, the first rotary element RE1 is connected to the second driven gear CG2B by engagement of the clutch C4 and its rotation speed is made into [NX2], and the fifth rotary element RE5 is connected to the transmission case 12 by engagement of the brake B1 and its rotation speed is made into [0], the rotation speed of the output gear 28 is shown by the point (3rd) at which a straight line connecting the intersection point of the vertical line Y1 and the horizontal line X2 to the intersection point of the vertical line Y5 and the horizontal line XZ crosses the vertical line Y4. Since, in the fourth speed gear stage, the third rotary element RE3 is connected to the first driven gear CG1B by engagement of the clutch C3 and its rotation speed is made into [1], and the fifth rotary element RE5 is connected to the transmission case 12 by engagement of the brake B1 and its rotation speed is made into [0], the rotation speed of the output gear 28 is shown by the point (4th) at which a straight line connecting the intersection point of the vertical line Y3 and the horizontal line X1 to the intersection point of the vertical line Y5 and the horizontal line XZ crosses the vertical line Y4. Since, in the fifth speed gear stage, the third rotary element RE3 is connected to the first driven gear CG1B by engagement of the clutch C3 and its rotation speed is made into [1], and the first rotary element RE1 is connected to the second driven gear CG2B by engagement of the clutch C4 and its rotation speed is made into [NX2], the rotation speed of the output gear 28 is shown by the point (5th) at which a straight line connecting the intersection point of the vertical line Y3 and the horizontal line X1 to the intersection point of the vertical line Y1 and the horizontal line X2 crosses the vertical line Y4. Since, in the sixth speed gear stage, the first rotary element RE1 is connected to the first driven gear CG1B by engagement of the clutch C1 and its rotation speed is made into [1], and the third rotary element RE3 is connected to the first driven gear CG1B by engagement of the clutch C3 and its rotation speed is made into [1], the rotation speed of the output gear 28 is shown by the point (6th) at which a straight line connecting the intersection point of the vertical line Y1 and the horizontal line X1 to the intersection point of the vertical line Y3 and the horizontal line X1 crosses the vertical line Y4. Since, in the seventh speed gear stage, the third rotary element RE3 is connected to the first driven gear CG1B by engagement of the clutch C3 and its rotation speed is made into [1], and the fifth rotary element RE5 is connected to the second driven gear CG2B by engagement of the clutch C5 and its rotation speed is made into [NX2], the rotation speed of the output gear 28 is shown by the point (7th) at which a straight line connecting the intersection point of the vertical line Y3 and the horizontal line X1 to the intersection point of the vertical line Y5 and the horizontal line X2 crosses the vertical line Y4. Since, in the eighth speed gear stage, the first rotary element RE1 is connected to the second driven gear CG2B by engagement of the clutch C4 and its rotation speed is made into [NX2], and the fifth rotary element RE5 is connected to the second driven gear CG2B by engagement of the clutch C5 and its rotation speed is made into [NX2], the rotation speed of the output gear 28 is shown by the point (8th) at which a straight line connecting the intersection point of the vertical line Y1 and the horizontal line X2 to the intersection point of the vertical line Y5 and the horizontal line X2 crosses the vertical line Y4. Since, in the reverse gear stage, the second rotary element RE2 is connected to the first driven gear CG1B by engagement of the clutch C2 and its rotation speed is made into [1], and the first rotary element RE1 is connected to the second driven gear CG2B by engagement of the clutch C4 and its rotation speed is made into [NX2], a negative rotation speed of the output gear 28 is shown by the point (Rev) at which a straight line connecting the intersection point of the vertical line Y2 and the horizontal line X1 to the intersection point of the vertical line Y1 and the horizontal line X2 crosses the vertical line Y3.

Figure 81:
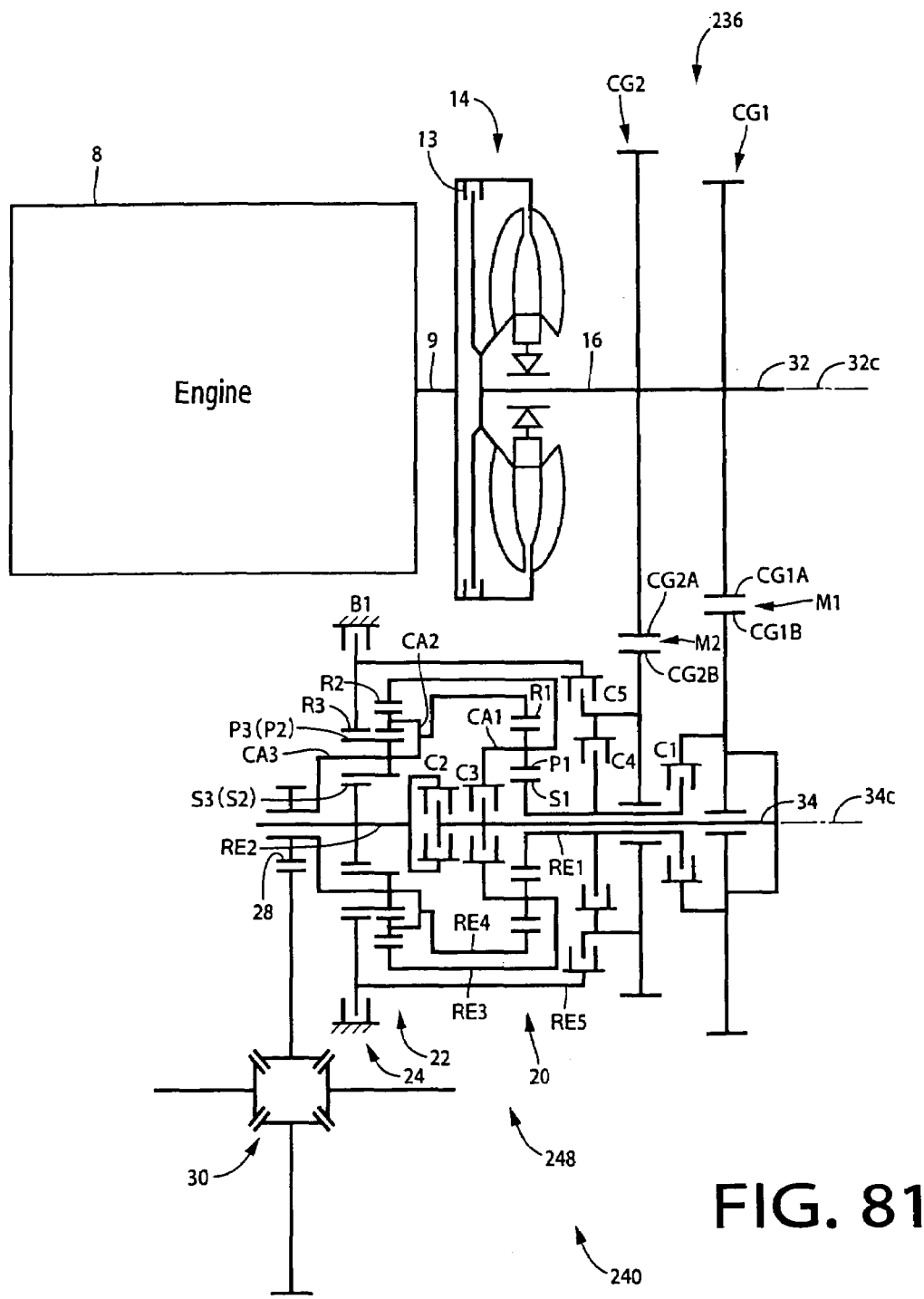
FIG. 81 is a view showing main points for describing a construction of a planetary gear type multistage transmission for vehicles according to still another embodiment of the present invention, corresponding to FIG. 78.
Figures 82, 83:
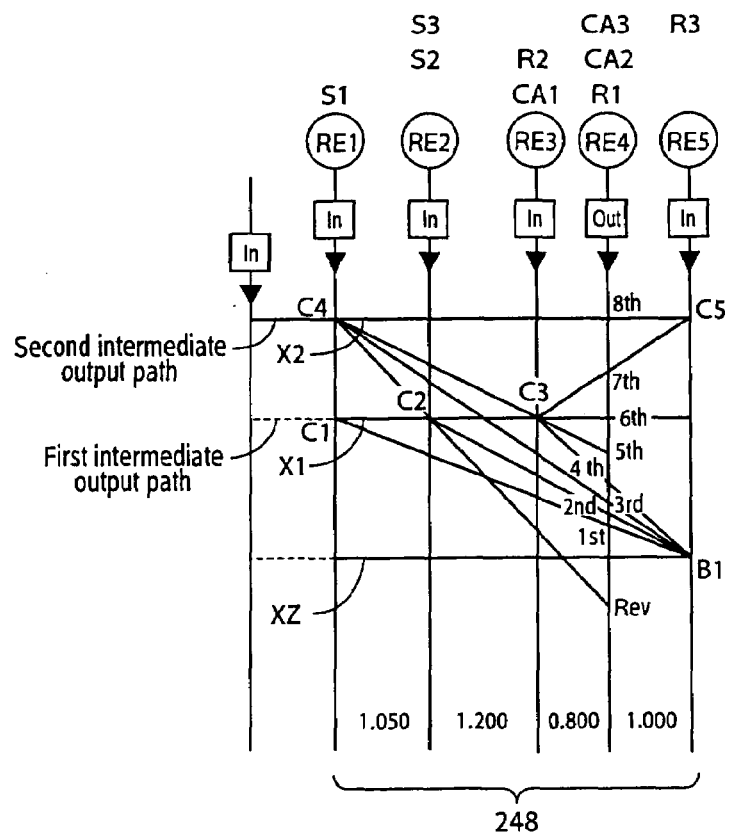
FIG. 82 is a chart showing another embodiment of the relationship between transmission gear stages of the planetary gear type multistage transmission for vehicles according to the embodiment shown in FIG. 81 and operations of hydraulic type friction engagement devices, which are required to establish the transmission gear stages, corresponding to FIG. 79.
FIG. 83 is a collinear chart describing another embodiment of the operations of the planetary gear type multistage transmission for vehicles according to the embodiment shown in FIG. 81, corresponding to FIG. 80.

FIG. 81 is a view showing main points for describing a construction of a transmission 240 according to another embodiment of the present invention. FIG. 82 is a chart showing the relationship between the transmission gear stages of the transmission 240 and operations of hydraulic type friction engagement devices necessary to establish the transmission gear stages. FIG. 83 is a collinear chart showing the rotation speeds of the rotary elements in the respective gear stages. The present embodiment is the same as the transmission 230 shown in FIG. 78 except for that the construction of respective devices of the second transmission portion 248 and arrangement of the torque converter 14, differ from those of the transmission 230 shown in FIG. 78. Therefore, effects similar to those of the embodiment shown in FIG. 78 through FIG. 80 can be obtained. Hereinafter, a description is given of different points between the transmission 240 and the transmission 230. Since the arrangement of the torque converter 14 is the same as in the transmission 11 shown in FIG. 1, the description thereof is omitted.

In the present embodiment, the first planetary gear set 20 and the third planetary gear set 24 that compose the second transmission portion 248 of the transmission 240 shown in FIG. 81 described above are composed of a single-pinion type planetary gear set, respectively. The second planetary gear set 22 is composed of a double-pinion type planetary gear set. The first planetary gear set 20 is provided with the first sun gear S1, the first planetary gear P1, the first carrier CA1 that supports the first planetary gear P1 so as to cause the same to rotate and to revolve it, and the first ring gear R1 engaged with the first sun gear S1 via the first planetary gear P1, and has a prescribed gear ratio ρ1 of, for example, [0.356] or so. The second planetary gear set 22 is provided with the second sun gear S2, a plurality of pairs of the second planetary gears P2 engaged with each other, the second carrier CA2 that supports the second planetary gears P2 so as to cause the same to rotate and to revolve it, and the second ring gear R2 engaged with the second sun gear S2 via the second planetary gears P2, and has a prescribed gear ratio ρ2 of, for example, [0.400] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.500] or so.

Also, the above-described second planetary gear set 22 and the third planetary gear set 24 have the second carrier CA2 and the third carrier CA3 composed of a common component, and have the second sun gear S2 and the third sun gear S3 composed of a common component, wherein the third planetary gear P3 may be made into a planetary gear train which is concurrently used as any one of a pair of the second planetary gears P2 engaged with each other. Thereby, the number of components of the transmission 240 can be further reduced together with a decrease in the axial length thereof. Also, those composed of these common components may be composed of separate components, respectively.

In the above-described second transmission portion 248, the first sun gear S1 is connected to the first driven gear CG1 via the first clutch C1, and is selectively connected to the second driven gear CG2B via the first clutch C4. The second sun gear S2 and the third sun gear S3 are connected to become integral with each other, are selectively connected to the first driven gear CG1B via the second clutch C2. The first carrier CA1 and the second ring gear R2 are connected to become integral with each other and are selectively connected to the first driven gear CG1B via the third clutch C3. The first ring gear R1, the second carrier CA2 and the third carrier CA3 are connected to become integral with each other and are connected to the output gear 28 operating as the output rotating member. The third ring gear R3 is selectively connected to the second driven gear CG2B via the fifth clutch C5, and is selectively connected to the transmission case 12 operating as the non-rotating member via the first brake B1.

In the transmission 240 constructed as described above, for example, as shown in FIG. 82 which is similar to the engagement operation chart of FIG. 79, since any two elements, which are selected among the first clutch C1, the second clutch C2, the third clutch C3, the fourth clutch C4, the fifth clutch C5 and the first brake B1, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios γ (=input shaft rotation speed $N_{IN}$/output shaft rotation speed $N_{OUT}$) which vary roughly at an equal ratio as in the embodiment shown in FIG. 78 through FIG. 80 can be obtained per gear stage. In addition, the transmission ratio width (=γ1/γ8) which is the ratio of the transmission ratio γ1 of the first speed gear stage to the transmission ratio γ8 of the eighth speed gear stage is made into a comparatively large value. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

FIG. 83 is a collinear chart, of the above-described transmission 240, corresponding to FIG. 80 which is a collinear chart of the above-described transmission 230. Five vertical lines Y1 through Y5 of the second transmission portion 248 in FIG. 83 represent, in order from the left side, the sun gear S1 corresponding to the first rotary element RE1, the sun gear S2 and sun gear S3 connected to each other, which correspond to the second rotary element RE2, the carrier CA1 and ring gear R2 connected to each other, which correspond to the third rotary element RE3, the ring gear R1, carrier CA2 and carrier CA3 connected to each other, which correspond to the fourth rotary element RE4, and the ring gear R3 corresponding to the fifth rotary element RE5, respectively. Therefore, on the basis of these rotary elements, FIG. 83 differs from FIG. 80 only in the construction of the respective rotary elements. These drawings are identical to each other in the form of the collinear chart. Accordingly, a description of the collinear chart of FIG. 83 is omitted.

Figure 84:
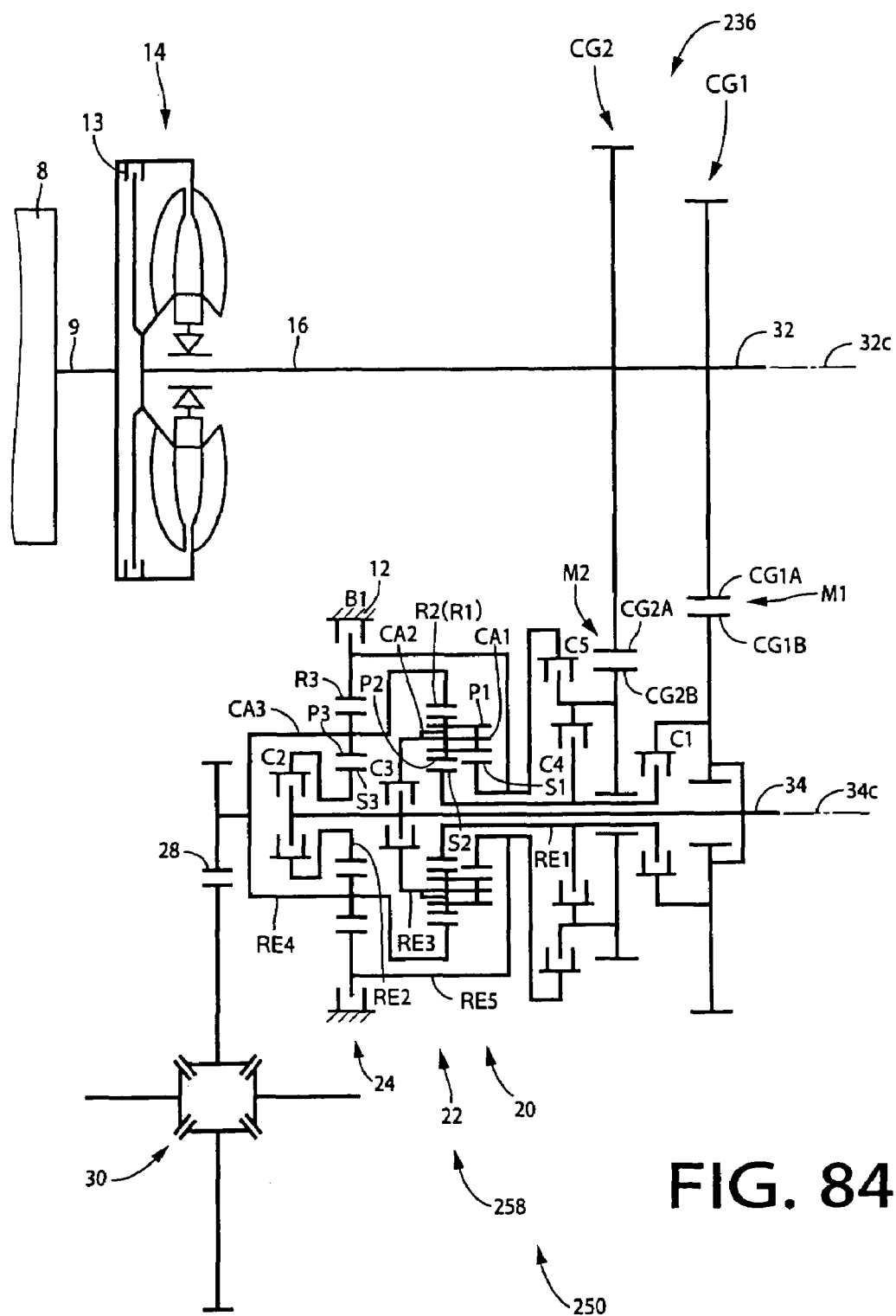
FIG. 84 is a view showing main points for describing a construction of a planetary gear type multistage transmission for vehicles according to still another embodiment of the present invention, corresponding to FIG. 78.
Figures 85, 86:
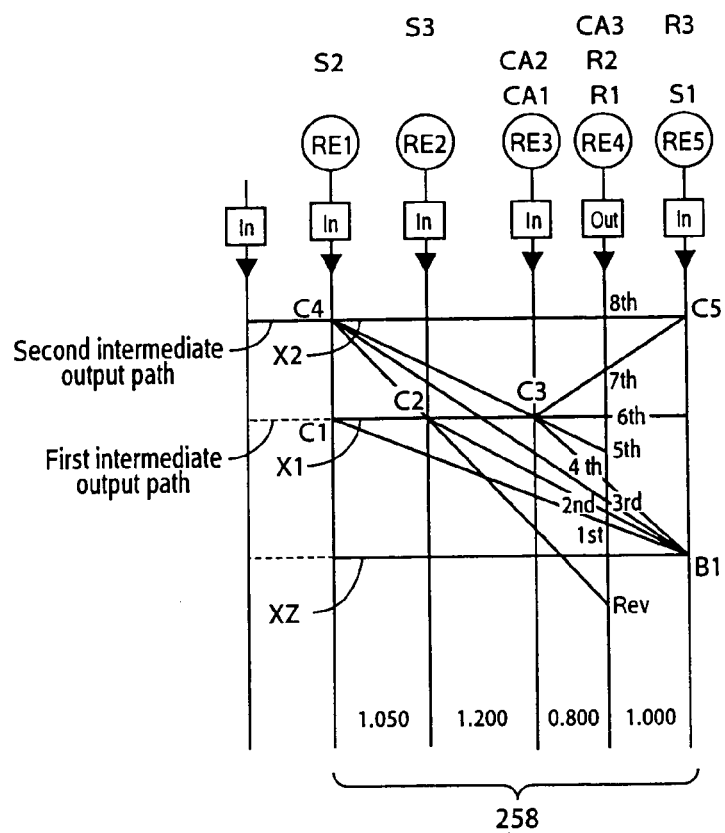
FIG. 85 is a chart showing another embodiment of the relationship between transmission gear stages of the planetary gear type multistage transmission for vehicles according to the embodiment shown in FIG. 84 and operations of hydraulic type friction engagement devices, which are required to establish the transmission gear stages, corresponding to FIG. 79.
FIG. 86 is a collinear chart describing operations of the planetary gear type multistage transmission for vehicles according to the embodiment shown in FIG. 84, corresponding to FIG. 80.

FIG. 84 is a view showing main points for describing a construction of a transmission 250 according to another embodiment of the present invention. FIG. 85 is a chart showing the relationship between the transmission gear stages of the transmission 250 and operations of hydraulic type friction engagement devices necessary to establish the transmission gear stages. FIG. 86 is a collinear chart showing the rotation speeds of the rotary elements in the respective gear stages. The present embodiment is the same as the transmission 230 shown in FIG. 78 except for that the construction of respective devices of the second transmission portion 258 differs from that of the transmission 230 shown in FIG. 78. Therefore, effects similar to those of the embodiment shown in FIG. 78 through FIG. 80 can be obtained. Hereinafter, a description is given of different points between the transmission 250 and the transmission 230.

In the present embodiment, the first planetary gear set 20 that composes the second transmission portion 258 of the transmission 250 shown in FIG. 84 described above is composed of a double-pinion type planetary gear set, and the second planetary gear set 22 and the third planetary gear set 24 are composed of a single-pinion type planetary gear set, respectively. The first planetary gear set 20 is provided with the first sun gear S1, a plurality of pairs of the first planetary gears P1 engaged with each other, the first carrier CA1 that supports the first planetary gears P1 so as to cause the same to rotate and to revolve it, and the first ring gear R1 engaged with the first sun gear S1 via the first planetary gears P1, and has a prescribed gear ratio ρ1 of, for example, [0.444] or so. The second planetary gear set 22 is provided with the second sun gear S2, the second planetary gear P2, the second carrier CA2 that supports the second planetary gear P2 so as to cause the same to rotate and to revolve it, and the second ring gear R2 engaged with the second sun gear S2 via the second planetary gear P2 and has a prescribed gear ratio ρ2 of, for example, [0.356] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.500] or so.

Also, the above-described first planetary gear set 20 and the second planetary gear set 22 have the first carrier CA1 and the second carrier CA2 composed of a common component, and have the first ring gear R1 and the second ring gear R2 composed of a common component, wherein the second planetary gear P2 is made into a Ravineaux type planetary gear train which is concurrently used as any one of a pair of the first planetary gears P1 engaged with each other. Thereby, the number of components of the transmission 250 can be further reduced together with a decrease in the axial length. Also, those which are composed of these common components may be composed of separate components.

In the above-described second transmission portion 258, the second sun gear S2 is selectively connected to the first driven gear CG1B via the first clutch C1, and is selectively connected to the second driven gear CG2B via the fourth clutch C4. The third sun gear S3 is selectively connected to the first driven gear CG1B via the second clutch C2. The first carrier CA1 and the second carrier CA2 are connected to become integral with each other, and are selectively connected to the first driven gear CG1B via the third clutch C3. The first ring gear R1, the second ring gear R2 and the third carrier CA3 are connected to become integral with each other and are connected to the output gear 28 operating as the output rotating member. The first sun gear S1 and the third ring gear R3 are connected to become integral with each other, are selectively connected to the second driven gear CG2B via the fifth clutch C5, and are selectively connected to the transmission case 12 operating as the non-rotating member via the first brake B1.

In the transmission 250 constructed as described above, for example, as shown in FIG. 85 which is similar to the engagement operation chart of FIG. 79, since any two elements, which are selected among the first clutch C1, the second clutch C2, the third clutch C3, the fourth clutch C4, the fifth clutch C5 and the first brake B1, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios γ (=input shaft rotation speed $N_{IN}$/output shaft rotation speed $N_{OUT}$) which vary roughly at an equal ratio as in the embodiment shown in FIG. 78 through FIG. 80 can be obtained per gear stage. In addition, the transmission ratio width (=γ1/γ8) which is the ratio of the transmission ratio γ1 of the first speed gear stage to the transmission ratio γ8 of the eighth speed gear stage is made into a comparatively large value. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

FIG. 86 is a collinear chart, of the above-described transmission 250, corresponding to FIG. 80 which is a collinear chart of the above-described transmission 230. Five vertical lines Y1 through Y5 of the second transmission portion 258 in FIG. 80 represent, in order from the left side, the sun gear S2 corresponding to the first rotary element RE1, the sun gear S3 corresponding to the second rotary element RE2, the carrier CA1 and carrier CA2 connected to each other, which correspond to the third rotary element RE3, the ring gear R1, ring gear R2 and carrier CA3 connected to each other, which correspond to the fourth rotary element RE4, and the sun gear S1 and ring gear R3 connected to each other, which correspond to the fifth rotary element RE5, respectively. Therefore, on the basis of these rotary elements, FIG. 86 differs from FIG. 80 only in the construction of the respective rotary elements. These drawings are identical to each other in the form of the collinear chart. Accordingly, a description of the collinear chart of FIG. 86 is omitted.

Figure 87:
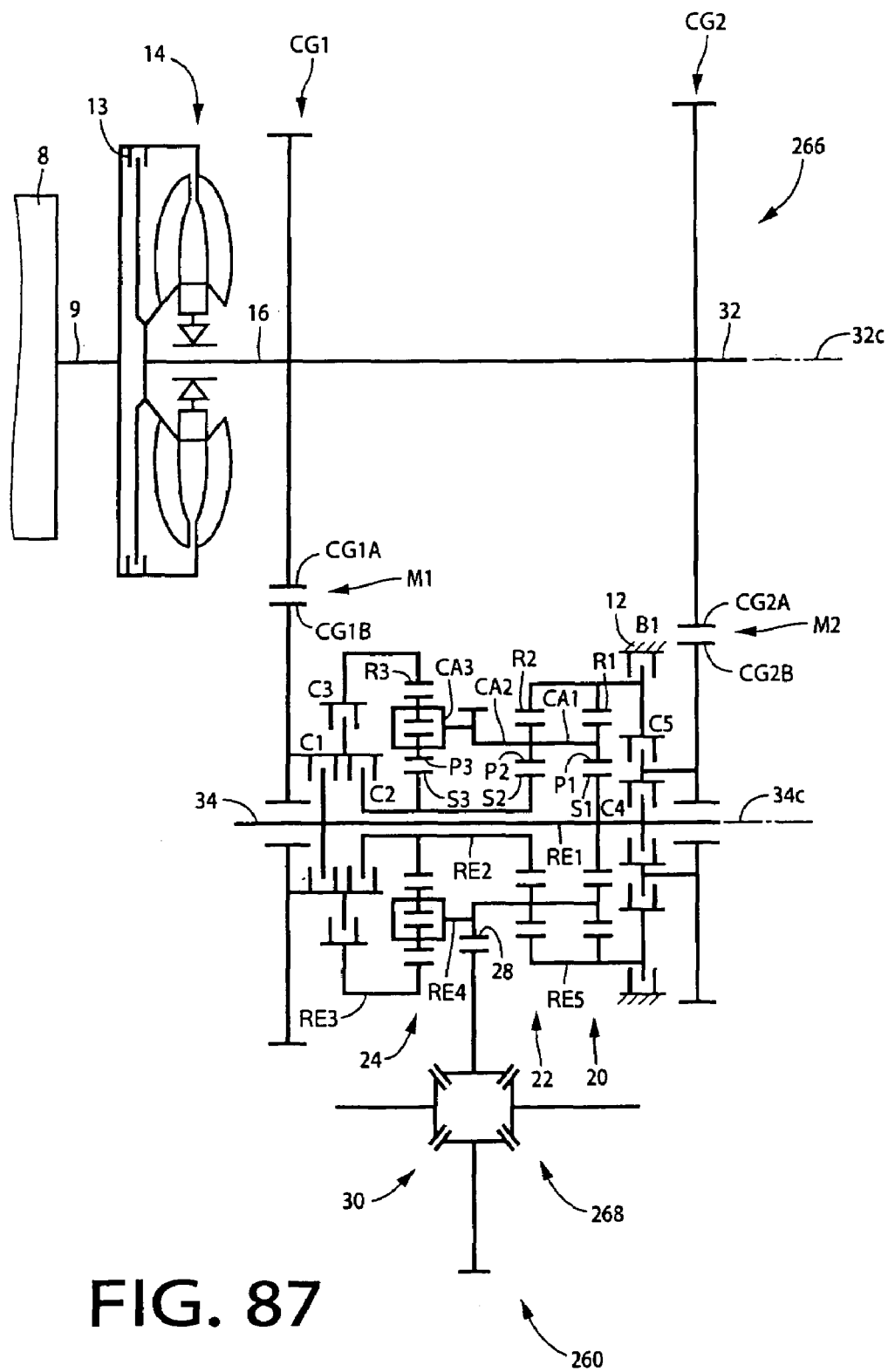
FIG. 87 is a view showing main points for describing a construction of a planetary gear type multistage transmission for vehicles according to still another embodiment of the present invention, corresponding to FIG. 78.
Figures 88, 89:
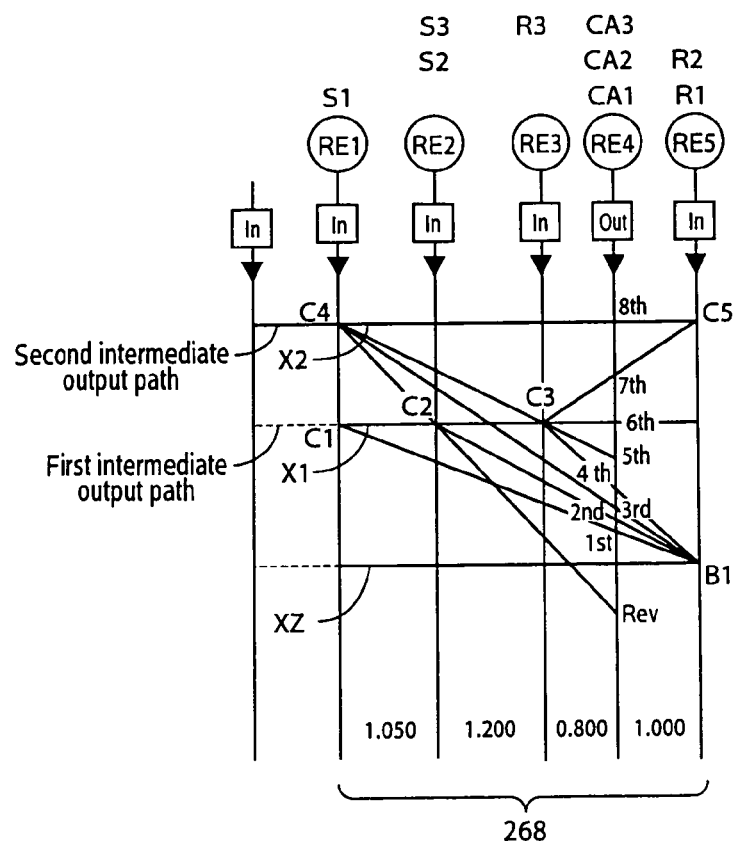
FIG. 88 is a chart showing another embodiment of the relationship between transmission gear stages of the planetary gear type multistage transmission for vehicles according to the embodiment shown in FIG. 87 and operations of hydraulic type friction engagement devices, which are required to establish the transmission gear stages, corresponding to FIG. 79.
FIG. 89 is a collinear chart describing another embodiment of the operations of the planetary gear type multistage transmission for vehicles according to the embodiment shown in FIG. 87, corresponding to FIG. 80.

FIG. 87 is a view showing main points for describing a construction of a transmission 260 according to another embodiment of the present invention. FIG. 88 is a chart showing the relationship between the transmission gear stages of the transmission 260 and operations of hydraulic type friction engagement devices necessary to establish the transmission gear stages. FIG. 89 is a collinear chart showing the rotation speeds of the rotary elements in the respective gear stages. The present embodiment is the same as the transmission 230 shown in FIG. 78 except for that the construction of respective devices of the second transmission portion 268 and arrangement between the first counter gear pair CG1 and the second counter gear pair CG2, differ from those of the transmission 230 shown in FIG. 78. Therefore, effects similar to those of the embodiment shown in FIG. 78 through FIG. 80 can be obtained. Hereinafter, a description is given of different points between the transmission 260 and the transmission 230.

In the transmission 260 according to the present embodiment, as shown in FIG. 87, the first counter gear pair CG1 and the second counter gear pair CG2 are disposed so as for the second transmission portion 268 to be placed therebetween. Thus, the axial length of the transmission 260 can be kept compact as in the transmission 230, and valve bodies of hydraulic control circuits of an oil pump and hydraulic friction engagement devices can be disposed in the empty spacing above the first axial center 32*c* between the first counter gear pair CG1 and the second counter gear pair CG2, wherein connections of oil paths of the transmission 260 can be facilitated.

In the present embodiment, the first planetary gear set 20 and the second planetary gear set 22, which compose the second transmission portion 268 of the transmission 260 shown in FIG. 87 described above, are, respectively, composed of a single-pinion type planetary gear set, and the third planetary gear set 24 is composed of a double-pinion type planetary gear set. The first planetary gear set 20 is provided with the first sun gear S1, the first planetary gear P1, the first carrier CA1 that supports the first planetary gear P1 so as to cause the same to rotate and to revolve it, and the first ring gear R1 engaged with the first sun gear S1 via the first planetary gear P1, and has a prescribed gear ratio ρ1 of, for example, [0.328] or so. The second planetary gear set 22 is provided with the second sun gear S2, the second planetary gear P2, the second carrier CA2 that supports the second planetary gear P2 so as to cause the same to rotate and to revolve it, and the second ring gear R2 engaged with the second sun gear S2 via the second planetary gear P2 and has a prescribed gear ratio ρ2 of, for example, [0.500] or so. The third planetary gear set 24 is provided with the third sun gear S3, a plurality of pairs of the third planetary gears P3 engaged with each other, the third carrier CA3 that supports the third planetary gears P3 so as to cause the same to rotate and to revolve it, and the third ring gear R3 engaged with the third sun gear S3 via the third planetary gears P3, and has a prescribed gear ratio ρ3 of, for example, [0.400] or so.

In the second transmission portion 268, the first sun gear S1 is selectively connected to the first driven gear CG1B via the first clutch C1, and is selectively connected to the second driven gear CG2B via the fourth clutch C4. The second sun gear S2 and the third sun gear S3 are connected to become integral with each other and are selectively connected to the first driven gear CG1B via the second clutch C2. The third ring gear R3 is selectively connected to the first driven gear CG1B via the third clutch C3. The first carrier CA1, the second carrier CA2 and the third carrier CA3 are connected to become integral with each other and are connected to the output gear 28 operating as the output rotating member. The first ring gear R1 and the second ring gear R2 are connected to become integral with each other, are selectively connected to the second driven gear CG2B via the fifth clutch C5, and are selectively connected to the transmission case 12 operating as the non-rotating member via the first brake B1.

In the transmission 260 constructed as described above, for example, as shown in FIG. 88 which is similar to the engagement operation chart of FIG. 79, since any two elements, which are selected among the first clutch C1, the second clutch C2, the third clutch C3, the fourth clutch C4, the fifth clutch C5 and the first brake B1, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios γ (=input shaft rotation speed $N_{IN}$/output shaft rotation speed $N_{OUT}$) which vary roughly at an equal ratio as in the embodiment shown in FIG. 78 through FIG. 80 can be obtained per gear stage. In addition, the transmission ratio width (=γ1/γ8) which is the ratio of the transmission ratio γ1 of the first speed gear stage to the transmission ratio γ8 of the eighth speed gear stage is made into a comparatively large value. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

FIG. 89 is a collinear chart, of the above-described transmission 260, corresponding to FIG. 80 which is a collinear chart of the above-described transmission 230. Five vertical lines Y1 through Y5 of the second transmission portion 268 in FIG. 89 represent, in order from the left side, the sun gear S1 corresponding to the first rotary element RE1, the sun gear S2 and sun gear S3 connected to each other, which correspond to the second rotary element RE2, the ring gear R3 corresponding to the third rotary element RE3, the carrier CA1, carrier CA2 and carrier CA3 connected to each other, which correspond to the fourth rotary element RE4, and the ring gear R1 and ring gear R2 connected to each other, which correspond to the fifth rotary element RE5, respectively. Therefore, on the basis of these rotary elements, FIG. 89 differs from FIG. 80 only in the construction of the respective rotary elements. These drawings are identical to each other in the form of the collinear chart. Accordingly, a description of the collinear chart of FIG. 89 is omitted.

Figure 90:
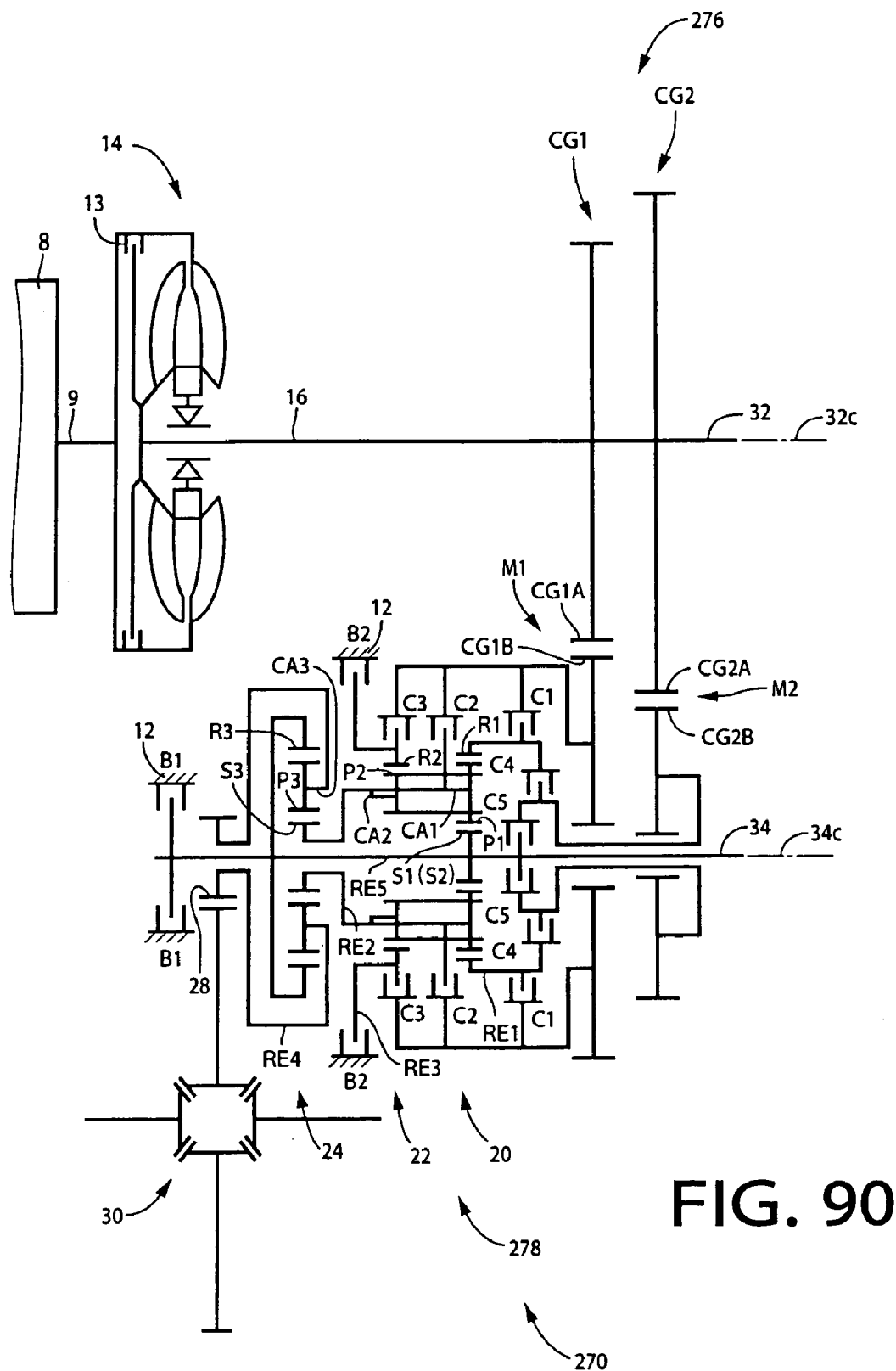
FIG. 90 is a view showing main points for describing a construction of a planetary gear type multistage transmission for vehicles according to still another embodiment of the present invention, corresponding to FIG. 78.
Figures 91, 92:
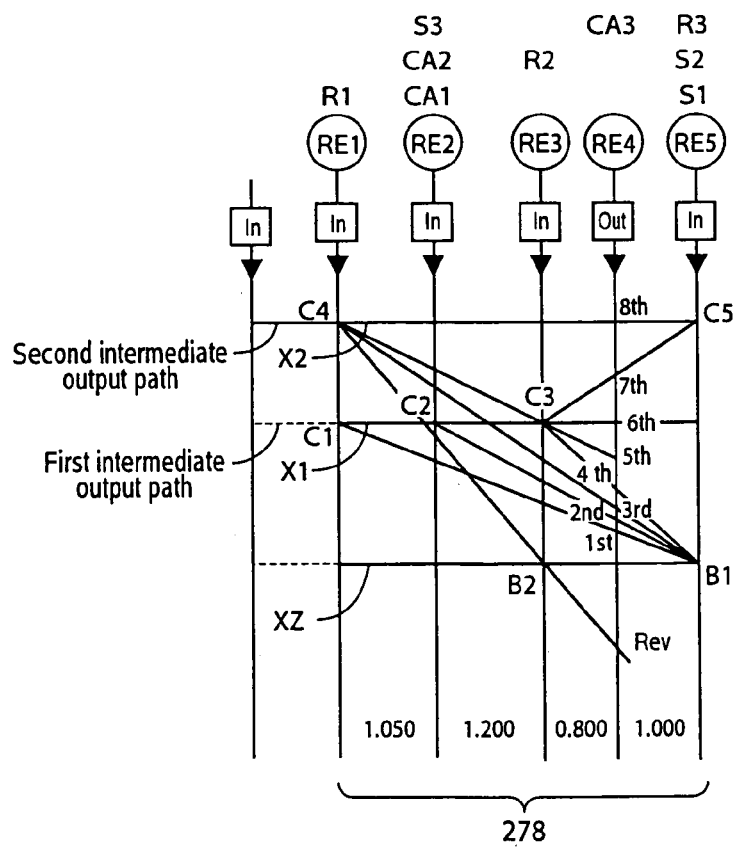
FIG. 91 is a chart showing another embodiment of the relationship between transmission gear stages of the planetary gear type multistage transmission for vehicles according to the embodiment shown in FIG. 90 and operations of hydraulic type friction engagement devices, which are required to establish the transmission gear stages, corresponding to FIG. 79.
FIG. 92 is a collinear chart describing operations of the planetary gear type multistage transmission for vehicles according to the embodiment shown in FIG. 90, corresponding to FIG. 80.

FIG. 90 is a view showing main points for describing a construction of a transmission 270 according to another embodiment of the present invention. FIG. 91 is a chart showing the relationship between the transmission gear stages of the transmission 270 and operations of hydraulic type friction engagement devices necessary to establish the transmission gear stages. FIG. 92 is a collinear chart showing the rotation speeds of the rotary elements in the respective gear stages. The present embodiment is the same as the transmission 230 shown in FIG. 78 except for the construction of respective devices of the second transmission portion 278 differ from that of the transmission 230 and that arrangement in which the first counter gear pair CG1 and the second counter gear pair CG2 are disposed is opposite to that of the transmission 230. Therefore, effects similar to those of the embodiment shown in FIG. 78 through FIG. 80 can be obtained. Hereinafter, a description is given of different points between the transmission 270 and the transmission 230.

In the present embodiment, the first planetary gear set 20 and the third planetary gear set 24 that compose the second transmission portion 278 of the transmission 270 shown in FIG. 90 described above are composed of a single-pinion type planetary gear set, respectively. The second planetary gear set 22 is composed of a double-pinion type planetary gear set. The first planetary gear set 20 is provided with the first sun gear S1, the first planetary gear P1, the first carrier CA1 that supports the first planetary gear P1 so as to cause the same to rotate and to revolve it, and the first ring gear R1 engaged with the first sun gear S1 via the first planetary gear P1, and has a prescribed gear ratio ρ1 of, for example, [0.350] or so. The second planetary gear set 22 is provided with the second sun gear S2, a plurality of pairs of the second planetary gears P2 engaged with each other, the second carrier CA2 that supports the second planetary gears P2 so as to cause the same to rotate and to revolve it, and the second ring gear R2 engaged with the second sun gear S2 via the second planetary gears P2, and has a prescribed gear ratio ρ2 of, for example, [0.400] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.500] or so.

In the first planetary gear set 20 and the second planetary gear set 22, the first carrier CA1 and the second carrier CA2 are composed of a common component, and the first sun gear S1 and the second sun gear S2 are also composed of a common component. Further, the first planetary gear P1 is made into a planetary gear train that is concurrently used as any one of a pair of the second planetary gears P2 engaged with each other, whereby the number of components of the transmission 270 can be further reduced together with a decrease in the axial length thereof. In addition, these components that are composed of a common member may be composed of separate components.

In the above-described second transmission portion 278, the first ring gear R1 is selectively connected to the first driven gear CG1B via the first clutch C1, and is selectively connected to the second driven gear CG2B via the fourth clutch C4. The first carrier CA1, the second carrier CA2 and the third sun gear S3 are connected to become integral with each other and are selectively connected to the first driven gear CG1B via the second clutch C2. The second ring gear R2 is selectively connected to the first driven gear CG1B via the third clutch C3, and is selectively connected to the transmission case 12 via the second brake B2. The third carrier CA3 is connected to the output gear 28 operating as the output rotating member. The first sun gear S1, the second sun gear S2 and the third ring gear R3 are connected to the second driven gear CG2B via the fifth clutch C5, and are selectively connected to the transmission case 12 via the first brake B1.

In the transmission 270 constructed as described above, for example, as shown in FIG. 91 which is similar to the engagement operation chart of FIG. 79 except for the engagement operations to establish a reverse gear stage in comparison therewith, since any two elements, which are selected among the first clutch C1, the second clutch C2, the third clutch C3, the fourth clutch C4, the fifth clutch C5, the first brake B1 and the second brake B2, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios γ (=input shaft rotation speed $N_{IN}$/output shaft rotation speed $N_{OUT}$) which vary roughly at an equal ratio as in the embodiment shown in FIG. 78 through FIG. 80 can be obtained per gear stage. In addition, the transmission ratio width (=γ1/γ8) which is the ratio of the transmission ratio γ1 of the first speed gear stage to the transmission ratio γ8 of the eighth speed gear stage is made into a comparatively large value. A description is given of the reverse gear stage. Since, by engagement of the fourth clutch C4 with the second brake B2, the first ring gear R1 is connected to the second driven gear CG2B, and the second ring gear R2 is connected to the transmission case 12, respectively, a reverse gear stage whose transmission ratio γR is a value, for example, [2.813] between the second speed gear stage and the third speed gear stage is established. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

FIG. 92 is a collinear chart, of the above-described transmission 270, corresponding to FIG. 80 which is a collinear chart of the above-described transmission 230. Five vertical lines Y1 through Y5 of the second transmission portion 278 in FIG. 92 represent, in order from the left side, the ring gear R1 corresponding to the first rotary element RE1, the carrier CA1, carrier CA2 and sun gear S3 connected to each other, which correspond to the second rotary element RE2, the ring gear R2 corresponding to the third rotary element RE3, the carrier CA3 corresponding to the fourth rotary element RE4, and the sun gear S1, sun gear S2 and ring gear R3 connected to each other, which correspond to the fifth rotary element. RE5, respectively. A main difference from FIG. 80 resides in that the brake B2 is added. The brake B2 is disposed so that the third rotary element RE3 (Ring gear R2) is selectively connected to the transmission case 12. Therefore, since, in the reverse gear stage, the first rotary element RE1 is connected to the second driven gear CG2B by engagement of the clutch C4 and its rotation speed is made into [NX2], and the third rotary element RE3 is connected to the transmission case 12 by engagement of the brake B2 and its rotation speed is made into [0], a negative rotation speed of the output gear 28 is shown by the point (Rev) at which a straight line connecting the intersection of the vertical line Y1 and the horizontal line X2 to the intersection of the vertical line Y3 and the horizontal line XZ crosses the vertical line Y4. Except for this point, FIG. 92 is the same as FIG. 80 in the form of the collinear chart. Accordingly, a description of parts other than the point in the collinear chart of FIG. 92 is omitted.

Figure 93:
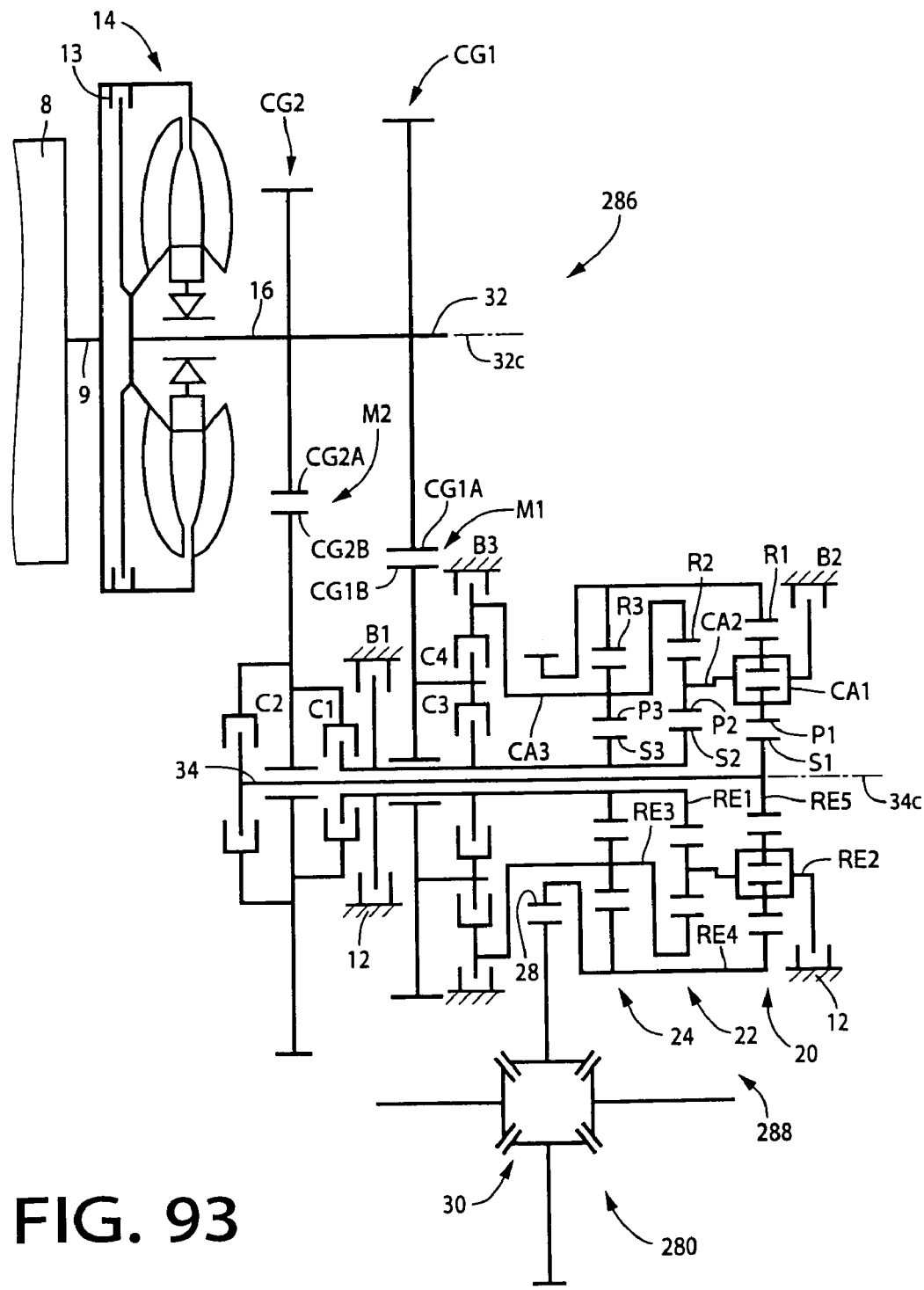
FIG. 93 is a view showing main points for describing a construction of a planetary gear type multistage transmission for vehicles according to still another embodiment of the present invention, corresponding to FIG. 1.
Figures 94, 95:
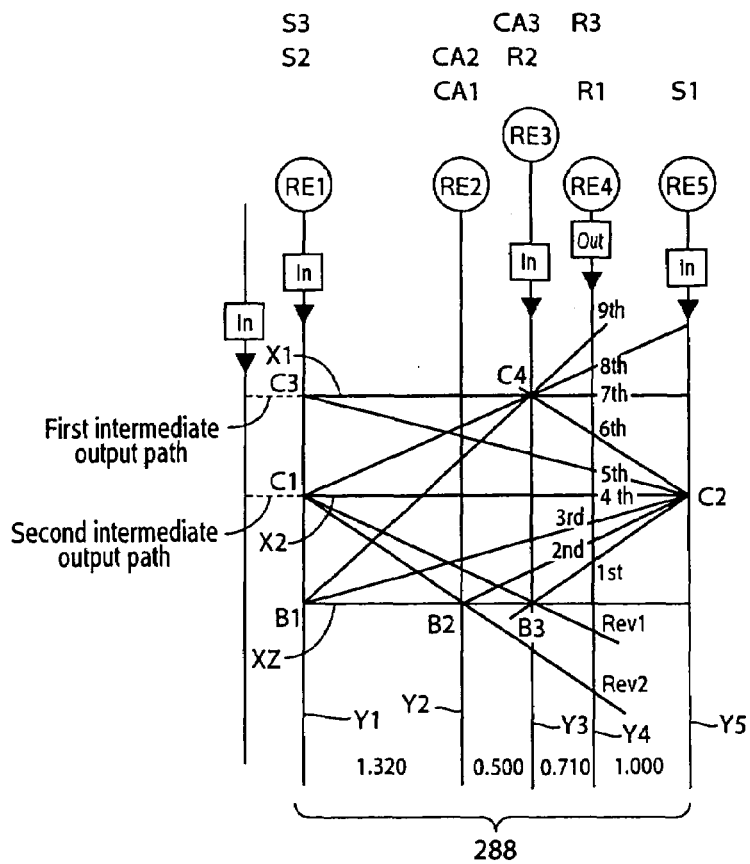
FIG. 94 is a chart showing another embodiment of the relationship between transmission gear stages of the planetary gear type multistage transmission for vehicles according to the embodiment shown in FIG. 93 and operations of hydraulic type friction engagement devices, which are required to establish the transmission gear stages, corresponding to FIG. 2.
FIG. 95 is a collinear chart describing another embodiment of the operations of the planetary gear type multistage transmission for vehicles according to the embodiment shown in FIG. 94, corresponding to FIG. 3.

FIG. 93 is a view showing main points for describing a construction of a transmission 280 according to another embodiment of the present invention. FIG. 94 is a chart showing the relationship between the transmission gear stages of the transmission 280 and operations of hydraulic type friction engagement devices necessary to establish the transmission gear stages. FIG. 95 is a collinear chart showing the rotation speeds of the rotary elements in the respective gear stages. The present embodiment is the same as the transmission 11 shown in FIG. 1 except for that the construction of respective devices of the second transmission portion 288 and relative arrangement of the first transmission portion 286 and the second transmission portion 288, differ from those of the transmission 11 shown in FIG. 1. Therefore, effects similar to those of the embodiment shown in FIG. 1 through FIG. 3 can be obtained. Hereinafter, a description is given of different points between the transmission 280 and the transmission 11.

The first transmission portion 286 is disposed so that the first counter gear pair CG1 and the second counter gear pair CG2 are juxtaposed so as to be as close to each other as possible and is disposed at the side having the engine 8 disposed on the first axial center 32c and the second axial center 34c. That is, the above-described torque converter 14 is disposed at the engine 8 side on the center 32c of the first axial center 32c from the first transmission portion 286, and the second transmission portion 288 is disposed opposite to the engine 8 side on the second axial center 34c from the first transmission portion 286.

In the first counter gear pair CG1 and the second counter gear pair CG2, which compose the first transmission portion 286 of the transmission 280 shown in FIG. 93, for example, the speed reduction ratio of the first counter gear pair CG1 is made into [1.000] or so, and the speed reduction ratio of the second counter gear pair CG2 is made into [2.000] or so, and the first transmission portion 286 transmits (outputs) rotations of the input shaft 16, that is, rotations of the first axis 32 to the second transmission portion 288 via the first intermediate output path M1 and the second intermediate output path M2 decelerated and rotated with respect to the first intermediate output path M1.

In the present embodiment, the first planetary gear set 20 that composes the second transmission portion 288 of the transmission 280 shown in FIG. 93 described above is composed of a double-pinion type planetary gear set, and the second planetary gear set 22 and the third planetary gear set 24 are composed of a single-pinion type planetary gear set, respectively. The first planetary gear set 20 is provided with the first sun gear S1, a plurality of pairs of the first planetary gears P1 engaged with each other, the first carrier CA1 that supports the first planetary gears P1 so as to cause the same to rotate and to revolve it, and the first ring gear R1 engaged with the first sun gear S1 via the first planetary gears P1, and has a prescribed gear ratio ρ1 of, for example, [0.548] or so. The second planetary gear set 22 is provided with the second sun gear S2, the second planetary gear P2, the second carrier CA2 that supports the second planetary gear P2 so as to cause the same to rotate and to revolve it, and the second ring gear R2 engaged with the second sun gear S2 via the second planetary gear P2 and has a prescribed gear ratio ρ2 of, for example, [0.379] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.390] or so.

In the above-described second transmission portion 288, the second sun gear S2 and the third sun gear S3 are connected to become integral with each other, are selectively connected to the second driven gear CG2B via the second clutch C1, are selectively connected to the first driven gear CG1B via the third clutch C3, and further are selectively connected to the transmission case 12 operating as the non-rotating member via the first brake B1. The first carrier CA1 and the second carrier CA2 are connected to become integral with each other, are selectively connected to the transmission case 12 via the second brake B2. The second ring gear R2 and the third carrier CA3 are connected to become integral with each other, are selectively connected to the first driven gear CG1B via the fourth clutch C4, and further are selectively connected to the transmission case 12 operating as the non-rotating member via the third brake B3. The first ring gear R1 and the third ring gear R3 are connected to become integral with each other, and are connected to the output gear 28 operating as the output rotating member. The first sun gear S1 is selectively connected to the second driven gear CG2B via the second clutch C2.

In the transmission 280 constructed as described above, for example, as shown in the engagement operation chart of FIG. 94, since any two elements, which are selected from the first clutch C1, the second clutch C2, the third clutch C3, the fourth clutch C4, the first brake B1, the second brake B2 and the third brake B3, are simultaneously engaged and operated with each other, any one of the first speed gear stage (the first transmission stage) through the ninth speed gear stage (the ninth transmission stage) or any one of the first reverse gear stage (the first reverse transmission stage) and the second reverse gear stage (the second reverse transmission stage) is established, wherein a transmission ratio γ(=input shaft rotation speed $N_{IN}$/output gear rotation speed $N_{OUT}$) which is varied roughly at an equal ratio can be given to respective gear stages.

That is, as shown in FIG. 94, since, by engagement of the second clutch C2 with the third brake B3, the first sun gear S1 is connected to the second driven gear CG2B, the second ring gear R2 and the third carrier CA3 are, respectively, connected to the transmission case 12, the first speed gear stage whose transmission ratio γ1 is the maximum value, for example, [4.817] is established. Also, since, by engagement of the second clutch C2 with the second brake B2, the first sun gear S1 is connected to the second driven gear CG2B, and the first carrier CA1 and the second carrier CA2 are, respectively, connected to the transmission case 12, the second speed gear stage whose transmission ratio γ2 is a smaller value, for example, [3.653] than the first speed gear stage is established. Also, since, by engagement of the second clutch C2 with the first brake B1, the first sun gear S1 is connected to the second driven gear CG2B, and the second sun gear S2 and the third sun gear S3 are, respectively, connected to the transmission case 12, the third speed gear stage whose transmission ratio γ3 is a smaller value, for example, [2.791] or so than the second speed gear stage is established. In addition, since, by engagement of the first clutch C1 with the second clutch C2, the second sun gear S2 and the third sun gear S3 are connected to the second driven gear CG2B, and the first sun gear S1 is connected to the second driven gear CG2B, the fourth speed gear stage whose transmission ratio γ4 is a smaller value, for example, [2.000] or so than the third speed gear stage is established. Also, since, by engagement of the second clutch C2 with the third clutch C3, the first sun gear S1 is connected to the second driven gear CG2B the second sun gear S2 and the third sun gear S3 are, respectively, connected to the first driven gear CG1B, the fifth speed gear stage whose transmission ratio γ5 is a smaller value, for example, [1.558] than the fourth speed gear stage is established. Further, since, by engagement of the second clutch C2 with the fourth clutch C4, the first sun gear S1 is connected to the second driven gear CG2B, and the second ring gear R2 and the third carrier CA3 are, respectively, connected to the first driven gear CG1B, the sixth speed gear stage whose transmission ratio γ6 is a smaller value, for example, [1.262] or so than the fifth speed gear stage is established. Also, since, by engagement of the third clutch C3 with the fourth clutch C4, the second sun gear S2 and the third sun gear S3 are, respectively, connected to the first driven gear CG1B, and the second ring gear R2 and the third carrier CA3 are, respectively, connected to the first driven gear CG1B, the seventh speed gear stage whose transmission ratio γ7 is a smaller value, for example, [1.000] than the sixth speed gear stage is established. In addition, since, by engagement of the first clutch C1 with the fourth clutch C4, the second sun gear S2 and the third sun gear S3 are, respectively, connected to the second driven gear CG2B, and the second ring gear R2 and the third carrier CA3 are, respectively, connected to the first driven gear CG1B, the eighth speed gear stage whose transmission ratio γ8 is a smaller value, for example, [0.837] than the seventh speed gear stage is established. Still further, since, by engagement of the fourth clutch C4 with the first brake B1, the second ring gear R2 and the third carrier CA3 are, respectively, connected to the first driven gear CG1B, and the second sun gear S2 and the third sun gear S3 are, respectively, connected to the transmission case 12, the ninth speed gear stage whose transmission ratio γ9 is a smaller value, for example, [0.719] or so than the eighth speed gear stage is established.

In addition, since, by engagement of the first clutch C1 with the third brake B3, the second sun gear S2 and the third sun gear S3 are, respectively, connected to the second driven gear CG2B, and the second ring gear R2 and the third carrier CA3 are, respectively, connected to the transmission case 12, the first reverse gear stage whose transmission ratio γR1 is a larger value, for example, [5.127] than the first speed gear stage is established. Also, since, by engagement of the first clutch C1 with the second brake B2, the second sun gear S2 and the third sun gear S3 are, respectively, connected to the second driven gear CG2B, and the first carrier CA1 and the second carrier CA2 are, respectively, connected to the transmission case 12, the second reverse gear stage whose transmission ratio γR2 is a smaller value, for example, [2.182] than the first reverse transmission stage and between the third speed gear stage and the fourth speed gear stage is established. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

In the above-described transmission 280, the ratio (=γ1/γ2) of the transmission ratio γ1 of the first speed gear stage to the transmission ratio γ2 of the second speed gear stage is made into [1.319], the ratio (=γ2/γ3) of the transmission ratio γ2 of the second speed gear stage to the transmission ratio γ3 of the third speed gear stage is made into [1.309], the ratio (=γ3/γ4) of the transmission ratio γ3 of the third speed gear stage to the transmission ratio γ4 of the fourth speed gear stage is made into [1.395], the ratio (=γ4/γ5) of the transmission ratio γ4 of the fourth speed gear stage to the transmission ratio γ5 of the fifth speed gear stage is made into [1.283], the ratio (=γ5/γ6) of the transmission ratio γ5 of the fifth speed gear stage to the transmission ratio γ6 of the sixth speed gear stage is made into [1.235], the ratio (=γ6/γ7) of the transmission ratio γ6 of the sixth speed gear stage to the transmission ratio γ7 of the seventh speed gear stage is made into [1.262], the ratio (=γ7/γ8) of the transmission ratio γ7 of the seventh speed gear stage to the transmission ratio γ8 of the eighth speed gear stage is made into [1.195], and the ratio (=γ8/γ9) of the transmission ratio γ8 of the eighth speed gear stage to the transmission ratio γ9 of the ninth speed gear stage is made into [1.163], wherein the respective transmission ratios 7 vary roughly at an equal ratio. Also, in the above-described transmission 280, the transmission ratio width (=γ1/γ9) which is the ratio of the transmission ratio γ1 of the first speed gear stage to the transmission ratio γ9 of the ninth speed gear stage is made into a comparatively large value, that is, [6.700]. Also, if the first speed gear stage is compared with the eighth speed gear stage, the transmission ratio width (=γ1/γ8) is made into a comparatively large value, for example, [5.756].

FIG. 95 is a collinear chart of the above-described transmission 280, corresponding to FIG. 3 which is a collinear chart of the above-described transmission 11. The lowermost horizontal line XZ of the three horizontal lines of the collinear chart of FIG. 95 shows that the rotation speed is zero, the uppermost horizontal line X1 shows that the rotation speed is [1.0], that is, the rotation speed of the first intermediate output path M1, and the intermediate horizontal line X2 shows a prescribed rotation speed [NX2] decelerated and rotated with respect to the first intermediate output path M1 in response to the speed reduction ratio of the second counter gear pair CG2, that is, the rotation speed of the second intermediate output path M2. In addition, five vertical lines Y1 through Y5 of the second transmission portion 288 represent, in order from the left side, the sun gear S2 and the sun gear S3 connected to each other, which correspond to the first rotary element RE1, the carrier CA1 and carrier CA2 connected to each other, which correspond to the second rotary element RE2, the ring gear R2 and carrier CA3 connected to each other, which correspond to the third rotary element RE3, the ring gear R1 and ring gear R3 connected to each other, which correspond to the fourth rotary element RE4 and the sun gear S1 corresponding to the fifth rotary element RE5, respectively.

If expressed utilizing the above-described collinear chart, the transmission 280 according to the present embodiment is constructed so that, in the first transmission portion 286, rotations of the input shaft 16 (rotations of the first axis 32) are outputted to the second transmission portion 288 via the first intermediate output path M1 and the second intermediate output path M2 decelerated and rotated with respect to the first intermediate output path M1. Also, in the second transmission portion 288, the first rotary element RE1 (S2 and S3) is selectively connected to the second driven gear CG2B via the first clutch C1, is selectively connected to the first driven gear CG1B via the third clutch C3, and is selectively connected to the transmission case 12 operating as the non-rotating member via the first brake B1. The second rotary element RE2 (CA1 and CA2) is selectively connected to the transmission case 12 via the second brake B2, the third rotary element RE3 (R2 and CA3) is selectively connected to the first driven gear CG1B via the fourth clutch C4, and is selectively connected to the transmission case 12 operating as the non-rotating member via the third brake B3. The fourth rotary element RE4 (R1 and R3) is connected to the output gear 28 operating as the output rotating member, and the fifth rotary element RE5 (S1) is selectively connected to the second driven gear CG2B via the second clutch C2.

In the collinear chart of FIG. 95 described above, since, in the first speed gear stage, the fifth rotary element RE5 is connected to the second driven gear CG2B by engagement of the clutch C2 and its rotation speed is made into [NX2], and the third rotary element RE3 is connected to the transmission case 12 by engagement of the brake B3 and its rotation speed is made into [0], the rotation speed of the output gear 28 is shown by the point (1st) at which a straight line connecting the intersection point of the vertical line Y5 and the horizontal line X2 to the intersection point of the vertical line Y3 and the horizontal line XZ crosses the vertical line Y4. Since, in the second speed gear stage, the fifth rotary element RE5 is connected to the second driven gear CG2B by engagement of the clutch C2 and its rotation speed is made into [NX2], and the second rotary element RE2 is connected to the transmission case 12 by engagement of the brake B2 and its rotation speed is made into [0], the rotation speed of the output gear 28 is shown by the point (2nd) at which a straight line connecting the intersection point of the vertical line Y5 and the horizontal line X2 to the intersection point of the vertical line Y2 and the horizontal line XZ crosses the vertical line Y4. Since, in the third speed gear stage, the fifth rotary element RE5 is connected to the second driven gear CG2B by engagement of the clutch C2 and its rotation speed is made into [NX2], and the first rotary element RE1 is connected to the transmission case 12 by engagement of the brake B1 and its rotation speed is made into [0], the rotation speed of the output gear 28 is shown by the point (3rd) at which a straight line connecting the intersection point of the vertical line Y5 and the horizontal line X2 to the intersection point of the vertical line Y1 and the horizontal line XZ crosses the vertical line Y4. Since, in the fourth speed gear stage, the fifth rotary element RE5 is connected to the second driven gear CG2B by engagement of the clutch C2 and its rotation speed is made into [NX2], and the first rotary element RE1 is connected to the second driven gear CG2B by engagement of the clutch C1 and its rotation speed is made into [NX2], the rotation speed of the output gear 28 is shown by the point (4th) at which a straight line connecting the intersection point of the vertical line Y5 and the horizontal line X2 to the intersection point of the vertical line Y1 and the horizontal line X2 crosses the vertical line Y4. Since, in the fifth speed gear stage, the fifth rotary element RE5 is connected to the second driven gear CG2B by engagement of the clutch C2 and its rotation speed is made into [NX2], and the first rotary element RE1 is connected to the first driven gear CG1B by engagement of the clutch C3 and its rotation speed is made into [1], the rotation speed of the output gear 28 is shown by the point (5th) at which a straight line connecting the intersection point of the vertical line Y5 and the horizontal line X2 to the intersection point of the vertical line Y1 and the horizontal line X1 crosses the vertical line Y4. Since, in the sixth speed gear stage, the fifth rotary element RE5 is connected to the second driven gear CG2B by engagement of the clutch C2 and its rotation speed is made into [NX2], and the third rotary element RE3 is connected to the first driven gear CG1B by engagement of the clutch C4 and its rotation speed is made into [1], the rotation speed of the output gear 28 is shown by the point (6th) at which a straight line connecting the intersection point of the vertical line Y5 and the horizontal line X2 to the intersection point of the vertical line Y3 and the horizontal line X1 crosses the vertical line Y4. Since, in the seventh speed gear stage, the first rotary element RE1 is connected to the first driven gear CG1B by engagement of the clutch C3 and its rotation speed is made into [1], and the third rotary element RE3 is connected to the first driven gear CG1B by engagement of the clutch C4 and its rotation speed is made into [1], the rotation speed of the output gear 28 is shown by the point (7th) at which a straight line connecting the intersection point of the vertical line Y1 and the horizontal line X1 to the intersection point of the vertical line Y3 and the horizontal line X1 crosses the vertical line Y4. Since, in the eighth speed gear stage, the first rotary element RE1 is connected to the second driven gear CG2B by engagement of the clutch C1 and its rotation speed is made into [NX2], and the third rotary element RE3 is connected to the first driven gear CG1B by engagement of the clutch C4 and its rotation speed is made into [1], the rotation speed of the output gear 28 is shown by the point (8th) at which a straight line connecting the intersection point of the vertical line Y1 and the horizontal line X2 to the intersection point of the vertical line Y3 and the horizontal line X1 crosses the vertical line Y4. Since, in the ninth speed gear stage, the third rotary element RE3 is connected to the first driven gear CG1B by engagement of the clutch C4 and its rotation speed is made into [1], and the first rotary element RE1 is connected to the transmission case 12 by engagement of the brake B1 and its rotation speed is made into [0], the rotation speed of the output gear 28 is shown by the point (9th) at which a straight line connecting the intersection point of the vertical line Y3 and the horizontal line X1 to the intersection point of the vertical line Y1 and the horizontal line XZ crosses the vertical line Y4. Since, in the first reverse gear stage, the first rotary element RE1 is connected to the second driven gear CG2B by engagement of the clutch C1 and its rotation speed is made into [NX2], and the third rotary element RE3 is connected to the transmission case 12 by engagement of the brake B3 and its rotation speed is made into [0], a negative rotation speed of the output gear 28 is shown by the point (Rev1) at which a straight line connecting the intersection point of the vertical line Y1 and the horizontal line X2 to the intersection point of the vertical line Y3 and the horizontal line XZ crosses the vertical line Y4. Since, in the second reverse gear stage, the first rotary element RE1 is connected to the second driven gear CG2B by engagement of the clutch C1 and its rotation speed is made into [NX2], and the second rotary element RE2 is connected to the transmission case 12 by engagement of the brake B2 and its rotation speed is made into [0], a negative rotation speed of the output gear 28 is shown by the point (Rev2) at which a straight line connecting the intersection point of the vertical line Y1 and the horizontal line X2 to the intersection point of the vertical line Y2 and the horizontal line XZ crosses the vertical line Y4.

As described above, according to the present embodiment, effects similar to those of the embodiment shown in FIG. 1 through FIG. 3 can be obtained. In addition, since the first reverse transmission stage is established by engaging the first clutch C1 with the third brake B3, and the second reverse transmission stage whose transmission ratio is smaller than that of the first reverse transmission stage is established by engaging the first clutch C1 with the second brake B2, seven or more forward transmission gear stages and two reverse transmission gear stages can be obtained.

For example, where a further greater drive force is required, for example, if, in the case of reverse on an uphill road, the first reverse transmission stage having a larger transmission ratio is used, and in the case of reverse on a flat road, the second reverse transmission stage having a smaller transmission ratio than in the first reverse transmission stage is used, such an effect can be brought about, by which fuel consumption can be saved.

Figure 96:
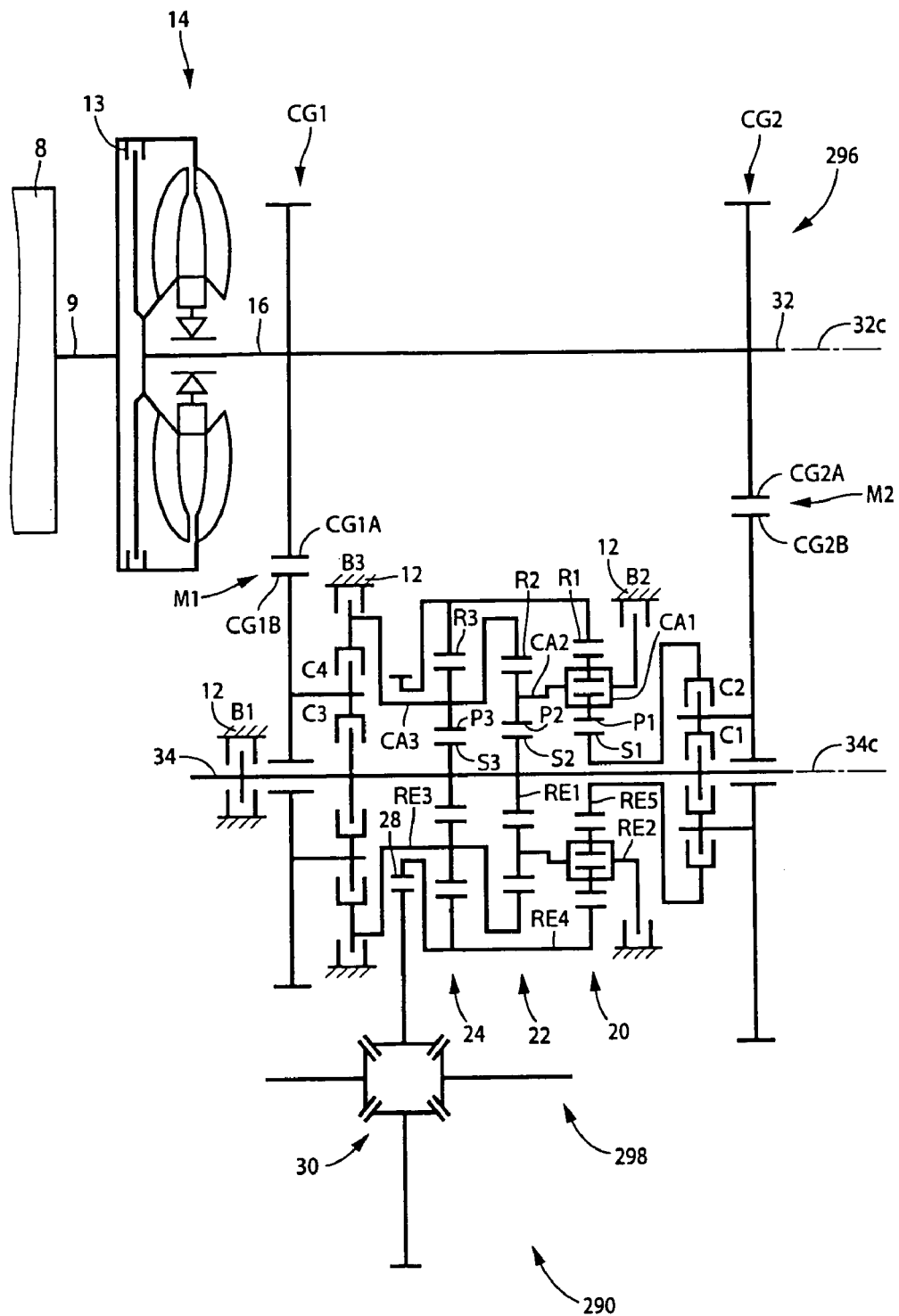
FIG. 96 is a view showing main points for describing a construction of a planetary gear type multistage transmission for vehicles according to still another embodiment of the present invention, corresponding to FIG. 93.
Figures 97, 98:
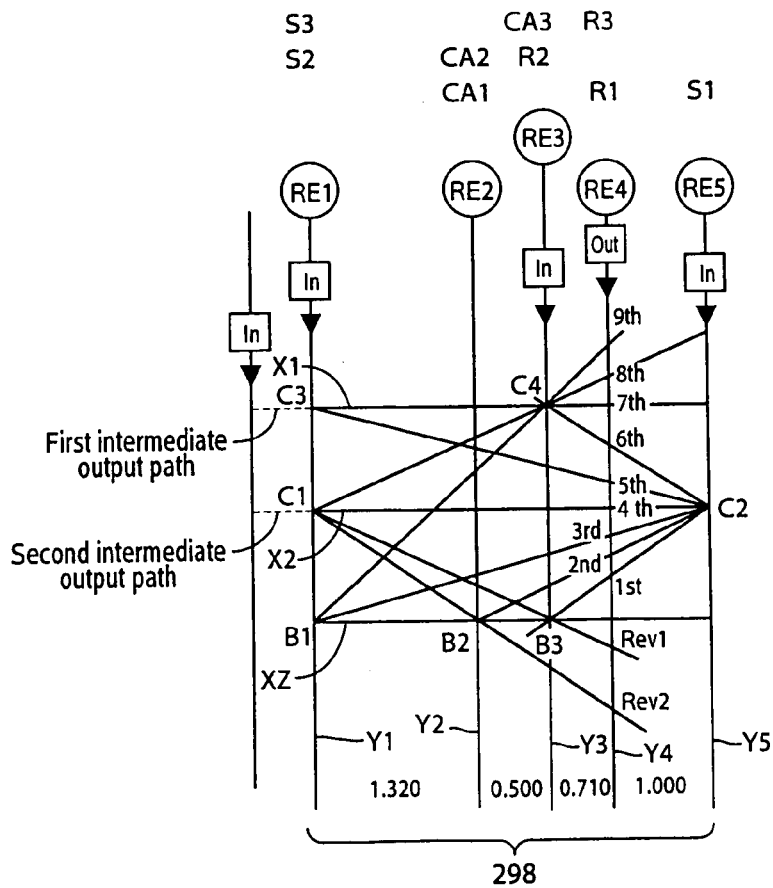
FIG. 97 is a chart showing another embodiment of the relationship between transmission gear stages of the planetary gear type multistage transmission for vehicles according to the embodiment shown in FIG. 96 and operations of hydraulic type friction engagement devices, which are required to establish the transmission gear stages, corresponding to FIG. 94.
FIG. 98 is a collinear chart describing operations of the planetary gear type multistage transmission for vehicles according to the embodiment shown in FIG. 96, corresponding to FIG. 95.

FIG. 96 is a view showing main points for describing a construction of a transmission 290 according to another embodiment of the present invention. FIG. 97 is a chart showing the relationship between the transmission gear stages of the transmission 290 and operations of hydraulic type friction engagement devices necessary to establish the transmission gear stages. FIG. 98 is a collinear chart showing the rotation speeds of the rotary elements in the respective gear stages. The present embodiment is the same as the transmission 280 shown in FIG. 93 except for that the arrangement between the first counter gear pair CG1 and the second counter gear pair CG2 differ from that of the transmission 280 shown in FIG. 93. Therefore, effects similar to those of the embodiment shown in FIG. 93 through FIG. 95 can be obtained. Hereinafter, a description is given of different points between the transmission 290 and the transmission 280. Since FIG. 97 and FIG. 98 are similar to FIG. 94 and FIG. 95, the description thereof is omitted.

In the transmission 290 according to the present embodiment, as shown in FIG. 96, the first counter gear pair CG1 and the second counter gear pair CG2, which compose the first transmission portion 296, are disposed so as for the second transmission portion 298 to be placed therebetween. Thus, the axial length of the transmission 290 can be kept compact as in the transmission 280, and valve bodies of hydraulic control circuits of an oil pump and hydraulic friction engagement devices can be disposed in the empty spacing above the first axial center 32c between the first counter gear pair CG1 and the second counter gear pair CG2, wherein connections of oil paths of the transmission 290 can be facilitated.

FIG. 99 is a view showing main points for describing a construction of a planetary gear type multistage transmission (hereinafter called a "transmission") 10 for vehicle, which is preferably employed as an automatic transmission for a vehicle. In FIG. 99, the transmission 10 is provided, in a transmission case 12 attached to the vehicle body, with the first transmission portion 36, which is mainly composed of the first axis 32 and the second axis 34 rotatably fixed in the transmission case 12 and disposed therein in parallel to each other and two sets of counter gear pairs being the first counter gear pair CG1 and the second counter gear pair CG2 operating as two sets of power transmission members, and the second transmission portion 38 which is mainly composed of the first planetary gear set 20, the second planetary gear set 22 and the third planetary gear set 24, wherein a torque converter 14 with a lockup clutch 13 operating as a hydraulic power transmission, an input shaft 16 connected to the torque converter 14, a drive gear CG1A being one of the above-described first counter gear pair CG1 fixed on the first axis 32 connected to the input shaft 16 and a drive gear CG2A being one of the above-described second counter gear pair CG2 are disposed on the first axial center 32c, which is the rotation center of the above-described first axis 32, one after another to be concentric therewith from a drive power source, for example, an engine 8 side, and a driven gear CG1B being the other of the above-described first counter gear pair CG1 rotatably provided around the second axis 34, a driven gear CG2B being the other of the above-described second counter gear pair CG2, the first planetary gear set 20, the second planetary gear set 22, the third planetary gear set 24 and an output gear 28 are disposed on the second axial center 34c, which is the rotation center of the above-described second axis 34, to be concentric therewith. The transmission 10 is preferably used as an automatic transmission for an FF or an RR, which is installed particularly in a lateral direction in a vehicle, and is provided between the engine 8 and drive wheels (not illustrated). The transmission 10 transmits an output of the engine 8 to the driving wheels. In the present embodiment, the above-described input shaft 16 and output gear 28 correspond to the input rotating member and output rotating member, respectively, and the above-described transmission case 12 corresponds to the non-rotating member. In addition, the input shaft 16 is substantially identical to the first axis 32 connected to the input shaft 16, wherein it can be the that rotations of the first axis 32 are rotations of the input shaft 16 being the input rotating member. Further, the above-described torque converter 14 is operatively connected to the crankshaft 9 of the engine 8 and outputs power of the engine 8 to the input shaft 16. That is, the input shaft 16 connected to a turbine shaft being the output side rotating member of the torque converter 14 is driven and rotated around the first axial center 32c by the engine 8, wherein the turbine shaft of the torque converter 14 corresponds to the input rotating member. Further, the above-described output gear 28 drives and rotates left and right drive wheels via, for example, a differential gear set 30, etc.

Here, by reference to FIG. 99, a detailed description is given of the layout of respective devices that compose the transmission 10. The first transmission portion 36 is disposed so that the first counter gear pair CG1 and the second counter gear pair CG2 are juxtaposed so as to be as close to each other as possible and so that it is made closer to the engine 8 side on the first axial center 32c and the second axial center 34c than the first planetary gear set 20, the second planetary gear set 22 and the third planetary gear set 24. That is, the above-described torque converter 14 and the input shaft 16 which is remarkably shorter than the second axis 34 are disposed on the first axial center 32c at the engine 8 side from the first transmission portion 36, and the second transmission portion 38 is disposed on the second axial center 34c at the side opposite to the engine 8 side from the first transmission portion 36. In addition, in the first transmission portion 36, the first counter gear pair CG1 is disposed at the engine 8 side from the second counter gear pair CG2, and in the second transmission portion 38, the third planetary gear set 24, the second planetary gear set 22 and the first planetary gear set 20 are disposed on the second axial center 34c one after another in the direction opposite to the engine 8 side from the first transmission portion 36 while the output gear 28 is disposed between the third planetary gear set 24 and the second planetary gear set 22. Further, respective engagement devices such as a clutch C1 through a clutch C4 are disposed between the second transmission portion 38 and the first counter gear pair CG1 or the second counter gear pair CG2, whereby the dimension of the transmission 10 in its axial direction can be shortened in comparison with the case where four planetary gear sets are employed on one axial center, and the transmission 10 become advantageous in the lateral installation in a FF or RR vehicle. Also, since, in the present embodiment, the clutches C1 through C4 and brakes B1 and B2 are concentrated at the axial end of the second axial center 34c or outside the transmission case 12, arrangement of hydraulic circuits can be facilitated. In particular, connection between the clutches C1 through C4 and the first transmission portion 36 can be made easy.

As in the counter gears of a parallel axis type transmission that has been widely known, the first counter gear pair CG1 and the second counter gear pair CG2 that compose the above-described first transmission portion 36 is provided with the first drive gear CG1A and the second drive gear CG2A on the first axis 32 and the first driven gear CG1B and the second driven gear CG2B on the second axial center 34c, and is composed of gear pairs in which the first drive gear CG1A is always engaged with the first driven gear CG1B and the second drive gear CG2A is also always engaged with the second driven gear CG2B. These two sets of counter gear pairs function as two sets of power transmission members for transmitting rotations of the input rotating member, which are inputted to the first axis, to the second transmission portion 38 on the second axial center 34c, wherein the first intermediate output path M1 being a drive-driven path is composed of the first counter gear pair CG1, and the second intermediate output path M2 also being a drive-driven path is composed of the second counter gear pair CG2. The first transmission portion 36 transmits two types of rotations differing from each other to the second transmission portion 38 via the first intermediate output path M1 and the second intermediate output path M2, which are two output paths. The first drive gear CG1A and the second drive gear CG2A are, respectively, the first drive member that composes the first intermediate output path M1 at the first axis 32 side and the second drive member that composes the second intermediate output path M2 at the first axis 32 side while the first driven gear CG1B and the second driven gear CG2B are, respectively, the first driven member that composes the first intermediate output path M1 at the second axial center 34c side and the second driven member that composes the second intermediate output path M2 at the second axial center 34c side. For example, where it is assumed that the speed reduction ratio (=rotation speed of the drive gear CG1A/rotation speed of the driven gear CG1B) of the first counter gear pair CG1 is [1.000] or so and the speed reduction ratio (=rotation speed of the drive gear CG2A/rotation speed of the driven gear CG2B) of the second counter gear pair CG2 is [0.630] or so, the first transmission portion 36 transmits (outputs) rotations of the input shaft 16, that is, rotations of the first axis 32, to the second transmission portion 38 via the first intermediate output path M1 and the second intermediate output path M2 that is accelerated and rotated with respect to the first intermediate output path M1. In the present embodiment, although it is assumed that the speed reduction ratio of the first counter gear pair CG1 is [1.000] or so and the first intermediate output path M1 is set to the rotation speed of the input shaft 16, the first intermediate output path M1 is not necessarily set to the rotation speed of the input shaft 16.

The first planetary gear set 20 that composes the second transmission portion 38 is composed of a double-pinion type planetary gear set, and the second planetary gear set 22 and the third planetary gear set 24 are, respectively, composed of a single-pinion type planetary gear set, respectively. The first planetary gear set 20 is provided with the first sun gear S1, a plurality of pairs of the first planetary gears P1 engaged with each other, the first carrier CA1 that supports the first planetary gears P1 so as to cause the same to rotate and to revolve it, and the first ring gear R1 engaged with the first sun gear S1 via the first planetary gears P1, and has a prescribed gear ratio ρ1 of, for example, [0.412] or so. The second planetary gear set 22 is provided with the second sun gear S2, the second planetary gear P2, the second carrier CA2 that supports the second planetary gear P2 so as to cause the same to rotate and to revolve it, and the second ring gear R2 engaged with the second sun gear S2 via the second planetary gear P2, and has a prescribed gear ratio ρ2 of, for example, [0.350] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.556] or so. The above-described three sets of planetary gear sets are partially connected to the second axis 34. There may be a case where the second axis 34 is not necessarily a continuous one axis but may be divided into a plurality on the basis of a connected state with the three sets of planetary gear sets. Where it is assumed that the number of teeth of the first sun gear S1 is ZS1, that of the first ring gear R1 is ZR1, that of the second sun gear S2 is ZS2, that of the second ring gear R2 is ZR2, that of the third sun gear S3 is ZS3, and that of the third ring gear R3 is ZR3, the above-described gear ratio ρ1 is ZS1/ZR1, the gear ratio ρ2 is ZS2/ZR2, and the gear ratio ρ3 is ZS2/ZR2.

In the above-described second transmission portion 38, the second sun gear S2 and the third sun gear S3 are connected to become integral with each other and are selectively connected to the first driven gear CG1B via the first clutch C1, and simultaneously are selectively connected to the second driven gear CG2B via the third clutch C3. Also, the first carrier CA1 and the second carrier CA2 are connected to become integral with each other, are selectively connected to the first driven gear CG1B via the second clutch C2, and simultaneously are selectively connected to the transmission case 12 operating as the non-rotating member via the first brake B1. The first ring gear R1, the second ring gear R2 and the third carrier CA3 are connected to become integral with each other and are connected to the output gear 28 operating as the output rotating member. The first sun gear S1 is selectively connected to the transmission case 12 via the second brake B2, and the third ring gear R3 is selectively connected to the second driven gear CG2B via the fourth clutch C4.

The above-described first clutch C1, the second clutch C2, the third clutch C3, the fourth clutch C4, the first brake B1 and the second brake B2 are Hydraulic type friction engagement devices that have been frequently used in a prior art automatic transmission for vehicle, which are composed of a wet type multi-plate configuration in which a plurality of friction plates overlapping each other are pressed by means of a hydraulic actuator or a band brake in which one end of one or two bands wound on the outer circumference of a rotating drum is tightened by means of a hydraulic actuator. Members at both sides between which the same intervenes are selectively connected to each other.

Figures 100, 101:
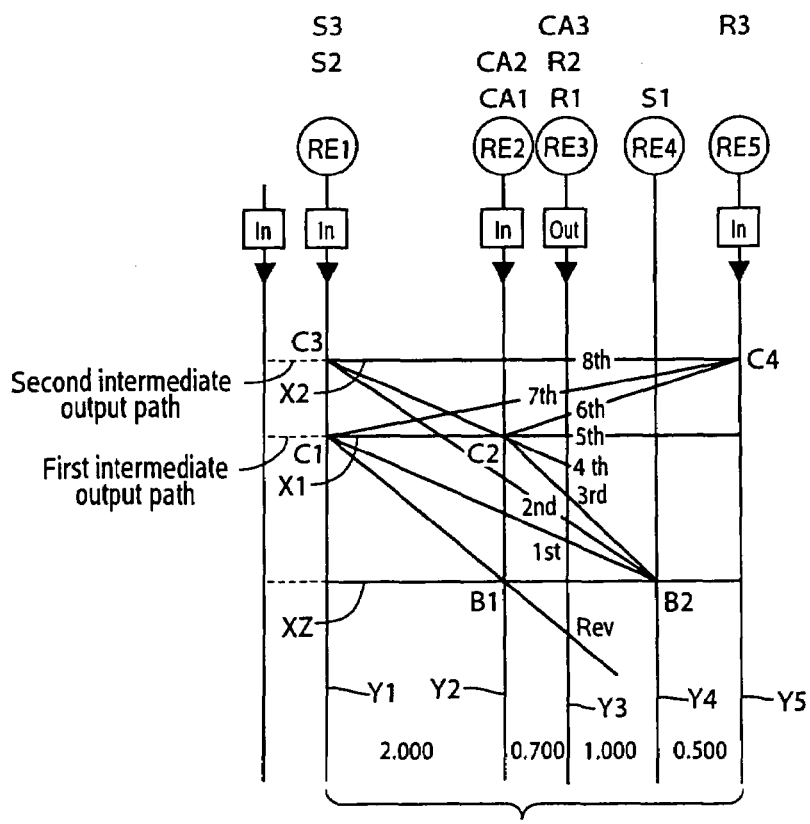
FIG. 100 is a chart showing the relationship between transmission gear stages of the planetary gear type multistage transmission for vehicles according to one embodiment shown in FIG. 99 and operations of hydraulic type friction engagement devices, which are required to establish the transmission gear stages.
FIG. 101 is a collinear chart describing operations of the planetary gear type multistage transmission for vehicles according to one embodiment shown in FIG. 99.

In the transmission 10 composed as described above, for example, as shown in the engagement operation chart of FIG. 100, since any two elements, which are selected from the first clutch C1, the second clutch C2, the third clutch C3, the fourth clutch C4, the first brake B1 and the second brake B2, are simultaneously engaged and operated with each other, any one of the first speed gear stage (the first transmission stage) through the eighth speed gear stage (the eighth transmission stage) or a reverse gear stage (reverse transmission stage) is selectively established, wherein a transmission ratio γ(=input shaft rotation speed $N_{IN}$/output gear rotation speed $N_{OUT}$) changing roughly at an equal ratio can be obtained per gear stage.

That is, as shown in FIG. 100, since, by engagement of the first clutch C1 with the second brake B2, the second sun gear S2 and the third sun gear S3 are, respectively, connected to the first driven gear CG1B and the first sun gear S1 is connected to the transmission case 12, the first speed gear stage whose transmission ratio γ1 is the maximum value, for example, [3.700] is established. Also, since, by engagement of the third clutch C3 with the second brake B2, the second sun gear S2 and the third sun gear S3 are, respectively, connected to the second driven gear CG2B and the first sun gear S1 is connected to the transmission case 12, the second speed gear stage whose transmission ratio γ2 is a smaller value than that of the first speed gear stage, for example, [2.330] is established. In addition, since, by engagement of the second clutch C2 with the second brake B2, the first carrier CA1 and the second carrier CA2 are, respectively, connected to the first driven gear CG1B and the first sun gear S1 and the transmission case 12 are connected to the first driven gear CG1B, the third speed gear stage whose transmission ratio γ3 is a smaller value than that of the second speed gear stage, for example, [1.700] is established. Also, since, by engagement of the second clutch C2 with the third clutch C3, the first carrier CA1 and the second carrier CA2 are, respectively, connected to the first driven gear CG1B, and the second sun gear S2 and the third sun gear S3 are, respectively, connected to the second driven gear CG2B, the fourth speed gear stage whose transmission ratio γ4 is a smaller value than that of the third speed gear stage, for example, [1.259] is established. Further, since, by engagement of the first clutch C1 with the second clutch C2, the second sun gear S2 and the third sun gear S3 are, respectively, connected to the first driven gear CG1B, and the first carrier CA1 and the second carrier CA2 are, respectively, connected to the first driven gear CG1B, the fifth speed gear stage whose transmission ratio γ5 is a smaller value than that of the fourth speed gear stage, for example, [1.000] is established. Also, since, by engagement of the second clutch C2 with the fourth clutch C4, the first carrier CA1 and the second carrier CA2 are, respectively, connected to the first driven gear CG1B, and the third ring gear γ3 is connected to the second driven gear CG2B, the sixth speed gear stage whose transmission ratio γ6 is a smaller value than that of the fifth speed gear stage, for example, [0.842] is established. Also, since, by engagement of the first clutch C1 with the fourth clutch C4, the second sun gear S2 and the third sun gear S3 are, respectively, connected to the first driven gear CG1B, and the third ring gear R3 is connected to the second driven gear CG2B, the seventh speed gear stage whose transmission ratio γ7 is a smaller value than that of the sixth speed gear stage, for example, [0.726] is established. Also, since, by engagement of the third clutch C3 with the fourth clutch C4, the second sun gear S2 and the third sun gear S3 are, respectively, connected to the second driven gear CG2B, and the third ring gear R3 is connected to the second driven gear CG2B, the eighth speed gear stage whose transmission ratio γ8 is a smaller value than that of the seventh speed gear stage, for example, [0.630] is established.

Since, by engagement of the first clutch C1 with the first brake B1, the second sun gear S2 and the third sun gear S3 are, respectively, connected to the first driven gear CG1B, and the first carrier CA1 and the second carrier CA2 are, respectively, connected to the transmission case 12, a reverse gear stage whose transmission ratio γR is a value between the first speed gear stage and the second speed gear stage, for example, [2.857], is established. The speed reduction ratio of the first counter gear pair CG1, speed reduction ratio of the second counter gear pair CG2, gear ratio ρ1 of the first planetary gear set 20, gear ratio ρ2 of the second planetary gear set 22, and gear ratio ρ3 of the third planetary gear set 24 are set so that the above-described transmission ratios can be obtained.

In the above-described transmission 10, the ratio (=γ1/γ2) of the transmission ratio γ1 of the first speed gear stage to the transmission ratio γ2 of the second speed gear stage is set to [1.588], the ratio (=γ2/γ3) of the transmission ratio γ2 of the second speed gear stage to the transmission ratio γ3 of the third speed gear stage is set to [1.370], the ratio (=γ3/γ4) of the transmission ratio γ3 of the third speed gear stage to the transmission ratio γ4 of the fourth speed gear stage is set to [1.350], the ratio (=γ4/γ5) of the transmission ratio γ4 of the fourth speed gear stage to the transmission ratio γ5 of the fifth speed gear stage is set to [1.259], the ratio (=γ5/γ6) of the transmission ratio γ5 of the fifth speed gear stage to the transmission ratio γ6 of the sixth speed gear stage is set to [1.187], the ratio (=γ6/γ7) of the transmission ratio γ6 of the sixth speed gear stage to the transmission ratio γ7 of the seventh speed gear stage is set to [1.161], and the ratio (=γ7/γ8) of the transmission ratio γ7 of the seventh speed gear stage to the transmission ratio γ8 of the eighth speed gear stage is set to [1.152], wherein the respective transmission ratios γ7 are varied roughly at an equal ratio. In addition, in the above-described transmission 10, the transmission ratio width (=γ1/γ8), which is the ratio of the transmission ratio γ1 of the first speed gear stage to the transmission ratio γ8 of the eighth speed gear stage is set to a comparatively large value, that is, [5.876].

FIG. 101 is a collinear chart capable of linearly describing the correlation in rotation speeds of respective rotary elements for which connected states differ from each other per gear stage. The collinear chart of FIG. 101 shows two-dimensional coordinates in which the horizontal direction shows the relationship of gear ratios ρ of the respective planetary gear sets 20, 22 and 24, and the vertical direction shows relative rotation speeds. The lowermost horizontal line XZ of the three horizontal lines shows that the rotation speed is zero, the horizontal line X1 immediately thereabove shows that the rotation speed is [1.0], that is, the rotation speed of the first intermediate output path M1, and the uppermost horizontal line X2 shows a prescribed rotation speed [NX2] accelerated and rotated with respect to the first intermediate output path M1 in response to the speed reduction ratio of the second counter gear pair CG2, that is, the rotation speed of the second intermediate output path M2. In addition, five vertical lines Y1 through Y5 of the second transmission portion 38 represent, in order from the left side, the sun gear S2 and sun gear S3 connected to each other, which correspond to the first rotary element RE1, the carrier CA1 and carrier CA2 connected to each other, which correspond to the second rotary element RE2, the ring gear R1, ring gear R2 and carrier CA3 connected to each other, which correspond to the third rotary element RE3, the sun gear S1 corresponding to the fourth rotary element RE4 and the ring gear R3 corresponding to the fifth rotary element RE5, respectively, wherein the intervals therebetween are determined in response to the gear ratios ρ1, ρ2, and ρ3 of the planetary gear sets 20, 22 and 24. Where it is assumed that the spacing between the sun gear and carrier is set to an interval corresponding to [1] between the vertical lines in the collinear chart, the spacing between the carrier and ring gear is set to an interval corresponding to p, and, in the second transmission portion 38 of FIG. 101, the spacing between the vertical line Y3 and the vertical line Y4 is set to the interval corresponding to [1], and the intervals between other vertical lines are accordingly set on the basis of the above-described relationship. As described above, since the sun gear S1, carrier CA2 and ring gear R1 of the first planetary gear set 20, the sun gear S2, carrier CA2 and ring gear R2 of the second planetary gear set 22, the sun gear S3, carrier CA3 and ring gear R3 of the third planetary gear set 24 are partially connected independently or with each other, five rotary elements, that is, the first rotary element RE1, the second rotary element RE2, the third rotary element RE3, the fourth rotary element RE4 and the fifth rotary element RE5 are composed in order from one (left) end to the other (right) end in the collinear chart as the rotary elements of the second transmission portion 38.

If expressed utilizing the above-described collinear chart, the transmission 10 according to the present embodiment is composed so that, in the transmission portion 36, rotations of the input shaft 16 (that is, rotations of the first axis 32) are outputted to the second transmission portion 38 via the first intermediate output path M1 and the second intermediate output path M2 accelerated and rotated with respect to the first intermediate output path M1. Also, the transmission 10 is composed, in the second transmission portion 38, so that the first rotary element RE1 (composed of S2 and S3) is selectively connected to the first driven gear CG1B via the first clutch C1, and is selectively connected to the second driven gear CG2B via the third clutch C3, the second rotary element RE2 (composed of CA1 and CA2) is selectively connected to the first driven gear CG1B via the second clutch C2, and is selectively connected to the transmission case 12 operating as the non-rotating member via the first brake B1, the third rotary element RE3 (composed of R1, R2 and CA3) is connected to the output gear 28 operating as the output rotating member, the fourth rotary element RE4 (composed of S1) is selectively connected to the transmission case 12 via the second brake B2, and the fifth rotary element RE5 (R3) is selectively connected to the second driven gear CG2B via the fourth clutch C4.

In the above-described collinear chart in FIG. 101, since, in the first speed gear stage, the first rotary element RE1 is connected to the first driven gear CG1B by engagement of the clutch C1 and the rotation speed [1] is brought about, and the fourth rotary element RE4 is connected to the transmission case 12 by engagement of the brake B2 and the rotation speed [0] is brought about, the rotation speed of the output gear 28 is shown by the point (1st) at which a straight line connecting the intersection point of the vertical line Y1 and the horizontal line X1 to the intersection point of the vertical line Y4 and the horizontal line XZ crosses the vertical line Y3. Since, in the second speed gear stage, the first rotary element RE1 is connected to the second driven gear CG2B by engagement of the clutch C3 and the rotation speed [NX2] is brought about, and the fourth rotary element RE4 is connected to the transmission case 12 by engagement of the brake B2 and the rotation speed [0] is brought about, the rotation speed of the output gear 28 is shown by the point (2nd) at which a straight line connecting the intersection point of the vertical line Y1 and the horizontal line X2 to the intersection point of the vertical line Y4 and the horizontal line XZ crosses the vertical line Y3. Since, in the third speed gear stage, the second rotary element RE2 is connected to the first driven gear CG1B by engagement of the clutch C2 and the rotation speed [1] is brought about, and the fourth rotary element RE4 is connected to the transmission case 12 by engagement of the brake B2 and the rotation speed [0] is brought about, the rotation speed of the output gear 28 is shown by the point (3rd) at which a straight line connecting the intersection point of the vertical line Y2 and the horizontal line X1 to the intersection point of the vertical line Y4 and the horizontal line XZ crosses the vertical line Y3. Since, in the fourth speed gear stage, the second rotary element RE2 is connected to the first driven gear CG1B by engagement of the clutch C2 and the rotation speed [1] is brought about, and the first rotary element RE1 is connected to the second driven gear CG2B by engagement of the clutch C3 and the rotation speed [NX2] is brought about, the rotation speed of the output gear 28 is shown by the point (4th) at which a straight line connecting the intersection point of the vertical line Y2 and the horizontal line X1 to the intersection point of the vertical line Y1 and the horizontal line X2 crosses the vertical line Y3. Since, in the fifth speed gear stage, the first rotary element RE1 is connected to the first driven gear CG1B by engagement of the clutch C1 and the rotation speed [1] is brought about, and the second rotary element RE2 is connected to the first driven gear CG1B by engagement of the clutch C2 and the rotation speed [1] is brought about, the rotation speed of the output gear 28 is shown by the point (5th) at which a straight line connecting the intersection point of the vertical line Y1 and the horizontal line X1 to the intersection point of the vertical line Y2 and the horizontal line X1 crosses the vertical line Y3. Since, in the sixth speed gear stage, the second rotary element RE2 is connected to the first driven gear CG1B by engagement of the clutch C2 and the rotation speed [1] is brought about, and the fifth rotary element RE5 is connected to the second driven gear CG2B by engagement of the clutch C4 and the rotation speed [NX2] is brought about, the rotation speed of the output gear 28 is shown by the point (6th) at which a straight line connecting the intersection point of the vertical line Y2 and the horizontal line X1 to the intersection point of the vertical line Y5 and the horizontal line X2 crosses the vertical line Y3. Since, in the seventh speed gear stage, the first rotary element RE1 is connected to the first driven gear CG1B by engagement of the clutch C1 and the rotation speed [1] is brought about, and the fifth rotary element RE5 is connected to the second driven gear CG2B by engagement of the clutch C4, and the rotation speed [NX2] is brought about, the rotation speed of the output gear 28 is shown by the point (7th) at which a straight line connecting the intersection point of the vertical line Y1 and the horizontal line X1 to the intersection point of the vertical line Y5 and the horizontal line X2 crosses the vertical line Y3. Since, in the eighth speed gear stage, the first rotary element RE1 is connected to the second driven gear CG2B by engagement of the clutch C3, and the rotation speed [NX2] is brought about, and the fifth rotary element RE5 is connected to the second driven gear CG2B by engagement of the clutch C4 and the rotation speed [NX2] is brought about, the rotation speed of the output gear 28 is shown by the point (8th) at which a straight line connecting the intersection point of the vertical line Y1 and the horizontal line X2 to the intersection point of the vertical line Y5 and the horizontal line X2 crosses the vertical line Y3. Since, in the reverse gear stage, the first rotary element RE1 is connected to the first driven gear CG1B by engagement of the clutch C1, and the rotation speed [1] is brought about, and the second rotary element RE2 is connected to the transmission case 12 by engagement of the brake B1, and the rotation speed [0] is brought about, a negative rotation speed of the output gear 28 is shown by the point (Rev) at which a straight line connecting the intersection point of the vertical line Y1 and the horizontal line X1 to the intersection point of the vertical line Y2 and the horizontal line XZ crosses the vertical line Y3.

As described above, according to the present embodiment, with the first transmission portion 36 and three sets of planetary gear sets of the first planetary gear set 20, the second planetary gear set 22 and the third planetary gear set 24, a planetary gear type multistage transmission 10 for vehicle capable of securing large transmission ratio widths and adequate transmission ratio steps can be brought about, which enables multistage forward transmissions. That is, respective transmission ratios γ are varied roughly at an equal ratio, excellent speed-increasing characteristics or speed accelerating characteristics can be obtained by changing the gear stages, and the transmission ratio width (=γ1/γ8) of the transmission 10 is set to a comparatively large value, for example, [5.876]. Therefore, a small-sized planetary gear type multistage transmission 10 for vehicle, by which, for example, high-speed drive and uphill-road starting performance are compatible with each other, can be obtained. In addition, since only three sets of planetary gear sets are used, it is possible to shorten the entire length, that is, the dimension in the axial direction, in comparison with a case of employing four planetary gear sets, in which the first transmission portion is composed of a planetary gear set, and the transmission 10 can be preferably employed for lateral installation in an FF vehicle and an RR vehicle.

Further, according to the present embodiment, since the first counter gear pair CG1 and the second counter gear pair CG2 are used, power (rotation) can be precisely transmitted from the input shaft 16 to the second transmission portion 38, and an adequate rotation speed can be obtained by only setting the speed reduction ratio (gear ratio) of the counter gear pairs.

Also, according to the present embodiment, since empty spacing is secured above the first axial center 32c, that is, above the extension line of the first axis 32 which is shorter than the second axis 34, at the side opposite to the engine 8 side from the first transmission portion 36, the axial length of the transmission 10 can be kept compact, and valve bodies of hydraulic circuits of an oil pump and hydraulic friction-engagement devices can be disposed in the empty spacing, wherein it becomes easy to connect oil paths of the transmission 10, and the empty spacing can be effectively utilized in view of mounting the transmission 10 in a vehicle body. That is very advantageous.

In addition, according to the present embodiment, a reverse transmission stage can be established by engaging the first clutch C1 with the first brake B1, wherein seven or more forward transmission gear stages and one reverse transmission gear stage are obtained.

Further, according to the present embodiment, the first planetary gear set 20, the second planetary gear set 22 and the third planetary gear set 24 are disposed on the second axial center 34c one after another in order at the side opposite to the engine 8 side from the first transmission portion 36, and the torque converter 14 is disposed on the first axis 32 at the engine 8 side from the first transmission portion 36 so that output of the engine 8 is inputted into the input shaft 16 (the first axis 32) of the transmission 10 via the torque converter 14. Therefore, compact design of the automatic transmission is enabled.

Also, according to the present embodiment, since the first clutch C1, the second clutch C2, the third clutch C3, the fourth clutch C4, the first brake B1 and the second brake B2 are concentrated at the axial end of the second axis 34 or at the transmission case 12 side, that is, outside, arrangement of hydraulic circuits can be facilitated.

Next, a description is given of another embodiment of the invention. In addition, in the following description, parts which are common to those in the above-described embodiment are given the same reference numbers, and the description thereof is omitted.

Figure 102:
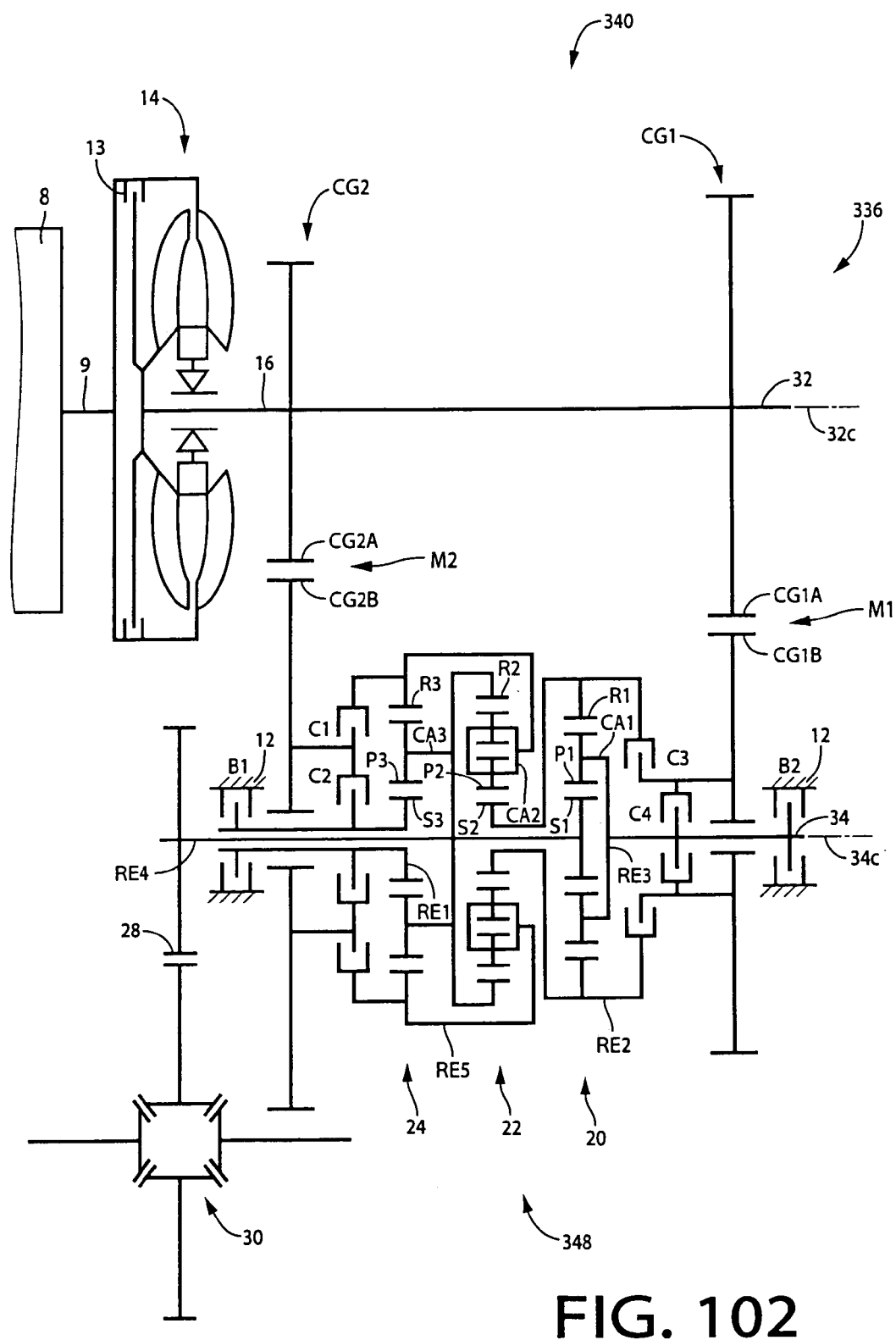
FIG. 102 is a view showing main points for describing a construction of a planetary gear type multistage transmission for vehicles according to an embodiment of the present invention, corresponding to FIG. 32.
Figures 103, 104:
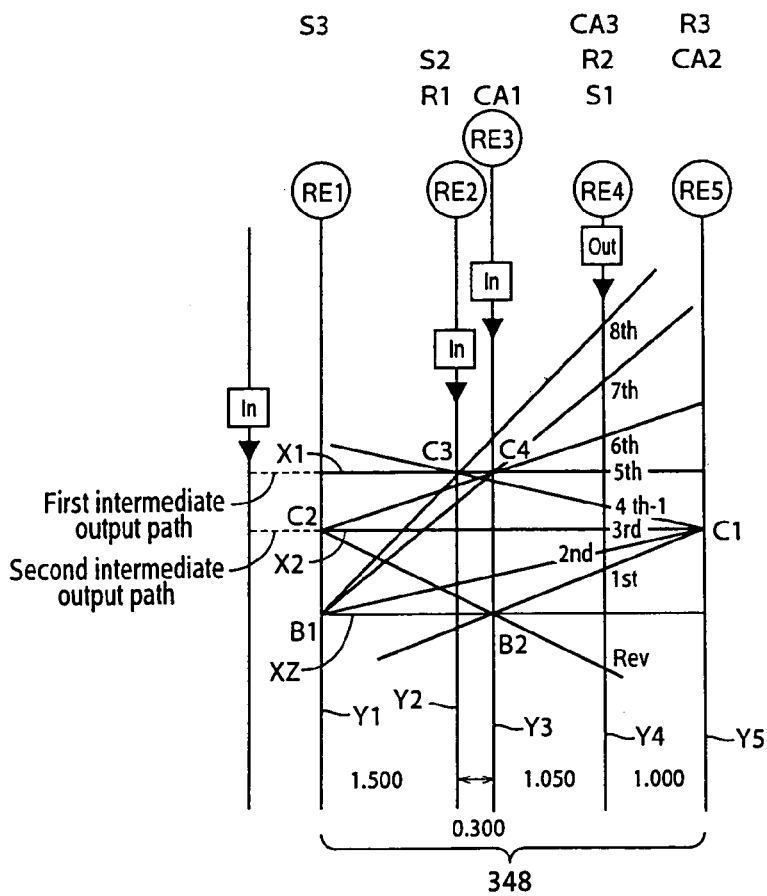
FIG. 103 is a chart showing the relationship between transmission gear stages of the planetary gear type multistage transmission for vehicles according to the embodiment shown in FIG. 102 and operations of hydraulic type friction engagement devices, which are required to establish the transmission gear stages, corresponding to FIG. 33.
FIG. 104 is a collinear chart describing operations of the planetary gear type multistage transmission for vehicles according to the embodiment shown in FIG. 102, corresponding to FIG. 34.

FIG. 102 is a view showing main points for describing a construction of a transmission 340 which is still another embodiment of the present invention. FIG. 103 is a chart showing the relationship between the transmission gear stages of the transmission 340 and operations of the hydraulic friction engagement devices necessary to establish the transmission gear stages. FIG. 104 is a collinear chart showing the rotation speeds of rotary elements in respective gear stages. The present embodiment is the same as the transmission 90 shown in FIG. 32 except for that the construction of respective devices of the second transmission portion 348 differs from that of the transmission 90 shown in FIG. 32. Therefore, effects similar to those of the embodiment shown in FIG. 32 through FIG. 34 can be obtained. Hereinafter, a description is given of points at which the transmission 340 differs from the transmission 90.

Figures 105, 106:
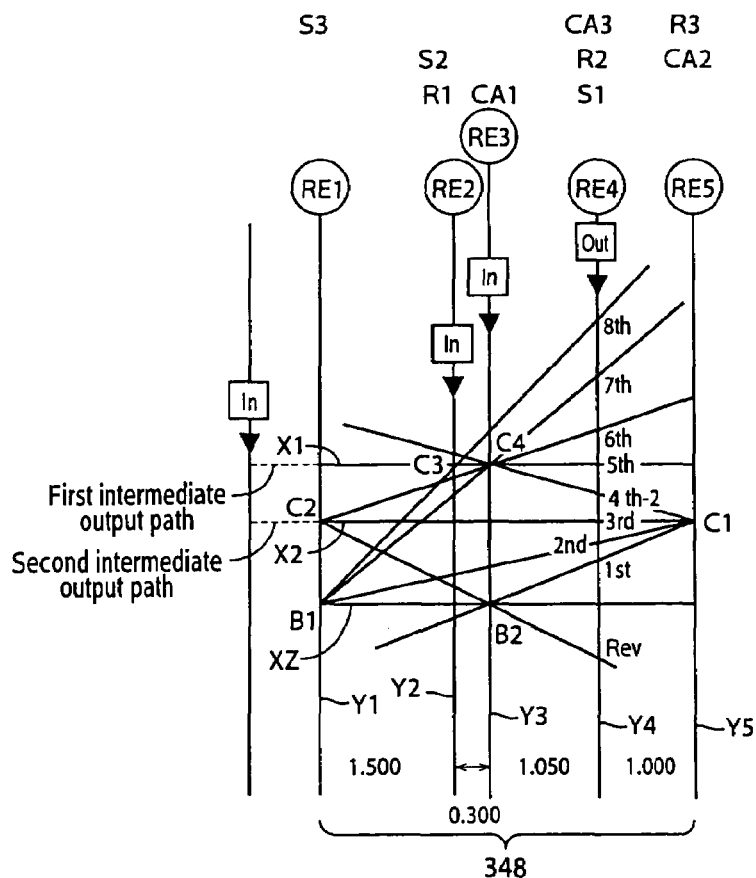
FIG. 105 is a chart showing another embodiment of the relationship between transmission gear stages of the planetary gear type multistage transmission for vehicles according to one embodiment shown in FIG. 102 and operations of hydraulic type friction engagement devices, which are required to establish the transmission gear stages, corresponding to FIG. 35.
FIG. 106 is a collinear chart describing another embodiment of the operations of the planetary gear type multistage transmission for vehicles according to the embodiment shown in FIG. 102, corresponding to FIG. 36.

In the present embodiment, the first planetary gear set 20 and the third planetary gear set 24 which compose the second transmission portion 348 of the transmission 340 shown in FIG. 106 above are composed of a single-pinion type planetary gear set, respectively. The second planetary gear set 22 is composed of a double-pinion type planetary gear set. The first planetary gear set 20 is provided with the first sun gear S1, the first planetary gear P1, the first carrier CA1 that supports the first planetary gear P1 so as to cause the same to rotate and to revolve it, and the first ring gear R1 engaged with the first sun gear S1 via the first planetary gear P1, and has a prescribed gear ratio ρ1 of, for example, [0.286] or so. The second planetary gear set 22 is provided with the second sun gear S2, a plurality of pairs of the second planetary gears P2 engaged with each other, the second carrier CA2 that supports the second planetary gears P2 so as to cause the same to rotate and to revolve it, and the second ring gear R2 engaged with the second sun gear S2 via the second planetary gears P2, and has a prescribed gear ratio ρ2 of, for example, [0.426] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.351] or so.

In the second transmission portion 348, the third sun gear S3 is selectively connected to the second driven gear CG2b via the second clutch C2 and is selectively connected to the transmission case 12 via the first brake B1. The first ring gear R1 and the second sun gear S2 are connected to become integral with each other and are selectively connected to the first driven gear CG1B via the third clutch C3. The first carrier CA1 is selectively connected to the first driven gear CG1B via the fourth clutch C4, and is selectively connected to the transmission case 12 via the second brake B2. The first sun gear S1, the second ring gear R2 and the third carrier CA3 are connected to become integral with each other and are connected to the output gear 28 operating as the output rotating member. The second carrier CA2 and the third ring gear R3 are connected to become integral with each other and are selectively connected to the second driven gear CG2B via the first clutch C1.

In the transmission 340 constructed as described above, as shown in FIG. 103 which is similar to the engagement operation chart of FIG. 33, since any two elements, which are selected among the first clutch C1, the second clutch C2, the third clutch C3, the fourth clutch C4, the first brake B1 and the second brake B2, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios γ (=input shaft rotation speed $N_{IN}$/output shaft rotation speed $N_{OUT}$) which vary roughly at an equal ratio as in the embodiment shown in FIG. 32 through FIG. 34 can be obtained per gear stage. In addition, the transmission ratio width (=γ1/γ8) which is the ratio of the transmission ratio γ1 of the first speed gear stage to the transmission ratio γ8 of the eighth speed gear stage is made into a comparatively large value. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

FIG. 104 is a collinear chart of the above-described transmission 340, corresponding to FIG. 34 which is a collinear chart of the above-described transmission 90. Five vertical lines Y1 through Y5 of the second transmission portion 348 in FIG. 104 represent, in order from the left side, the sun gear S3 corresponding to the first rotary element RE1, the ring gear R1 and the sun gear S2 connected to each other, which correspond to the second rotary element RE2, the carrier CA1 corresponding to the third rotary element RE3, the sun gear S1, ring gear R2 and carrier CA3 connected to each other, which correspond to the fourth rotary element RE4, and the carrier CA2 and ring gear R3 connected to each other, which correspond to the fifth rotary element RE5, respectively. Therefore, on the basis of these rotary elements, FIG. 104 differs from FIG. 34 only in the construction of the respective rotary elements. These drawings are the same in the form of the collinear chart. Accordingly, a description of the collinear chart of FIG. 104 is omitted.

FIG. 105 shows still another embodiment of engagement operations, shown in FIG. 103, of the hydraulic type friction engagement devices of the above-described transmission 340. FIG. 106 shows still another embodiment of the collinear chart, shown in FIG. 104, of the transmission 340. A difference between FIG. 105 and FIG. 103 is the same as that between FIG. 35 and FIG. 33. Also, a difference between FIG. 106 and FIG. 104 is the same as that between FIG. 36 and FIG. 34. Therefore, the description thereof is omitted.

Figure 107:
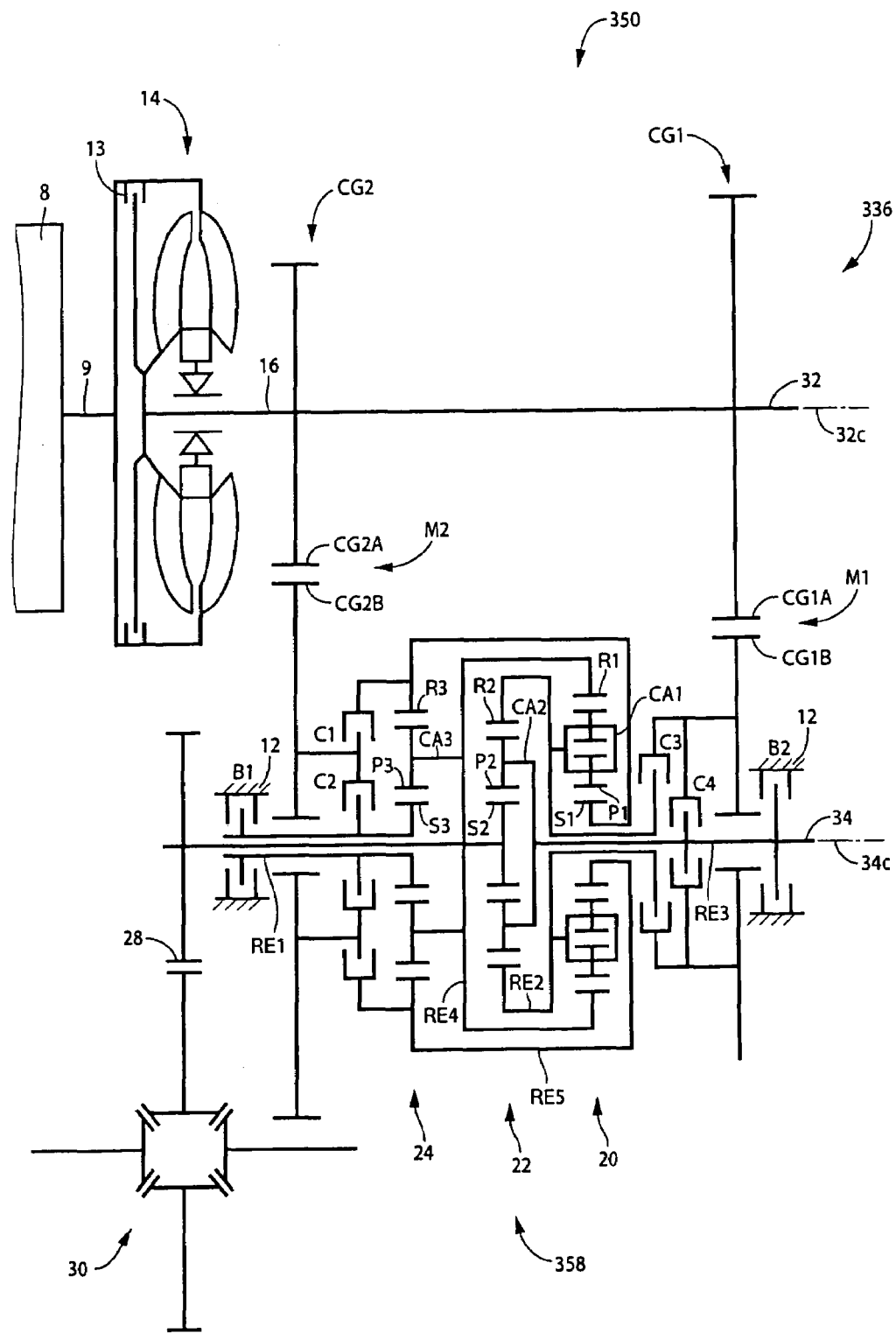
FIG. 107 is a view showing main points for describing a construction of a planetary gear type multistage transmission for vehicles according to still another embodiment of the present invention, corresponding to FIG. 32.
Figures 108, 109:
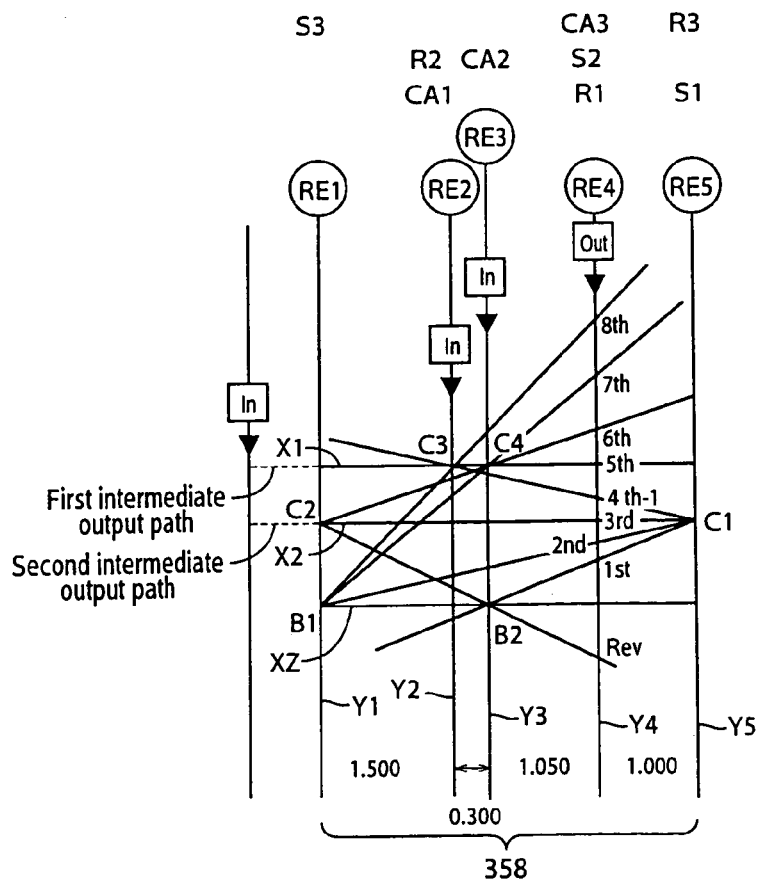
FIG. 108 is a chart showing the relationship between transmission gear stages of the planetary gear type multistage transmission for vehicles according to the embodiment shown in FIG. 107 and operations of hydraulic type friction engagement devices, which are required to establish the transmission gear stages, corresponding to FIG. 33.
FIG. 109 is a collinear chart describing operations of the planetary gear type multistage transmission for vehicles according to the embodiment shown in FIG. 107, corresponding to FIG. 34.

FIG. 107 is a view showing main points for describing a construction of a transmission 350 which is still another embodiment of the present invention. FIG. 108 is a chart showing the relationship between the transmission gear stages of the transmission 350 and operations of the hydraulic friction engagement devices necessary to establish the transmission gear stages. FIG. 109 is a collinear chart showing the rotation speeds of rotary elements in respective gear stages. The present embodiment is the same as the transmission 90 shown in FIG. 32 except for that the construction of respective devices of the second transmission portion 358 differs from that of the transmission 90 shown in FIG. 32. Therefore, effects similar to those of the embodiment shown in FIG. 32 through FIG. 34 can be obtained. Hereinafter, a description is given of points at which the transmission 350 differs from the transmission 90.

In the present embodiment, the first planetary gear set 20 that composes the second transmission portion 358 of the transmission 350 shown in FIG. 107 described above is composed of a double-pinion type planetary gear set, and the second planetary gear set 22 and the third planetary gear set 24 are, respectively, composed of a single-pinion type planetary gear set. The first planetary gear set 20 is provided with the first sun gear S1, a plurality of pairs of the first planetary gears P1 engaged with each other, the first carrier CA1 that supports the first planetary gears P1 so as to cause the same to rotate and to revolve it, and the first ring gear R1 engaged with the first sun gear S1 via the first planetary gears P1, and has a prescribed gear ratio ρ1 of, for example, [0.574] or so. The second planetary gear set 22 is provided with the second sun gear S2, the second planetary gear P2, the second carrier CA2 that supports the second planetary gear P2 so as to cause the same to rotate and to revolve it, and the second ring gear R2 engaged with the second sun gear S2 via the second planetary gear P2, and has a prescribed gear ratio ρ2 of, for example, [0.286] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.351] or so.

In the above-described second transmission portion 358, the third sun gear S3 is selectively connected to the second driven gear CG2B via the second clutch C2, and is selectively connected to the transmission case 12 via the first brake B1. The first carrier CA1 and the second ring gear R2 are connected to become integral with each other and are selectively connected to the first driven gear CG1B via the third clutch C3. The second carrier CA2 is selectively connected to the first driven gear CG1B via the fourth clutch C4, and is selectively connected to the transmission case 12 via the second brake B2. The first ring gear R1, the second sun gear S2 and the third carrier CA3 are connected to become integral with each other, and are connected to the output gear 28 operating as the output rotating member. The first sun gear S1 and the third ring gear R3 are connected to become integral with each other, and are selectively connected to the second driven gear CG2B via the first clutch C1.

In the transmission 350 constructed as described above, for example, as shown in FIG. 107 which is similar to the engagement operation chart of FIG. 108, since any two elements, which are selected among the first clutch C1, the second clutch C2, the third clutch C3, the fourth clutch C4, the first brake B1 and the second brake B2, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios γ (=input shaft rotation speed $N_{IN}$/output shaft rotation speed $N_{OUT}$) which vary roughly at an equal ratio as in the embodiment shown in FIG. 32 through FIG. 34 can be obtained per gear stage. In addition, the transmission ratio width (=γ1/γ8) which is the ratio of the transmission ratio γ1 of the first speed gear stage to the transmission ratio γ8 of the eighth speed gear stage is made into a comparatively large value. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are set so as to obtain the above-described transmission ratios.

FIG. 109 is a collinear chart of the above-described transmission 350, corresponding to FIG. 34 which is a collinear chart of the above-described transmission 90. Five vertical lines Y1 through Y5 of the second transmission portion 358 in FIG. 109 represent, in order from the left side, the sun gear S3 corresponding to the first rotary element RE1, the carrier CA1 and ring gear R2 connected to each other, which correspond to the second rotary element RE2, the carrier CA2 corresponding to the third rotary element RE3, the ring gear R1, sun gear S2 and carrier CA3 connected to each other, which correspond to the fourth rotary element RE4, and the sun gear S1 and ring gear R3 connected to each other, which correspond to the fifth rotary element RE5, respectively. Therefore, on the basis of these rotary elements, FIG. 109 differs from FIG. 34 only in the construction of the respective rotary elements. These drawings are the same in the form of the collinear chart. Accordingly, a description of the collinear chart of FIG. 109 is omitted.

Figures 110, 111:
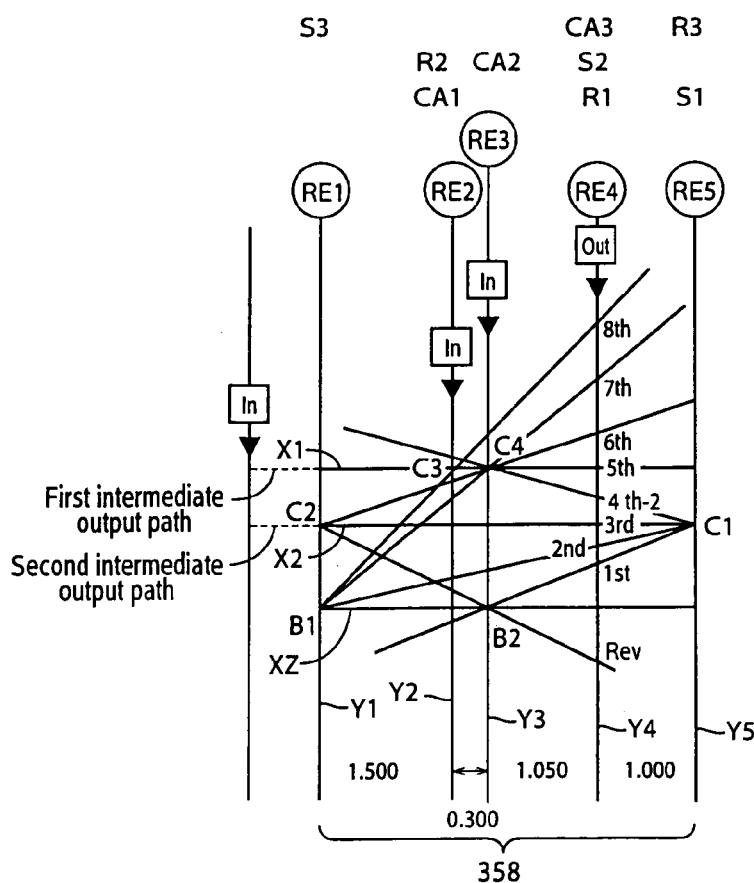
FIG. 110 is a chart showing another embodiment of the relationship between transmission gear stages of the planetary gear type multistage transmission for vehicles according to one embodiment shown in FIG. 107 and operations of hydraulic type friction engagement devices, which are required to establish the transmission gear stages, corresponding to FIG. 35.
FIG. 111 is a collinear chart describing another embodiment of the operations of the planetary gear type multistage transmission for vehicles according to the embodiment shown in FIG. 107, corresponding to FIG. 36.

FIG. 110 shows still another embodiment of engagement operations, shown in FIG. 108, of the hydraulic type friction engagement devices of the above-described transmission 350. FIG. 111 shows still another embodiment of the collinear chart, shown in FIG. 109, of the transmission 350. A difference between FIG. 110 and FIG. 108 is the same as that between FIG. 35 and FIG. 33. Also, a difference between FIG. 111 and FIG. 109 is the same as that between FIG. 36 and FIG. 34. Therefore, the description thereof is omitted.

Figure 112:
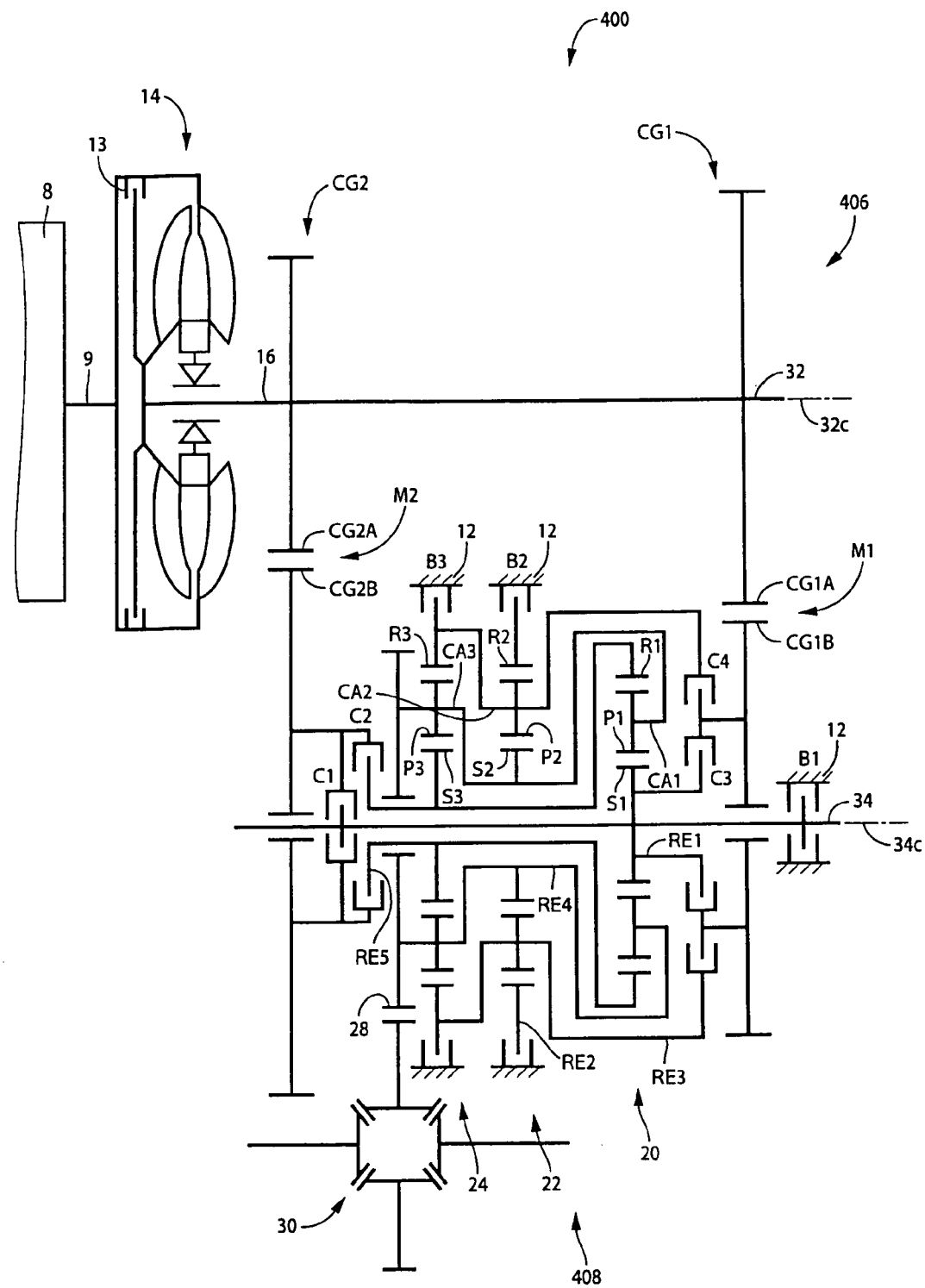
FIG. 112 is a view showing main points for describing a construction of a planetary gear type multistage transmission for vehicles according to still another embodiment of the present invention, corresponding to FIG. 96.
Figures 113, 114:
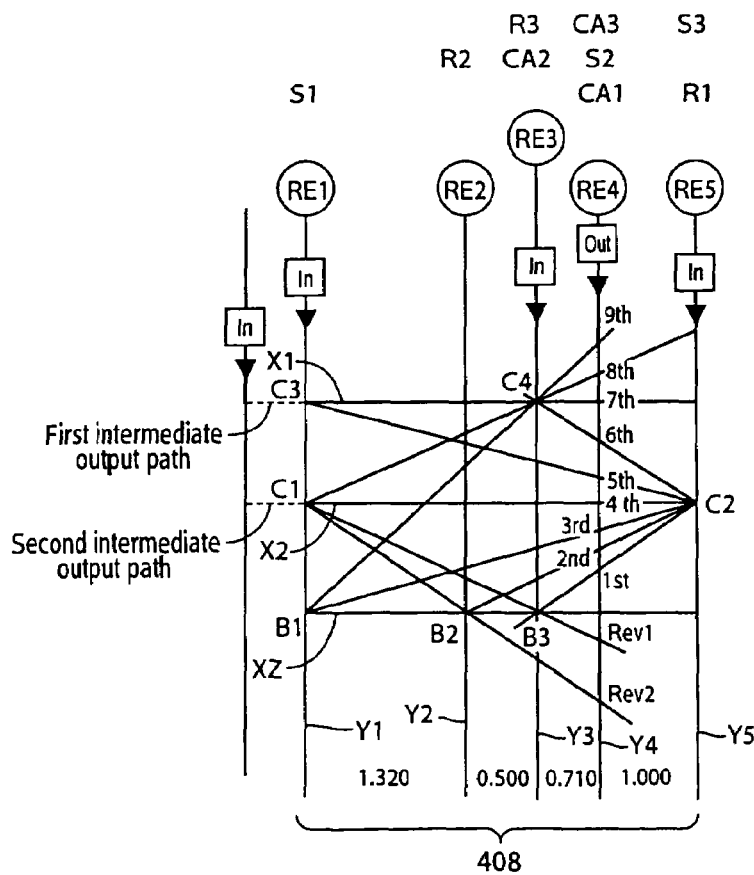
FIG. 113 is a chart showing the relationship between transmission gear stages of the planetary gear type multistage transmission for vehicles according to the embodiment shown in FIG. 112 and operations of hydraulic type friction engagement devices, which are required to establish the transmission gear stages, corresponding to FIG. 97.
FIG. 114 is a collinear chart describing operations of the planetary gear type multistage transmission for vehicles according to the embodiment shown in FIG. 112, corresponding to FIG. 98.

FIG. 112 is a view showing main points for describing a construction of a transmission 400 which is still another embodiment of the present invention. FIG. 113 is a chart showing the relationship between the transmission gear stages of the transmission 400 and operations of the hydraulic friction engagement devices necessary to establish the transmission gear stages. FIG. 114 is a collinear chart showing the rotation speeds of rotary elements in respective gear stages. The present embodiment is the same as the transmission 290 shown in FIG. 96 except for that the construction of respective devices of the second transmission portion 408 differs from that of the transmission 290 and that the arrangement between first counter gear pair CG1 and the second counter gear pair CG2 is opposite to that of the transmission 290. Therefore, effects similar to those of the embodiment shown in FIG. 96 through FIG. 98 can be obtained. Hereinafter, a description is given of points at which the transmission 400 differs from the transmission 290.

In the present embodiment, the first planetary gear set 20, the second planetary gear set 22 and the third planetary gear set 24, which compose the second transmission portion 408 of the transmission 400 shown in FIG. 112 above are composed of a single-pinion type planetary gear set, respectively. The first planetary gear set 20 is provided with the first sun gear S1, the first planetary gear P1, the first carrier CA1 that supports the first planetary gear P1 so as to cause the same to rotate and to revolve it, and the first ring gear R1 engaged with the first sun gear S1 via the first planetary gear P1, and has a prescribed gear ratio ρ1 of, for example, [0.395] or so. The second planetary gear set 22 is provided with the second sun gear S2, the second planetary gear P2, the second carrier CA2 that supports the second planetary gear P2 so as to cause the same to rotate and to revolve it, and the second ring gear R2 engaged with the second sun gear S2 via the second planetary gear P2, and has a prescribed gear ratio ρ2 of, for example, [0.704] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.710] or so.

In the above-described second transmission portion 408, the first sun gear S1 is selectively connected to the second driven gear CG2B via the first clutch C1, is selectively connected to the first driven gear CG1B via the third clutch C3, and is selectively connected to the transmission case 12 operating as the non-rotating member via the first brake B1. The second ring gear R2 is selectively connected to the transmission case 12 via the second brake B2, the second carrier CA2 and the third ring gear R3 are connected to become integral with each other, are selectively connected to the first driven gear CG1B via the fourth clutch C4, and further are selectively connected to the transmission case 12 operating as the non-rotating member via the third brake B3. The first carrier CA1, the second sun gear S2 and the third carrier CA3 are connected to become integral with each other and are connected to the output gear 28 operating as the output rotating member. The first ring gear R1 and the third sun gear S3 are connected to become integral with each other and are selectively connected to the second driven gear CG2B via the second clutch C2.

In the transmission 400 constructed as described above, for example, as shown in FIG. 113 which is similar to the engagement operation chart of FIG. 97, since any two elements, which are selected among the first clutch C1, the second clutch C2, the third clutch C3, the fourth clutch C4, the first brake B1, the second brake B2 and the third brake B3, are simultaneously engaged and operated with each other, any one of the first speed gear stage (the first transmission stage) through the ninth speed gear stage (the ninth transmission stage) or any one of the first reverse gear stage (the first reverse transmission stage) and the second reverse gear stage (the second reverse transmission stage) is selectively established, and transmission ratios γ (=input shaft rotation speed $N_{IN}$/output shaft rotation speed $N_{OUT}$) which vary roughly at an equal ratio can be obtained per gear stage. In addition, the transmission ratio width (=γ1/γ9) which is the ratio of the transmission ratio γ1 of the first speed gear stage to the transmission ratio γ9 of the ninth speed gear stage is made into a comparatively large value, that is, [6.700]. Also, as regards the ratio of the first speed gear stage to the eighth speed gear stage, the transmission ratio width (=γ1/γ8) is made into a comparatively large value, that is, [5.756]. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

FIG. 114 is a collinear chart, of the above-described transmission 400, corresponding to FIG. 98 which is a collinear chart of the above-described transmission 290. Five vertical lines Y1 through Y5 of the second transmission portion 408 in FIG. 114 represent, in order from the left side, the sun gear S1 corresponding to the first rotary element RE1, the ring gear R2 corresponding to the second rotary element RE2, the carrier CA2 and ring gear R3 connected to each other, which correspond to the third rotary element RE3, the carrier CA1, sun gear S2 and carrier CA3 connected to each other, which correspond to the fourth rotary element RE4, and the ring gear R1 and the sun gear S3 connected to each other, which correspond to the fifth rotary element RE5, respectively. Therefore, on the basis of these rotary elements, FIG. 114 differs from FIG. 98 only in the construction of the respective rotary elements. These drawings are identical to each other in the form of the collinear chart. Accordingly, a description of the collinear chart of FIG. 98 is omitted.

Figure 115:
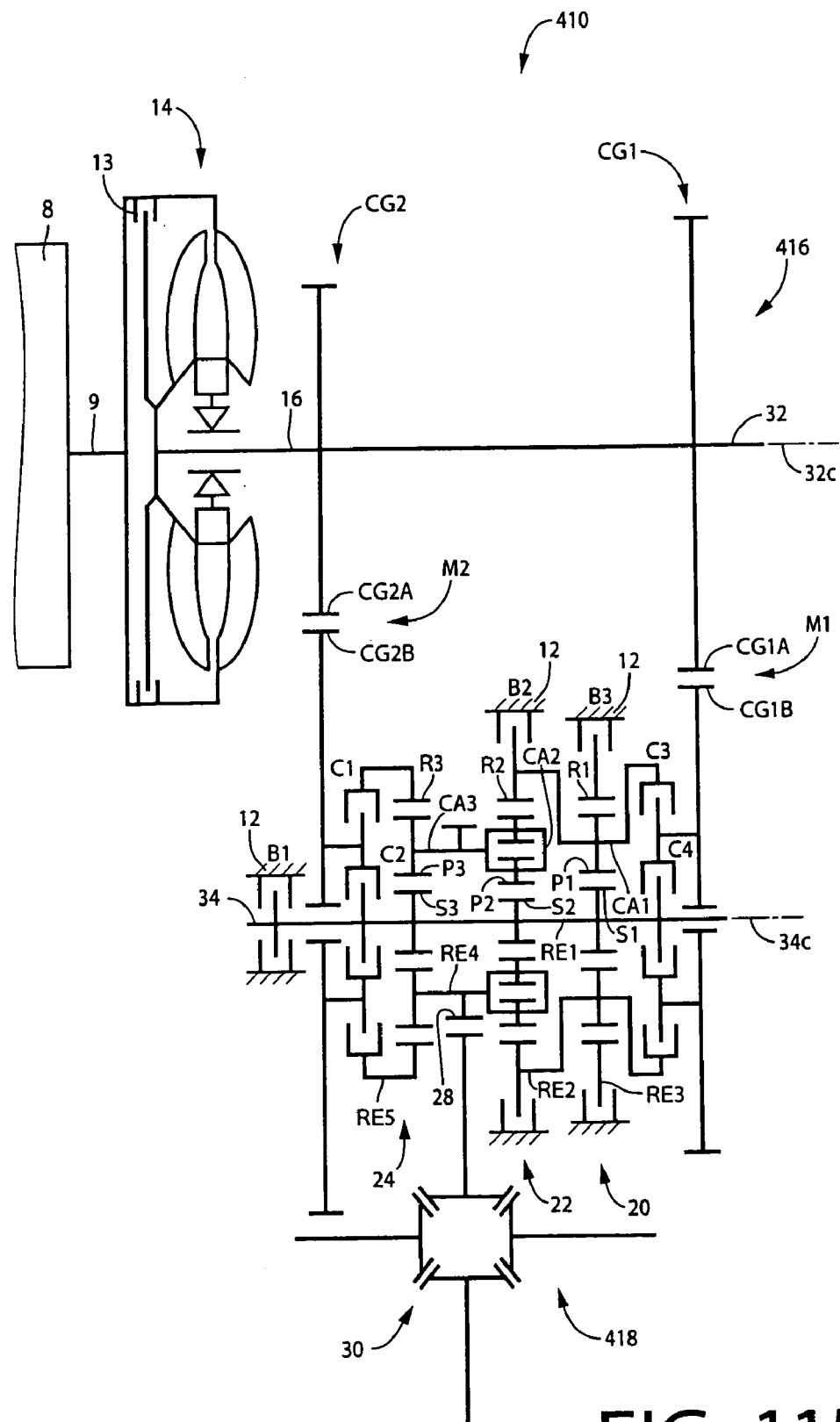
FIG. 115 is a view showing main points for describing a construction of a planetary gear type multistage transmission for vehicles according to still another embodiment of the present invention, corresponding to FIG. 32.
Figures 116, 117:
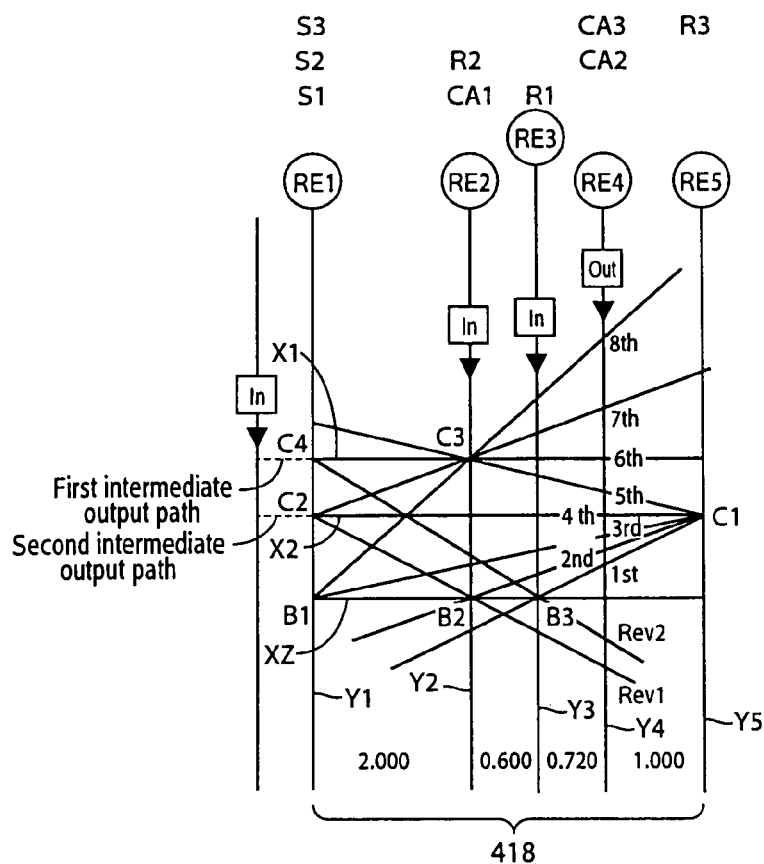
FIG. 116 is a chart showing the relationship between transmission gear stages of the planetary gear type multistage transmission for vehicles according to the embodiment shown in FIG. 115 and operations of hydraulic type friction engagement devices, which are required to establish the transmission gear stages, corresponding to FIG. 33.
FIG. 117 is a collinear chart describing operations of the planetary gear type multistage transmission for vehicles according to the embodiment shown in FIG. 115, corresponding to FIG. 34.

FIG. 115 is a view showing main points for describing a construction of a transmission 410 according to another embodiment of the present invention. FIG. 116 is a chart showing the relationship between the transmission gear stages of the transmission 410 and operations of hydraulic type friction engagement devices necessary to establish the transmission gear stages. FIG. 117 is a collinear chart showing the rotation speeds of the rotary elements in the respective gear stages. The present embodiment is the same as the transmission 90 shown in FIG. 32 except for that the construction of respective devices of the second transmission portion 418 differ from that of the transmission 90 shown in FIG. 32. Therefore, effects similar to those of the embodiment shown in FIG. 32 through FIG. 34 can be obtained. Hereinafter, a description is given of different points between the transmission 410 and the transmission 90.

In the first counter gear pair CG1 and the second counter gear pair CG2 that compose the first transmission portion 416 of the transmission 410 shown in FIG. 115 above, the speed reduction ratio of the first counter gear pair CG1 is made into, for example, [1.000] or so, and that of the second counter gear pair CG2 is made into, for example, [1.745] or so, and the first transmission portion 416 transmits (outputs) rotations of the input shaft 16, that is, rotations of the first axis 32 to the second transmission portion 418 via the first intermediate output path M1 and the second intermediate output path M2 decelerated and rotated with respect to the first intermediate output path M1.

In the present embodiment, the first planetary gear set 20 and the third planetary gear set 24 that compose the second transmission portion 418 of the transmission 410 shown in FIG. 115 described above are composed of a single-pinion type planetary gear set, respectively. The second planetary gear set 22 is composed of a double-pinion type planetary gear set. The first planetary gear set 20 is provided with the first sun gear S1, the first planetary gear P1, the first carrier CA1 that supports the first planetary gear P1 so as to cause the same to rotate and to revolve it, and the first ring gear R1 engaged with the first sun gear S1 via the first planetary gear P1, and has a prescribed gear ratio ρ1 of, for example, [0.300] or so. The second planetary gear set 22 is provided with the second sun gear S2, a plurality of pairs of the second planetary gears P2 engaged with each other, the second carrier CA2 that supports the second planetary gears P2 so as to cause the same to rotate and to revolve it, and the second ring gear R2 engaged with the second sun gear S2 via the second planetary gears P2, and has a prescribed gear ratio ρ2 of, for example, [0.398] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.301] or so.

In the above-described second transmission portion 418, the first sun gear S1, the second sun gear S2 and the third sun gear S3 are connected to become integral with each other, are selectively connected to the second driven gear CG2B via the second clutch C2, further are selectively connected to the first driven gear CG1B via the fourth clutch C4, and still further are selectively connected to the transmission case 12 operating as the non-rotating member via the first brake B1. The first carrier CA1 and the second ring gear R2 are connected to become integral with each other, are selectively connected to the first driven gear CG1B via the third clutch C3, and further are selectively connected to the transmission case 12 via the second brake B2. The first ring gear R1 is selectively connected to the transmission case 12 via the third brake B3. The second carrier CA2 and the third carrier CA3 are connected to become integral with each other and are connected to the output gear 28 operating as the output rotating member. The third ring gear R3 is selectively connected to the second driven gear CG2B via the first clutch C1.

In the transmission 410 constructed as described above, for example, as shown in the engagement operation chart of FIG. 116, since any two elements, which are selected from the first clutch C1, the second clutch C2, the third clutch C3, the fourth clutch C4, the first brake B1, the second brake B2 and the third brake B3, are simultaneously engaged and operated with each other, any one of the first speed gear stage (the first transmission stage) through the eighth speed gear stage (the eighth transmission stage) or a reverse gear stage (the reverse transmission stage) is established, wherein a transmission ratio γ(=input shaft rotation speed $N_{IN}$/output gear rotation speed $N_{OUT}$) which is varied roughly at an equal ratio can be given to respective gear stages.

That is, as shown in FIG. 116, since, by engagement of the first clutch C1 with the third brake B3, the third ring gear R3 is connected to the second driven gear CG2B, and the first ring gear R1 is connected to the transmission case 12, respectively, the first speed gear stage whose transmission ratio γ1 is the maximum value, for example, [4.169] is established. Also, since, by engagement of the first clutch C1 with the second brake B2, the third ring gear R3 is connected to the second driven gear CG2B, and the first carrier CA1 and the second ring gear R2 are, respectively, connected to the transmission case 12, the second speed gear stage whose transmission ratio γ2 is a smaller value than that of the first speed gear stage, for example, [3.067] or so is established. In addition, since, by engagement of the first clutch C1 with the first brake B1, the third ring gear R3 is connected to the second driven gear CG2B, and the first sun gear S1, the second sun gear S2 and the third sun gear S3 are, respectively, connected to the transmission case 12, the third speed gear stage whose transmission ratio γ3 is a smaller value than that of the second speed gear stage, for example, [2.271] or so is established. Also, since, by engagement of the first clutch C1 with the second clutch C2, the third ring gear R3 is connected to the second driven gear CG2B, and the first sun gear S1, the second sun gear S2 and the third sun gear S3 are, respectively, connected to the second driven gear CG2B, the fourth speed gear stage whose transmission ratio γ4 is a smaller value than that of the third speed gear stage, for example, [1.745] or so is established. Further, since, by engagement of the first clutch C1 with the third clutch C3, the third ring gear R3 is connected to the second driven gear CG2B, and the first carrier CA1 and the second ring gear R2 are, respectively, connected to the first driven gear CG1B, the fifth speed gear stage whose transmission ratio γ5 is a smaller value than that of the fourth speed gear stage, for example, [1.321] or so is established. Also, since, by engagement of the third clutch C3 with the fourth clutch C4, the first carrier CA1 and the second ring gear R2 are, respectively, connected to the first driven gear CG1B, and the first sun gear S1, the second sun gear S2 and the third sun gear S3 are, respectively, connected to the first driven gear CG1B, the sixth speed gear stage whose transmission ratio γ6 is a smaller value than that of the fifth speed gear stage, for example, [1.000] or so is established. Also, since, by engagement of the second clutch C2 with the third clutch C3, the first sun gear S1, the second sun gear S2 and the third sun gear S3 are, respectively, connected to the second driven gear CG2B, the first carrier CA1 and the second ring gear R2 are, respectively, connected to the first driven gear CG1B, the seventh speed gear stage whose transmission ratio γ7 is a smaller value than that of the sixth speed gear stage, for example, [0.780] is established. Also, since, by engagement of the third clutch C3 with the first brake B1, the first carrier CA1 and the second ring gear R2 are, respectively, connected to the first driven gear CG1B, and the first sun gear S1, the second sun gear S2 and the third sun gear S3 are, respectively, connected to the transmission case 12, the eighth speed gear stage whose transmission ratio γ8 is a smaller value than that of the seventh speed gear stage, for example, [0.602] is established.

Also, since, by engagement of the second clutch C2 with the second brake B2, the first sun gear S1, the second sun gear S2 and the third sun gear S3 are, respectively, connected to the second driven gear CG2B, and the first carrier CA1 and the second ring gear R2 are, respectively, connected to the transmission case 12, the first reverse gear stage whose transmission ratio γR1 is a value, for example, [2.644] or so, between the second speed gear stage and the third speed gear stage is established. In addition, since, by engagement of the fourth clutch C4 with the third brake B3, the first sun gear S1, the second sun gear S2 and the third sun gear S3 are, respectively, connected to the first driven gear CG1B, and the first ring gear R1 is connected to the transmission case 12, the second reverse gear stage whose transmission ratio γR2 is a larger value, for example, [3.611] or so than that of the first reverse transmission stage and between the first speed gear stage and the second speed gear stage is established. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

In the above-described transmission 410, the ratio (=γ1/γ2) of the transmission ratio γ1 of the first speed gear stage to the transmission ratio γ2 of the second speed gear stage is made into [1.359], the ratio (=γ2/γ3) of the transmission ratio γ2 of the second speed gear stage to the transmission ratio γ3 of the third speed gear stage is made into [1.351], the ratio (=γ3/γ4) of the transmission ratio γ3 of the third speed gear stage to the transmission ratio γ4 of the fourth speed gear stage is made into [1.301], the ratio (=γ4/γ5) of the transmission ratio γ4 of the fourth speed gear stage to the transmission ratio γ5 of the fifth speed gear stage is made into [1.321], the ratio (=γ5/γ6) of the transmission ratio γ5 of the fifth speed gear stage to the transmission ratio γ6 of the sixth speed gear stage is made into [1.321], the ratio (=γ6/γ7) of the transmission ratio γ6 of the sixth speed gear stage to the transmission ratio γ7 of the seventh speed gear stage is made into [1.282], and the ratio (=γ7/γ8) of the transmission ratio γ7 of the seventh speed gear stage to the transmission ratio γ8 of the eighth speed gear stage is made into [1.295], wherein the respective transmission ratios γ vary roughly at an equal ratio. Also, in the above-described transmission 410, the transmission ratio width (=γ1/γ8) which is the ratio of the transmission ratio γ1 of the first speed gear stage to the transmission ratio γ8 of the eighth speed gear stage is made into a comparatively large value, that is, [6.921].

FIG. 117 is a collinear chart of the above-described transmission 410, corresponding to FIG. 34 which is a collinear chart of the above-described transmission 90. Five vertical lines Y1 through Y5 of the second transmission portion 418 represent, in order from the left side, the sun gear S1, sun gear S2 and sun gear S3 connected to each other, which correspond to the first rotary element RE1, the carrier CA1 and ring gear R2 connected to each other, which correspond to the second rotary element RE2, the ring gear R1 corresponding to the third rotary element RE3, the carrier CA2 and carrier CA3 connected to each other, which correspond to the fourth rotary element RE4, and the ring gear R3 corresponding to the fifth rotary element RE5, respectively.

If expressed utilizing the above-described collinear chart, the transmission 410 according to the present embodiment is constructed so that, in the first transmission portion 416, rotations of the input shaft 16 (rotations of the first axis 32) are outputted to the second transmission portion 418 via the first intermediate output path M1 and the second intermediate output path M2 decelerated and rotated with respect to the first intermediate output path M1. The transmission 410 is also constructed so that, in the second transmission portion 418, the first rotary element RE1 (S1, S2 and S3) is selectively connected to the second driven gear CG2B via the second clutch C2, is selectively connected to the first driven gear CG1B via the fourth clutch C4, and is selectively connected to the transmission case 12 operating as the non-rotating member via the first brake B1, the second rotary element RE2 (CA1 and R2) is selectively connected to the first driven gear CG1B via the third clutch C3, and is selectively connected to the transmission case 12 via the second brake B2, the third rotary element RE3 (R1) is selectively connected to the transmission case 12 via the third brake B3, the fourth rotary element RE4 (CA2 and CA3) is connected to the output gear 28 operating as the output rotating member, and the fifth rotary element RE5 (R3) is selectively connected to the second driven gear CG2B via the first clutch C1.

In the collinear chart of FIG. 117 described above, since, in the first speed gear stage, the fifth rotary element RE5 is connected to the second driven gear CG2B by engagement of the clutch C1 and its rotation speed is made into [NX2], and the third rotary element RE3 is connected to the transmission case 12 by engagement of the brake B3 and its rotation speed is made into [0], the rotation speed of the output gear 28 is shown by the point (1st) at which a straight line connecting the intersection point of the vertical line Y5 and the horizontal line X2 to the intersection point of the vertical line Y3 and the horizontal line XZ crosses the vertical line Y4. Since, in the second speed gear stage, the fifth rotary element RE5 is connected to the second driven gear CG2B by engagement of the clutch C1 and its rotation speed is made into [NX2], and the second rotary element RE2 is connected to the transmission case 12 by engagement of the brake B2 and its rotation speed is made into [0], the rotation speed of the output gear 28 is shown by the point (2nd) at which a straight line connecting the intersection point of the vertical line Y5 and the horizontal line X2 to the intersection point of the vertical line Y2 and the horizontal line XZ crosses the vertical line Y4. Since, in the third speed gear stage, the fifth rotary element RE5 is connected to the second driven gear CG2B by engagement of the clutch C1 and its rotation speed is made into [NX2], and the first rotary element RE1 is connected to the transmission case 12 by engagement of the brake B1 and its rotation speed is made into [0], the rotation speed of the output gear 28 is shown by the point (3rd) at which a straight line connecting the intersection point of the vertical line Y5 and the horizontal line X2 to the intersection point of the vertical line Y1 and the horizontal line XZ crosses the vertical line Y4. Since, in the fourth speed gear stage, the fifth rotary element RE5 is connected to the second driven gear CG2B by engagement of the clutch C1 and its rotation speed is made into [NX2], and the first rotary element RE1 is connected to the second driven gear CG2B by engagement of the clutch C2 and its rotation speed is made into [NX2], the rotation speed of the output gear 28 is shown by the point (4th) at which a straight line connecting the intersection point of the vertical line Y5 and the horizontal line X2 to the intersection point of the vertical line Y1 and the horizontal line X2 crosses the vertical line Y4. Since, in the fifth speed gear stage, the fifth rotary element RE5 is connected to the second driven gear CG2B by engagement of the clutch C1 and its rotation speed is made into [NX2], and the second rotary element RE2 is connected to the first driven gear CG1B by engagement of the clutch C3 and its rotation speed is made into [1], the rotation speed of the output gear 28 is shown by the point (5th) at which a straight line connecting the intersection point of the vertical line Y5 and the horizontal line X2 to the intersection point of the vertical line Y2 and the horizontal line X1 crosses the vertical line Y4. Since, in the sixth speed gear stage, the second rotary element RE2 is connected to the first driven gear CG1B by engagement of the clutch C3 and its rotation speed is made into [1], and the first rotary element RE1 is connected to the first driven gear CG1B by engagement of the clutch C4 and its rotation speed is made into [1], the rotation speed of the output gear 28 is shown by the point (6th) at which a straight line connecting the intersection point of the vertical line Y2 and the horizontal line X1 to the intersection point of the vertical line Y1 and the horizontal line X1 crosses the vertical line Y4. Since, in the seventh speed gear stage, the first rotary element RE1 is connected to the second driven gear CG2B by engagement of the clutch C2 and its rotation speed is made into [NX2], and the second rotary element RE2 is connected to the first driven gear CG1B by engagement of the clutch C3 and its rotation speed is made into [1], the rotation speed of the output gear 28 is shown by the point (7th) at which a straight line connecting the intersection point of the vertical line Y1 and the horizontal line X2 to the intersection point of the vertical line Y2 and the horizontal line X1 crosses the vertical line Y4. Since, in the eighth speed gear stage, the second rotary element RE2 is connected to the first driven gear CG1B by engagement of the clutch C3 and its rotation speed is made into [1], and the first rotary element RE1 is connected to the transmission case 12 by engagement of the brake B1 and its rotation speed is made into [0], the rotation speed of the output gear 28 is shown by the point (8th) at which a straight line connecting the intersection point of the vertical line Y2 and the horizontal line X1 to the intersection point of the vertical line Y1 and the horizontal line XZ crosses the vertical line Y4. Since, in the first reverse gear stage, the first rotary element RE1 is connected to the second driven gear CG2B by engagement of the clutch C2 and its rotation speed is made into [NX2], and the second rotary element RE2 is connected to the transmission case 12 by engagement of the brake B2 and its rotation speed is made into [0], a negative rotation speed of the output gear 28 is shown by the point (Rev1) at which a straight line connecting the intersection point of the vertical line Y1 and the horizontal line X2 to the intersection point of the vertical line Y2 and the horizontal line XZ crosses the vertical line Y4. Since, in the second reverse gear stage, the first rotary element RE1 is connected to the first driven gear CG1B by engagement of the clutch C4 and its rotation speed is made into [1], and the third rotary element RE3 is connected to the transmission case 12 by engagement of the brake B3 and its rotation speed is made into [0], a negative rotation speed of the output gear 28 is shown by the point (Rev2) at which a straight line connecting the intersection point of the vertical line Y1 and the horizontal line X1 to the intersection point of the vertical line Y3 and the horizontal line XZ crosses the vertical line Y4.

As described above, according to the present embodiment, effects which are similar to those of the embodiment shown in FIG. 32 through FIG. 34 can be obtained. In addition thereto, since the first reverse transmission stage is established by engaging the second clutch C2 and the second brake B2 with each other, and the second reverse transmission stage whose transmission ratio is larger than that of the first reverse transmission stage is also established by engaging the fourth clutch C4 and the third brake B3 with each other, seven or more forward transmission gear stages and two reverse transmission gear stages can be obtained. Therefore, for example, where a further greater drive force is required, for example, if, in the case of reverse on an uphill road, the second reverse transmission stage having a larger transmission ratio is used, and in the case of reverse on a flat road, the first reverse transmission stage having a smaller transmission ratio than in the second reverse transmission stage is used, such an effect can be brought about, by which fuel consumption can be saved.

Figure 118:
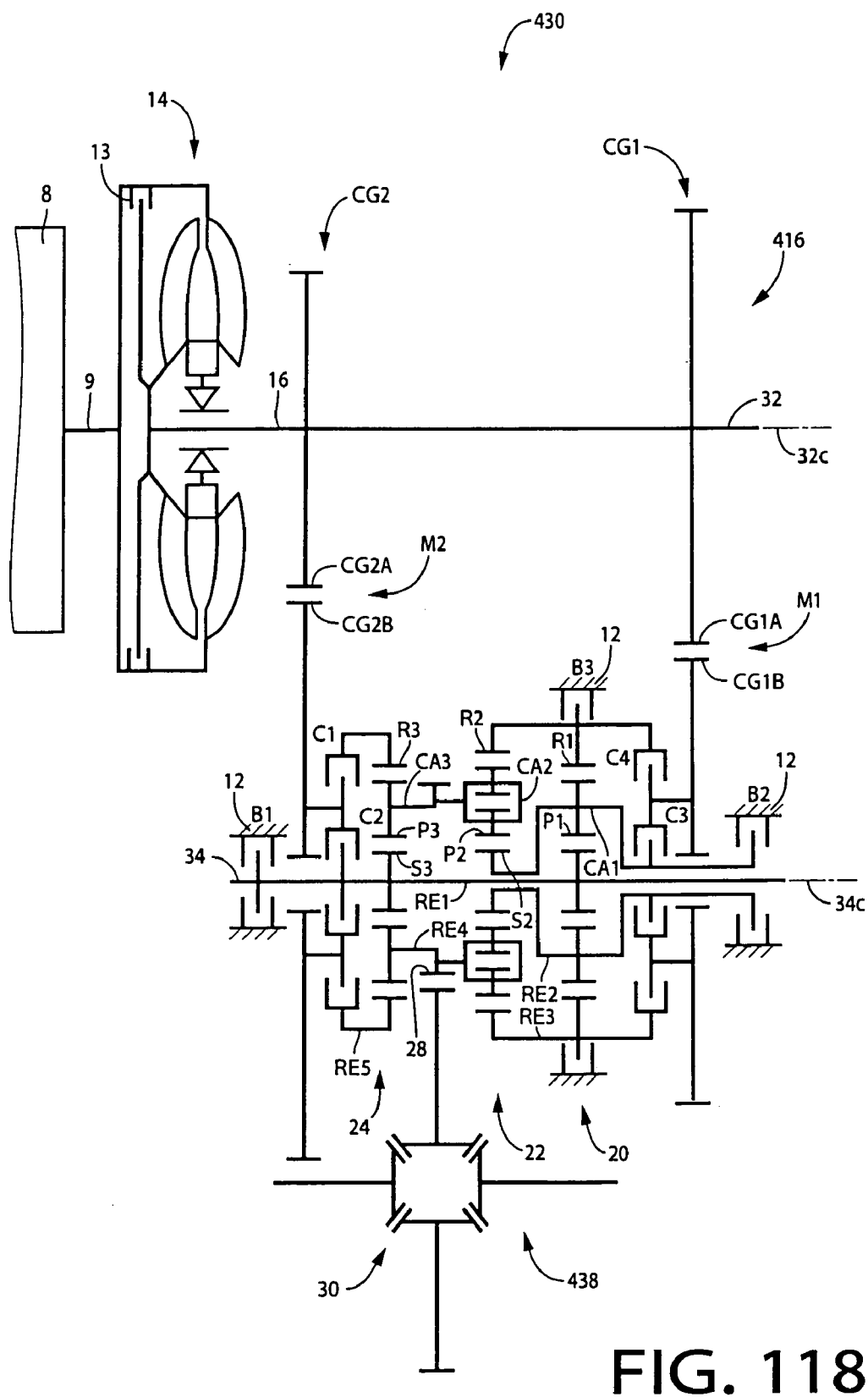
FIG. 118 is a view showing main points for describing a construction of a planetary gear type multistage transmission for vehicles according to still another embodiment of the present invention, corresponding to FIG. 115.
Figures 119, 120:
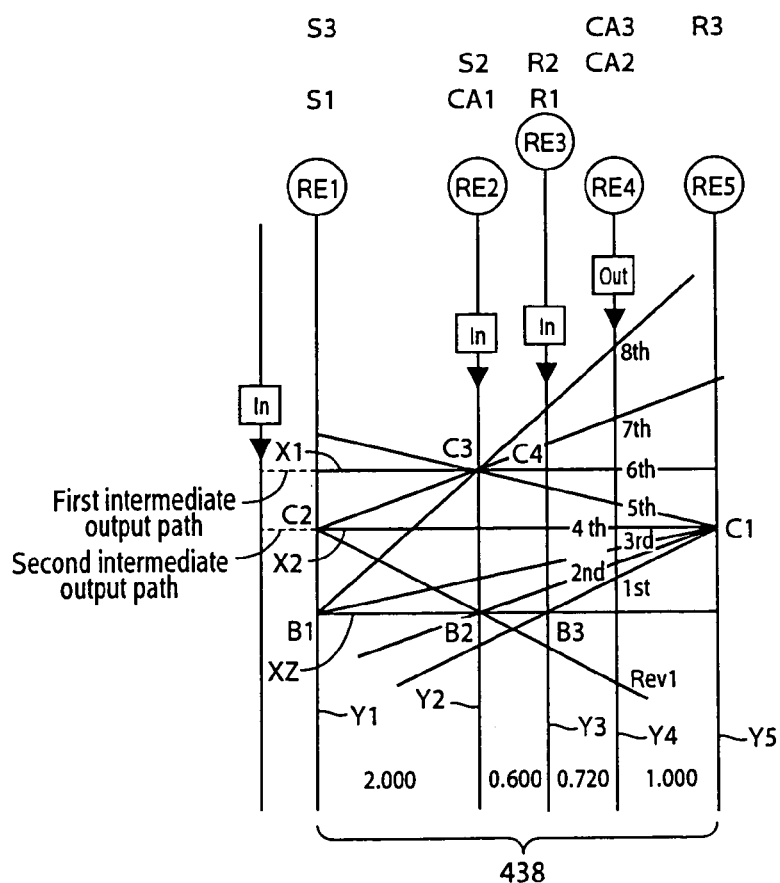

FIG. 118 is a view showing main points for describing a construction of a transmission 430 according to another embodiment of the present invention. FIG. 119 is a chart showing the relationship between the transmission gear stages of the transmission 430 and operations of hydraulic type friction engagement devices necessary to establish the transmission gear stages. FIG. 120 is a collinear chart showing the rotation speeds of the rotary elements in the respective gear stages. The present embodiment is the same as the transmission 410 shown in FIG. 115 except for that the connections between the clutch C4 and the respective devices of the transmission 430 and the construction of respective devices of the second transmission portion 438, differ from those of the transmission 410 shown in FIG. 115. Therefore, effects similar to those of the embodiment shown in FIG. 115 through FIG. 117 can be obtained. However, since the reverse transmission stage is composed of only one transmission gear stage, effects that are obtained by setting the two reverse transmission stages as in the embodiment shown in FIG. 115 through FIG. 117 cannot be obtained. Hereinafter, a description is given of different points between the transmission 430 and the transmission 410.

In the present embodiment, the first planetary gear set 20 and the third planetary gear set 24 which compose the second transmission portion 438 of the transmission 430 shown in FIG. 118 are composed of a single-pinion type planetary gear set, respectively. The second planetary gear set 22 is composed of a double-pinion type planetary gear set. The first planetary gear set 20 is provided with the first sun gear S1, the first planetary gear P1, the first carrier CA1 that supports the first planetary gear P1 so as to cause the same to rotate and to revolve it, and the first ring gear R1 engaged with the first sun gear S1 via the first planetary gear P1, and has a prescribed gear ratio $\rho1$ of, for example, [0.300] or so. The second planetary gear set 22 is provided with the second sun gear S2, a plurality of pairs of the second planetary gears P2 engaged with each other, the second carrier CA2 that supports the second planetary gears P2 so as to cause the same to rotate and to revolve it, and the second ring gear R2 engaged with the second sun gear S2 via the second planetary gears P2, and has a prescribed gear ratio ρ2 of, for example, [0.545] or so. The third planetary gear set 24 is provided with the third sun gear S3, the third planetary gear P3, the third carrier CA3 that supports the third planetary gear P3 so as to cause the same to rotate and to revolve it, and the third ring gear R3 engaged with the third sun gear S3 via the third planetary gear P3, and has a prescribed gear ratio ρ3 of, for example, [0.301] or so.

In the second transmission portion 438, the first sun gear S1 and the third sun gear S3 are connected to become integral with each other, are selectively connected to the second driven gear CG2b via the second clutch C2 and are selectively connected to the transmission case 12 operating as the non-rotating member via the first brake B1. The first carrier CA1 and the second sun gear S2 are connected to become integral with each other, are selectively connected to the first driven gear CG1B via the third clutch C3, and are selectively connected to the transmission case 12 via the second brake B2. The first ring gear R1 and the second ring gear R2 are connected to become integral with each other, are selectively connected to the first driven gear CG1B via the fourth clutch C4, and are selectively connected to the transmission case 12 via the third brake B3. The second carrier CA2 and the third carrier CA3 are connected to become integral with each other and are connected to the output gear 28 operating as the output rotating member. The third ring gear R3 is selectively connected to the second driven gear CG2B via the first clutch C1.

In the transmission 430 constructed as described above, as shown in FIG. 119 which is similar to the construction in which the second reverse gear stage is eliminated in the engagement operation chart of FIG. 116, since any two elements, which are selected among the first clutch C1, the second clutch C2, the third clutch C3, the fourth clutch C4, the first brake B1, the second brake B2 and the third brake B3, are simultaneously engaged and operated with each other, any one of the first speed gear stage (the first transmission stage) through the eighth speed gear stage (the eighth transmission stage) or a reverse gear stage (reverse transmission stage) is selectively established, and transmission ratios γ (=input shaft rotation speed $N_{IN}$/output shaft rotation speed $N_{OUT}$) which vary roughly at an equal ratio as in the embodiment shown in FIG. 115 through FIG. 117 can be obtained per gear stage. In addition, the transmission ratio width (=γ1/γ8) which is the ratio of the transmission ratio γ1 of the first speed gear stage to the transmission ratio γ8 of the eighth speed gear stage is made into a comparatively large value. However, as described above, since the clutch 4 selectively connects the first ring gear R1 and the second ring gear R2 to the first driven gear CG1B, the sixth speed gear stage differs from the embodiment shown in FIG. 115 through FIG. 117 in that, by engagement of the third clutch C3 with the fourth clutch C4, the first carrier CA1 and the second sun gear S2 are, respectively, connected to the first driven gear CG1B, and the first ring gear R1 and the second ring gear R2 are, respectively, connected to the first driven gear CG1B. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

FIG. 120 is a collinear chart of the above-described transmission 430, corresponding to FIG. 117 which is a collinear chart of the above-described transmission 410. Five vertical lines Y1 through Y5 of the second transmission portion 438 represent, in order from the left side, the sun gear S1 and sun gear S3 connected to each other, which correspond to the first rotary element RE1, the carrier CA1 and sun gear S2 connected to each other, which correspond to the second rotary element RE2, the ring gear R1 and ring gear R2 connected to each other, which correspond to the third rotary element RE3, the carrier CA2 and carrier CA3 connected to each other, which correspond to the fourth rotary element RE4, and the ring gear R3 corresponding to the fifth rotary element RE5, respectively. Main differences from FIG. 117 reside in that the clutch C4 is disposed so as to selectively connect the third rotary element RE1 (R1 and R2) to the first driven gear CG1B and that the second reverse gear stage is eliminated. Therefore, since, in the sixth speed gear stage, the second rotary element RE2 is connected to the first driven gear CG1B by engagement of the clutch C3 and its rotation speed is made into [1], and the third rotary element RE3 is connected to the first driven gear CG1B by engagement of the clutch C4 and its rotation speed is made into [1], the rotation speed of the output gear 28 is shown by the point (6th) at which a straight line connecting the intersection point of the vertical line Y2 and the horizontal line X1 to the intersection point of the vertical line Y3 and the horizontal line X1 crosses the vertical line Y4. Except for this point, FIG. 120 is similar to FIG. 117 as a collinear chart. Therefore, a description of a part other than this point in the collinear chart of FIG. 120 is omitted.

Figure 121:
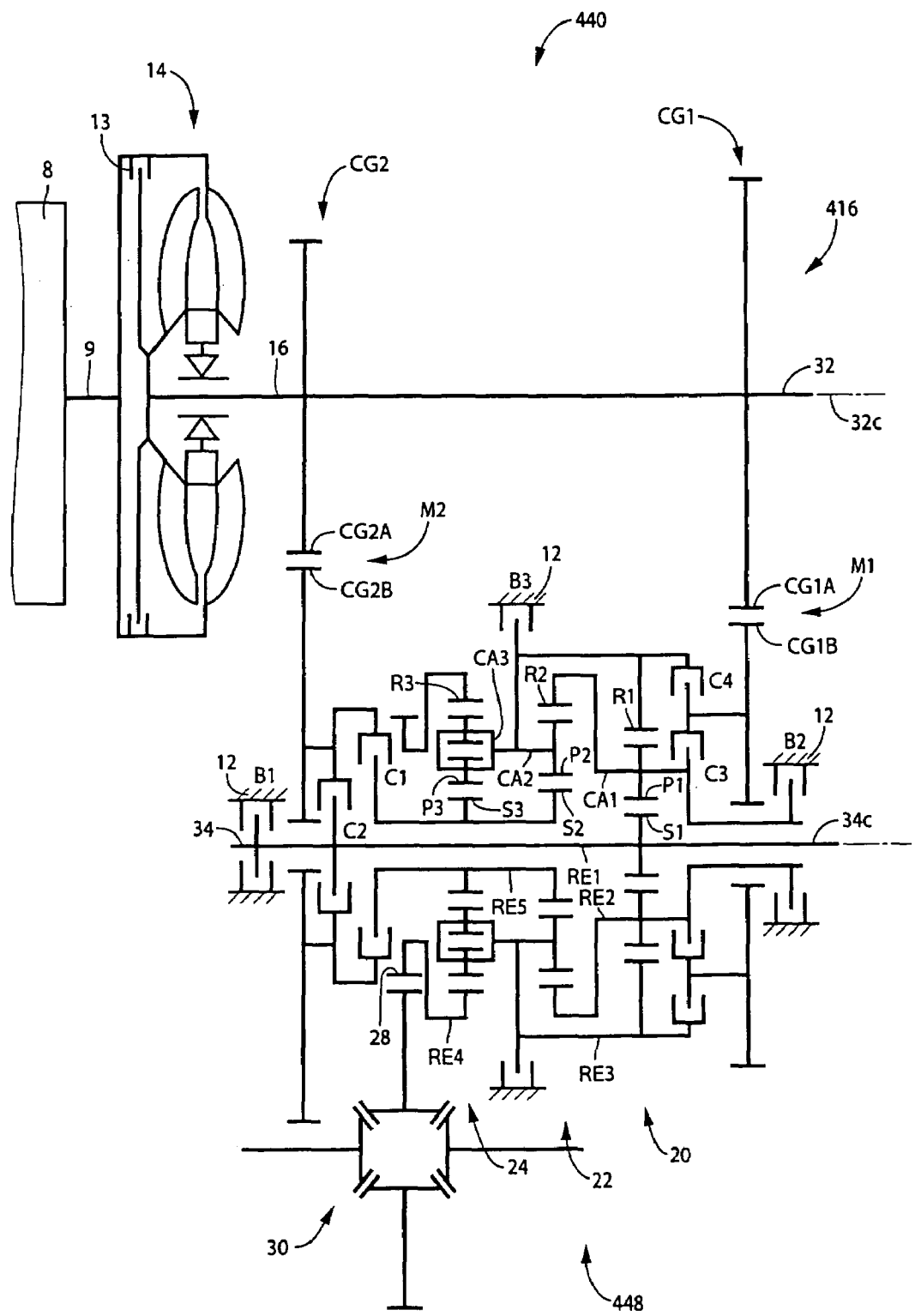
Figures 122, 123:
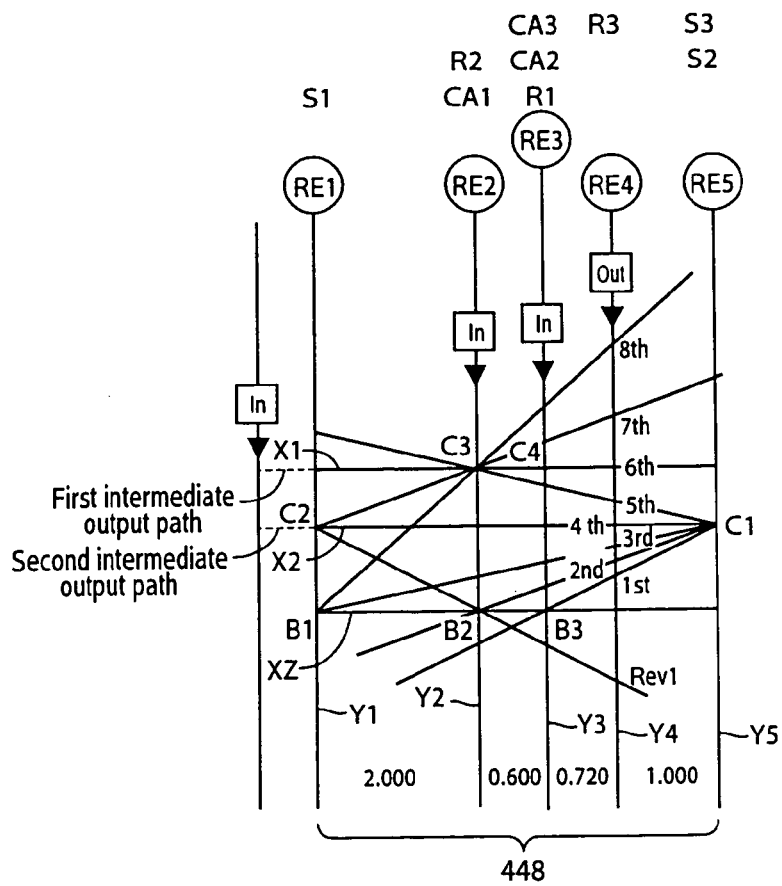

FIG. 121 is a view showing main points for describing a construction of a transmission 440 which is still another embodiment of the present invention. FIG. 122 is a chart showing the relationship between the transmission gear stages of the transmission 440 and operations of the hydraulic friction engagement devices necessary to establish the transmission gear stages. FIG. 123 is a collinear chart showing the rotation speeds of rotary elements in respective gear stages. The present embodiment is the same as the transmission 430 shown in FIG. 118 except for that the construction of respective devices of the second transmission portion 448 differs from that of the transmission 430 shown in FIG. 118. Therefore, effects similar to those of the embodiment shown in FIG. 118 through FIG. 120 can be obtained. Hereinafter, a description is given of points at which the transmission 440 differs from the transmission 430.

In the present embodiment, the first planetary gear set 20 and the second planetary gear set 22, which compose the second transmission portion 448 of the transmission 440 shown in FIG. 121 described above, are, respectively, composed of a single-pinion type planetary gear set, and the third planetary gear set 24 is composed of a double-pinion type planetary gear set. The first planetary gear set 20 is provided with the first sun gear S1, the first planetary gear P1, the first carrier CA1 that supports the first planetary gear P1 so as to cause the same to rotate and to revolve it, and the first ring gear R1 engaged with the first sun gear S1 via the first planetary gear P1, and has a prescribed gear ratio ρ1 of, for example, [0.300] or so. The second planetary gear set 22 is provided with the second sun gear S2, the second planetary gear P2, the second carrier CA2 that supports the second planetary gear P2 so as to cause the same to rotate and to revolve it, and the second ring gear R2 engaged with the second sun gear S2 via the second planetary gear P2, and has a prescribed gear ratio ρ2 of, for example, [0.349] or so. The third planetary gear set 24 is provided with the third sun gear S3, a plurality of pairs of the third planetary gears P3 engaged with each other, the third carrier CA3 that supports the third planetary gears P3 so as to cause the same to rotate and to revolve it, and the third ring gear R3 engaged with the third sun gear S3 via the third planetary gears P3, and has a prescribed gear ratio ρ3 of, for example, [0.419] or so.

In the second planetary gear set 22 and the third planetary gear set 24, the second carrier CA2 and the third carrier CA3 are composed of a common component, and the second sun gear S2 and the third sun gear S3 are also composed of a common component. Further, the second planetary gear P2 may be made into a planetary gear train that is concurrently used as any one of a pair of the third planetary gears P3 engaged with each other, whereby the number of components of the transmission 440 can be further decreased together with a decrease in the axial length thereof. In addition, the above-described second planetary gear set P2 may have different diameters (different numbers of teeth) at the third planetary gear set 24 side and at the second planetary gear set 22 side.

In the above-described second transmission portion 448, the first sun gear S1 is selectively connected to the second driven gear CG2B via the second clutch C2 and is selectively connected to the transmission case 12 operating as the non-rotating member via the first brake B1. The first carrier CA1 and the second ring gear R2 are connected to become integral with each other, are selectively connected to the first driven gear CG1B via the third clutch C3, and are selectively connected to the transmission case 12 via the second brake B2. The first ring gear R1, the second carrier CA2 and the third carrier CA3 are connected to become integral with each other, are selectively connected to the first driven gear CG1B via the fourth clutch C4, and are selectively connected to the transmission case 12 via the third brake B3. The third ring gear R3 is connected to the output gear 28 operating as the output rotating member. The second sun gear S2 and the third sun gear S3 are connected to become integral with each other and are selectively connected to the second driven gear CG2B via the first clutch C1.

In the transmission 440 composed as described above, for example, as shown in the engagement operation chart of FIG. 122 which is similar to the engagement operation chart of FIG. 119, since any two elements, which are selected from the first clutch C1, the second clutch C2, the third clutch C3, the fourth clutch C4, the first brake B1, the second brake B2 and the third brake B3, are simultaneously engaged and operated with each other, any one of the first speed gear stage (the first transmission stage) through the eighth speed gear stage (the eighth transmission stage) or a reverse gear stage (reverse transmission stage) is selectively established, wherein a transmission ratio γ (=input shaft rotation speed $N_{IN}$/output gear rotation speed $N_{OUT}$) changing roughly at an equal ratio can be obtained per gear stage. In addition, the transmission ratio width (=γ1/γ8) which is the ratio of the transmission ratio γ1 of the first speed gear stage to the transmission ratio γ8 of the eighth speed gear stage is made into a comparatively large value. The speed reduction ratio of the first counter gear pair CG1, the speed reduction ratio of the second counter gear pair CG2, gear ratio ρ1 of the first planetary gear set 20, gear ratio ρ2 of the second planetary gear set 22 and gear ratio ρ3 of the third planetary gear set 24 are established so as to obtain the above-described transmission ratios.

FIG. 123 shows a collinear chart in the above-described transmission 440, which corresponds to FIG. 120 of the collinear chart showing the above-described transmission 430. Five vertical lines Y1 through Y5 of the second transmission portion 448 in FIG. 123 represent, in order from the left side, the sun gear S1 corresponding to the first rotary element RE1, the carrier CA1 and ring gear R2 connected to each other, which correspond to the second rotary element RE2, the ring gear R1, the carrier CA2 and carrier CA3 connected to each other, which correspond to the third rotary element RE3, the ring gear R3 corresponding to the fourth rotary element RE4, and the sun gear S2 and sun gear S3 connected to each other, which correspond to the fifth rotary element RE5, respectively. Therefore, on the basis of these rotary elements, FIG. 123 differs from FIG. 120 only in the construction of the respective rotary elements, and these drawings are identical to each other in the form of the collinear charts. A description of the collinear chart of FIG. 123 is omitted.

Figure 124:
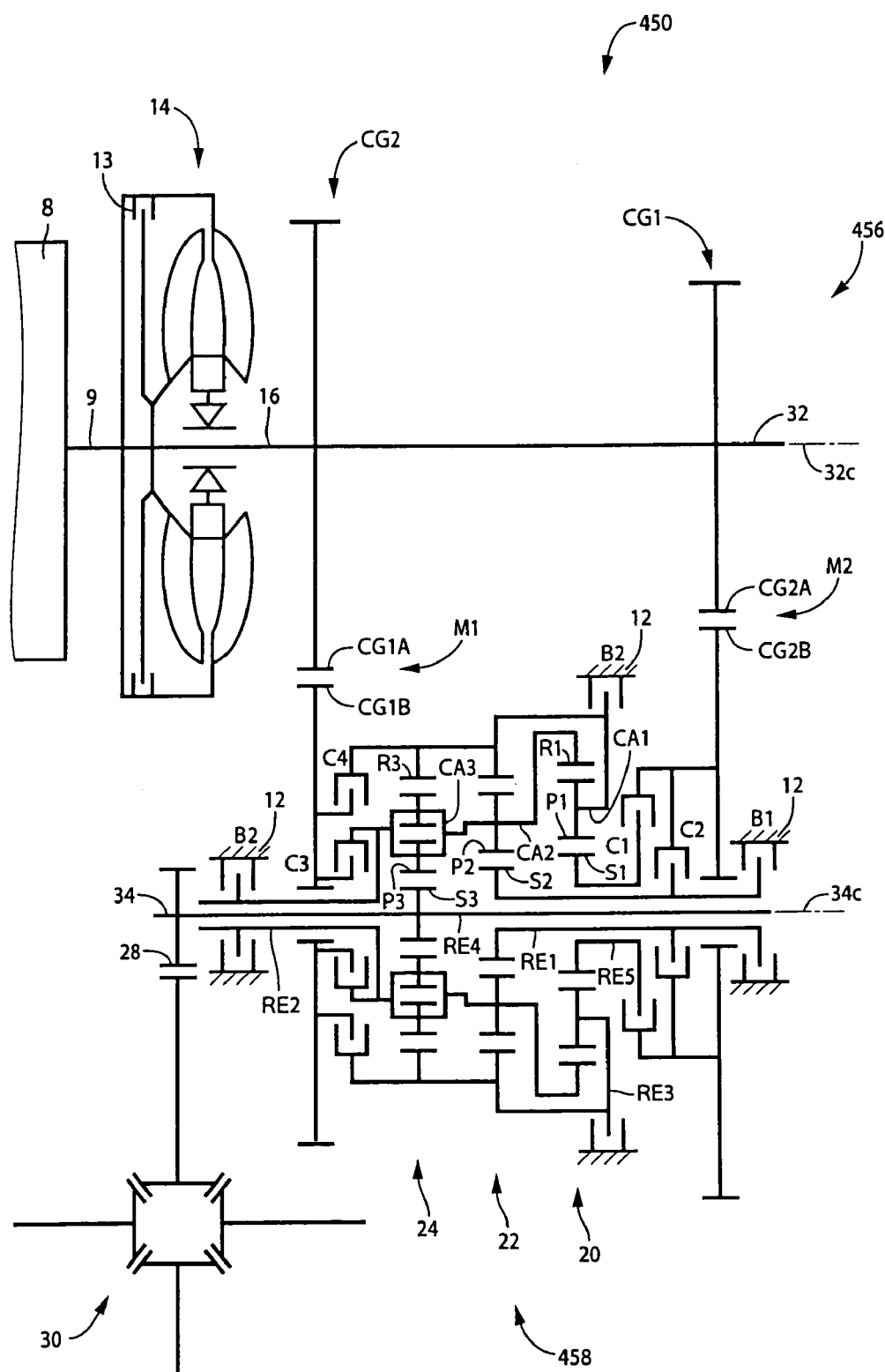
Figures 125, 126:
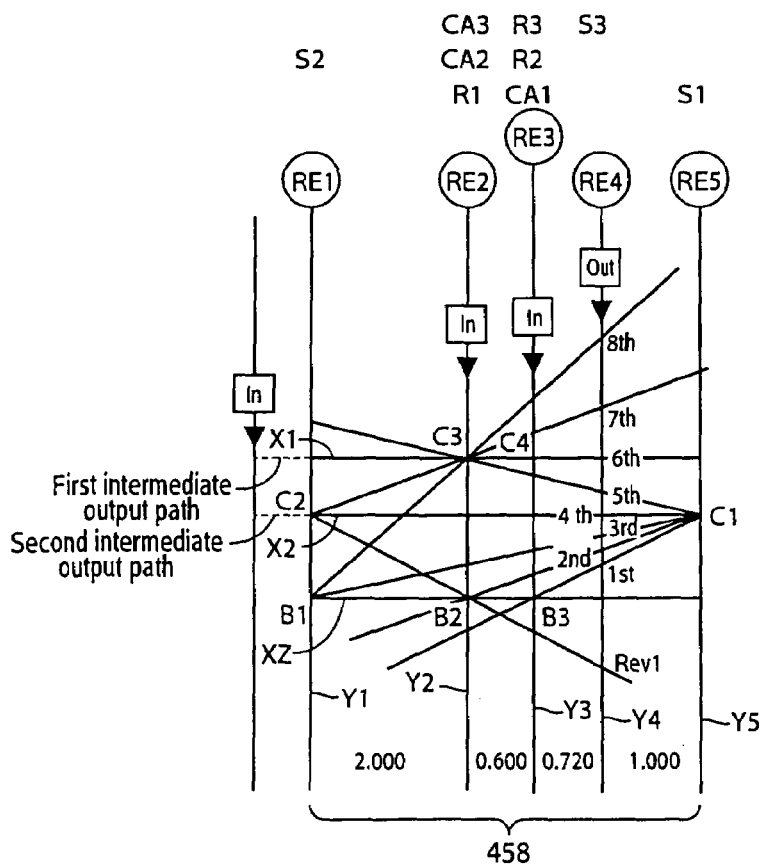

FIG. 124 is a view showing main points for describing a construction of a transmission 450 according to still another embodiment of the present invention. FIG. 125 is a chart showing the relationship between the transmission gear stages of the transmission 450 and operations of hydraulic type friction engagement devices necessary to establish the transmission gear stages. FIG. 126 is a collinear chart showing the rotation speeds of the rotary elements in the respective gear stages. The present embodiment is the same as the transmission 430 shown in FIG. 118 except for that the construction of respective devices of the second transmission portion 458 differs from that of the transmission 430 and that the arrangement between the first counter gear pair CG1 and the second counter gear pair CG2 are disposed is opposite to that of the transmission 430. Therefore, effects similar to those of the embodiment shown in FIG. 118 through FIG. 120 can be obtained. Hereinafter, a description is given of different points between the transmission 450 and the transmission 430.

In the present embodiment, the first planetary gear set 20 and the second planetary gear set 22, which compose the second transmission portion 458 of the transmission 450 shown in FIG. 124 described above, are, respectively, composed of a single-pinion type planetary gear set, and the third planetary gear set 24 is composed of a double-pinion type planetary gear set. The first planetary gear set 20 is provided with the first sun gear S1, the first planetary gear P1, the first carrier CA1 that supports the first planetary gear P1 so as to cause the same to rotate and to revolve it, and the first ring gear R1 engaged with the first sun gear S1 via the first planetary gear P1, and has a prescribed gear ratio ρ1 of, for example, [0.349] or so. The second planetary gear set 22 is provided with the second sun gear S2, the second planetary gear P2, the second carrier CA2 that supports the second planetary gear P2 so as to cause the same to rotate and to revolve it, and the second ring gear R2 engaged with the second sun gear S2 via the second planetary gear P2 and has a prescribed gear ratio ρ2 of, for example, [0.300] or so. The third planetary gear set 24 is provided with the third sun gear S3, a plurality of pairs of the third planetary gears P3 engaged with each other, the third carrier CA3 that supports the third planetary gears P3 so as to cause the same to rotate and to revolve it, and the third ring gear R3 engaged with the third sun gear S3 via the third planetary gears P3, and has a prescribed gear ratio ρ3 of, for example, [0.455] or so.

In the second planetary gear set 22 and the third planetary gear set 24, the second carrier CA2 and the third carrier CA3 are composed of a common component, and the second ring gear R2 and the third ring gear R3 are also composed of a common component. Further, wherein the second planetary gear P2 may be made into a Ravineaux type planetary gear train which is concurrently used as any one of a pair of the third planetary gears P3 engaged with each other. Therefore, the number of components of the transmission 450 can be further decreased together with a decrease in the axial length thereof. In addition, the above-described second planetary gear P2 may have different diameters (different numbers of teeth) at the third planetary gear set 24 side and the second planetary gear set 22 side.

In the above-described second transmission portion 458, the second sun gear S2 is selectively connected to the second driven gear CG2B via the second clutch C2 and is selectively connected to the transmission case 12 operating as the non-rotating member via the first brake B1. The first ring gear R1, the second carrier CA2 and the third carrier CA3 are connected to become integral with each other, are selectively connected to the first driven gear CG1B via the third clutch C3, and are selectively connected to the transmission case 12 via the second brake B2. The first carrier CA1, the second ring gear R2 and the third ring gear R3 are connected to become integral with each other, are selectively connected to the first driven gear CG1B via the fourth clutch C4, and are selectively connected to the transmission case 12 via the third brake B3. The third sun gear S3 is connected to the output gear 28 operating as the above-described rotating member, and the first sun gear S1 is selectively connected to the second driven gear CG2B via the first clutch C1.

In the transmission 450 constructed as described above, for example, as shown in the engagement operation chart of FIG. 125 which is similar to the engagement operation chart of FIG. 119, since any two elements, which are selected among the first clutch C1, the second clutch C2, the third clutch C3, the fourth clutch C4, the first brake B1, the second brake B2 and the third brake B3 are simultaneously engaged and operated with each other, any one of the first speed gear stage (the first transmission stage) through the eighth speed gear stage (the eighth transmission stage) or a reverse gear stage (the reverse transmission stage) is selectively established, and transmission ratios $\gamma$ (=input shaft rotation speed $N_{IN}$/output shaft rotation speed $N_{OUT}$) which vary roughly at an equal ratio can be obtained per gear stage as in the embodiment shown in FIG. 118 through FIG. 120. Also, the transmission ratio width (=$\gamma 1/\gamma 8$) which is the ratio of the transmission ratio $\gamma 1$ of the first speed gear stage to the transmission ratio $\gamma 8$ of the eighth speed gear stage is made into a comparatively large value. The speed reduction ratio of the first counter gear pair CG1, the speed reduction ratio of the second counter gear pair CG2, gear ratio $\rho 1$ of the first planetary gear set 20, gear ratio $\rho 2$ of the second planetary gear set 22 and gear ratio $\rho 3$ of the third planetary gear set 24 are set so as to obtain the above-described transmission ratios.

FIG. 126 shows a collinear chart in the above-described transmission 450, which corresponds to FIG. 120 of the collinear chart showing the above-described transmission 430. Five vertical lines Y1 through Y5 of the second transmission portion 458 in FIG. 126 represent, in order from the left side, the sun gear S2 corresponding to the first rotary element RE1, the ring gear R1, the carrier CA2 and carrier CA3 connected to each other, which correspond to the second rotary element RE2, the carrier CA1, the ring gear R2 and ring gear R3 connected to each other, which correspond to the third rotary element RE3, the sun gear S3 corresponding to the fourth rotary element RE4, and the sun gear S1 corresponding to the fifth rotary element RE5, respectively. Therefore, on the basis of these rotary elements, FIG. 126 differs from FIG. 120 only in the construction of the respective rotary elements, and these drawings are identical to each other in the form of the collinear charts. Therefore, a description of the collinear chart of FIG. 126 is omitted.

As described above, in the transmissions 340, 350, 400, 410, 430, 440 and 450 according to the present embodiments, either of a plurality of planetary gear sets is disposed between the first counter gear pair CG1 and the second counter gear pair CG2, and only three or less sets of planetary gear sets are disposed on the first axis 32 and the second axis 34. Therefore, since it is possible to shorten the entire length, that is, the dimension in the axial direction, in comparison with, for example, a case where four sets of planetary gear sets are employed on one axis, a planetary gear set type multistage transmission for vehicle capable of securing forward multistage transmissions can be obtained, which can be preferably employed for the lateral installation in a FF vehicle or RR vehicle.

As described above, although the description was given of the embodiments according to the invention with reference to the accompanying drawings, the present invention may be applicable to other modes.

For example, in the transmissions 10, 11, 41, 50, 60, 70, 80, 90, 100, 110, 120, 130, 140, 150, 160, 170, 180, 190, 200, 210, 220, 230, 240, 250, 260, 270, 290, 340, 350, 410, 430, 440 and 450 according to the above-described embodiments, although eight forward speed transmission stages are established, seven forward speed transmission stages may be established by eliminating any one of the eighth speed transmission stages. In addition, in the transmission 280, 290 and 400, although nine forward speed transmission stages are established, seven or eight forward speed transmission stages may be established by eliminating one or two of the nine speed transmission stages. Further, in the transmission 280, 290 and 400, although two reverse speed transmission stages are established, only any one of the two reverse speed transmission stages may be established.

Further, in the transmissions according to the above-described embodiment, a one-way clutch may be provided in series with or in parallel to any one of the first clutch C1 through the fourth clutch C4 and the first brake B1 through the third brake B3. If so, shifting action control of transmission may be facilitated. For example, if a one-way clutch is provided in parallel to the second brake B2 in the transmission 10, the first transmission stage can be established by only engaging the first clutch C1. In addition, any one of the first clutch C1 through the fourth clutch C4 and the first brake B1 through the third brake B3 may be replaced by a one-way clutch. In such a case, tentative transmission may be obtained.

Also, in the first transmission portions 36 according to the above-described embodiments, although a counter gear pair is used as a power transmission member, a set of power transmission members may be composed of pulleys disposed on the first axial center 32c and the second axial center 34c, respectively, and a belt installed on these pulleys.

Further, in the above-described embodiments, although the clutches C and brakes B, which are engagement elements of the transmissions are hydraulic type friction engagement devices, they may be electromagnetic engagement devices, for example, electromagnetic clutches and magnetic particle type clutches.

Further, in the transmissions 10, 11, 41, 50, 60, 70, 80, 90, 100, 110, 120, 130, 140, 150, 160, 170, 180, 190, 200, 210, 220, 230, 240, 250, 260, 270, 280, 290, 340, 350, 410, 430, 440 and 450, although the engine 8 is directly connected to the torque converter 14 via the crankshaft 9, for example, the engine 8 and torque converter 14 may be operatively connected by means of, for example, gears, belts, etc. Also, it is not necessary to dispose both of them on a common shaft.

Also, other drive sources, for example, an electric motor, may be employed instead of the engine 8.

Also, in the transmissions 10, 11, 41, 50, 60, 70, 80, 90, 100, 110, 120, 130, 140, 150, 160, 170, 180, 190, 200, 210, 220, 230, 240, 250, 260, 270, 280, 290 340, 350, 410, 430, 440 and 450, a one-way clutch may be provided in series to or in parallel to any one of the first clutch C1 through the fifth clutch C5 and the first brake B1 through the third brake B3. If so, shifting action control of transmission may be facilitated. For example, if a one-way clutch is provided in parallel to the second brake B2 in the transmission 11, the first transmission stage can be established by only engaging the first clutch C1. In addition, any one of the first clutch C1 through the fifth clutch C5 and the first brake B1 through the third brake B3 may be replaced by a one-way clutch. In such a case, tentative transmission may be obtained.

In the first transmission portions 36, 37, 56, 66, 96, 106, 116, 156, 166, 176, 186, 216, 236, 266, 276, 286, 296, 336, 406, 416, and 456 according to the above-described embodiments, although a counter gear pair is used as a power transmission member, a set of power transmission members may be composed of pulleys disposed on the first axial center 32c and the second axial center 34c, respectively, and a belt installed on these pulleys.

Also, in the above-described transmissions 230, 240, 250, 260 and 270, although the first clutch C1 is engaged with the third clutch C3 in order to establish the sixth speed gear stage, the second clutch C2 may be engaged instead of any one of the first clutch C1 and the third clutch C3. That is, the sixth speed gear stage can be established by engaging any two of the first clutch C1, the second clutch C2 and the third clutch C3.

Further, in the above-described embodiments, although the clutches C and brakes B, which are engagement elements of the transmissions 11, 41, 50, 60, 70, 80, 90, 100, 110, 120, 130, 140, 150, 160, 170, 180, 190, 200, 210, 220, 230, 240, 250, 260, 270, 280 and 290 are hydraulic type friction engagement devices, they may be electromagnetic engagement devices, for example, electromagnetic clutches and magnetic particle type clutches.

Further, in the transmission 340, 350, 410, 430, 440 and 450 according to the above-described embodiments, although eight forward speed transmission stages are established, seven forward speed transmission stages may be established by eliminating any one of the eight speed transmission stages. In addition, in the transmission 400, although nine forward speed transmission stages are established, seven or eight forward speed transmission stages may be established by eliminating one or two of the nine transmission stages. Further, in the transmissions 400 and 410, although two reverse speed transmission stages are established, only any one of the two reverse speed transmission stages may be established.

Also, in the above-described transmissions 340, 350, 400, 410, 430, 440 and 450 according to the above-described embodiments, although the engine 8 is directly connected to the torque converter 14 via the crankshaft 9, for example, the engine 8 and torque converter 14 may be operatively connected by means of, for example, gears, belts, etc. Also, it is not necessary to dispose both on a common shaft. Also, other drive sources, for example, an electric motor, may be employed instead of the engine 8.

And, in the above-described transmissions 340, 350, 400, 410, 430, 440 and 450 according to the above-described embodiments, a one-way clutch may be provided in series with or in parallel to any one of the first clutch C1 through the fourth clutch C4 and the first brake B1 through the second brake B2. If so, shifting action control of transmission may be facilitated. For example, if a one-way clutch is provided in parallel to the second brake B2 in the transmission, the first transmission stage can be established by only engaging the first clutch C1. In addition, any one of the first clutch C1 through the fourth clutch C4 and the first brake B1 through the second brake B2 may be replaced by a one-way clutch. In such a case, tentative transmission may be obtained.

Also, in the first transmission portions 406, 416 and 456 according to the above-described embodiments, although a counter gear pair is used as a power transmission member, a set of power transmission members may be composed of pulleys disposed on the first axial center 32c and the second axial center 34c, respectively, and a belt installed on these pulleys.

Also, in the above-described embodiments, although a torque converter 14 with a lock-up clutch 13 is provided between the engine 8 and the input shaft 16 as a hydraulic transmission device, it may not be necessary that the lock-up clutch 13 is provided. Also, a fluid coupling, a magnetic particle type electromagnetic clutch, a multiple-plate type or single-plate hydraulic clutch may be provided instead of the torque converter 14.

In the collinear charts of the above-described embodiments, vertical lines Y1 through Y8 are arranged one after another in order from the left to the right. However, the vertical lines may be disposed one after another in order from the right to the left. Also, although the horizontal line X1 corresponding to the rotation speed [1] is disposed above the horizontal line XZ corresponding to the rotation speed [0], the horizontal line X1 may be disposed under the horizontal line XZ.

Further, in the above-described embodiments, although the clutches C and brakes B, which are engagement elements of the transmissions 10, 11, 41, 50, 60, 70, 80, 90, 100, 110, 120, 130, 140, 150, 160, 170, 180, 190, 200, 210, 220, 230, 240, 250, 260, 270, 280, 290 340, 350, 410, 430, 440 and 450 are hydraulic type friction engagement devices, they may be electromagnetic engagement devices, for example, electromagnetic clutches and magnetic particle type clutches.

Still further, the above-described embodiments are only examples. The present invention can be carried out in diversified modes to which various modifications and improvements are added on the basis of knowledge of ones skilled in the same art.

What is claimed is:

1. A planetary gear type multistage transmission for vehicles, which is composed so that the transmission is provided with a first transmission portion and a second transmission portion, transmits rotations of an input rotating member, which is positioned at the driving-force source side and is rotatable around a first axial center, to the second transmission portion on a second axial center parallel to the first axial center via the first transmission portion, and outputs the rotation from an output rotating member rotating around the second axial center;

wherein the first transmission portion transmits rotations of the input rotating member to the second transmission portion via a first intermediate output path and a second intermediate output path;

the second transmission portion is provided with three planetary gear sets of a first planetary gear set, a second planetary gear set and a third planetary gear set, which are disposed one after another to be concentric with the second axial center, wherein some of five rotary elements are composed of sun gears, carriers and ring gears of the three planetary gear sets connected to each other, the five rotary elements are selectively connected to any one of a first driven member composing the first intermediate output path at the second axial center side, a second driven member composing the second intermediate output path at the second axial center side and a non-rotating member via clutches and brakes;

a rotational speed of the rotary motion transmitted by the second intermediate output path is lower than a rotational speed of the rotary motion transmitted by the first intermediate output path;

a first rotary element of the five rotary elements is selectively connected to the second driven member via a second clutch, and is selectively connected to said non-rotating member via a first brake;

a second rotary element of the five rotary elements is selectively connected to the first driven member via a third clutch;

a third rotary element of the five rotary elements is selectively connected to non-rotating member via a third brake;

a fourth rotary element of the five rotary elements is connected to the output rotating member;

and a fifth rotary element of the five rotary elements is selectively connected to the second driven member via a first clutch, and further, via a fourth clutch, the third rotary element is selectively connected to the first driven member, or the third rotary element is selectively connected to the fifth rotary element, or the fifth rotary element is selectively connected to the first driven member, or the first rotary element is selectively connected to the first driven member, wherein at least seven forward speed transmission stages are established by selectively engaging and disengaging the clutches and brakes.

2. A planetary gear type multistage transmission for vehicles according to claim 1, wherein the first planetary gear set is a double-pinion type planetary gear set provided with a first sun gear, a first carrier and a first ring gear and having a pair of first planetary gears rotatably supported by means of the first carrier, which are engageable with each other; the second planetary gear set is a single-pinion type planetary gear set provided with a second sun gear, a second carrier and a second ring gear and having a second planetary gear rotatably supported by means of the second carrier; a third planetary gear set is a single-pinion type planetary gear set provided with a third sun gear, a third carrier and a third ring gear and having a third planetary gear rotatably supported by means of the third carrier; the first rotary element includes the second sun gear and the third sun gear; the second rotary element includes the first carrier and the second carrier; the third rotary element includes the first ring gear and the second ring gear; the fourth rotary element includes the first sun gear and the third carrier; and the fifth rotary element includes the third ring gear.

3. A planetary gear type multistage transmission for vehicles according to claim 1, wherein the first planetary gear set is a single-pinion type planetary gear set provided with a first sun gear, a first carrier and a first ring gear, and having a first planetary gear rotatably supported by means of the first carrier; the second planetary gear set is a double-pinion type planetary gear set provided with a second sun gear, a second carrier and a second ring gear and having a pair of second planetary gears rotatably supported by means of the second carrier, which are engageable with each other; the third planetary gear set is a single-pinion type planetary gear set provided with a third sun gear, a third carrier and a third ring gear, and having a third planetary gear rotatably supported by means of the third carrier; the first rotary element includes the first sun gear and the third sun gear; the second rotary element includes the first carrier and the second carrier; the third rotary element includes the first ring gear and the second ring gear; the fourth rotary element includes the second sun gear and the third carrier; and the fifth rotary element includes the third ring gear.

4. A planetary gear type multistage transmission for vehicles according to claim 1, wherein a first transmission stage of the maximum transmission ratio is established by engaging the first clutch and the third brake; a second transmission stage having a smaller transmission ratio than that of the first transmission stage is established by engaging the first clutch and the second brake; a third transmission stage having a smaller transmission ratio than that of the second transmission stage is established by engaging the first clutch and the first brake; a fourth transmission stage having a smaller transmission ratio than that of the third transmission stage is established by engaging the first clutch and the second clutch; a fifth transmission stage having a smaller transmission ratio than that of the fourth transmission stage is established by engaging the first clutch and the third clutch; a sixth transmission stage having a smaller transmission ratio than that of the fifth transmission stage is established by engaging the third clutch and the fourth clutch; a seventh transmission stage having a smaller transmission ratio than that of the sixth transmission stage is established by engaging the second clutch and the third clutch; and an eighth transmission stage having a smaller transmission ratio than that of the seventh transmission stage is established by engaging the third clutch and the first brake.

5. A planetary gear type multistage transmission for vehicles according to claim 1, wherein a reverse transmission stage is established by engaging the second clutch and the second brake or a first reverse transmission stage is established by engaging the second clutch and the second brake, and a second reverse transmission stage having a larger transmission ratio than that of the first reverse transmission stage is established by the fourth clutch and the third brake.

6. A planetary gear type multistage transmission for vehicles according to claim 1, wherein the first planetary gear set is a single-pinion type planetary gear set provided with a first sun gear, a first carrier and a first ring gear, and having a first planetary gear rotatably supported by means of the first carrier; the second planetary gear set is a double-pinion type planetary gear set provided with a second sun gear, a second carrier and a second ring gear and having a pair of second planetary gears which are rotatably supported by means of the second carrier and are engageable with each other; the third planetary gear set is a single-pinion type planetary gear set provided with a third sun gear, a third carrier and a third ring gear, and having a third planetary gear rotatably supported by means of the third carrier; the first rotary element includes the first sun gear, the second sun gear and the third sun gear; the second rotary element includes the first carrier and the second ring gear; the third rotary element includes the first ring gear; the fourth rotary element includes the second carrier and the third carrier; and the fifth rotating element includes the third ring gear.

7. A planetary gear type multistage transmission for vehicles according to claim 1, wherein the first planetary gear set is a single-pinion type planetary gear set provided with a first sun gear, a first carrier and a first ring gear, and having a first planetary gear rotatably supported by means of the first carrier; the second planetary gear set is a double-pinion type planetary gear set provided with a second sun gear, a second carrier and a second ring gear and having a pair of second planetary gears which are rotatably supported by means of the second carrier and are engageable with each other; the third planetary gear set is a single-pinion type planetary gear set provided with a third sun gear, a third carrier and a third ring gear, and having a third planetary gear rotatably supported by means of the third carrier; the first rotary element includes the first sun gear and the third sun gear; the second rotary element includes the first carrier and the second sun gear; the third rotary element the first ring gear and the second ring gear; the fourth rotary element includes the second carrier and the third carrier; and the fifth rotating element includes the third ring gear.

8. A planetary gear type multistage transmission for vehicles according to claim 1, wherein the first planetary gear set is a single-pinion type planetary gear set provided with a first sun gear, a first carrier and a first ring gear and having a first planetary gear rotatably supported by means of the first carrier; the second planetary gear set is a single-pinion type planetary gear set provided with a second sun gear, a second carrier and a second ring gear and having a second planetary gear rotatably supported by means of the second carrier; and the third planetary gear set is a double-pinion type planetary gear set provided with a third sun gear, a third carrier, and a third ring gear and having a pair of third planetary gears which are rotatably supported by means of the third carrier and are engageable with each other; the first rotary element includes the first sun gear; the second rotary element includes the first carrier and the second ring gear; the third rotary element includes the first ring gear, the second carrier and the third carrier; the fourth rotary element includes the third ring gear; and the fifth rotary element includes the second sun gear and the third sun gear.

9. A planetary gear type multistage transmission for vehicles according to claim 1, wherein the first planetary gear set is a single-pinion type planetary gear set provided with a first sun gear, a first carrier and a first ring gear, and having a first planetary gear rotatably supported by means of the first carrier; the second planetary gear set is a double-pinion type planetary gear set provided with a second sun gear, a second carrier and a second ring gear and having a pair of second planetary gears rotatably supported by means of the second carrier, which are engageable with each other; the third planetary gear set is a single-pinion type planetary gear set provided with a third sun gear, a third carrier and a third ring gear, and having a third planetary gear rotatably supported by means of the third carrier; the first rotary element includes the third sun gear; the second rotary element includes the first ring gear; the third rotary element includes the first carrier and the second carrier; the fourth rotary element includes the second ring gear and the third carrier; and the fifth rotary element includes the first sun gear, the second sun gear and the third ring gear.

10. A planetary gear type multistage transmission for vehicles according to claim 9, wherein the first carrier and the second carrier, and the first sun gear and the second sun gear are, respectively, composed of a common member, and the first planetary gear is concurrently used as any one of the pair of the second planetary gears which are engageable with each other.

11. A planetary gear type multistage transmission for vehicles, which is composed so that the transmission is provided with a first transmission portion and a second transmission portion, transmits rotations of an input rotating member, which is positioned at the driving-force source side and is rotatable around a first axial center, to the second transmission portion on a second axial center parallel to the first axial center via the first transmission portion, and outputs the rotation from an output rotating member rotating around the second axial center;

wherein the first transmission portion transmits rotations of the input rotating member to the second transmission portion via a first intermediate output path and a second intermediate output path;

the second transmission portion is provided with three planetary gear sets of a first planetary gear set, a second planetary gear set and a third planetary gear set, which are disposed one after another to be concentric with the second axial center, wherein some of five rotary elements are composed of sun gears, carriers and ring gears of the three planetary gear sets connected to each other, the five rotary elements are selectively connected to any one of a first driven member composing the first intermediate output path at the second axial center side, a second driven member composing the second intermediate output path at the second axial center side and a non-rotating member via clutches and brakes;

a rotational speed of the rotary motion transmitted by the second intermediate output path is lower than a rotational speed of the rotary motion transmitted by the first intermediate output path; and the second transmission portion includes a single-pinion type first planetary gear set provided with a first sun gear, a first carrier and a first ring gear having a first planetary gear rotatably supported by means of the first carrier; a double-pinion type second planetary gear set provided with a second sun gear, a second carrier and a second ring gear and having a pair of second planetary gears which are rotatably supported by means of the second carrier and are engageable with each other; and a single-pinion type third planetary gear set provided with a third sun gear, a third carrier and a third ring gear and having a third planetary gear rotatably supported by means of the third carrier; the three planetary gear sets being disposed one after another to be concentric with the second axial center; wherein the third sun gear is selectively connected to the second driven member via a second clutch and is selectively connected to said non-rotating member via a first brake; the first ring gear is selectively connected to the first driven member via a third clutch and is connected to the non-rotating member via a second brake; the first carrier and the second carrier are selectively connected to the non-rotating member via a third brake; the second ring gear and the third carrier are connected to the output rotating member; the first sun gear, the second sun gear and the third ring gear are selectively connected to the first driven member via a fourth clutch and are selectively connected to the second driven member via a first clutch, wherein at least seven forward speed transmission stages are established by selectively engaging and disengaging the clutches and brakes.

* * * * *